(12) United States Patent
Nix

(10) Patent No.: US 12,192,184 B2
(45) Date of Patent: Jan. 7, 2025

(54) SECURE SESSION RESUMPTION USING POST-QUANTUM CRYPTOGRAPHY

(71) Applicant: John A. Nix, Evanston, IL (US)

(72) Inventor: John A. Nix, Evanston, IL (US)

( * ) Notice: Subject to any disclaimer, the term of this patent is extended or adjusted under 35 U.S.C. 154(b) by 202 days.

(21) Appl. No.: 18/063,192

(22) Filed: Dec. 8, 2022

(65) Prior Publication Data
US 2023/0308424 A1 Sep. 28, 2023

Related U.S. Application Data

(60) Provisional application No. 63/287,384, filed on Dec. 8, 2021.

(51) Int. Cl.
*H04L 9/40* (2022.01)
*H04L 9/08* (2006.01)
*H04L 9/32* (2006.01)

(52) U.S. Cl.
CPC ............ *H04L 63/045* (2013.01); *H04L 9/085* (2013.01); *H04L 9/0852* (2013.01); *H04L 9/0861* (2013.01); *H04L 9/3242* (2013.01)

(58) Field of Classification Search
CPC ....... H04L 9/0852–0861; H04L 9/3093; H04L 9/3262; H04L 63/045
See application file for complete search history.

(56) References Cited

U.S. PATENT DOCUMENTS

| 8,681,996 | B2 | 3/2014 | Sabev |
| 8,782,774 | B1 | 7/2014 | Pahl et al. |
| 9,531,685 | B2 | 12/2016 | Gero et al. |
| 9,673,977 | B1 | 6/2017 | Kalach |
| 9,819,656 | B2 | 11/2017 | Carlson |
| 9,985,782 | B2 | 5/2018 | McCallum |
| 10,169,587 | B1 | 1/2019 | Nix |
| 10,218,504 | B1 | 2/2019 | Kalach et al. |

(Continued)

FOREIGN PATENT DOCUMENTS

WO 2022060471 A2 3/2022

OTHER PUBLICATIONS

Guerin, et al., "Method for Exchanging Cryptographic Keys for Quantum-secure Communication Between a Server and a Client", Jul. 22, 2021, DE 102020200726 A1 (English Translation), pp. 1-29 (Year: 2021).*

(Continued)

*Primary Examiner* — Jonathan A Bui
(74) *Attorney, Agent, or Firm* — GrowIP Law Group LLC

(57) ABSTRACT

A server and a device can support secure sessions with both (i) post-quantum cryptography (PQC) key encapsulation mechanisms (KEM) and (ii) session resumption. In an initial secure session, the device and server can mutually generate a first shared secret key K1 from a first KEM based on a device PKI key pair. The device and server can mutually generate a second shared secret key K2 from a second KEM based on a server PKI key pair. The device and server can mutually generate a symmetric ciphering key S2 from both K1 and K2. The server can encrypt an identity for a "pre-shared" secret key (PSK-ID) with S2. The device and server can (i) mutually generate a PSK from both K1 and K2 and (ii) close the initial secure session. The device can transmit a message to resume the session, where the message includes the PSK-ID and a MAC value.

13 Claims, 16 Drawing Sheets

(56) References Cited

U.S. PATENT DOCUMENTS

| | | |
|---|---|---|
| 10,412,063 B1 | 9/2019 | Mandich et al. |
| 11,153,080 B1 | 10/2021 | Nix |
| 2002/0166048 A1 | 11/2002 | Coulier |
| 2009/0049299 A1 | 2/2009 | Jablon et al. |
| 2013/0051551 A1 | 2/2013 | El Aimani |
| 2013/0114810 A1 | 5/2013 | Kobayashi et al. |
| 2014/0089658 A1 | 3/2014 | Raghuram |
| 2014/0195804 A1 | 7/2014 | Hursti |
| 2015/0067338 A1 | 3/2015 | Gero et al. |
| 2015/0271146 A1 | 9/2015 | Holyfield |
| 2016/0065370 A1 | 3/2016 | Le Saint |
| 2017/0012974 A1 | 1/2017 | Sierra et al. |
| 2019/0097794 A1 | 3/2019 | Nix |
| 2019/0149527 A1 | 5/2019 | Rhidian |
| 2019/0386825 A1 | 12/2019 | Bhattacharya et al. |
| 2020/0235929 A1 | 7/2020 | Jacobs et al. |
| 2020/0259647 A1* | 8/2020 | Goncalves ............... H04L 9/14 |
| 2020/0304305 A1 | 9/2020 | Garcia Morchon et al. |
| 2020/0314115 A1 | 10/2020 | Nabeesa et al. |
| 2020/0374129 A1 | 11/2020 | Dilles et al. |
| 2020/0396060 A1* | 12/2020 | Wu .................... G06Q 20/0655 |
| 2020/0403978 A1 | 12/2020 | Allen et al. |
| 2021/0058242 A1 | 2/2021 | Donsomsakunkij et al. |
| 2021/0083862 A1 | 3/2021 | Pointcheval et al. |
| 2022/0345298 A1* | 10/2022 | Cap ...................... H04L 9/0869 |
| 2023/0254132 A1* | 8/2023 | Ramanathan ............ H04L 9/14 380/28 |
| 2024/0273221 A1* | 8/2024 | Shea .................... H04L 9/0852 |

OTHER PUBLICATIONS

Wikipedia, "Post-Quantum Cryptography Standardization", Oct. 29, 2021.
GSM Association, "iUICC POC Group Primary Platform requirements", Release 1.0, May 17, 2017.
ETSI Technical Standard 103 465 v. 15.0.0, "Smart Cards; Smart Secure Platform (SSP); Requirements Specification", May 2019.
Bos, et al, "CRYSTALS—Kyber: a CCA-secure module-lattice-based KEM", NIST PQC Round 1 Submission Package, Nov. 2017.
Jao, et al, "Supersingular Isogeny Key Encapsulation", NIST PQC Round 2 Submission Package, Apr. 17, 2019.
Krawczyk, et al, "HMAC-based Extract-and-Expand Key Derivation Function (HKDF)", Internet Engineering Task Force (IETF), RFC 5869, May 2010.
Aragon, et al, "BIKE—Bit-Flipping Key Encapsulation", NIST PQC Conference, Apr. 13, 2018.
Fischlin, et al, "Multi-Stage Key Exchange and the Case of Google's QUIC Protocol", Association for Computing Machinery Conference on Computer and Communications Security 2014, p. 1193-1204, 2014.
Krawczyk, et al, "The OPTLS Protocol and TLS 1.3", Proc. IEEE European Symposium on Security and Privacy, 2016.
European Telecommunications Standards Institute (ETSI), Technical Report 103 823 V1.1.1, "Cyber; Quantum-Safe Public-Key Encryption and Key Encapsulation", Sep. 2021.
Internet Engineering Task Force (IETF) Request for Comments (RFC) 8446, "The Transport Layer Security (TLS) Protocol Version 1.3", Aug. 2018.

* cited by examiner

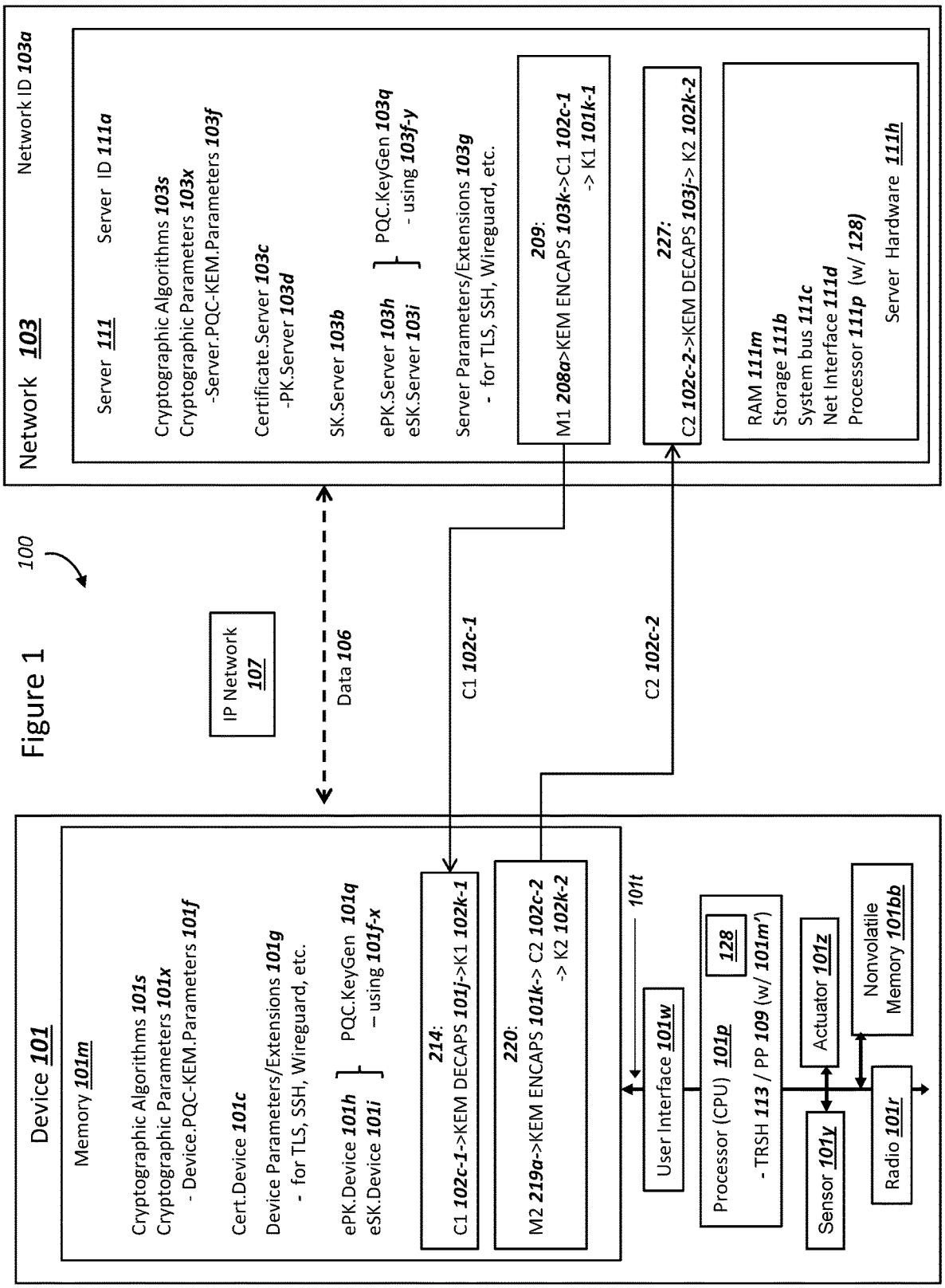

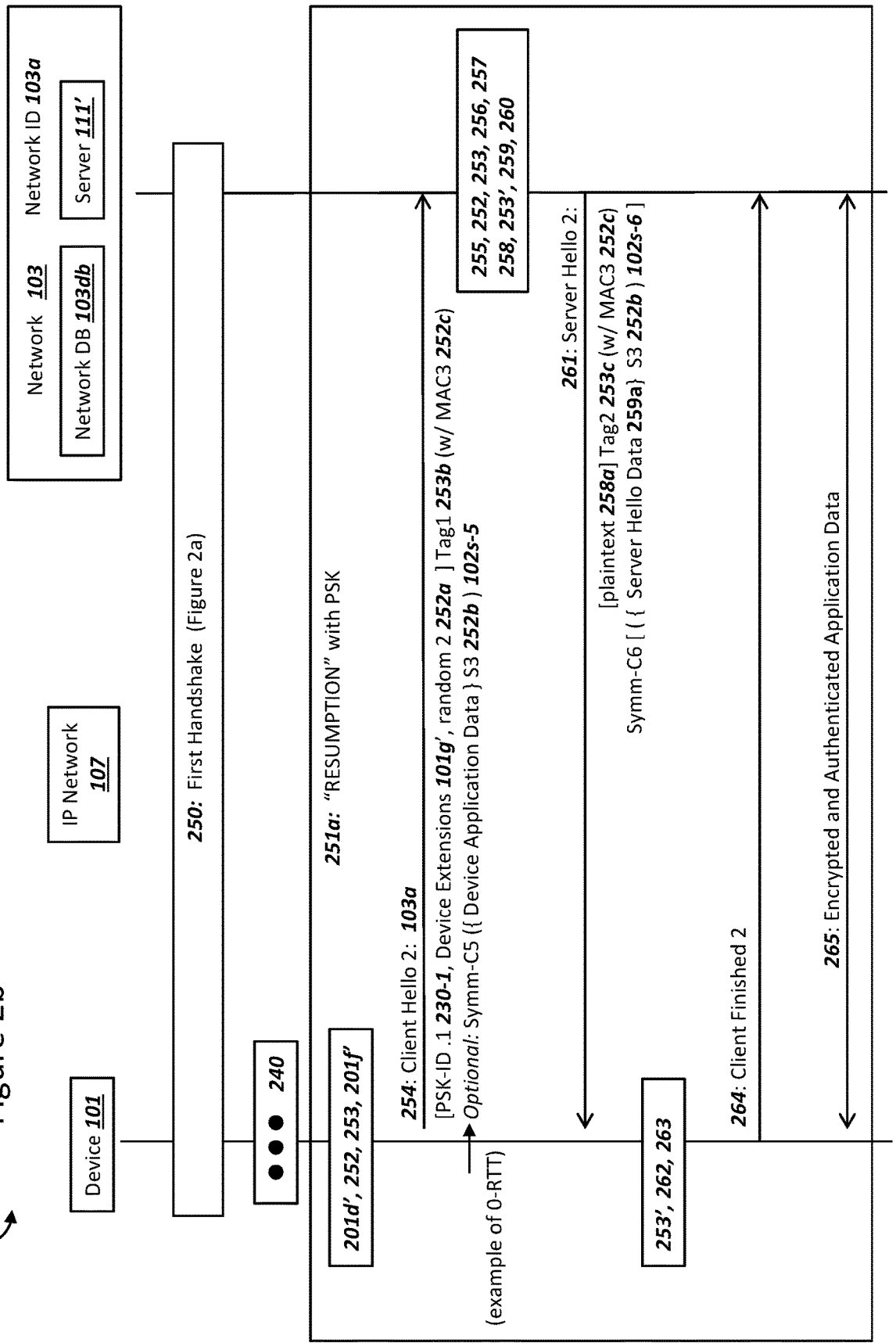

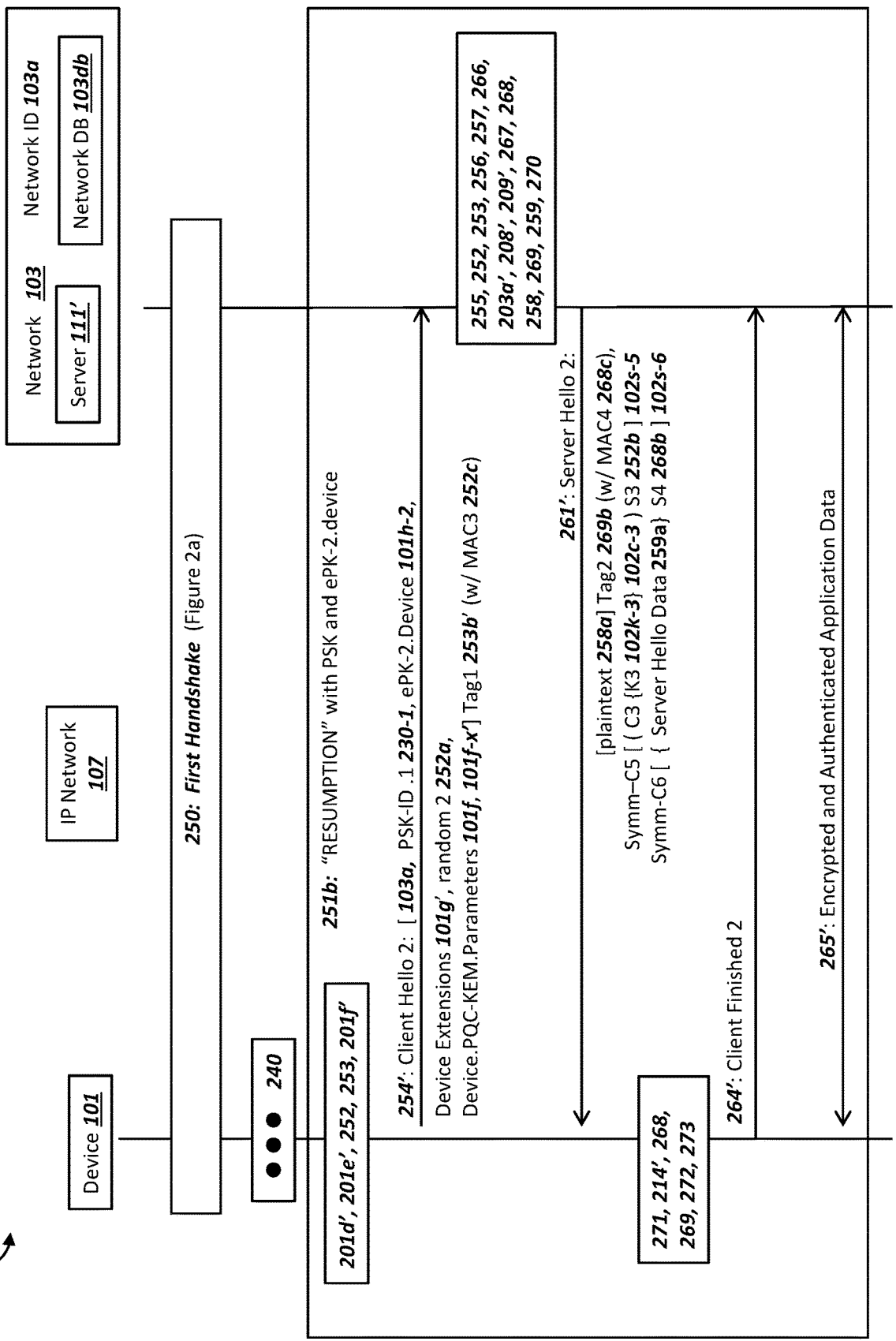

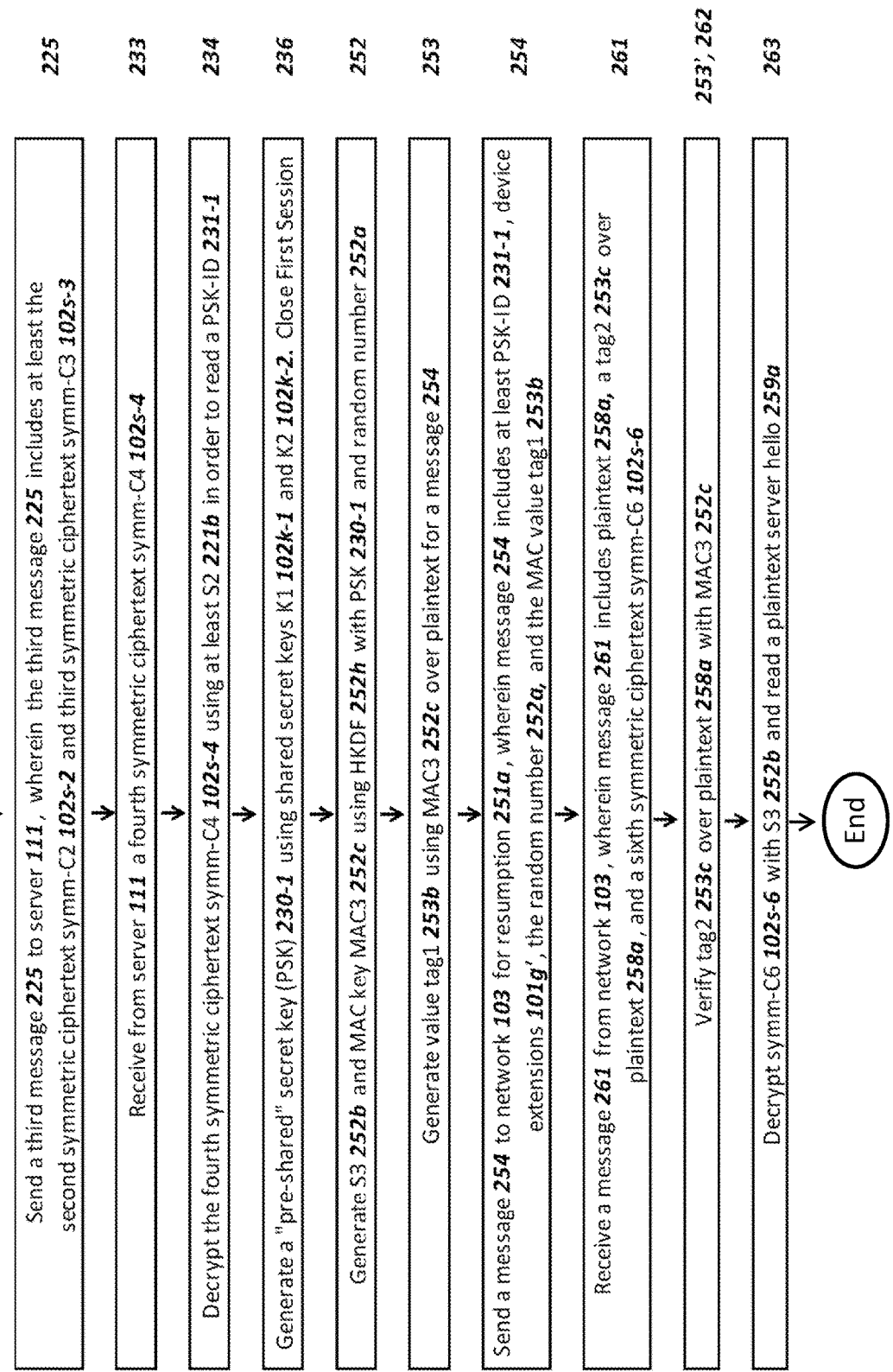

Continued in Figure 10b

SECURE SESSION RESUMPTION USING POST-QUANTUM CRYPTOGRAPHY

RELATED APPLICATIONS

The present application claims the benefit of U.S. Provisional Application No. 63/287,384, filed Dec. 8, 2021, which is incorporated herein by reference in its entirety.

BACKGROUND

Technical Field

The present systems and methods relate to devices and servers securing communications using post-quantum cryptography (PQC) key encapsulation mechanisms (KEM) with authentication, and more particularly to generating "pre-shared keys" from a first session handshake for subsequent secure communications, in order to improve efficiency, increase flexibility, and enhance data session security.

Description of Related Art

Many protocols for secure communications through the public Internet depend on classical public key infrastructure (PKI) algorithms of Rivest-Shamir-Adleman (RSA), Diffi-Hellman (DH), or elliptic curve cryptography (ECC). ECC algorithms include elliptic curve Diffie-Hellman (ECDH) key exchanges. Example protocols as of November 2021 include current, published versions of Transport Layer Security (TLS), Secure Shell (SSH), Datagram Transport Layer Security (DTLS), the embedded SIM from the GSMA, the Device Provisioning Protocol (DPP) from the WiFi Alliance™, the Open Firmware Loader from Global Platform, and IP Security (IPSec). Many other examples exist as well. The security of the majority of communications on the public Internet today depend on at least one of RSA, DH, or ECC based algorithms.

Although the use of RSA, DH, and ECC algorithms are included in many different protocols and standards, quantum computers are expected to be able to solve both (i) the elliptic curve discrete logarithm problem (for DH and ECC algorithms) and (ii) the integer factorization problem (for RSA algorithms) in polynomial time, while classical computers solve the problem in exponential time or sub-exponential time. As of mid 2020, estimates for the number of high quality and long coherent logical qubits required to feasibly break a 256 bit ECC public key to determine the private key with a reasonable computation time are approximately 2000-4000 qubits. Estimates for the number of equivalent logical qubits required to break a 3072 bit RSA based PKI public key to determine the private key are approximately 4000-8000 qubits. Current industry projections of the number of qubits for operating quantum computers project this number of qubits could be available for a computing device in approximately 10 years and likely within 15 years. Consequently, a need exists in the art for secure sessions to support cryptographic algorithms based on hard problems for quantum computers that are not based on either the elliptic curve discrete logarithm problem or the integer factorization problem. A need exists in the art for secure sessions to continue using PKI keys for exchanging shared secrets, where a public key can be publicly shared and the corresponding private keys securely stored.

The National Institute of Standards and Technology (NIST) in 2021 continues to conduct a project for Post-Quantum Cryptography (PQC) Standardization. The field of post-quantum cryptography continues to develop with proposed algorithms currently undergoing as of December 2021 detailed evaluation and revisions for standardization. In general, the leading candidates for post-quantum cryptography key exchange or "key encapsulation mechanisms" (KEM) propose using lattice-based algorithms, code-based algorithms, or Supersingular Isogeny Key Encapsulation (SIKE). These proposed algorithms are described by the Wikipedia article for "NIST Post-Quantum Cryptography Standardization" dated Oct. 29, 2021, which is hereby incorporated by reference and referred to as the Wikipedia PQC article. The above KEM algorithms propose, in summary, a first party deriving a PKI key pair, sending a public key to a second party, receiving a ciphertext processed with the public key from the second party, and processing the ciphertext with a private key in order determine a shared secret key for both the first party and the second party.

The exemplary algorithms for PQC KEM standardization generally have less long-term, detailed study and confirmation of security of the associated underlying "hard" problems, compared to integer factoring and calculating discrete logarithms. Consequently, the emergence of cryptographically relevant quantum computers (QRQC) over approximately the coming decade (which may feasibly solve current hard problems for PKI cryptography commonly used) requires the industry to shift to cryptographic algorithms that have potential uncertainty for long-term security. In other words, it is currently not proven that lattice-based cryptography, code-based cryptography, or SIKE problems cannot be solved in polynomial time by either classical computers or quantum computers. A need exists in the art for secure sessions using PQC algorithms to provide security greater than the security provided by any single PQC algorithm (e.g. lattice-based, code-based, or SIKE), in order to reduce concerns and uncertainty about migrating from RSA, ECC, DH algorithms to PQC algorithms.

The most widely deployed standard for secure sessions on the public Internet today is TLS version 1.2 as specified in the Internet Engineering Task Force (IETF) 5246. As one example, the Payment Card Industry Security Standards Council recommends at least TLS v1.2 as of late-2021. TLS version 1.2 normally requires that four handshake messages are exchanged before a device or client can receive server encrypted application data. The four handshake messages result in a single initial shared secret key and symmetric encryption derived from a single algorithm using PKI (e.g. RSA, DH, or ECDH). Many large corporations and web sites are also adding support for TLS version 1.3. TLS version 1.3 supports a device or client sending the server encrypted device application data after two handshake messages (e.g. "Client Hello" and "Server Hello"), but again only supports a single initial shared secret key derived from a single PKI algorithm for key exchange.

If the single PKI algorithm is found weakened with either classical computers or cryptographically relevant quantum computers, then the single initial shared secret key used for encryption may no longer be adequately secured, and the overall secure session for data confidentiality may also no longer be secured. A need exists in the art for secure sessions to use PQC KEM for generating two initial shared secrets that are independently generated based on two different PQC KEM algorithms, such that if one of the initial shared secrets is found weakened with either classical computers or cryptographically relevant quantum computers, then the overall secure session for data confidentiality can still be secured by the other initial shared secret.

A need exists in the art for a device and a server to transmit and receive encrypted application data with both (i) a minimal number of handshake messages, while (ii) simultaneously supporting two distinct PQC KEM algorithms. In other words, new technology is needed for secure communication to be established with the minimum number of messages such that two distinct PQC KEM algorithms could also be utilized. A need exists in the art for both efficiency (from minimal handshake messages) while preferably supporting two distinct PQC KEM algorithms (where overall security is at least the stronger of the two PQC KEM algorithms), such that future potential weaknesses from any single PQC KEM algorithm has minimal impact on the overall security established for the session.

Secure sessions between a device and a server should also preferably support forward secrecy. In general forward secrecy is supported through the use of at least one ephemeral PKI key pair from either the device or the server, which is available with conventional technology. In this manner, shared secret keys and resulting symmetric ciphering keys are generally not compromised from the release or compromise of a static private key used to establish the secure session, such as a static private key for generating. As one example, TLS v 1.3 provides forward secrecy through the use of two ephemeral ECDH PKI key pairs (one for the client and one for the server). However, the two ephemeral ECDH PKI key pairs are used for a single ECDH key exchange which results in both (i) a single initial shared secret key and (ii) security that depends on a single algorithm (e.g. ECC). A need exists in the art for a client/device and a server/host to both (i) obtain forward secrecy through the use of ephemeral PKI keys, and (ii) obtain security for the session from two distinct PQC algorithms (e.g. two algorithms from lattice-based algorithms, code-based algorithms, and SIKE).

With conventional technology, KEM algorithms with openly shared public keys can be subject to "Man in the Middle" (MITM) attackers that can try to substitute public keys such as an unauthenticated device ephemeral public key, and/or a server ephemeral public key with an ephemeral public key for the attacker. Establishing a secure session with KEM algorithms that are resistant to MITM attackers increase complexity as well as potentially requiring additional message and data shared within the handshake messages. A need exists in the art for both a device and a server to efficiently use PQC KEM algorithms with the minimum number of handshake messages and reduced additional data in order to establish secure communications resistant to a MITM attacker.

The use of secure sessions between devices and servers can prefer to use session resumption. After initial handshake messages and the transfer of encrypted application data, session may be closed at the networking layer using transmission control protocol (TCP) or user datagram protocol (UDP) packets. A device and a server can resume the session using keys and identifiers generated during the initial session. The benefit is that bandwidth and computational resources can be conserved with session resumption by avoiding the full set of handshake messages. The benefit of session resumption can include avoiding a second time (i) the derivation of the first and second shared secrets a second time and (ii) generation/verification of digital signatures. Conventional technology for secure sessions, such as TLS version 1.3, supports resumed sessions with a "pre-shared" secret key (from the initial session) and equivalent mechanisms are provided with earlier versions of TLS. However, with TLS 1.3, the only shared secret generated by the device and server is a single shared secret from an (EC) DH key exchange. Increased risks for lower security resulting from a single shared secret are discussed above. A need exists in the art for secure sessions using PQC KEM to support session resumption in a manner that supports deriving a "pre-shared" secret key from previously established shared secret keys. A need exists in the art for the device and the server share identification regarding the "pre-shared" secret key in a manner that is more secure than provided with TLS 1.3 and previous versions. A need exists in the art for the "pre-shared" secret key to be secured against cryptographically relevant quantum computers.

Conventional technology for resuming secure sessions, such as within TLS 1.3, does not support the use of message authentication code (MAC) values over data in a second "Client Hello" message for resuming a secure session. Likewise, conventional technology does not support MAC values that are generated in a manner that is secured against cryptographically relevant quantum computers. A MITM attacker could receive a second "Client Hello" message for resuming secure sessions supporting PQC algorithms. The MITM attacker could feasibly attempt to alter data within the second "Client Hello" message that does not include MAC values. A need exists in the art to securely generate MAC values for a second "Client Hello" message to resume a session, where the MAC values can be generated using data from the first session and also be secured against cryptographically relevant quantum computers.

Many other examples exist as well for needs in the art for devices and servers or networks to support PQC KEM algorithms resistant to quantum computers. The above examples are just a few and intended to be illustrative instead of limiting.

SUMMARY

Methods and systems are provided for a device and a server to establish secure communications based on post-quantum cryptography (PQC) key encapsulation mechanisms (KEM). Methods and systems are provided for a device and a server to securely resume a first session that was based on the PQC KEM. The methods and systems provided herein can address exemplary needs in the art described above and other benefits are available as well, including increasing the security from using both a first KEM and a second KEM during the initial handshake messages for establishing a secure session or secured communications. In exemplary embodiments, a device or client can support a first set of PQC KEM algorithms and a server can support a second set of PQC KEM algorithms. The first and second sets of PQC KEM algorithms can support at least a first mutually shared PQC KEM algorithm and a second mutually shared PQC KEM algorithm. The device can derive a device ephemeral public key and device ephemeral private key for the first mutually shared PQC KEM algorithm.

The device can send the server a first message, which could comprise a "Client Hello" message. The first message can include (i) the device ephemeral public key, (ii) an identifier or code specifying the first mutually shared PQC KEM algorithm for the device ephemeral public key, and (ii) the first set of PQC KEM algorithms supported by the device. The server can receive the first message and select the second mutually shared PQC KEM algorithm from overlap between (i) the first set of PQC KEM algorithms supported by the device and (ii) the second set of PQC KEM algorithms supported by the server. In exemplary embodiments the first mutually shared PQC KEM algorithm selected by the device can support a type comprising one of lattice-based cryptography, code-based cryptography, and SIKE. In exemplary embodiments the second mutually shared PQC KEM algorithm selected by the server can support a type both (i) comprising one of lattice-based cryptography, code-based cryptography, and SIKE, and (ii) different than the type selected by the device. In this manner, two different types of PQC KEM algorithms can be mutually supported and subsequently used by both the device and the server.

An exemplary system can include a computing device and a server. The server can be operated and controlled by a network. The server can include server computing hardware, where computer hardware can comprise electrical components for processing, storing, sending or transmitting, and receiving data, including communication with other nodes via data networks. For some exemplary embodiments, a server can comprise a virtual machine operating on a host server, where the host server includes server computing hardware. Server computing hardware can include at least one processor in order to store and record data as well as communicate with other nodes over an IP network, such as with a computing device operating at a remote location from the server.

The computing device could comprise a smartphone, a laptop computer, a second server, a smart camera, an intelligent sensor for the "internet of things", a tracking device, health monitoring equipment in a hospital, a desktop computer, and other possibilities exist as well. The computing device operates a client program or executable instructions by a processor in the device for communicating with the server. Both the device and the server can store cryptographic algorithms for processing both (i) the first mutually shared PQC KEM algorithm selected by the device and (ii) the second mutually shared PQC KEM algorithm selected by the server. Both the device and the server can store (i) a first set of parameters associated with the first mutually shared PQC KEM algorithm selected by the device and (ii) the second mutually shared PQC KEM algorithm selected by the server.

The server can derive a server ephemeral private key and a corresponding server ephemeral public key using the second mutually shared PQC KEM algorithm selected by the server. The server can conduct a first KEM using a KEM encapsulation function (KEM ENCAPS) with (i) the received device ephemeral public key from the first message and (ii) the first mutually shared PQC KEM algorithm selected by the device. The output of the KEM ENCAPS can be both (i) a first asymmetric ciphertext C1 and (ii) a first shared secret key K1.

The server can store a server certificate and a corresponding server static public key. The server can generate a digital signature over at least (i) the derived server ephemeral public key, and (ii) at least one of the first asymmetric ciphertext C1 and the first shared secret key K1. The server can use a first hash-based key derivation function or an HMAC-based Extract-and-Expand Key Derivation Function (HKDF) with at least the first shared secret key K1 to derive at least a first symmetric ciphering key. The server can use a symmetric ciphering algorithm and the first symmetric ciphering key to encrypt into a first symmetric ciphertext symm-C1 at least (i) the derived server ephemeral public key, (ii) an identity or code for the second mutually shared PQC KEM algorithm selected by the server, (iii) the server certificate, and (iv) the digital signature. The server can generate a response second message that includes at least (i) metadata for the symmetric ciphering algorithm (e.g. at least an identity or parameters for the symmetric ciphering algorithm), (ii) the first asymmetric ciphertext C1, and (iii) the first symmetric ciphertext symm-C1. The server can send the response second message to the device, and the response second message can comprise a "Server Hello" message.

The device can receive the response second message and conduct a series of steps in order to process the message. The device can conduct the first KEM using a KEM decapsulation function (KEM DECAPS) with the received first asymmetric ciphertext in order to mutually derive or generate the first shared secret key K1. The device can use the first HKDF with at least the first shared secret key K1 to mutually derive at least the first symmetric ciphering key. The device can use (i) the metadata, (ii) the symmetric ciphering algorithm, and (iii) the mutually derived first symmetric ciphering key to decrypt the first symmetric ciphertext symm-C1 into a plaintext. The device can use the server certificate from the plaintext to verify the digital signature. Note that the digital signature can be verified over at least one of the first asymmetric ciphertext C1 and the first shared secret key K1, and in this manner the device can confirm that the first asymmetric ciphertext C1 and the corresponding response second message originated by the server (and not from a potential "Man in the Middle" attacker). The device can verify the server certificate up to a securely stored certificate issuer certificate.

The device can conduct a second KEM using a KEM encapsulation function (KEM ENCAPS) with (i) the received server ephemeral public key from the plaintext (e.g. transmitted within the first symmetric ciphertext symm-C1) and (ii) the second mutually shared PQC KEM algorithm selected by the server also from the plaintext. The output of the KEM ENCAPS can be both (i) a second asymmetric ciphertext C2 and (ii) a second shared secret key K2.

In some exemplary embodiments, the second asymmetric ciphertext C2 can be "double encrypted" into an encrypted second symmetric ciphertext symm-C2 by the device using the first symmetric ciphering key and the symmetric ciphering algorithm. In other words, the second asymmetric ciphertext C2 can be data that is asymmetrically encrypted using the second mutually shared PQC KEM algorithm and the server ephemeral public key. The encrypted second symmetric ciphertext symm-C2 can comprise data that is both (i) asymmetrically encrypted using the KEM and then also (ii) symmetrically encrypted using the first symmetric ciphering key. As contemplated herein, a symmetric ciphering algorithm can use both a symmetric ciphering key and a corresponding message authentication code (MAC) key. The MAC key can be used with a MAC algorithm in order to generate MAC values or tag values for message verification and integrity checks. In other exemplary embodiments, the second asymmetric ciphertext C2 can be "MACed" with a MAC key generated by the first HKDF, and a symmetric encryption of the second asymmetric ciphertext C3 could be omitted. Device can specify second metadata for a third message below that indicates if the device sends to the server the second asymmetric ciphertext C2 as a "double encrypted" second symmetric ciphertext symm-C2, and other possibilities exist as well for a device and a server to specify the use and communication of a "double encrypted" second symmetric ciphertext symm-C2.

The device can use a second HKDF with at least the second shared secret key K2 to derive at least a second symmetric ciphering key. For preferred exemplary embodiments, the device can use at least both (i) the first shared secret key K1 output from the device KEM DECAPS function and also (ii) the second shared secret key K2 output from the device KEM ENCAPS function in order to derive at least the second symmetric ciphering key. In this manner, the second symmetric ciphering key can provide a security level of at least the stronger of the first KEM (e.g. used the KEM DECAPS) and the second KEM (e.g. used with the KEM ENCAPS). Thus, if one KEM is later found compromised or broken in the future, the second symmetric ciphering key can remain secured by the other KEM. This feature provides benefits over conventional technology and addresses needs in the art identified above, where a current PQC algorithm proposed for standardization could have currently unidentified weaknesses identified in the future. In other words, the input of both the first shared secret key K1 and the second shared secret key into the second HKDF to derive the second symmetric ciphering key can provide an overall higher level of security, and other benefits can be achieved as well.

The device can select a second plaintext for encryption to include in a third message, which could comprise data for a "Client Finished" message. The second plaintext could include (i) final handshake data and also potentially (ii) application data from the device to the server. The application data could be sensor data, device configuration data, a registration message, and other possibilities exist as well. The second plaintext could also include a device certificate as well as a digital signature from the device. The device can use (i) the metadata from the response second message, (ii) the symmetric ciphering algorithm, and (iii) the derived second symmetric ciphering key to encrypt the second plaintext into a third symmetric ciphertext symm-C3. The device can send the server the third message, where the third message can include at least the second asymmetric ciphertext C2 (possibly as a "double encrypted" second symmetric ciphertext symm-C2) and the third symmetric ciphertext C3.

The server can receive the third message and conduct a series of steps to process the third message. In preferred exemplary embodiments where the third message includes the "double encrypted" second symmetric ciphertext symm-C2, the server can use the symmetric ciphering algorithm and the first symmetric ciphering key to decrypt the "double encrypted" second symmetric ciphertext symm-C2 into a second asymmetric ciphertext C2. In other words, the second symmetric ciphertext symm-C2 could comprise data that is both (i) asymmetrically encrypted using the second KEM and the server ephemeral public key and (ii) symmetrically encrypted using the first mutually derived symmetric ciphering key. If present, the symmetric encryption for a second symmetric ciphertext symm-C2 could be removed or "unwrapped" using the first mutually derived symmetric ciphering key. After removal of the symmetric encryption, the server can read the second asymmetric ciphertext symm-C2 which comprises data that has been asymmetrically encrypted.

The server can conduct a second KEM using a KEM decapsulation function (KEM DECAPS) with (i) the second asymmetric ciphertext C2, (ii) the second mutually shared PQC KEM algorithm selected by the server, and (iii) the server ephemeral private key. The output of the KEM DECAPS can be the second shared secret key K2. The server can use the second HKDF with at least the second shared secret key K2 to mutually derive at least the second symmetric ciphering key. For preferred exemplary embodiments, the server can use at least both (i) the first shared secret key K1 output from the server KEM ENCAPS function and also (ii) the second shared secret key K2 output from the server KEM DECAPS function in order to derive at least the second symmetric ciphering key. The security benefits for including both the first and second shared secret keys K1 and K2 in the generation of the second symmetric ciphering key are described above for the device generation of the second symmetric ciphering key.

The server can use (i) the symmetric ciphering algorithm, and (ii) the mutually derived second symmetric ciphering key to decrypt the third symmetric ciphertext symm-C3 into the second plaintext. The server can confirm a final device handshake message from the second plaintext. The server can subsequently process server application data and derive additional symmetric ciphering keys using at least the first and second shared secret keys K1 and K2.

Before closing or ending the initial secure session, the server and device can derive a "pre-shared" secret key (PSK) for use with session resumption after a first session with the device has been closed. In other words, the device or server may temporarily end communications from a first session. The device may later prefer and/or request to resume the secure communication without requiring (i) second processing of the full set of PQC KEM algorithm calculations to re-derive the first and second shared secrets, (ii) the bandwidth to share ephemeral public keys, as well as (iii) the bandwidth and processing power required to generate and verify digital signatures. For preferred exemplary embodiments, the server and device can use at least both (i) the first shared secret key K1 output from the first KEM and also (ii) the second shared secret key K2 output from the second KEM in order to derive at least the PSK. The security benefits for including both the first and second shared secret keys K1 and K2 in the generation of the PSK are described above for the device generation of the second symmetric ciphering key. The device can store the PSK in device memory for later use with a resumed session.

The server can also generate an identity or identifier of the PSK comprising a PSK-ID. The PSK-ID could comprise a string and/or a number to uniquely identify the PSK mutually generated in the paragraph above. The server can store both the PSK and the PSK-ID in a network database, where the network database can be connected to the server and also additional servers within a network that can receive a request for a resumed session from device 101. In preferred exemplary embodiments, the server can encrypt at least the PSK-ID into a fourth symmetric ciphertext symm-C4 using the second symmetric ciphering key. The server can transmit the fourth symmetric ciphertext symm-C4 to the device and the device can receive the fourth symmetric ciphertext symm-C4. The device can decrypt the fourth symmetric ciphertext symm-C4 using the second symmetric ciphering key and read the plaintext value for the PSK-ID. The device can store the PSK-ID in device memory for use with a resumed session. The device and/or the server can end the initial secure session by exchanging a close or finish message. The device and server can flush, delete, or write over cryptographic keys in memory related to the first session, including the deletion of keys K1, K2, ephemeral secret keys, and related values generated or used during the first and second KEM. In this manner, future security of encrypted data from the first session can be enhanced.

After a period of time, which can depend on the application for the device using the initial secure session, the device can prepare a message for the server for session resumption using the PSK generated in the initial secure session. As described above, session resumption can conserve resources while providing sufficient security that was achieved during the initial secure session. The device can generate a third symmetric ciphering key and a corresponding third MAC key using a HKDF with at least the PSK. The device can also generate a random number for use with the resumed session. In some embodiments, the device can generate the third symmetric ciphering key using the HKDF with at least the PSK and the random number. The device can select updated device extensions for the resumed session. The device can generate a tag value over the PSK-ID, the updated device extensions, and the random number using a MAC algorithm and the third MAC key. The device can send a message comprising a second "Client Hello" message to request session resumption, where the message can comprise the PSK-ID, the updated device extensions, the random number, and the tag value.

A benefit of the tag value is that a MITM attacker could not feasibly alter or substitute the PSK-ID (such as trying to use a different PSK-ID the MITM attacker generated with the network in a different initial secure session than the one described above). In addition, the MITM attacker could not feasibly alter the updated device extensions for the resumed session, such as attempting a "downgrade" attack by inserting false updated device extensions with reduced security or deprecated algorithms. Also, the random number generated by the device for the second "Client Hello" message could also not be feasibly altered through the use of the tag value based on the third MAC key.

The server can receive the second "Client Hello" message and perform steps to process the message. The server can use the PSK-ID from the message to query the network database to select and receive the corresponding PSK. The server can generate a third symmetric ciphering key and a corresponding third MAC key using a HKDF with at least the PSK. The server can also receive the random number for use with the resumed session in the second "Client Hello" message. In some embodiments, the server can generate the third symmetric ciphering key using the HKDF with at least the PSK and the random number. The server can generate the tag value over the PSK-ID, the device extensions, and the random number using a MAC algorithm and the third MAC key. The server can compare the generated tag value with the received tag value from the second "Client Hello" message. If the generated tag value and the received tag value match, the server can authenticate or verify that the second "Client Hello" message has been generated by the device that performed the initial secure session (e.g. the device has mutually derived the PSK). The server can then generate a sixth symmetric ciphertext comprising server hello data that is encrypted with the third symmetric ciphering key. The server can transmit the sixth symmetric ciphertext to the device and the device can decrypt the sixth symmetric ciphertext using the mutually derived third symmetric ciphering key. The device and server can then take additional steps using the PSK to transfer encrypted and authenticated application data.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1 is a graphical illustration of an exemplary system, where a device and a network process and communicate data in order to establish secure communications, in accordance with exemplary embodiments;

FIG. 2b is a simplified message flow diagram illustrating an exemplary system with exemplary data transmitted and received by a device and a network for resuming a secure session, in accordance with exemplary embodiments;

FIG. 2c is a simplified message flow diagram illustrating an exemplary system with exemplary data transmitted and received by a device and a network for resuming a secure session, in accordance with exemplary embodiments;

FIG. 9b is a flow chart illustrating exemplary steps for a device to conduct multiple key encapsulation mechanisms (KEM) and resume a secure session with a "pre-shared" secret key, in accordance with exemplary embodiments;

DETAILED DESCRIPTION OF EXEMPLARY EMBODIMENTS OF THE INVENTION

FIG. 1

Figure 2A:
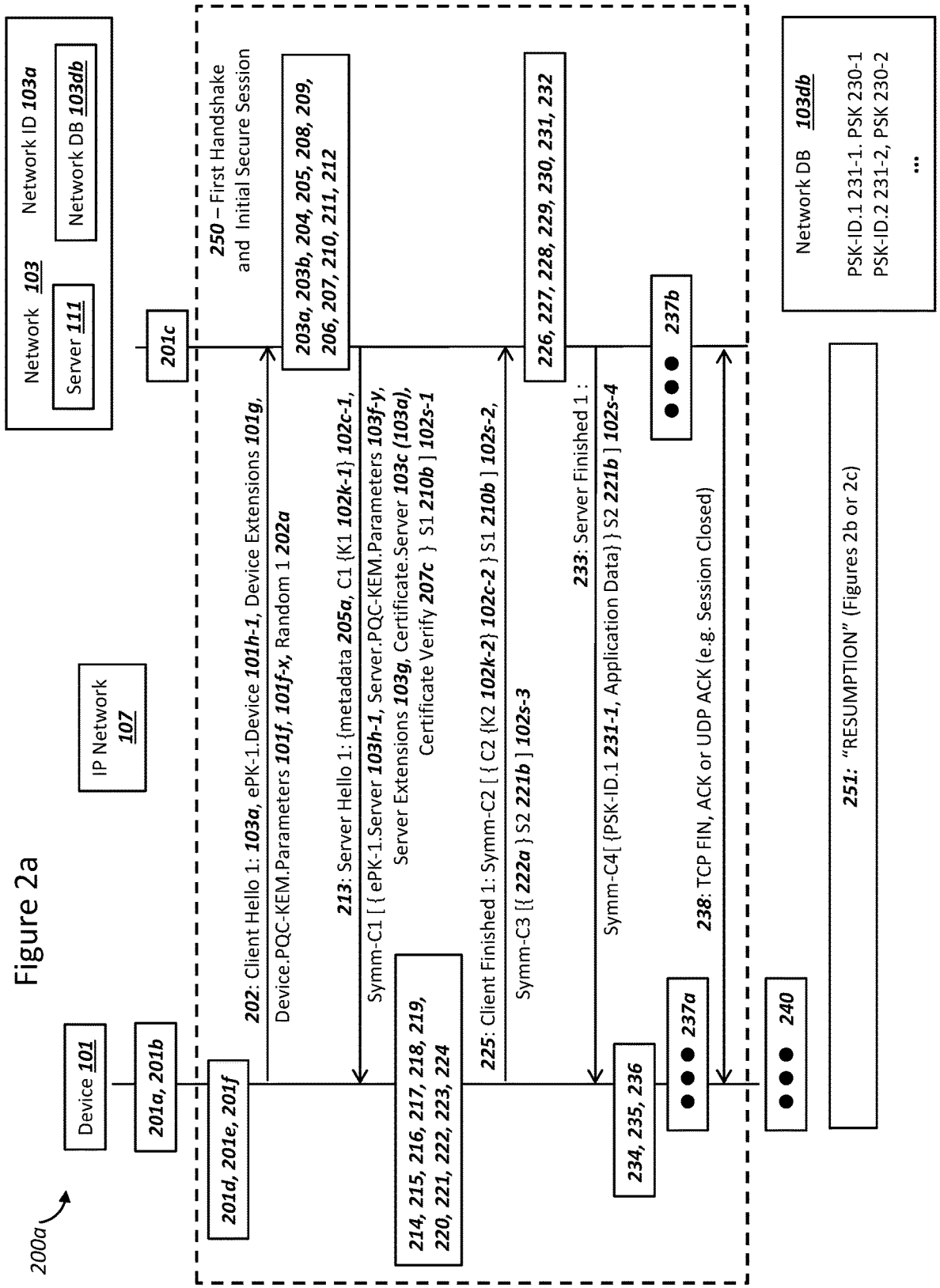
FIG. 2a is a simplified message flow diagram illustrating an exemplary system with exemplary data transmitted and received by a device and a network, in accordance with exemplary embodiments.

FIG. 1 is a graphical illustration of an exemplary system, where a device and a network process and communicate data in order to establish a secure communications, in accordance with exemplary embodiments. The system 100 can include a device 101, an Internet Protocol (IP) network 107, and a network 103. The depicted nodes or entities can communicate data 106 over the IP network 107. Although a single device 101 and a single network 103 are depicted in FIG. 1, a system 100 can comprise a plurality of each of the depicted nodes or entities. A system 100 as depicted in FIG. 1 can support secure sessions between the device 101 and the network 103 such as, but not limited to, using a protocol for Transport Layer Security (TLS), Datagram Transport Layer Security (DLTS), a virtual private network (VPN), IP Security (IPSec), Secure Shell (SSH), and Wireguard VPN tunnels. Although the standardized protocols listed in the previous sentence as of November 2021 do not normally include support for post-quantum cryptographic algorithms, these protocols in the future are expected to include support for post-quantum cryptographic algorithms, including key encapsulation mechanisms using PKI and the use of quantum safe digital signatures. Other possibilities exist as well for secure protocols supported between device 101 and network 103, without departing from the scope of the present disclosure.

Device 101 and network 103 can utilize a variety of wireless wide area network (WAN) and wireless local area network (LAN) wireless and technologies to communicate data 106 between the nodes, including Low Power Wide Area (LPWA) technology, 3rd Generation Partnership Project (3GPP) technology such as, but not limited to, 4G Long-Term Evolution (LTE), or 4G LTE Advanced, NarrowBand—Internet of Things (NB-IoT), LTE Cat M, and 5G or subsequent wireless technologies. In addition, the wireless technology used by device 101 and network 103 could support or implement wireless LAN technologies such as WiFi and the related series of standards from IEEE 802.11 standards, such as 802.11ac, 802.11 ax, etc. Other examples exist as well for wireless WAN technology and/or wireless LAN technology used for communications between device 101 and network 103 without departing from the scope of the present disclosure.

Network 103 can also connect to the IP network 107 and send/receive data 106 other via a wired connection such as, but not limited to, an Ethernet connection or a fiber optic connection. In other words, for some exemplary embodiments, network 103 can connect to IP network 107 using a wired connection, and device 101 can connect to IP network 107 using a wireless connection. IP network 107 could also be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 107 could utilize globally routable IP addresses. A private IP network overlayed on IP network 107 could utilize private IP addresses which could also be referred to as an Intranet. Other possibilities for device 101 and network 103 to communicate data through an IP network 107 exist as well without departing from the scope of the disclosure.

Device 101 can be a computing device for sending and receiving data using a radio 101r. Device 101 can take several different embodiments, such as a general purpose personal computer, a laptop computer, a mobile phone or mobile handset based on the Android® or Fuchsia from Google® or the IOS operating system from Apple®, a tablet, a device with a sensor or actuator for the "Internet of Things", a module for "machine to machine" communications, a device that connects to a wireless Wide Area Network (WAN) operated by a mobile network operator, a router, and/or a server, and other possibilities exist as well for the embodiments of a device 101 without departing from the scope of the present disclosure. In other words, for some embodiments, device 101 could include and use a network interface such as, but not limited to, a radio 101r for sending and receiving data with the network 103 through IP network 107.

The electrical components within device 101 can include a memory 101m, a processor 101p, a radio 101r, a sensory 101y, an actuator 101z, and a user interface 101w. As depicted in FIG. 1, a data bus 101t or a system bus 101t could internally electrically connect the depicted components within a device 101. Additional components to support the operation of device 101 can include a battery to store electrical power, and an antenna to transmit and receive RF signals. The sensor 101y can collect data external or internal to the device 101, such as temperature, motion, position, pressure, etc. A device 101 could also include the actuator 101z to convert electrical signals into physical actions, such as a motor for moving components, a relay for opening or closing a circuit, a speaker for outputting sound, a screen for displaying information to a user of device 101, etc. Additional details regarding the operation of electrical components within device 101 are depicted and described in connection with FIG. 11 below.

Memory 101m can comprise combinations of (i) volatile random access memory and (ii) nonvolatile memory. The volatile memory can include random access memory (RAM) for relatively fast read and write operations, such as SRAM or DRAM compared, to nonvolatile memory. RAM for memory 101m could also include persistent RAM or non-volatile RAM (NVRAM), such that data in a persistent RAM memory or nonvolatile RAM is stored when power is removed. Nonvolatile memory can include storage memory such as a flash memory and record or store data when power is removed from device 101. In general, different forms and electrical components for memory 101m can be used without departing from the scope of the present disclosure. Processor 101p can comprise a central processing unit (CPU) or a "system on a chip" and be similar to a processor 111p for a server 111 described below, but with reduced capabilities for a device 101 compared to a processor 111p for a server 111. For some embodiments, processor 101p can include the volatile memory or RAM memory portion of memory 101*m*, such as with the current, commercial M1 series of processors from Apple Inc.

In exemplary embodiments, processor 101*p* can include a hardware random number generator 128, which can generate a random number or pseudo random number using sensor data within processor 101*p*. As one example, hardware random number generator 128 could collect electrical or thermal noise values from sensors within processor 101*p*, and generate a random number from noise values. Although the hardware random number generator 128 is depicted within processor 101*p* and external to TRSH 113, for some embodiments the hardware random number generator 128 can be within TRSH 113. The random number output from hardware random number generator can be used to (i) generate a private key corresponding to a public key for a PKI algorithm, (ii) generate an random number or value for M2 219*a* in a KEM ENCAPS function 101*k*, or (iii) generate a random number included within data for a secure session between device 101 and network 103, such as random 252*a* from a step 252 for device 101 below. For descriptions where cryptographic algorithms 101*s* include a random number generators, the cryptographic algorithms 101*s* could read a random number or value from the hardware random number generator 128 and use and process the value with additional steps, such as inputting the value from the hardware random number generator into a secure hash algorithm in order to obtain or read a random number. Or, the cryptographic algorithms 101*s* could use directly a random number from a hardware random number generator 128.

Tamper resistant secure hardware (TRSH) 113 can comprise a secure processing environment as described in the GlobalPlatform document, titled "Open Firmware Loader for Tamper Resistant Secure Hardware", Release 1.3.0.14 dated April 2021, which is hereby incorporated by reference in its entirety ("GlobalPlatform OFL"). TRSH 113 can also comprise the secure element as described in the ETSI SSP Requirements document ETSI TS 103 465 V15.0.0 (2019-05) titled "Smart Cards; Smart Secure Platform (SSP); Requirements Specification" ("ETSI SSP Requirements"), which is hereby incorporated by reference in its entirety. Tamper resistant secure hardware 113 can comprise a silicon enclave within a tamper resistant chip such as a "system on chip" operating within processor 101*p*. In addition, processor 103*p* for network 103 can include a TRSH and a primary platform 109. Other possibilities exist as well for the specifications supported by TRSH 113 without departing from the scope of the present disclosure.

TRSH 113 can include a primary platform (PP) 109, where a primary platform is also described in both the GSMA PP Requirements document and the SSP Requirements document. TRSH 113 could also comprise a "Smart Secure Platform" (SSP) as described in the SSP Requirements document, such as the SSP depicted in FIG. 2 of the "Architecture" section 9.2.1. Primary platform 109 can comprise a secure operating environment, a secure enclave, a secure element, and include a secure processing core within a processor for device 101. Primary platform 109 can also operate in a Trusted Execution Environment (TEE) within a processor for device 101. Primary platform 109 can also comprise a SSP as contemplated by ETSI documents and draft specifications for 5G networks. PP 109 can include memory 101*m*' equivalent to device memory 101*m*, where memory 101*m*' can be dedicated to PP 109 and comprise a reduced number of memory cells compared to general device memory 101*m*. Memory 101*m*' can prevent applications on device 101 from reading or writing directly to memory 101*m*', such that PP 109 has sole access to the memory 101*m*'. For some embodiments, memory 101*m*' can include cryptographic algorithms 101*s* and cryptographic parameters 101*x*.

TRSH 113 and PP 109 can support a variety of applications. TRSH 113 can comprise the physical device such as a dedicated processing core or silicon area within a processor 101*p* in FIG. 1, and a primary platform 109 can comprise a secure processing environment operating within the TRSH 113. With appropriate configured secondary platform bundle or firmware, TRSH 113 and PP 101 could operate as an "integrated universal integrated circuit card" (iUICC), an "embedded universal integrated circuit card" (eUICC), a secure element for banking applications or payments from mobile phones, an radio-frequency identity (RFID) card, a secure bootstrap environment for device 101, a virtual key for cars or door locks, an secure environment for recording an identity and secret or private keys for drivers licenses, passports, online or web-site access, etc.

For some exemplary embodiments, the steps and data processing conducted by device 101 to establish a secure session such as the steps and data processing depicted and described for a device 101 in FIG. 2*a* and FIGS. 9*a* and 9*b* below can be conducted by a secondary platform bundle operating within a primary platform 109 within a processor 101*p*. In other exemplary embodiments, the use of a TRSH 113 and PP 109 could be omitted or substituted with similar secure enclave or secure processing environment technology. For these embodiments, the processor 101*p* within device 101 could perform the steps and data processing depicted and described for a device 101 in FIG. 2*a* and FIGS. 9*a* and 9*b* below without the use of a TRSH 113 and PP 109. Note that the use of a TRSH 113 and PP 109 could be omitted for some embodiments of a device 101, and the steps and data processing for a device 101 depicted in FIG. 2*a* and FIGS. 9*a* and 9*b* below (as well as subsequent Figures herein) could be conducted using the processor 101*p* and other depicted electrical components for a device 101.

Device 101 may include radio 101*r* support radio-frequency (RF) communications with networks including a MNO 102 via standards such as LTE, LTE Advanced, 5G, and/or other mobile-network technologies. In a wireless configuration, the radio 101*r* may also provide connectivity to local networks such as 802.11 WLAN, Bluetooth, Zigbee, LoRa, or an IEEE 802.15.4 network, among other possibilities. In exemplary embodiments, a radio 101*r* is connected to an antenna, which could be either internal to device 101 or external to device 101. Device 101 may also include nonvolatile memory 101*bb*, where nonvolatile memory 101*bb* is also depicted and described in connection with FIG. 11 below.

Note that device 101 may also optionally include user interface 101*w* which may include one or more devices for receiving inputs and/or one or more devices for conveying outputs. User interfaces are known in the art and thus user interfaces are not described in detail here. User interface 101*w* could comprise a touch screen if device 101 operates as a smartphone or mobile phone. Device 101 can optionally omit a user interface 101*w*, since no user input may be required for many M2M applications such as networked sensors, although a user interface 101*w* could be included with device 101. LED lights or a display of LEDs could also comprise a user interface 101*w*.

Memory 101*m* within device 101 can store cryptographic algorithms 101*s*, cryptographic parameters 101*x*, a device ephemeral public key infrastructure (PKI) key pair comprising an device ephemeral private key 101*i* and a corresponding device ephemeral public key 101*h*, an optional device certificate 101c, a set of supported device PQC KEM parameters device.PQC-KEM.parameters 101f, device parameters or device extensions 101g, a key encapsulation mechanism (KEM) decapsulation function 101j, and a KEM encapsulation function 101k. In general, the depicted data within memory 101m can be stored within a nonvolatile memory 101bb such as flash memory or a solid state drive or hard drive when power from device 101 is removed or the device is powered off. When power is supplied to device 101 or device 101 operates, for some embodiments, the device ephemeral private key 101i and the corresponding device ephemeral public key 101h may optionally only be stored in volatile memory such as RAM. When power is supplied to device 101 or device 101, the depicted data for memory 101m can be copied by processor 101p using a bus 101t from a nonvolatile memory 101bb for device 101 into a volatile memory 101m.

Cryptographic algorithms 101s can include the steps and logic for processor 101p in device 101 to conduct in order for device 101 to securely communicate with network 103 and a server 111. Cryptographic algorithms 101s can include at least symmetric ciphering algorithms, a random number generator, a key pair generation algorithm, digital signature algorithms, asymmetric ciphering algorithms, secure hash algorithms, and key encapsulation mechanisms (KEM). Cryptographic algorithms 101s can use libraries associated with cryptographic suites such as OpenSSL, crypto++, BouncyCastle, or Mozilla, and other possibilities exist as well without departing from the scope of the present disclosure, including the future update of those libraries to support post-quantum cryptography. Cryptographic algorithms 101s can use inputs of keys such as public keys, private keys, and/or symmetric keys along with cryptographic parameters 101x in order to for device 101 to process cryptographic data including secure hash values, ciphertext, key exchanges, and digital signatures.

Cryptographic parameters 101x can specify values or settings for (i) processing a KEM that supports post-quantum cryptographic algorithms such as KEM decapsulation (DECAPS) 101j and KEM encapsulation (ENCAPS) 101k, (ii) mutually deriving a shared secret, (iii) mutually deriving a symmetric ciphering key from the shared secret using a hash-based key derivation function or an HMAC-based Extract-and-Expand Key Derivation Function (HKDF), (iv) using a symmetric ciphering algorithm with the symmetric ciphering key, (v) using a digital signature algorithm, and (vi) the generation of message authentication code (MAC) or tag values for symmetric ciphertext. As contemplated herein, cryptographic parameters 101x may also be referred to as parameters 101x. Each of device 101 and network 103 can record at least compatible subset of parameters within a set of cryptographic parameters 101x. Parameters 101x can specify values for key length, key formatting (e.g. compressed or uncompressed), encoding rules, constants, numbers or variables for a post-quantum cryptography algorithm of a key encapsulation mechanism, etc. Parameters 101x can specify values for a post-quantum cryptography algorithm of a digital signature algorithm.

In exemplary embodiments, cryptographic parameters 101x and cryptographic algorithms 101s (as well as cryptographic parameters 103x and cryptographic algorithms 103x for a network 103) can support post-quantum cryptography key exchanges or "key encapsulation mechanisms" (KEM) using lattice-based, code-based, or Supersingular Elliptic Curve Isogeny algorithms. These proposed algorithms are described by the Wikipedia article for "NIST Post-Quantum Cryptography Standardization" dated Oct. 29, 2021, which is hereby incorporated by reference. In other words, cryptographic parameters 101x and cryptographic algorithms 101s can support (i) classical cryptographic functions such as secure hash algorithms (e.g. SHA256 or SHA3-256, etc.) and symmetric ciphering (e.g. AES, Blowfish, XChaCha, etc.), while also including (ii) support for PQC algorithms identified in Round 3 of the National Institute of Standards and Technology (NIST) project for Post-Quantum Cryptography (PQC) Standardization.

In general, as contemplated herein, keys, cryptographic algorithms 101s or 103s, and parameters 101x or 103x supporting post-quantum cryptography (PQC) key encapsulation mechanisms (KEM) can be based on any of (i) lattice based algorithms, such as learning with errors, (ii) code based algorithms such as classic McEliece or BIKE, and (iii) ECC algorithms that based on Supersingular Elliptic Curve Isogeny, and other possibilities exist as well without departing from the scope of the present disclosure. In exemplary embodiments, keys, cryptographic algorithms 101s or 103s, and parameters 101x or 103x supporting post-quantum cryptography (PQC) key encapsulation mechanisms (KEM) are not based on (i) the integer factorization problem, (ii) the discrete logarithm problem, or (iii) the elliptic curve discrete logarithm problem.

In exemplary embodiments, the depicted KEM parameters of Device.PQC-KEM.Parameters 101f can comprise a set of parameters that comprise a subset of the cryptographic parameters 101x, where the depicted KEM parameters of Device.PQC-KEM.Parameters 101f pertain to parameters for different PQC key encapsulation mechanisms. Exemplary values of the depicted KEM parameters of Device-.PQC-KEM.Parameters 101f are also depicted and described in connection with FIG. 8 below. Device 101 can select a subset of 101f-x of the set of KEM parameters 101f in order to generate a PKI key pair and conduct a first KEM with a network. As contemplated herein, the subset 101f-x of the set of KEM parameters 101f can also be referred to as KEM parameters 101f-x and also a first KEM algorithm.

Device 101 using the processor 101p can select a subset 101f-x of the set of KEM parameters 101f stored in memory 101m in order to generate a PKI key pair and conduct a first KEM with a network 103 using a server 111. In an exemplary embodiment, subset 101f-x of the KEM parameters of Device.PQC-KEM.Parameters 101f or could specify the selection of Kyber-512 for approximately 128 bit of security with symmetric encryption, or Kyber-768 for approximately 192 bits of security with symmetric encryption, or Kyber-1024 for approximately 256 bits of security with symmetric encryption. In other words, Device.PQC-KEM.Parameters 101f could specify families or groups of parameters for multiple different PQC KEM such as, but not limited to, Kyber, SIKE, BIKE, etc., and the subset 101f-x could comprise the parameters for using a specific KEM for the family or group (such as subset 101f-x specifying values for one of the equivalent levels of 128, 192, or 256 bits of security for a symmetric ciphering algorithms). Other post-quantum cryptographic algorithms and parameters could be supported as well for both the KEM parameters of Device.PQC-KEM.Parameters 101f and a subset 101f-x.

A device 101 could store one or a plurality of different device certificates cert.device 101c. Each of the different device certificates 101c could use different values for (i) a device identity such as a user name, (ii) a device static public key for verifying digital signatures generated by device 101, (iii) a different certificate issuer for generating a digital signature for the device certificate 101c, and/or (iv) a subset of cryptographic parameters 101s and cryptographic algorithms 101x for use with the device certificate 101c. In exemplary embodiments, the device certificate 101c can be formatted according to X.509v3 standards. The device identity in a device certificate 101c can be an international mobile subscriber identity (IMSI), a subscription permanent identifier (SUPI) according to 5G standards, or a network access identifier (NAI) as specified in IETF RFC 7542, and other possibilities exist as well without departing from the scope of the present disclosure.

Although not depicted in FIG. 1, device 101 can also store a static private key corresponding to the public key in each device certificate cert.device 101c. In exemplary embodiments, the subset of cryptographic parameters 101s and cryptographic algorithms 101x for a device certificate cert.device 101c can support any of the digital signature algorithms as specified in Round 3 of the NIST PQC project, which are also identified in the Wikipedia PQC article. The device certificate cert.device 101c can be stored in nonvolatile memory such as a storage memory for memory 101m when device 101 is powered off or inactive, and then moved into volatile memory such as a RAM memory for memory 101m when device 101 operates.

Device 101 can include a set of device parameters or device extensions 101g for conducting a secure session with a network 103 and a server 111. The secure session and device extensions 101g could be for a standard protocol supporting PQC such as future versions of TLS, SSH, Wireguard, etc. The device extensions 101g can include supported cipher suites supported by device 101 in establishing secure communications with network 103 and server 111. The device extensions 101g can also be used for the "Extensions" fields within a "Client Hello" or equivalent message such as a first message 202 as depicted and described in connection with FIG. 2a below. The device extensions 101g can include supported symmetric ciphering algorithms and modes, such as the Advanced Encryption Standard (AES) with a ciphertext chaining mode such as Electronic Code Book mode (ECB), Galois/Counter Mode (GCM), XChaCha20 for encryption, etc. Device extensions could also include values or parameters for algorithms to generate MAC or tag values for symmetric ciphertext, such as specifying the use of the Poly1305 algorithm for the generation of MAC or tag values. An example for standards describing the use of Poly1305 includes IETF RFC 7539, which is hereby incorporated by reference.

Device extensions 101g can include supported secure hash algorithms, key lengths, and supported digital signature algorithms from cryptographic algorithms 101s. Device extensions 101g can also include supported cryptographic parameters 101x for use with the cryptographic algorithms 101s. In general, device extensions 101g can be associated with a secure communications protocol supported by device 101 when communicating with a network 103 and server 111. In other words, a device 101 can support both cryptographic algorithms 101s and cryptographic parameters 101x, and device extensions 101g can be a subset of the cryptographic algorithms 101s and cryptographic parameters 101x that are specified for a particular secure communications protocol between device 101 and server 111. Device extensions 101g could also include supported digital signature algorithms as well as names or identifiers of certificate authority certificates or root certificates stored by device 101 in order to authenticate a server certificate 103c received from server 111.

A first protocol, such as TLS, supported by device 101 could use first device extensions 101g as a first subset of cryptographic algorithms 101s and cryptographic parameters 101x, and a second protocol, such as Wireguard could use second device extensions 101g as a second subset of cryptographic algorithms 101s and cryptographic parameters 101x. As one example, the first device extensions 101g could specify the use of AES-GCM with 256 bit keys and the SHA-2 algorithm, and the second device extensions 101g could specify the use of XChaCha-Poly1305 with the SHA-3 algorithm. Other possibilities exist as well for device extensions 101g to support different subsets of cryptographic algorithms 101s and cryptographic parameters 101x without departing from the scope of the present disclosure.

Device 101 can include a PQC key pair generation algorithm PQC.KeyGen 101q from cryptographic algorithms 101s and the selected first subset 101f-x (or first KEM algorithm) of KEM parameters 101f. The PQC key pair generation algorithm PQC.KeyGen 101q from cryptographic algorithms 101s can comprise computer executable instructions for a processor 101p in device 101 to generate an ephemeral private key and corresponding ephemeral public key. Network 103 can include a compatible PQC key pair generation algorithm 103q from cryptographic algorithms 103s described below. A PQC key pair generation algorithm 101q can use the selected first subset 101f-x (or first KEM algorithm) of KEM parameters 101f in order to generate (i) a random number from a random number generator 128 in order to derive a device ephemeral PKI private key eSK.device 101h and (ii) a corresponding device ephemeral PKI public key ePK.device 101i. Although FIG. 1 depicts a single device ephemeral public key ePK.device 101h and a single device ephemeral private key eSK.device 101i, a device 101 could generate, store, and use a plurality of the ephemeral PKI key pairs. A first device ephemeral public key could comprise an ePK-1.device 101h-1, and a second device ephemeral public key could comprise an ePK-2.device 101h-2.

The device ephemeral private key eSK.device 101i can comprise a first private key for an exemplary lattice-based algorithm of Kyber768. In other words, the selected subset 101f-x could specify use of Kyber768. The KEM parameters 101f-x could specify values of the device ephemeral private key eSK.device 101i of n=256 and q=7681 in an exemplary embodiment. The KEM parameters 101f-x that define keys and ciphertext could be set to du=11, dv=3 and dt=11. For Kyber768, the values of k could be 3 and n could be 4. Other values for KEM parameters 101f-x are possible as well without departing from the scope of the present disclosure, such as an exemplary lattice-based algorithm of Kyber1024. With Kyber 1024, the values associated KEM parameters 101f-y could be the same as above, except for the use of k=4 and n=5.

In an exemplary embodiments that use Kyber algorithms, PQC.KeyGen 101q can comprise "Algorithm 1 Kyber: CPA: KeyGen ( ) key generation" from the paper "CRYSTALS-Kyber: a CCA-secure module-lattice-based KEM" (referred to herein as the Kyber paper), which is herein incorporated by reference. In exemplary embodiments that use Supersingular Isogeny Key Encapsulation (SIKE) algorithms, PQC.KeyGen 101q can comprise the "KeyGen" function or algorithm specified in the paper "Supersingular Isogeny Key Encapsulation" dated Apr. 16, 2020, (referred to herein as the SIKE paper), which is herein incorporated by reference. Other PQC key generation functions from Round 3 of the NIST PQC project could be used for a PQC.KeyGen 101q function as well, without departing from the scope of the present disclosure. A PQC.KeyGen 101q within the present disclosure could include any of the KeyGen functions described within the ETSI TR 103 823 V1.1.1 titled "CYBER; Quantum-Safe Public-Key Encryption and Key Encapsulation", which is herein incorporated by reference and referred to herein as the ETSI PQC Summary.

Device 101 can store or record in memory 101m a KEM DECAPS function 101j in both (i) nonvolatile memory or 101bb or storage memory when device 101 is powered off and (ii) volatile memory such as RAM when device 101 is operating. In summary, the selected first subset of parameters 101f-x and the generated or derived device ephemeral private key eSK.Device 101i can be used with the KEM DECAPS function 101j in order to convert a first received asymmetric ciphertext C1 102c-1 into a first shared secret key K1 102k-1. Example parameters and values used with the KEM DECAPS function 101j are depicted and described for a step 214 in FIG. 2a below and also in FIG. 4 below and also FIG. 8 below. The KEM DECAPS function 101j can be included in cryptographic algorithms 101s and support a plurality of different PQC key encapsulation mechanisms (KEM), such as any of the PQC KEM in Round 3 of the NIST PQC project. In addition, KEM DECAPS function 101j, KEM ENCAPS function 101k, and KEM parameters 101f can support any of the algorithms and associated parameter sets identified in section 5.5 of the ETSI PQC Summary.

Device 101 can store or record in memory 101m a KEM ENCAPS function 101k in both (i) nonvolatile memory or storage memory when device 101 is powered off and (ii) volatile memory such as RAM when device 101 is operating. A received subset of parameters Device.PQC-KEM.Parameters 101f, such as the second subset 103f-y (discussed in FIG. 2a below for a second KEM algorithm) could be used with KEM ENCAPS function 101k. The selected subset of parameters Device.PQC-KEM.Parameters 101f and a received server ephemeral public key ePK.server 103h can be used with the KEM ENCAPS function 101k in order to convert number such as, but not limited to, a random number for M2 219a into both (i) a second asymmetric ciphertext C2 102c-2 and a second shared secret key K2 102k-2. Device 101 may receive and process a first symmetric ciphertext symm-C1 102s-1 second asymmetric ciphertext C2 (as depicted in a message 213 below in FIG. 2) before conducting the KEM ENCAPS function 101k. The parameters and values used with the KEM ENCAPS function 101k are depicted and described for a step 220 in FIG. 2a below and also in FIG. 5 below and also FIG. 8 below. The KEM ENCAPS function 101k can be included in cryptographic algorithms 101s and support a plurality of different PQC key encapsulation mechanisms (KEM), such as any of the PQC KEM in Round 3 of the NIST PQC project.

Network 103 can comprise a collection of servers and also operate as a cloud service. As depicted for system 100 in FIG. 1, network 103 can communicate with device 101 through IP network 107. Network 103 can include a network identity of network ID 103a, which could comprise a domain name, a name, or a string to uniquely identify network 103 in a system 100. In exemplary embodiments, at least a portion of network ID 103a can comprise a network access identifier for network 103. Network 103 can include at least one server 111 as depicted in FIG. 1. Although a single server 111 is depicted for a network 103 in FIG. 1, a network 103 could include a plurality of servers 111, where each server 111 can be identified using a different server identity of server ID 111a.

Server 111 can include hardware components similar to those of a device 101 depicted in FIG. 1, except generally with larger capacities appropriate for a server 111. Server 111 can also operate as a host computing environment with physical hardware for a virtual machine to operate as a guest computing environment. Server 111 can include a server identity of server ID 111a, which could comprise a domain name, a name, or a string to uniquely identify server 111 in a system 100. In exemplary embodiments, at least a portion of server ID 111a can comprise a network access identifier for server 111.

A server 111 can include server hardware 111h comprising random access memory (RAM) 111m, storage memory 111b, at least one system bus 111c, at least one network interface 111d, and at least one processor 103p. For a server 111 operating in a network 103, server 111 can include at least one processor 111p in order to store and record data as well as communicate with other nodes over an IP network 107, such as device 101 through an IP network 107. Processor 111p can also be referred to as a central processing unit (CPU) 111p. Processor 111p can comprise a general purpose processor appropriate for the computational requirements for a server 111, and may operate with multiple different processor cores, including field programmable gate arrays (FPGA).

A processor 111p can comprise exemplary ARM® based processors or an Intel® based processor such as belonging to the XEON® family of processors, and other possibilities exist as well. Processor 111p can utilize the system bus 111c to fetch instructions from RAM memory 111m or storage memory 111b within a server 111 and operate on the instruction. A processor 111p or 101p can include components such as registers, accumulators, and logic elements to add, subtract, multiply, and divide numerical values and record the results in memory. In exemplary embodiments, at least one processor 111p within server 111 can be used to conduct the steps and message flows depicted in FIG. 2a below, as well as the steps for a server 111 in FIGS. 10a and 10b below. For some embodiments, the network 103 could operate a plurality of processors 111p, where the plurality of processors 111p can operate either within a single server 111 or the plurality of processors can be distributed across a plurality of server 111. A processor system can comprise either the plurality of processors or a single processor with a plurality of processing cores. As depicted in FIG. 1, processor 111p can also include a hardware random number generator 128, which can be equivalent to the hardware random number generator 128 described above for a processor 101p within device 101.

RAM 111a may comprise a random access memory for Server 111. RAM 111a can be a volatile memory providing rapid read/write memory access to processor 111p. RAM 111a could be located on a separate integrated circuit in server 111. The system bus 111c may be any of several types of bus structures including a memory bus or memory controller, a peripheral bus, and a local bus using any of a variety of bus architectures including a data bus. System bus 111c connects components within server 111, such as transferring electrical signals between the components illustrated for a server 111. Server 111 can include multiple different versions of bus 111c to connect different components, including a first system bus 111c between CPU 111p and RAM 111a (which could be a memory bus), and a second system bus 111c between CPU 111p and network interface 111d, which could be a SPI bus, a PCI bus, or similar data busses.

Server 111 may also operate a network interface 111d, where network interface 111d can be used to connect and communicate with other nodes such as depicted in FIG. 1 and also FIG. 2a below. Network interface 111d can comprise a physical interface connected to system bus 111c for server 111. In exemplary embodiments, network interface 111d can comprise an Ethernet or fiber optic wired connection. Network interface 111d can connect server 111 to plurality of computing devices and other servers through networks such as the globally routable public Internet.

Nonvolatile memory 111b or "storage" 111b (which can also be referred to herein as "storage memory 111b") within server 111 can comprise a non-volatile memory for long-term storage of data, including times when server 111 may be powered off. Storage memory 111b may be a NAND flash memory or a NOR flash memory and record firmware for server 111, such as a bootloader program and an operating system. Storage memory 111b can record long-term and non-volatile storage of data or files for server 111. In exemplary embodiments, the network identity 103a is recorded in storage memory 111b when server 111 is powered off, and the network identity 103a is copied by CPU 111p into RAM 111a when server 111 powers on.

Storage memory 111b can operate as a traditional hard disk drive or a solid state drive (SSD), or as a storage area network (SAN). Storage memory 111b can also comprise a plurality of spinning hard disk drives in a redundant array of independent disks (RAID) configuration. Storage memory 111b may also be referred to as "server storage" and can include exemplary file systems of FAT16, FAT 32, NTFS, ext3, ext4, UDF, or similar file systems. As contemplated herein, the terms "memory 111b", "storage memory 111b", and "nonvolatile memory 111b" can be considered equivalent.

Cryptographic algorithms 103s can include the steps and logic for processor 103p in server 111 to conduct in order for server 111 and network 103 to securely communicate with device 101. Cryptographic algorithms 101s can include at least symmetric ciphering algorithms, a random number generator, a key pair generation algorithm, digital signature algorithms, asymmetric ciphering algorithms, secure hash algorithms, and key encapsulation mechanisms. Cryptographic algorithms 103s can use libraries associated with cryptographic suites such as OpenSSL, crypto++, Bouncy-Castle, or Mozilla, and other possibilities exist as well without departing from the scope of the present disclosure, including the future update of those libraries to support post-quantum cryptography. Cryptographic algorithms 103s can use inputs of keys such as public keys, private keys, and/or symmetric keys along with cryptographic parameters 103x in order to for server 111 and network 103 to process cryptographic data including secure hash values, ciphertext, key exchanges, and digital signatures.

Cryptographic parameters 103x can specify values or settings for (i) processing a KEM that supports post-quantum cryptographic algorithms such as KEM DECAPS 103j and KEM ENCAPS 103k, (ii) mutually deriving a shared secret, (iii) mutually deriving a symmetric ciphering key from the shared secret using a hash-based key derivation function or an HMAC-based Extract-and-Expand Key Derivation Function (HKDF), (iv) using a symmetric ciphering algorithm with the symmetric ciphering key, (v) using a digital signature algorithm, and (vi) the generation of message authentication code (MAC) or tag values for symmetric ciphertext. As contemplated herein, cryptographic parameters 103x may also be referred to as parameters 103x. Each of device 101 and network 103 can record at least compatible subset of parameters within a set of cryptographic parameters 103x. Parameters 103x can specify values for key length, key formatting (e.g. compressed or uncompressed), encoding rules, constants, numbers or variables for a post-quantum cryptography algorithm of a key encapsulation mechanism, etc. Parameters 103x can specify values for a post-quantum cryptography algorithm of a digital signature algorithm.

In exemplary embodiments, cryptographic parameters 103x and cryptographic algorithms 103s (as well as cryptographic parameters 101x and cryptographic algorithms 101x for a device 101) can support post-quantum cryptography key exchanges or "key encapsulation mechanisms" (KEM) using lattice, code-based, or Supersingular Elliptic Curve Isogeny algorithms. These proposed algorithms are described by the Wikipedia article for "NIST Post-Quantum Cryptography Standardization" dated Oct. 29, 2021, which is hereby incorporated by reference. In other words, cryptographic parameters 103x and cryptographic algorithms 103s can support (i) classical cryptographic functions such as secure hash algorithms (e.g. SHA256 or SHA3-256, etc.) and symmetric ciphering (e.g. AES, Blowfish, XChaCha, etc.), while also including (ii) support for PQC algorithms identified in Round 3 of the National Institute of Standards and Technology (NIST) project for Post-Quantum Cryptography (PQC) Standardization.

In exemplary embodiments, the depicted KEM parameters of Server.PQC-KEM.Parameters 103f can comprise a set of parameters that comprise a subset of the cryptographic parameters 103x, where the depicted KEM parameters of Server.PQC-KEM.Parameters 103f pertain to parameters for different PQC key encapsulation mechanisms (KEM). Exemplary values of the depicted KEM parameters of Server.PQC-KEM.Parameters 103f are also depicted and described in connection with FIG. 8 below. Note that Server.PQC-KEM.Parameters 103f can be different than Device.PQC-KEM.Parameters 101f, but in exemplary embodiments, at least one subset of parameters (or a first KEM algorithm) is commonly shared between a server 111 and a device 101, such as the exemplary subset 101f-x as depicted and described in connection with FIG. 2a and FIG. 8 below. In addition, in some exemplary embodiments a second subset of parameters (or a second KEM algorithm) is commonly shared between a server 111 and a device 101, such as the exemplary subset 103f-y as depicted and described in connection with FIG. 2a and FIG. 8 below.

A server 111 could store one or a plurality of different server certificates cert.server 103c. Each of the different server certificates 103c could use different values for (i) a server identity such as a server name or server ID 111a, (ii) a static server static public key PK.server 103d for verifying digital signatures generated by server 111, (iii) a different certificate issuer for generating a digital signature for the server certificate 103c, and/or (iv) a subset of cryptographic parameters 103s and cryptographic algorithms 103x for use with the server certificate 103c. In exemplary embodiments, the server certificate 103c can be formatted according to X.509v3 standards. The server identity in a device certificate 101c can be a server ID 111a, or a network access identifier (NAI) as specified in IETF RFC 7542, and other possibilities exist as well without departing from the scope of the present disclosure.

As depicted in FIG. 1, server 111 and network 103 can also store a static private key SK.server 103b corresponding to the public key PK.server 103d in each server certificate cert.server 103c. In exemplary embodiments, the subset of cryptographic parameters 103s and cryptographic algorithms 103x for a server certificate cert.server 103c can support any of the digital signature algorithms as specified in Round 3 of the NIST PQC project, which are also identified in the Wikipedia PQC article. The server certificate cert.server 103c can be stored in nonvolatile memory such as a storage memory 111b when server 111 is powered off or inactive, and then moved into volatile memory such as a RAM memory 111m for memory 101m when server 111 operates or is connected to IP network 107.

Server 111 can select a subset 103f-y (or a second KEM algorithm) of the set of KEM parameters 103f in order to generate a PKI key pair and for conducting or performing a second KEM 101k/103j with a device 101. In an exemplary embodiment, subset 103f-y of the KEM parameters of Server.PQC-KEM.Parameters 103f could specify the selection of Kyber-512 for approximately 128 bit of security with symmetric encryption, or Kyber-768 for approximately 192 bits of security with symmetric encryption, or Kyber-1024 for approximately 256 bits of security with symmetric encryption. In other words, Server.PQC-KEM.Parameters 103f could specify a family or group of parameters for a PQC KEM such as, but not limited to, Kyber, SIKE, BIKE, etc., and the subset 103f-y could comprise the parameters for using a specific KEM for the family or group (such as subset 103f-y (or second KEM algorithm) specifying values for one of the equivalent levels of 128, 192, or 256 bits of security for a symmetric ciphering algorithms). Other post-quantum cryptographic algorithms and parameters could be supported as well for both the KEM parameters of Server.PQC-KEM.Parameters 103f and a subset 103f-y for a second KEM algorithm.

Figure 8:
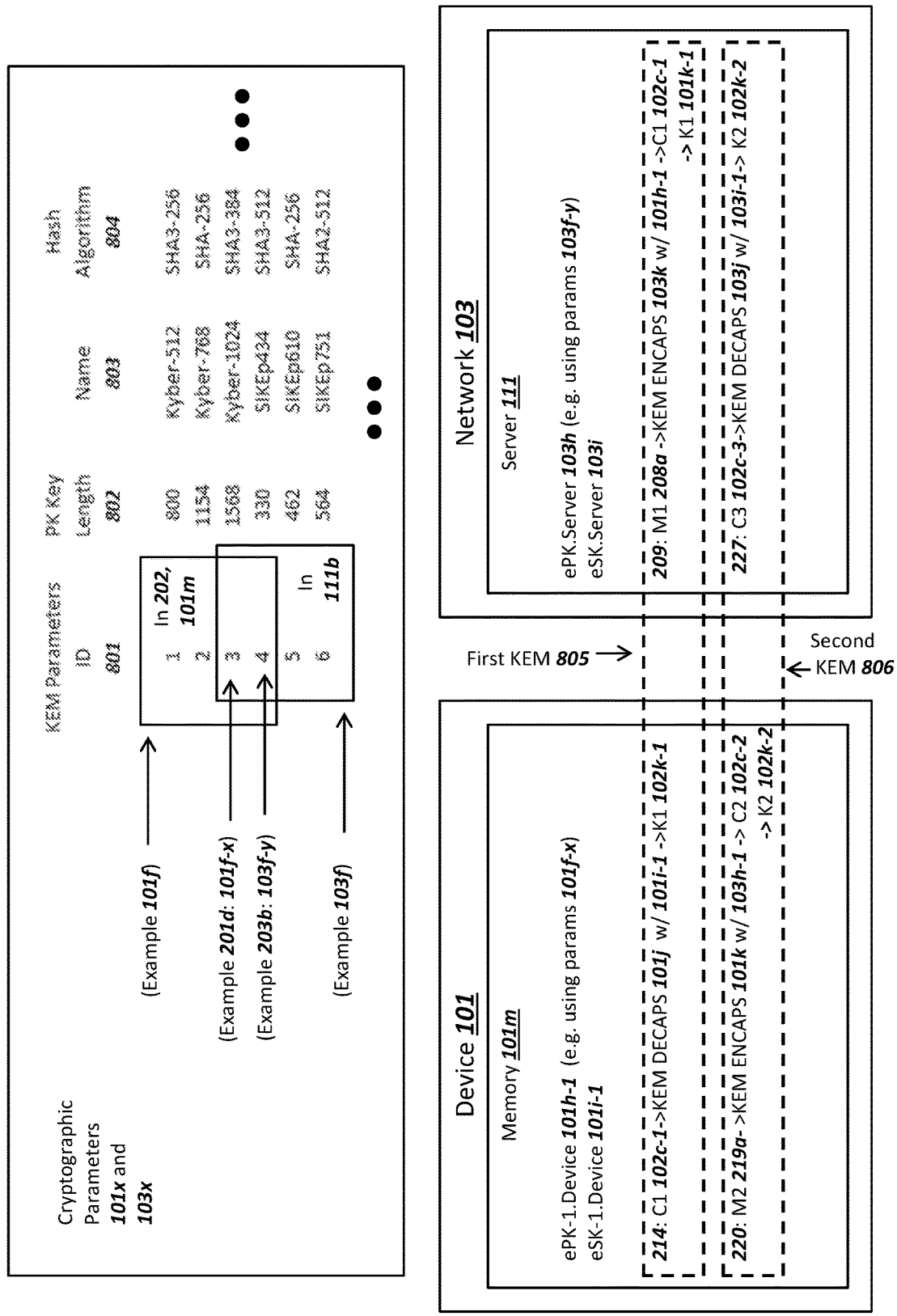
FIG. 8 is an illustration of (i) an exemplary set of cryptographic parameters for a key encapsulation mechanism stored and used by a device and a server, and (ii) conducting two KEM for the cryptographic parameters in accordance with exemplary embodiments.

For some preferred exemplary embodiments and as depicted in FIG. 8 below, the subset 103f-y of parameters for the second KEM algorithm selected by server 111 can be different than the subset 101f-x for the first KEM algorithm selected by device 101, such as supporting a different KEM algorithm, including a different type or family. For other existing embodiments, the subset 103f-y can be the same as the subset 101-x, such as both server 111 and device 101 using the same KEM algorithm and parameters for both the first KEM and second KEM.

Server 111 can include a PQC key pair generation algorithm PQC.KeyGen 103q from cryptographic algorithms 103s and the selected subset 103f-x (or second KEM algorithm) of KEM parameters 103f. A PQC key pair generation algorithm 103q can use the selected subset 103f-y (or second KEM algorithm) of KEM parameters 103f in order to generate (i) a random number from a random number generator in order to derive or generate a server ephemeral PKI private key eSK.server 103h and (ii) a corresponding server ephemeral PKI public key ePK.server 103i. Although FIG. 1 depicts a single server ephemeral public key ePK-.server 103h and a single server ephemeral private key eSK.server 103i, a server 111 could generate, store, and use a plurality of the ephemeral PKI key pairs. A first server ephemeral public key could comprise an ePK.server 103h, and a second server ephemeral public key could comprise an ePK-2.server 103h-2.

In an exemplary embodiments that use Kyber algorithms, PQC.KeyGen 103q can comprise "Algorithm 1 Kyber: CPA: KeyGen ( ) key generation" from the paper "CRYSTALS-Kyber: a CCA-secure module-lattice-based KEM" (referred to herein as the Kyber paper), which is herein incorporated by reference. In exemplary embodiments that use Supersingular Isogeny Key Encapsulation (SIKE) algorithms, PQC.KeyGen 103q can comprise the "KeyGen" function or algorithm specified in the paper "Supersingular Isogeny Key Encapsulation" dated Apr. 16, 2020, (referred to herein as the SIKE paper), which is herein incorporated by reference. Other PQC key generation functions from Round 3 of the NIST PQC project could be used for a PQC.KeyGen 103q function as well, without departing from the scope of the present disclosure. A PQC.KeyGen 103q within the present disclosure could include any of the KeyGen functions described within the ETSI PQC Summary.

Server 111 can store or record in nonvolatile memory or storage memory 111b when server 111 is powered off and (ii) volatile memory such as RAM 111m when operating a KEM ENCAPS function 103k. A received subset of parameters Server.PQC-KEM.Parameters 103f, such as subset 101f-x (or first KEM algorithm) could be used with KEM ENCAPS function 103k. The received subset (or first KEM algorithm) of parameters Server.PQC-KEM.Parameters 103f and a received device ephemeral public key ePK-1.device 101h-1 can be used with the KEM ENCAPS function 103k in order to convert number such as, but not limited to, a random number for M1 208a into both (i) a first asymmetric ciphertext C1 102c-1 and (ii) a first shared secret key K1 102k-1. The parameters and values used with the KEM ENCAPS function 103k are depicted and described for a step 209 in FIG. 2a below and also in FIG. 3 below and also FIG. 8 below. The KEM ENCAPS function 103k can be included in cryptographic algorithms 103s and support a plurality of different PQC key encapsulation mechanisms (KEM), such as any of the PQC KEM in Round 2 of the NIST PQC project.

Server 111 can store or record in nonvolatile memory or storage memory 111b when server 111 is powered off and (ii) volatile memory such as RAM 111m when operating a KEM DECAPS function 103j. In summary, the selected second subset of KEM parameters 103f-y (or the second KEM algorithm) and the generated or derived server ephemeral private key eSK.server 103i can be used with the KEM DECAPS function 103j in order to convert a received second asymmetric ciphertext C2 102c-2 into a second shared secret key K2 102k-2. The parameters and values used with the KEM DECAPS function 103j are depicted and described for a step 225 in FIG. 2a below and also in FIG. 5 below and also FIG. 8 below. The KEM DECAPS function 103j can be included in cryptographic algorithms 103s and support a plurality of different PQC key encapsulation mechanisms (KEM), such as any of the PQC KEM in Round 3 of the NIST PQC project.

Server 111 can include a set of server parameters or server extensions 103g for conducting a secure session with a device 101. The secure session and server extensions 103g could be for a standard protocol supporting PQC such as future versions of TLS, SSH, Wireguard, etc. The server parameters 103g can include supported cipher suites supported by server 111 in establishing secure communications with a device 101. The server extensions 103g can also be used for the "Extensions" fields within a "Server Hello" or equivalent message such as a second message 213 as depicted and described in connection with FIG. 2a below. The server extensions 103g can include supported symmetric ciphering algorithms and modes, such as the Advanced Encryption Standard (AES) with a ciphertext chaining mode such as Electronic Code Book mode (ECB), Galois/Counter Mode (GCM), etc. Server extensions could also include values or parameters for algorithms to generate MAC or tag values for symmetric ciphertext, such as specifying the use of the Poly1305 algorithm for the generation of MAC or tag values. An example for standards describing the use of Poly1305 includes IETF RFC 7539, which is hereby incorporated by reference.

Server extensions 103g can include supported secure hash algorithms, key lengths, and supported digital signature algorithms from cryptographic algorithms 103s. Server extensions 103g can also include supported cryptographic parameters 103x for use with the cryptographic algorithms 103s. In general, server extensions 103g can be associated with a secure communications protocol supported by server 111 when communicating with a device 101. In other words, a server 111 can support both cryptographic algorithms 103s and cryptographic parameters 103x, and server extensions 103g can be a subset of the cryptographic algorithms 103s and cryptographic parameters 103x that are specified for a particular secure communications protocol between device 101 and server 111.

A first protocol, such as TLS, supported by server 111 could use first server extensions 103g as a first subset of cryptographic algorithms 103s and cryptographic parameters 103x, and a second protocol, such as Wireguard could use second server extensions 103g as a second subset of cryptographic algorithms 103s and cryptographic parameters 103x. As one example, the first server extensions 103g could specify the use of AES-GCM with 256 bit keys and the SHA-2 algorithm, and the second server extensions 103g could specify the use of XChaCha-Poly1305 with the SHA-3 algorithm. Other possibilities exist as well for server extensions 103g to support different subsets of cryptographic algorithms 103s and cryptographic parameters 103x without departing from the scope of the present disclosure.

FIG. 2a

FIG. 2a is a simplified message flow diagram illustrating an exemplary system with exemplary data transmitted and received by a device and a network, in accordance with exemplary embodiments. System 200a can include a device 101, IP network 107, a network 103, and a server 111 operating within network 103. The nodes or entities within system 200a were also depicted and described in connection with FIG. 1 above, where FIG. 2a depicts exemplary steps for the nodes and exemplary message flows between the nodes. Although a single device 101, IP network 107, and network 103 are depicted in a system 200a, a system 200a could include a plurality of each of the depicted nodes connected via different IP networks 107. In addition, data recorded for device 101 and network 103 depicted and described above in FIG. 1 can be received and stored in the device 101 and network 103 depicted in FIG. 2a during the steps and message flows depicted in FIG. 2a.

A network 103 in FIG. 2a can also include a network database 103db to store "pre-shared" secret keys and identifiers or identities of the "pre-shared" secret keys. As contemplated herein, a "pre-shared" secret key does not need to be shared between device 101 and network 103 before the device 101 sends a first message 202 below. The "pre-shared" secret key can be mutually generated by device 101 and network 103 and server 111 based on data exchanged during a first handshake or initial session 250 and the "pre-shared" secret key can be used for resumption or continuing a secure session after the first handshake. In this manner, the use of a "pre-shared" secret key can be equivalent to a "pre-shared" secret key used for resumption as described in the TLS 1.3 specification.

At step 201a, device 101 could be manufactured. The electrical components depicted for device 101 in FIG. 2a could be assembled and connected, such as (i) mounting both RAM memory for device 101 memory 101m onto a circuit board and then also (ii) mounting flash memory or storage memory for device 101 memory 101m onto a circuit board for device 101. For some embodiments, RAM memory for device 101 memory 101m may be within processor 101p operating as a "System on a Chip". Sensors 101y and actuators 101z could be connected to a device 101 in a step 201a as well. Some firmware could be loaded into device 101 at a step 201a, such as storing a boot loader firmware within memory 101m in order for device 101 to being operating after power up. Some drivers could be loaded or stored within device 101 at a step 201a as well.

At step 201b, firmware and software can be stored or recorded in device 101 during manufacturing or a device distribution step. The firmware and software can be stored within nonvolatile memory or storage memory for memory 101m within device 101. The firmware and software can include device drivers used by processor 101p within device 101. Memory 101m may include a flash memory and record firmware and/or an operating system for device 101. Memory 101m can record or store long-term and nonvolatile storage of data or files for device 101. Device 101 could also be distributed to end users during a step 201b after the loading of firmware and configuration data for device 101.

In an exemplary embodiment, an operating system with configuration settings is recorded in memory 101m in a step 201b. The operating system can include cryptographic algorithms 101s and cryptographic parameters 101x, where cryptographic algorithms 101s and cryptographic parameters 101x were depicted and described in connection with FIG. 1 above. Note that the set of parameters Device.PQC-KEM.Parameters 101f as first subset of cryptographic parameters 101x can be stored in device 101 at a step 201b. The firmware, operating system, and application software loaded in device 101 in a step 201b can include machine executable instructions for processor 101p in order for processor 101p to conduct the subsequent series of steps and message flows depicted for device 101 in FIG. 2a and also subsequent figures below.

A step 201b can include device 101 selecting a protocol for establishing a secure session with a network 103. As contemplated herein, a secure session can comprise communications between device 101 and network 103 where the data is both encrypted and at least authenticated using a certificate and digital signature for the server. In preferred exemplary embodiments, the encryption of data between device 101 and network 103 supports forward secrecy through the use of ephemeral PKI key pairs. The secure session could support any of TLS, DTLS, SSH, a VPN, IPSec, and other protocols are possible as well without departing from the scope of the present disclosure. A set of device extensions 101g can be selected for each of the protocols for secure sessions supported by device 101 in a step 201b.

A step 201b can include device 101 selecting a protocol for establishing a secure session and then using subsequent steps and message flows as depicted herein in order to conduct the protocol for the secure session. The message flows depicted in FIG. 2a support structures for TLS, but other protocols could be supported in a system 200a as well. The software or firmware loaded in a step 201b can include client software or firmware for device 101 to conduct the subsequent steps depicted herein, such as generating a Transport Layer Security (TLS) "client hello" message for message 202, receiving and processing a TLS "server hello" message for message 213, etc. A network interface within device 101, such as, but not limited to, radio 101z, could communicate the messages depicted in FIG. 2a including sending a first message 202, receiving a second message 213, etc.

At a step 201c, server 111 within network 103 can conduct a step equivalent to a step 201b by device above, where server 111 is loaded is an operating system and configuration settings or parameters. The data could be stored within storage memory 111b. Prior to a step 201c, the electrical components for a server 111 depicted as server hardware 111h in FIG. 1 above could be assembled and connected. A network 103 could perform the step 201c for a server 111, such as a network administrator connecting to server 111 and performing the steps. The operating system and associated application software for server 111 can include cryptographic algorithms 103s and cryptographic parameters 103x. A step 201c could include server 111 loading and operating a server package for processing secure sessions and messages such as OpenSSL, BouncyCastle, Secure Shell (SSH), an IP Security (IPSec) server, a VPN such as Wireguard, and other possibilities exist as well for the server packages and application software loaded in a step 201c. In exemplary embodiments, server 111 conducting the steps in FIG. 2a can comprise a virtual server operating on a host server, where the host server includes computing hardware 111h.

Note that the set of parameters Server.PQC-KEM.Parameters 103f as first subset of cryptographic parameters 103x can be stored in server 111 at a step 201c. The firmware, operating system, and application software loaded in server 111 in a step 201c can include machine executable instructions for processor 111p in order for processor 111p to conduct the subsequent series of steps and message flows depicted for server 111 in FIG. 2a and also subsequent figures below. The software or firmware loaded in a step 201c can include host software or firmware for server 111 to conduct the subsequent steps depicted herein, such as received and processing a Transport Layer Security (TLS) "client hello" message for message 202, processing and sending a TLS "server hello" message for message 213, etc.

At step 201c, server 111 can also load the cryptographic algorithms 103s with a server process for conducting transport layer security such as TLS, where the server process could comprise software such as OpenSSL, Microsoft Server, etc. In addition, although TLS is described as a technology or protocol for a secure session in FIG. 2a, other and related protocols could be used as well for processing digital signatures in the current disclosure, including IP Security (IPSec), Datagram Transport Layer Security (DTLS) with UDP messages, Secure Shell (SSH), and other possibilities exist as well.

At step 201c, server application software for conducting a secure session with device 101 such as a TLS server could be configured to support the use of a KEM ENCAPS function 103k and also the KEM DECAPS function 103j, which is depicted and described in connection with FIG. 1 above. Note that the configuration step 201c could also specify a preference for the use of different cryptographic algorithms 101s for the KEM ENCAPS function 103k and the KEM DECAPS function 103j.

At steps 201d through 201f, device 101 can begin operating and process data in order to generate a first message 202 for server 111, where the first message 202 could comprise a "Client Hello" message. Steps 201d and subsequent steps in FIG. 2a can use the computing hardware in device 101 as depicted in FIG. 1 above, as well as the operating system and stored parameters within device 101 stored in a step 201b above. At step 201d, device 101 can power on or wake from a sleep state and then select either a network ID 103a or a server ID 111a for sending a first message 202. The IDs 103a or 111a could comprise domain names or IP addresses for connecting to the network 103.

Step 201d can include device 101 selecting device parameters 101g for use with a secure session between device 101 and server 111. In some protocols such as TLS, the device parameters 101g can be referred to as extensions, such the device or client data for the section "4.2-Extensions" within IETF RFC 8446. Device extensions 101g were also described above in connection with FIG. 1, and can include identifiers or values for supported by both (i) cryptographic algorithms 101s and cryptographic parameters 101x, and (ii) a protocol for secure communications with network 103 and server 111. Device extensions 101g can include supported cipher suites such as names or values identifying supported symmetric ciphering algorithms, secure hash algorithms, digital signature algorithms, etc.

Device extensions 101g selected in a step 201d can include an identity for a certificate issuer or certificate authority of supported by device 101. The identity for the certificate issuer can comprise a name or string recorded in a certificate issuer certificate root certificate or possibly an intermediate certificate issuer certificates stored within device 101. A value or field for device parameters 101g processed by device 101 in a step 201d can include a certificate request, such that a "Client Hello" message 202 can request certificates and at least one digital signature from server 111 that supports other fields or values in device parameters 101g such as specified supported digital signature algorithms in cryptographic algorithms 101s in addition to the an identity of a supported certificate issuer by device 101.

At step 201d, device 101 can select a subset of the cryptographic parameters 101x for conducting a first KEM 103k/101j, where the selected subset can comprise Device.PQC-KEM.Parameters 101f. An exemplary selected subset of parameters Device.PQC-KEM.Parameters 101f are also depicted and described in connection with FIG. 8 below. During a step 201d, device 101 could also select KEM parameters 101f-x (or a first KEM algorithm) from the subset of parameters Device.PQC-KEM.Parameters 101f. In other words, at a step 201d, the parameters Device.PQC-KEM.Parameters 101f can include different supported families of PQC KEM, such as Kyber, BIKE, SIKE, NRTU, HQC, Classic McEliece, etc, where the KEM parameters 101f-x (or the first KEM algorithm) can comprise a specific, identified KEM such as one of (i) Kyber-768 or (ii) SIKEp434 or (iii) BIKE security level 3, etc. Device.PQC-KEM.Parameters 101f for device 101 are also depicted and described in connection with FIG. 8 below.

At step 201e, device 101 can use a PQC.KeyGen function 101q in FIG. 1 to generate a device ephemeral PKI key pair comprising a first device ephemeral public key ePK-1.device 101h-1 and a first device ephemeral private key eSK-1.device 101i-1. The algorithm used to generate the ephemeral PKI key pair can be specified in KEM parameters 101f-x selected by device 101 in a step 201d above. In a step 201e, the device ephemeral PKI key pair can comprise a key pair supporting key encapsulation mechanisms specified in Round 3 of the NIST "Post Quantum Cryptography" (PQC) project. Each KEM provides details for a KeyGen function, which could be used for a PQC.KeyGen function 101q in a step 201e. The first device ephemeral public key ePK-1.device 101h-1 generated in a step 201e can comprise the value of "Key Share" within a "Client Hello" message for a first message 202 below. Device 101 can also generate a random number for inclusion in the "Client Hello" message 202 below in a step 201e.

After the conclusion of a step 201e by device 101, device 101 can then conduct a step 201f to process a first message 202 as depicted in FIG. 2a. A step 201f can use firmware or application software within device 101 in order to perform steps as specified in a protocol for a secure session between device 101 and network 103. The first message 202 can comprise a "Client Hello" or equivalent first message according to the protocol for the secure session selected by device in a step 201d. Device 101 can send a first message 202 comprising a "Client Hello" message (or equivalent for a different protocol than TLS) to the server 111 operating in network 103 in a step 201f. A domain name for server 111 or an IP address for server 111, such as a server ID 111a, could be (i) stored in device 101 at a step 201e and (ii) used by device 101 to send the first message 202 to network 103 and server 111. A step 201f can comprise processor 101p writing the data for the first message 202 to a radio 101r (or equivalently a network interface if device 101 does not include a radio 101r). As depicted in FIG. 2a, the first message 202 can comprise a first "Client Hello 1" message, where a second "Client Hello 2" message depicted in FIGS. 2b, 2c, and 2d below can comprise a message for use with resumption of the secure session.

As depicted in FIG. 2a, the first message 202 from device 101 to server 111 can comprise a network ID 103a, the first device ephemeral public key ePK-1.Device generated in a step 201e, device parameters 101g selected in a step 201d, a set of parameters for conducting a PQC KEM of Device.PQC-KEM.Parameters 101f, and the subset of parameters 101f-x for the first device ephemeral public key ePK-1.Device 101h-1 and conducting a first KEM 103k/101j between device 101 and server 111. In other words, Device.PQC-KEM.Parameters 101f can include multiple different KEM parameters and algorithms supported by device 101, such as those depicted for a Device.PQC-KEM.Parameters 101f in FIG. 8 below. As contemplated herein, Device.PQC-KEM.Parameters 101f can also be referred to as parameters 101f. Message 202 can include headers or values specifying the message is for a "Client Hello" according to the secure session protocol selected by the device 101. The first message 202 can also include a random number 202a read by device 101 from a random number generator 128.

Server 111 can receive the first message as a "Client Hello" message 202 via a network interface 111d in server hardware 111h (depicted for server 111 in FIG. 1 above). Server 111 can use application software such as, but not limited to, OpenSSL with cryptographic algorithms 103s and cryptographic parameters 103x and server hardware 111h to process the received first message 202.

At step 203a, server 111 can conduct a first step to process the "Client Hello" message 202. Server 111 can confirm the "Client Hello" message 202 is supported by server 111 using the values within device parameters 101g, 101f, and 101f-x. Server 111 can validate that the first device ephemeral public key ePK-1.device 101h-1 received is properly structured and consistent with KEM parameters 101f-x. The first device ephemeral public key ePK-1.device 101h-1 can also be referred to as a key share. For example, if KEM parameters 101f-x state the key 101h-1 supports the Kyber-786 algorithm, then in a step 203a server 111 could at least verify the ePK-1.device 101h-1 is 1184 bytes long and also can be successfully input into a KEM ENCAPS function 103k for sever 111.

At a step 203a, server 111 can also verify that KEM parameters 101f-x is supported by Server.PQC-KEM.Parameters 103f. In other words, in a step 203a, server 111 can determine the selected KEM parameters 101f-x for the first KEM 103k/101j and ePK-1.device 101h-1 are supported by server 111 by cryptographic algorithms 103s and cryptographic parameters 103x. The first KEM 103k/101j associated with received KEM parameters 101f-x can be for (i) KEM ENCAPS 103k by server 111 and (ii) KEM DECAPS 101j by device 101 as depicted and described in connection with FIG. 1 above.

In a preferred exemplary embodiment, for a step 203b, server 111 can select a second set of KEM parameters 103f-y that are both (i) different than the first set of KEM parameters 101f-x received in message 202 and (ii) supported by or included within the set of KEM parameters 101f also received in a message 202. The selection of a second set of KEM parameters 103f-y in a step 203b is also depicted and described in connection with FIG. 8 below. In summary, for a step 203b and in a preferred exemplary embodiment, server 111 selects KEM parameters 103f-y for a second KEM 101k/103j, where the second KEM comprises (i) KEM ENCAPS 101k by device 101 and (ii) KEM DECAPS 103j by server 111 as depicted and described in connection with FIG. 1 above. Note that the above sentence also describes a second KEM 806 which is depicted and described in connection with FIG. 8 below.

In a preferred exemplary embodiment, the KEM parameters 103f-y selected in a step 203b support at least the following criteria for KEM parameters 103f-y: (i) are included within a list or set of parameters 101f for device 101 received in message 202, (ii) are included within a list or set of parameters 103f for server 111 as supported by server 111, and (iii) support a different family or type of PQC algorithms than KEM parameters 101f-x. In other words if (x) device 101 signals support of Kyber and SIKE algorithms in parameters 101f and selects Kyber for KEM parameters 101f-x and ePK-1.device 101h-1, and (y) server 111 also supports Kyber and SIKE algorithms parameters 103f and cryptographic algorithms 103s, then for a step 203b server 111 in preferred embodiments can select a SIKE algorithm for KEM parameters 103f-y to use with the second KEM 101k/103j comprising KEM ENCAPS 101k and KEM DECAPS 103j. Other possibilities exist as well for the specific families of algorithms that could be specified in parameters 101f and 103f, received in 101f-x, and the selected in a step 203b by server 111 for KEM parameters 103f-x without departing from the scope of the present disclosure.

At step 204, server 111 can use a PQC.KeyGen function 103q to generate a server ephemeral PKI key pair comprising a server ephemeral public key ePK.server 103h and a server ephemeral private key eSK.server 103i. The algorithm used to generate the ephemeral PKI key pair can be specified in KEM parameters 103f-y selected by server 111 in a step 203b above. In a step 204, the device ephemeral PKI key pair can comprise a key pair supporting key encapsulation mechanisms specified in Round 2 of the NIST "Post Quantum Cryptography" (PQC) project. Each KEM provides details for a KeyGen function, which could be used for a PQC.KeyGen function 103q from FIG. 1 in a step 204. The server ephemeral public key ePK.server 103h generated in a step 204 can comprise the value of "Key Share" within a "Server Hello" message for a second message 213 below.

In some exemplary embodiments, the set of KEM parameters 103f-y (i) used in step 204 to generate a server ephemeral public key ePK.server 103h and a server ephemeral private key eSK.server 103i can be (ii) equal to or equivalent to KEM parameters 101f-x received in a message 202. In other words, some exemplary embodiments support device 101 and server 111 using the exact same algorithm for both (i) a first KEM 103k/101j initiated by a device through KeyGen and sending a first public key of ePK-1.device 101*h*-1, and (ii) a second KEM 101*k*/103*j* initiated by a server through KeyGen and sending a second public key of ePK.server 103*h*. In other exemplary embodiments, device 101 and server 111 use completely different algorithms for both (i) the first KEM 103*k*/101*j* initiated by a device through KeyGen and sending a first public key of ePK-1.device 101*h*-1, and (ii) the second KEM 101*k*/103*j* initiated by a server through KeyGen and sending a second public key of ePK.server 103*h*.

The selection and use of the same KEM algorithm for both the first KEM 103*k*/101*j* and second KEM 101*k*/103*j* can depend on the processing capabilities and security requirements for device 101 and server 111/network 103. For lower security requirements and/or lower processing capabilities for device 101 and server 111/network 103, both nodes could use the same KEM algorithm for both the first and second KEM. For higher security requirements and/or higher processing capabilities for the device 101 and server 111/network 103, the server 111 in a step 203*b* can select a different KEM algorithm than the first KEM algorithm for the first device ephemeral public key and for the sever ephemeral PKI key pair. For this example of higher security requirements, then the first KEM algorithm for the first device ephemeral public key and the second KEM algorithm for the server ephemeral public key can be different and also support different types of algorithms (e.g. first KEM algorithm supporting lattice-based cryptography and the second KEM algorithm supporting code-based cryptography or SIKE).

In a first exemplary embodiment, (i) the first KEM 103*k*/101*j* initiated or selected by device 101 using ePK-1.device 101*h*-1 supports lattice based algorithms, and (ii) the second KEM 101*k*/103*j* initiated or selected by server 111 using ePK.server 103*h* supports Supersingular Isogeny Key Encapsulation (SIKE). In a second exemplary embodiment, (i) the first KEM 103*k*/101*j* initiated or selected by device 101 using ePK-1.device 101*h*-1 supports lattice based algorithms, and (ii) the second KEM 101*k*/103*j* initiated or selected by server 111 using ePK.server 103*h* supports code based algorithms. In a third exemplary embodiment, (i) the first KEM 103*k*/101*j* initiated or selected by device 101 using ePK-1.device 101*h*-1 supports code based algorithms, and (ii) the second KEM 101*k*/103*j* initiated or selected by server 111 using ePK.server 103*h* supports lattice based algorithms.

In a fourth exemplary embodiment, (i) the first KEM 103*k*/101*j* initiated by device 101 using ePK-1.device 101*h*-1 supports code based algorithms and (ii) the second KEM 101*k*/103*j* initiated by server 111 using ePK.server 103*h* supports Supersingular Isogeny Key Encapsulation. In a fifth exemplary embodiment, (i) the first KEM 103*k*/101*j* initiated by device 101 using ePK-1.device 101*h*-1 supports Supersingular Isogeny Key Encapsulation and (ii) the second KEM 101*k*/103*j* initiated by server 111 using ePK-.server 103*h* supports code based algorithms. In a sixth exemplary embodiment, (i) the first KEM 103*k*/101*j* initiated by device 101 using ePK-1.device 101*h*-1 supports Supersingular Isogeny Key Encapsulation and (ii) the second KEM 101*k*/103*j* initiated by server 111 using ePK.server 103*h* supports lattice based algorithms.

For the six embodiments described above in the previous two paragraphs, lattice based algorithms could comprise any of CRYSTALS-KYBER, FrodoKEM, NTRU Prime, and SABER. For the six embodiments described above in the previous two paragraphs, code based algorithms could comprise any of BIKE, Classic McEliece, and HQC. The algorithms described in the previous sentence are specified in "Round 3" of the Wikipedia PQC article.

At step 205, server 111 can select a server certificate of cert.server 103*c* which supports the device extensions 101*g* received in a message 202. At one example, different cert.server 103*c* could support both (i) different digital signature algorithms, and (ii) different certificate issuers (such that cert.server 103*c* could be verified by device 101 using the same certificate issuer). At the conclusion of a step 205, server 111 can identify and store a cert.server 103*c* for subsequent steps and messages in FIG. 2*a* that would be compatible with device 101. In exemplary embodiments, the server certificate of cert.server 103*c* supports at least a subset of both device extensions 101*g* and server extensions 103*g*.

At step 205, server 111 can also select metadata 205*a*, where metadata 205*a* can include parameters or values used for the subsequent generation of both a first asymmetric ciphertext C1 102*c*-1 and a first symmetric ciphertext symm-C1 102*s*-1. As one example, metadata 205*a* could include values or a name for (i) KEM parameters 101*f*-*x* that specify the first asymmetric ciphertext C1 102*c*-1 supports the KEM parameters 101*f*-*x*, and (ii) a symmetric ciphering algorithm used to generate a first symmetric ciphertext symm-C1 102*s*-1. As a second example, the metadata 205*a* could include an initialization vector for the first symmetric ciphertext C1 102*s*-1 and also an identity of the symmetric ciphering algorithm (such as "AES") and a chaining mode (e.g. ECB, CBC, etc.). For some embodiments, initialization vectors could be mutually derived using shared secret keys and HKDF, and the initialization vectors could be omitted from metadata for messages. In exemplary embodiments, the metadata 205*a* selected by a server 111 in a step 205 can be a selected subset of device extensions 101*g* received in a message 202.

As contemplated herein, the depicted numeral values of "102*c*" designate an asymmetric ciphertext and the depicted numeral values for "102*s*" designate a symmetric ciphertext. A first asymmetric ciphertext is depicted with a numeral of 102*c*-1 and a second asymmetric ciphertext is depicted with a numeral of 102*c*-2. Likewise, a first symmetric ciphertext is depicted with a numeral of 102*s*-1 and a second symmetric ciphertext is depicted with a numeral of 102*s*-2, etc.

At step 205, server 111 can also select server extensions 103*g* used by the server in generating a subsequent "Server Hello" message. Note that server extensions 103*g* can be a subset of the supported server extensions 103*g* described in FIG. 1 above. Server 111 can use both (i) the received device extensions 101*g* from a "Client Hello" message 202 and (ii) stored parameters and algorithms from for server extensions 103*g* in order to select a compatible and preferred set of server extensions 103*g* that would also be supported by device 101. Server extensions 103*g* can select subsets of algorithms or parameters offered or proposed by device 101 in the "Client Hello" message 202. In other words, in exemplary embodiments, server extensions 103*g* can be a subset of device extensions 103*g* received by server 111 in a message 202.

A portion of the subsets of subsets of algorithms or parameters offered or proposed by device 101 in the "Client Hello" message 202 can also be included in metadata 205*a*, such as specifying a specific symmetric ciphering algorithm and parameters for the first symmetric ciphertext symm-C1 102*s*-1. In other words, device 101 could use metadata 205*a* in order to process and decrypt the first symmetric ciphertext symm-C1 102*s*-1 (where metadata 205*a* would normally be plaintext in order to device 101 to process the symmetric ciphertext). For embodiments of the present invention, the server extensions 103g selected by a server 111 in a step 205 can include both (i) a digital signature algorithm for generating a digital signature in a "Certificate Verify" 207c and (ii) symmetric ciphering parameters for processing a first symmetric ciphertext symm-C1 102s-1. In addition, metadata 205a can include an algorithm for generation of MAC or tag values in order to ensure message integrity, such as metadata 205a specifying the use of Poly1305 for MAC or tag values of symmetrically encrypted data. Other algorithms for MAC or tag values could be specified as well.

At step 208, server 111 can derive or generate a random number M1 208a for use in a first KEM 103k/101j between server 111 and device 101. At step 209, server 111 can use both (i) the received device ephemeral public key of ePK-1.device 101h-1 and (ii) the specified subset of KEM parameters 101f-x for the device ephemeral public key and the first KEM 103k/101j in order to generate both (x) a first asymmetric ciphertext C1 102c-1 and (y) a first shared secret key K1 102k-1.

At step 209, server 111 can use a KEM ENCAPS function 103k with both (i) and (ii) from the previous sentence as well as M1 208a in order to generate both (x) a asymmetric ciphertext C1 102c-1 and (y) a first shared key K1 102k-1. A summary of the step 209 by server 111 with a KEM ENCAPS function 103k was also depicted and described in connection with FIG. 1 above. A server 111 can use both cryptographic algorithms 103s and cryptographic parameters 103x in order to conduct the step 209. The function and use of a step 209 and a KEM ENCAPS function 103k is also depicted and described in FIG. 3 below. In exemplary embodiments, both the value of M1 208a comprising a random number and the device ephemeral public key can be stored within RAM memory 111m of server 111 within network 103.

At step 206, server 111 can select data and values for processing a "Server Hello" message 213. In exemplary embodiments the data or values for a "Server Hello" message 213 selected in a step 206 can include at least (i) a first server ephemeral public key ePK.server 103h, (ii) the second set of KEM parameters for the server ephemeral public key ePK.server 103h of 103f-y, (iii) the server certificate cert.server 103c selected in a step 205 above, (iv) server extensions 103g from a step 205, and (v) the first asymmetric ciphertext C1 102c-1 output from a step 209. The values for (i) through (v) in the previous sentence can comprise a "data for signature" which can be input into a PQC digital signature algorithm such as Dilithium in order to generate a "Certificate Verify" 207c value for inclusion in plaintext 211a. Note (i) the second set of KEM parameters 103f-y can be values for a subset of Server.PQC-KEM.Parameters 103f and (y) the first set of KEM parameters 101f-x can be for the device ephemeral public key ePK-1.device 101h-1. At step 206, server 111 can also include the data and values selected for a "Server Hello" message in a "data for signature". Consequently, as depicted in FIG. 2a, a step 206 can normally be conducted after a step 208 and 209 in order to select and use the first asymmetric ciphertext C1 102c-1 output from a step 209 for inclusion in the "data for signature".

At step 206, server 111 can select a digital algorithm and conduct digital signature generation step in order to generate a digital signature which can comprise a "Certificate Verify" 207c value. The algorithm for digital signature generation could be specified or identified by the supported digital signature algorithm in both device extensions 101g and server extensions 103g. In other words, the digital signature algorithm selected in a step 206 can be a selected subset supported by both device extensions 101g and server extensions 103g, and can comprise the digital signature algorithm within server extensions 103g from a step 205 above.

At step 207, server 111 can use the selected digital signature algorithm from a step 206 and conduct digital signature generation step in order to generate a digital signature which can comprise a "Certificate Verify" 207c value. The step 207 can occur after a step 209, because the output of a step 209 comprising at least a first asymmetric ciphertext C1 102c-1 can be used for "data to sign" in a step 207 to generate a digital signature comprising the "Certificate Verify" 207c value. The "data for signature" selected for input into a digital signature algorithm can include the following: the random number 202a received in a message 202, metadata 205a selected or processed in a step 205 (and transmitted to device 101 in a message 213 below), the first asymmetric ciphertext C1 102c-1 generated in a step 209, the first server ephemeral public key ePK.server 103h, server extensions 103g, and the server certificate cert.server 103c.

Variations for the data for signature selected by server 111 in a step 207 are possible without departing from the scope of the present disclosure. As one example, the data for signature in order to generate a digital signature of a "Certificate Verify" 207c value could be over the first shared secret key K1 102k-1 instead of the first asymmetric ciphertext 102c-1. Alternatively, the generation of digital signature for a "Certificate Verify" 207c could include both the first asymmetric ciphertext 102c-1 and the shared secret K1 102k-1 as input into the "data to sign" in a step 207. For some embodiments, the parameters 103f-y for the first server ephemeral public key of ePK.server 103h and Server.PQC-KEM.Parameters could be include in the "data to sign" to generate the digital signature of "Certificate Verify" 207c.

Note that the inclusion of at least one of (i) the first asymmetric ciphertext C1 102c-1 generated in a step 209 and/or (ii) the first shared secret key K1 102k-1 in a "data to sign" by a server 111 in a step 207 can be important for security against a MITM attacker located between device 101 and server 111 in an IP network 107. The device 101 has sent a first device ephemeral public key ePK-1.device 101h-1 as plaintext in a message 202. An attacker could attempt to (i) generate a substitute and "fake" first device ephemeral public key ePK-1.device 101h-1' with a corresponding fake device ephemeral private key, and then (ii) receive the first asymmetric ciphertext C1 102c-1 for the "fake" first device ephemeral public key ePK-1.device 101h-1', (iii) use the corresponding fake device ephemeral private key with the first asymmetric ciphertext C1 102c-1 to generate the first shared secret K1 102k-1, and (iv) substitute a "fake" first asymmetric ciphertext C1 102c-1' for the first device ephemeral public key ePK-1.device 101h-1 in a response message 213' to device 101 by the MITM attacker.

By server 111 including at least one of (i) the first asymmetric ciphertext C1 102c-1 generated in a step 209 and/or (ii) the first shared secret key K1 102k-1 in a "data to sign" by a server 111 in a step 207, then the digital signature of "Certificate Verify" 207c over at least (i) or (ii) can be used by device 101 in a signature verification step 217 below in order to verify the server 111 generated the first asymmetric ciphertext C1 102c-1. In other words, the verification of the digital signature in a "Certificate Verify" 207c by device 101 in a step 217 below can fail if a MITM attacker substitutes a "fake" first asymmetric ciphertext C1 102c-1' for the first device ephemeral public key ePK-1.device 101h-1.

At step 210, server 111 can use a hash-based key derivation function or an HMAC-based Extract-and-Expand Key Derivation Function (HKDF) 210a (depicted and described in FIG. 3 below) with at least the first shared secret key K1 102k-1 output from KEM ENCAPS function 103k in order to generate both (i) a first symmetric ciphering key of S1 210b and a first message authentication code (MAC) key MAC1 210c. As described below, HKDF 210a can comprise a HMAC-based Extract-and-Expand Key Derivation Function (HKDF). In other words, a HMAC-based Extract-and-Expand Key Derivation Function can be a subset of a hash-based key derivation function. Note that in some exemplary embodiments, additional data mutually shared between device 101 and server 111 besides the first shared secret key K1 102k-1 can also be input into the HKDF 210a in a step 210 in order to generate S1 210b and MAC1 210c. The additional data input into HKDF 210a can comprise data from the message 202, such as, but not limited to, the device ephemeral public key ePK-1.device 101h-1 from device 101, device extensions 101g, and/or parameters 101f and 101f-x. A protocol for conducting the secure session between device 101 and network 103 could also specify text values or a text value for input into the HKDF 210a, where both the device 101 and server 111 would use the same text value or text values for input into the HKDF 210a.

A step 210 by server 111 can also generate two values for each of the first symmetric ciphering key of S1 210b and a first message authentication code (MAC) key MAC1 210c. A first portion of the first symmetric ciphering key of S1 210b could be used with a symmetric encryption step 212a by server 111 in step 212 below (also depicted in FIG. 3), and a second portion of the first symmetric ciphering key of S1 210b could be used with a symmetric decryption step 215a by server 111 in a step 226 below (depicted in FIG. 5). Likewise, a first portion of the first MAC key MAC1 210c could be used with the generation of MAC values with the symmetric encryption step 212a by server 111 in step 212 below (also depicted in FIG. 3), and a second portion of the first MAC key MAC1 210c could be used with a symmetric decryption step 215a by server 111 in a step 226 below (depicted in FIG. 5). The corresponding use to two portions of both the first symmetric ciphering key of S1 210b and the first message authentication code (MAC) key MAC1 210c by device 101 is also described below for device 101 in a step 215.

Other data from a message 202 can be used for input into a HKDF 210a, in addition to the first shared secret key K1 102k-1, without departing from the scope of the present disclosure, such as, but not limited to, (i) a network ID 103a or a server ID 111a that can be included in a message 202, as well as plaintext data from a message 213 such as (ii) portions or all of metadata 205a, and/or the first asymmetric ciphertext C1 102c-1. For other embodiments, the input of additional data from a message 202 into a HKDF 210a besides K1 102k-1 could be omitted, and S1 210b and MAC1 210c could be derived from K1 102k-1. The function and use of a step 210 using output from KEM ENCAPS function 103k of at least K1 102k-1 and a HKDF 210a is also depicted and described in FIG. 3 below.

A step 207 for conducting digital signature generation is also depicted and described in connection with FIG. 3 of PCT patent application PCT/US21/43603 filed Jul. 29, 2021 in the name of John Nix and titled "Secure Communication with Two Post-Quantum Cryptography Key Encapsulations and Authentication", which is herein incorporated by reference in its entirety. The "Certificate Verify" 207c value can be generated using the server static private key SK.server 103b for the public key PK.server 103d in the server certificate cert.server 103c, where the keys are also depicted and described in connection with FIG. 1 above.

At step 211, server 111 can select and process a plaintext 211a for encryption into a first symmetric ciphertext symm-C1 102s-1. A step 211 is also depicted and described in connection with FIG. 3 below. Note that the first asymmetric ciphertext C1 102c-1 could be previously output from the KEM ENCAPS function 103k (where device 101 uses the first asymmetric ciphertext C1 102c-1 for the first KEM 103k/101j). In exemplary embodiments the data or values for the plaintext 211a selected in a step 211 can include at least (i) the server ephemeral public key ePK.server 103h, (ii) the second set of KEM parameters 103f-y for the server ephemeral public key ePK.server 103h for a second KEM algorithm, (iii) the server certificate cert.server 103c selected in a step 205 above, (iv) server extensions 103g from a step 205, and (v) the digital signature generated in a step 207 of a "Certificate Verify" 207c. Additional data could be included in plaintext 211a or some data listed above could be omitted from plaintext 211a without departing from the scope of the present disclosure. The plaintext 211a, the server ephemeral public key ePK.server 103h, and the server ephemeral private key eSK.server 103i can be stored within RAM memory 111a for server 111 and network 103. The KEM parameters 103f-y and the server certificate cert.server 103c as well as the server static private key SK.server 103b can be stored within nonvolatile memory or storage memory 111b.

At step 212, server 111 can use symmetric encryption 212a with the plaintext 211a from a step 211 in order to generate the first symmetric ciphertext symm-C1 102s-1. A step 212 is also depicted and described in connection with FIG. 3 below. The symmetric encryption 212a can be included within cryptographic algorithms 103s for server 111. The symmetric encryption 212a can include input of the parameters specified in metadata 205a from a step 205 above and the symmetric ciphering key S1 210b and MAC key MAC1 210c from a step 210 above. In a step 212, server 111 can also use an initialization vector for the symmetric encryption 212a, where the initialization vector can be included with metadata 205a or derived from HKDF 210a. As contemplated herein, an initialization vector for use with symmetric encryption or decryption can also be referred to as a nonce or a nonce value.

As depicted in FIG. 2a, server 111 can then send device 101 a response second message 213, where the response second message can also comprise a "Server Hello" message. As depicted in FIG. 2a, the response second message 213 can comprise a first "Server Hello 1" message, where a second "Server Hello 2" message depicted in FIGS. 2b, 2c, and 2d below can comprise a response message for use with resumption of the secure session. The response second message 213 can include (i) metadata 205a from a step 205 above, (ii) the first asymmetric ciphertext C1 102c-1 output from the KEM ENCAPS function 103k in a step 209, and (iii) the first symmetric ciphertext symm-C1 102s-1 output from step 212. Additional data could be included in a response second message 213 without departing from the scope of the present disclosure. Note that although a message 213 with a depicted asymmetric ciphertext of C1 102c-1 shows the value K1 102k-1 within brackets, the actual first shared secret key K1 102k-1 may normally not be included within the ciphertext. In other words, the depicted asymmetric ciphertext of C1 102c-1 includes sufficient data for device 101 to use the C1 102c-1 with the KEM DECAPS 101j function and a device ephemeral private key to generate the first shared secret key K1 102k-1. The previous two sentences regarding the use of brackets to indicate an asymmetric ciphertext corresponds to a shared secret key K also apply for the second asymmetric ciphertext C2 102c-2 for a message 225 below.

For some embodiments, the portions of data for a response second message 213 of metadata 205a, the first ciphertext 102c-1, and the first symmetric ciphertext symm-C1 102s-1 could be sent as separate segments, portions, or sub-messages, where the aggregate delivery of the data for metadata 205a, the first asymmetric ciphertext C1 102c-1, and the first symmetric ciphertext symm-C1 102s-1 can represent the response second message 213. Note the first message 202 and the messages 225, 231, etc. below could likewise be separated into different segments, where the collective segments for each message represent the full message. In addition, although the response second message 213 depicts the use of symmetrically encrypted data with the use of brackets "{ }" followed by the key S1 210b used to generated the symmetrically encrypted data, the symmetrically encrypted data can also include a tag value or message authentication code (MAC) value for the symmetrically encrypted data. The inclusion of a MAC value for confirming message integrity is shown by the "MAC value" with the first symmetric ciphertext 102s-1 for a step 212 in FIG. 3 below, where the MAC value would be generated with the MAC key 210c. Likewise, other symmetric ciphertext in FIG. 2a, such as symm-C2 102s-2, symm-C3 102s-3, etc. can include MAC values generated using MAC keys.

The first symmetric ciphertext symm-C1 102s-1 in a response second message 213 can include encrypted data for (i) the server ephemeral public key ePK.server 103h, (ii) the KEM parameters 103f-y for the server ephemeral public key ePK.server 103h which can be selected in a step 203b above, (iii) selected server extensions 103g which were selected in a step 205 above, (iv) the server certificate cert.server 103c, which can also be selected in a step 205 above, and (iv) a digital signature for server 111 comprising "Certificate Verify" 207c, which can be generated in a step 207. Note that the plaintext data for generating and verifying the "Certificate Verify" 207c digital signature can include the data for (i) through (iv) in the previous sentence, in addition to "Certificate Verify" 207c being over the first asymmetric ciphertext C1 102c-1.

Device 101 can receive the response second message 213 and conduct a series of steps in order to process the message and securely send application data from the device to the server. At step 214, device 101 can use (i) the specified KEM parameters 101f-x transmitted in message 202 along for the first KEM algorithm with (ii) cryptographic algorithms 101s to conduct the KEM DECAPS 101j function with the received first asymmetric ciphertext C1 102c-1. The device 101 can use the first device ephemeral private key of eSK-1.device 101i-1 with the KEM DECAPS 101j and the received first ciphertext 102c-1 in order to generate the first shared secret key K1 102k-1. A step 214 for device 101 is also depicted and described in connection with FIG. 4 below, and also summarized for the step 214 for device 101 in FIG. 1 above. Note that for some PQC algorithms, the KEM DECAPS 101j function could fail for a small frequency of messages 202 and 213, such as less than one failure per million or billion KEM messages, and if a step 214 fails, then device 101 could send server 111 an error message and then return to a step 201d to repeat the generation of a different message 202.

A step 214 can also include device 101 using the first shared secret key K1 102k-1 with the HKDF 210a (depicted in FIG. 4 below) in order to generate the first symmetric ciphering key S1 210b and the first MAC key MAC1 210c. Note that the HKDF 210a can also include input data from message 202 in addition to the first shared secret key K1 102k-1, which was described for a HDKF 210a for server 111 above, and also for the step 214 below in FIG. 4. Other data from a message 202 can be used for input into a HKDF 210a, in addition to the first shared secret key K1 102k-1, without departing from the scope of the present disclosure, such as, but not limited to, (i) a network ID 103a or a server ID 111a that can be included in a message 202, as well as plaintext data from a message 213 such as (ii) portions or all of metadata 205a, and/or the first asymmetric ciphertext C1 102c-1. The data input into HKDF 210a by device 101 and server 111 (in step 210) would be identical in exemplary embodiments in order for the HKDF 210a to output the same values for device 101 and server 111. At the conclusion of a step 214, device 101 can store the first symmetric ciphering key S1 210b and first MAC key MAC1 210c, which are mutually and secretly shared between device 101 and server 111.

A step 214 can include device 101 calculating two values for the symmetric ciphering key S1 210b, where a first S1 210b-1 can be for use by device 101 for symmetric encryption of plaintext data into ciphertext for transmission to server 111, and a second S1 210b-2 can be for use by device 101 for symmetric decryption of ciphertext data from server 111 into plaintext data. The first S1 210b-1 can be referred to as a first portion of the symmetric ciphering key S1. The second S1 210b-2 can be referred to as a second portion of the symmetric ciphering key.

Likewise, device 101 in a step 214 can generate two values for MAC key MAC1 210c, where the first MAC1 is used by device 101 to generate MAC codes for server 111 and the second MAC1 is used by device 101 to verify MAC codes for server 111. The first MAC1 210c can be referred to as a first portion of MAC1 210c, and the second MAC1 210c can be referred to as a second portion of MAC1 210c. A server 111 can likewise use the HKDF 210a in a step 210 to generate all of the same first S1 210b-1, the second S2 210b-2, the first MAC1 201c-1 and the second MAC 210c-2. In addition, HKDF 210a for device 101 (depicted and described in connection with FIG. 4 below) and server 111 (depicted and described in connection with FIG. 3 below) can generate nonce values or initialization vectors for use with symmetric encryption 212a (depicted in FIG. 3 below) and symmetric decryption 215a (depicted in FIG. 4 below).

In the exemplary embodiment for the step 224 below for device 101, the device 101 can use the first S1 210b-1 for encryption, and for the step 215 below device 101 could use the second S2 210b-2 for decryption. In other words, although the present disclosure uses the term "first symmetric ciphering key S1 210b", the "first symmetric ciphering key S1 210b" output from a HKDF 210a can comprise two components of key S1 210b-1 for symmetric encryption by device 101 and key S2 210b-2 for symmetric decryption by device 101. Likewise, the server 111 can output from the same HKDF 210a during a step 210 the key S1 210b-1 for symmetric decryption by server 111 and the key S1 210b-2 for symmetric encryption by server 111. Thus, in exemplary embodiments and as contemplated herein, the term "symmetric ciphering key S1 210*b*" can comprise two related keys of S1 210*b*-1 and S1 210*b*-2.

At step 215, device 101 can use symmetric decryption 215*a* with the first symmetric ciphertext symm-C1 102*s*-1 from a message 213 in order to read the plaintext 211*a*. A step 215 is also depicted and described in connection with FIG. 4 below. The symmetric decryption 215*a* can be included within cryptographic algorithms 101*s* for device 101. The symmetric decryption 215*a* can include input of the parameters specified in metadata 205*a* from a message 213 and the first symmetric ciphering key S1 210*b* and MAC key MAC1 201*c* from a step 214 above.

At step 216, device 101 can select from the plaintext 211*a* from the step 215 a "message to verify". The message to verify can comprise the data for input into a digital signature verification step and comprise plaintext data. Some data for the "message to verify" 216*a* could be within the second message 213 and external to the first symmetric ciphertext symm-C1 102*s*-1. In exemplary embodiments, the "message to verify" can be equal to or the same as the "data for signature" from a step 206 above for server 111, since both server 111 and device 101 could read the plaintext values for each of the fields in both the "message to verify" and the "data for signature". The "message to verify" selected for input into a digital signature algorithm can include the following: the random number 202*a* transmitted in a message 202, metadata 205*a* received in a message 213, the first asymmetric ciphertext C1 102*c*-1 received in a message 213, the first server ephemeral public key ePK.server 103*h*, server extensions 103*g*, and the server certificate cert.server 103*c*. The parameters for the first server ephemeral public key ePK.server 103*h* of Server.PQC-KEM.Parameters 103*f*-*y* could also be includes in the "message to verify".

In another embodiment, the "message to verify" can include at least (i) the server ephemeral public key ePK.server 103*h*, (ii) the second set of KEM parameters 103*f*-*y* for the server ephemeral public key ePK.server 103*h*, (iii) the server certificate 103*c* read from plaintext 211*a* in a step 216 above, (iv) server extensions 103*g* from a step 205, and (v) the first asymmetric ciphertext C1 102*c*-1 received in a message 213. Additional data could be included in the "message to verify", such as a random number 202*a* generated by device 101 during steps 201*d*-201*f* and transmitted by device 101 in a message 202. Server 111 could also optionally include the random number 202*a* form a message 202 in the "data for signature" 206*a*.

Variations for the data for the "message to verify" by device 101 in a step 216 are possible without departing from the scope of the present disclosure. As one example, the "message to verify" in order to verify a digital signature of a "Certificate Verify" 207*c* value could be over the value K1 102*k*-1 instead of the first asymmetric ciphertext 102*c*-1. Alternatively, the verification of digital signature for a "Certificate Verify" 207*c* could include both the first asymmetric ciphertext 102*c*-1 and the shared secret K1 102*k*-1. For some embodiments, the parameters 103*f*-*y* for the first server ephemeral public key of ePK.server 103*h* and Server.PQC-KEM.Parameters could be include in the "message to verify" to verify the digital signature of "Certificate Verify" 207*c*.

At step 217, device 101 can use (i) cryptographic algorithms 101*s* and (ii) server certificate cert.server 103*c*, including parameters within the server certificate, and (iii) the "message to verify" from a step 216 above for device 101 in order to verify the digital signature of "Certificate Verify" 207*c*. Upon successful comparison of an internally calculated value for "Certificate Verify" 207*c* with the received value for the digital signature of "Certificate Verify" 207*c* from the message 213, then device 101 can trust that server 111 holds or operates with the private key SK.server 103*b* corresponding to the server static public key PK.server 103*d* in the server certificate cert.server 103*c*. In addition, device 101 can also trust or determine that the data within the "message to verify" and the message 213 was transmitted by and originated by server 111.

A step 217 for conducting digital signature verification of the "Certificate Verify" value 207*c* is also depicted and described in connection with FIG. 4 of PCT patent application PCT/US21/43603 filed Jul. 29, 2021 in the name of John Nix and titled "Secure Communication with Two Post-Quantum Cryptography Key Encapsulations and Authentication", which is herein incorporated by reference in its entirety. The "Certificate Verify" 207*c* value can be verified using the server static public key PK.server 103*d* in the server certificate cert.server 103*c* received in a message 213 and decrypted in a step 215.

At step 218, device 101 can verify the server certificate cert.server 103*c* using (i) cryptographic algorithms 101*s* and (ii) a trusted root or intermediate certificate issuer certificate stored within device 101. In this manner, device 101 can confirm the cert.server 111103*c* is signed by a trusted certificate issuer. The digital signature verification steps for a step 218 on a digital signature within the cert.server 103*c* can be equivalent to the digital signature verification for the "Certificate Verify" 207*c* in step 217 above, except the data being verified for the equivalent "message to verify" for a step 218 can be data within the server certificate cert.server 103*c*. Note that a step 218 can include multiple levels of verifying certificates or digital signatures for the Online Certificate Status Protocol (OSCP) through a stored root or intermediate certificate in device 101. Although not depicted in FIG. 2*a*, message 213 can include OSCP data and signatures for device 101 to verify current authentication status of cert.server 103*c*, such as determining that cert.server 103*c* has not been revoked.

At step 219, device 101 can derive or generate a random number M2 219*a* for use in a second KEM 101*k*/103*j* between device 101 and server 111. At step 220, device 101 can use both (i) the received first server ephemeral public key of ePK.server 103*h* and (ii) the specified subset of parameters 103*f*-*y* for the server ephemeral public key and the second KEM 101*k*/103*j* in order to generate both (x) a second asymmetric ciphertext C2 102*c*-2 and (y) a second shared secret key K2 102*k*-2. At step 220, device 101 can use a KEM ENCAPS function 101*k* with both (i) and (ii) from the previous sentence in order to generate both (x) the second asymmetric ciphertext C2 102*c*-2 and (y) the second shared secret key K2 102*k*-2. The function and use of a step 220 and a KEM ENCAPS function 101*k* is also depicted and described in FIG. 5 below. A summary of the step 220 by device 101 with a KEM ENCAPS function 101*k* was also depicted and described in connection with FIG. 1 above. A device 101 can use both cryptographic algorithms 101*s* and cryptographic parameters 101*x* in order to conduct the step 220.

At step 221, device 101 can use a hash-based key derivation function or an HMAC-based Extract-and-Expand Key Derivation Function (HKDF) 221*a* (depicted and described in FIG. 5 below) with at least the second shared secret key K2 102*k*-2 output from KEM ENCAPS function 101*k* in order to generate at least both (i) a second symmetric ciphering key of S2 221*b* and (ii) a second message authentication code (MAC) key MAC2 221*c*. Note that in some exemplary embodiments, additional data mutually shared between device 101 and server 111 besides the second shared secret key K2 102k-2 can also be input into the HKDF 221a in a step 221 in order to generate S2 221b and MAC2 221c. The additional data input into HKDF 221a can comprise data from the message 202 and the message 213, such as, but not limited to, the device ephemeral public key ePK-1.device 101h-1 from device 101, device extensions 101g, parameters 101f and 101f-x, the server ephemeral public key ePK.server 103h from server 111, server extensions 103g, parameters 103f-y, metadata 205a, and server certificate cert.server 103c. Note that not all the data from the previous sentence are required to be input into HKDF 221a in a step 221, and a subset of the example data could be selected for input into HKDF 221a.

In preferred exemplary embodiments, in a step 221, at least both the first shared secret key K1 102k-1 and the second shared secret key K2 102k-2 are input in the HKDF 221a in order to generate keys S2 221b and MAC2 221c. In this manner, the second symmetric ciphering key S2 and MAC key MAC2 can be mutually derived with server 111 more securely by including input from two separate shared secrets (e.g. K1 and K2, which can be derived by separate KEM algorithms), compared to deriving the key S2 and MAC2 using only a single KEM algorithm. In other words, the combination of K1 and K2 for HKDF 221a provides security equal to at least the stronger of the first KEM (for KEM ENCAPS 103k) and the second KEM (for KEM ENCAPS 101k). As discussed above for the generation of S1 210b from a first HKDF 210a, the second symmetric ciphering key S2 221b output from a HKDF 221a can comprise a first key S2 221b-1 for encryption by device 101 and a second key S2 221b-2 for decryption by device 101. Likewise, the output of a HDKF 221a and also HKDF 210a above can include the generation of a nonce value or initialization vector for input into symmetric ciphering algorithms. A first nonce value or initialization vector could be used with a first symmetric ciphering key S1 221b-1 for encryption by device 101 (and decryption by server 111) and a second nonce value or initialization vector could be use with a second symmetric ciphering key S2 221b-2 for decryption by device 101 (and encryption by server 111).

In an exemplary embodiment, the KEM parameters 101f-x for ePK-1.device and KEM parameters 103f-y for ePK.server can be the same, and the first KEM 103k/101j and the second KEM 101k/103j could be conducted using the same PQC KEM algorithm. Although the benefits of increased security from conducting two different types of PQC KEM algorithms for the first KEM and the second KEM are not provided in this embodiment described within this paragraph, several benefits of the present disclosure are achieved to address the identified needs in the art. First, both the device and server can generate ephemeral PKI key pairs, such that the security after the first and second KEM depends on more than one KEM ENCAPS/DECAPS step. Second, even with the same KEM parameters for both 101f-x and 103f-y, two distinct shared secret keys K1 and K2 can be generated and both keys K1 and K2 can be used for HKDF 221a. In general, the use of two distinct shared secret keys K1 and K2 compared to the use of a single shared secret key will provide a higher level of security for deriving a second symmetric ciphering key S2 221b.

At step 222, device 101 can select and process a plaintext 222a for encryption into a third symmetric ciphertext symm-C3 102s-3. A step 222 for a device is also depicted and described in connection with FIG. 5 below. In some exemplary embodiments for mutual authentication between device 101 and server 111, then the plaintext 222a can also include a device certificate of cert.device 101c, as well as a digital signature over plaintext 222a (but excluding the digital signature itself) using the private key corresponding to the public key in cert.device 101c. For a step 222, device 101 can also (i) calculate a hash value 222b (depicted in FIG. 5 below) over data in both the first message 202 and the response second message 213, and (ii) include the hash value 222b in the plaintext 222a.

At step 223, device 101 can use symmetric encryption 223a with the plaintext 222a from a step 222 in order to generate the third symmetric ciphertext symm-C3 102s-3. A step 223 is also depicted and described in connection with FIG. 5 below. The symmetric encryption 223a can be included within cryptographic algorithms 101s for device 101. The symmetric encryption 223a can include input of at least (i) the parameters specified in metadata 205a from a step 205 above for server 111 and received in a message 213, and (ii) the symmetric ciphering key S2 221b and MAC key MAC2 221c from a step 221 above. A step 223 can also include device 101 processing metadata 223b, where metadata 223b can include handshake headers, parameters 103f-y, an initialization vector, etc. Metadata 223b can include a portion of the metadata 205a received in a message 205. For some embodiments, the initialization vector as a parameter for a symmetric ciphering algorithm and symmetric encryption 223a can also be generated using the HKDF, Device 101 could conduct an additional encryption step 224, where device 101 can encrypt the second asymmetric ciphertext C2 102c-2 output from a step 220 into a "double encrypted" second symmetric ciphertext symm-C2 102s-2. In other words, data for the second asymmetric ciphertext C2 102c-2, such as a value generated with M2 219a, can have a first level of encryption as the second asymmetric ciphertext C2 102c-2. By symmetrically encrypting the second asymmetric ciphertext C2 102c-2 into the second symmetric ciphertext symm-C2 102s-2, the data for the second asymmetric ciphertext C2 102c-2 would then be "double encrypted" from both the asymmetric encryption and then the symmetric encryption. The step 224 can be equivalent to the encryption step 212 performed by server 111 above using the symmetric encryption 212a with the first symmetric ciphering key S1 210b and MAC key MAC1 201c. In other words, the PQC KEM algorithms proposed in the NIST Round 3 standardization project propose the use of an asymmetrically encrypted ciphertext such as the second asymmetric ciphertext C2 102c-2 in order to conduct a KEM. The original asymmetric ciphertext output from the KEM (such as KEM ENCAPS 101k in FIG. 5) could provide the first level of asymmetric encryption.

Although the ciphertext from the party conducting an ENCAPS function (e.g. device 101 using the server ephemeral public key ePK.server 103h) is normally secure with the first level of asymmetric encryption, additional levels of security could be obtained for the system 200a in FIG. 2a by device 101 conducting a step 224 to "double encrypt" data for the second asymmetric ciphertext C2 102c-2 output from KEM ENCAPS 101k also using symmetric encryption. A step 224 by device 101 is depicted and described in connection with FIG. 5 below.

One reason to conduct a step 224 by device 101 for message 225 is that a potential attacker could exist between device 101 and server 111. Without "double encrypting", an attacker could attempt to substitute (i) an original second asymmetric ciphertext C2 102c-2 from device 101 with (ii) a different, "fake" ciphertext asymmetric ciphertext C2 102c-2. The different, "fake" asymmetric ciphertext C2 102c-2 could feasibly be validly created using the server ephemeral public key ePK.server 103*h*. The use of a "double encrypted" second symmetric ciphertext symm-C2 102*s*-2 by device 101 increases resistance to an attacker substituting a fake second asymmetric ciphertext C2 102*c*-2.

Or, in some embodiments, (i) the second symmetric ciphertext symm-C2 102*s*-2 could omit the use of the symmetric ciphering key S1 210*b* by device 101 and encryption in a step 224 and (ii) the second asymmetric ciphertext C1 102*c*-2 could be processed in a step 212*a* with only the first MAC key MAC1 210*c* to generate a MAC value. For these embodiments, the MAC values for message integrity with the second asymmetric ciphertext C2 102*c*-2 could be verified by server 111 using the MAC key MAC1 210*c* derived by the server in a step 210.

In other words, a second symmetric ciphertext symm-C2 102*s*-2 depicted in FIG. 2*a* could comprise a plaintext value of the second asymmetric ciphertext C2 102*c*-2 with MAC values generated using the first MAC key MAC1 210*c* by device 101, such that server 111 could verify the second asymmetric ciphertext C2 102*c*-2 was generated by device 101 that (i) conducted the KEM DECAPS 101*j* and (ii) operates with the first shared secret key K1 102*k*-1. For the embodiments described within this paragraph, the first asymmetric ciphertext C1 102*c*-1 is not "double encrypted", but the MAC value generated with the first MAC key MAC1 210*c* in step 224 (depicted in FIG. 5 below but without use of symmetric ciphering key S1 210*b*), can be used to authenticate and verify the second asymmetric ciphertext C2 102*c*-2 was generated by a device that stores and operates with the first shared secret key K1 102*k*-1. For these embodiments, instead of the data depicted for a message 225 shown as "Symm-C2[{C2{K2 102*k*-2}102*c*-2}S1 210*b*] 102*s*-2", the data depicted for message 225 could be [{C2{K2 102*k*-2}102*c*-2}Tag value (MAC1 210*c*)".

As depicted in FIG. 2*a*, device 101 can then send server 111 a third message 225, where the third message 225 can also comprise a "Client Finished" message. The third message 225 can include plaintext metadata or parameters for processing symmetric ciphertext (such as a nonce value or initialization vector), (ii) the second symmetric ciphertext symm-C2 102*s*-2 output from a step 224, and (iii) the third symmetric ciphertext symm-C3 102*s*-3 output from a step 223. As depicted in FIG. 2*a*, the second symmetric ciphertext symm-C2 102*s*-2 can comprise the second asymmetric ciphertext C2 102*c*-2 output from the KEM ENCAPS function 101*k* with an additional layer of symmetric encryption using the first symmetric ciphering key S1 210*b*. For some embodiments, the use of the additional layer of symmetric encryption for the second asymmetric ciphertext C2 102*c*-2 could be omitted and a message 225 could include the second asymmetric ciphertext C2 102*c*-2 with a MAC value generated using an algorithm like Poly1305 with the first MAC key 210*c*.

As described for a step 224 above, the second symmetric ciphertext symm-C2 102*s*-2 could comprise the second asymmetric ciphertext C2 102*c*-2 from a step 220 by device 101 that has been either (i) encrypted and tagged with the first symmetric ciphering key S1 210*b* and MAC key MAC1 210*c*, or (ii) "MACed" only with the first MAC key MAC1 210*c* (such as for authentication only from device 101). For other embodiments, the second asymmetric ciphertext C2 102*c*-2 could be sent in a message 225 as directly output from a step 220 in FIG. 5 below and without any additional processing with S1 210*b* and MAC1 210*c*.

Additional data could be included in a third message 225 without departing from the scope of the present disclosure. For some embodiments, the portions of data for the third message 225 of plaintext metadata, the second symmetric ciphertext symm-C2 102*s*-2, and the third symmetric ciphertext symm-C2 102*s*-3 could be sent as separate segments, portions, or sub-messages, where the aggregate delivery of the data for metadata, the second symmetric ciphertext symm-C2 102*s*-2, and the third symmetric ciphertext symm-C3 102*s*-3 can represent the third message 225.

Server 111 can receive the third message 225 and conduct a series of steps in order to process the message and securely receive application data from the device to the server. For embodiments with where the third message 225 includes a second symmetric ciphertext symm-C2 102*s*-2 (such as a "double encrypted" data for the second asymmetric ciphertext C2 102*c*-2), then the server 111 could conduct a decryption step 226 as depicted and described in connection with FIG. 5 below in order to convert the second symmetric ciphertext symm-C2 102*s*-2 into a second asymmetric ciphertext C2 102*c*-2. In other words, the server 111 could (i) use the first symmetric ciphering key S1 210*b* and MAC key MAC1 210*c* (from a step 210) in order to (ii) decrypt the second symmetric ciphertext symm-C2 102*s*-2 into a second asymmetric ciphertext C2 102*c*-2. For some embodiments, the use of a first symmetric ciphering key S1 210*b* could be omitted in a step 226 (and also corresponding step 224 by device 101), and the depicted second symmetric ciphertext symm-C2 102*s*-2 could comprise the second asymmetric ciphertext C2 102*c*-2 with MAC values that could be verified with the first MAC key MAC1 210*c*. In other words, for some embodiments, the second symmetric ciphertext symm-C2 102*s*-2 may not be "double encrypted" and could simply include MAC values for verification with the MAC key MAC1 210*c*.

At step 227, server 111 can use the specified KEM parameters 103*f-y* transmitted in message 213 along with cryptographic algorithms 103*s* to conduct the KEM DECAPS 103*j* function with the received second asymmetric ciphertext C2 102*c*-2. The server can use the server ephemeral private key of eSK.server 103*i* with the KEM DECAPS 103*j* and the received second asymmetric ciphertext C2 102*c*-2 in order to generate the second shared secret key K2 102*k*-2. A step 227 for server 111 is also depicted and described in connection with FIG. 6 below. Note that for some PQC algorithms, the KEM DECAPS 103*j* function could fail for a small frequency of messages 225, such as less than one failure per million or billion KEM, and if a step 227 fails, then server 111 could send device 101 an error message.

A step 227 can also include server 111 using at least the second shared secret key K2 102*k*-2 with the HKDF 221*a* (depicted in FIG. 5 below) in order to generate the second symmetric ciphering key S2 221*b* and the second MAC key MAC1 221*c*. In some exemplary embodiments, the HKDF 221*a* can also include input of at least the first shared secret key K1 102*k*-1 in addition to the second shared secret key K2 102*k*-2 in order to generate the second symmetric ciphering key S2 221*b* and the MAC key MAC1 221*c*. In this manner and by including the first shared secret key K1 102*k*-1, the symmetric ciphering key S2 and MAC key MAC2 can be mutually derived with device 101 more securely by including input from two separate shared secrets (e.g. K1 and K2, which can also be derived by separate KEM algorithms), compared to deriving the key S2 and MAC2 using only a single KEM algorithm (e.g. using either (i) K2 only or (ii) a single KEM algorithm for K1 and K2). In other words, the combination of (x) K1 output from a first KEM 103*k*/101*j* and K2 output from a second KEM 101*k*/103*j* for (y) HKDF 221*a* provides security equal to at least the stronger of the first KEM (for KEM ENCAPS 103*k*) and the second KEM (for KEM ENCAPS 101*k*). At the conclusion of a step 227, server 111 can store the second symmetric ciphering key S2 221*b* and MAC key MAC2 221*c*, which are mutually and secretly shared between device 101 and server 111. An HKDF 221*a* and an HKDF 210*a* can also generate nonce values or initialization vectors for use with symmetric ciphering algorithms and generation of message authentication codes or tag values.

At step 228, server 111 can use symmetric decryption 228*a* with the third symmetric ciphertext symm-C3 102*s*-3 from a third message 225 in order to read the plaintext 222*a*. A step 228 for server 111 is also depicted and described in connection with FIG. 6 below. The symmetric decryption 226*a* can be included within cryptographic algorithms 103*s* for server 111. The symmetric decryption 226*a* can include input of the parameters specified in plaintext metadata from the third message 225 and the second symmetric ciphering key S2 221*b* and second MAC key MAC2 221*b* from a step 227 above.

At step 229, server 111 can verify a digital signature for a client "Certificate Verify" from plaintext 222*a* for embodiments where device 101 uses a device certificate cert.device 101*c*. Note that the use of a device certificate by device 101 could be omitted for some embodiments depicted in FIG. 2*a*, such that a one-way authentication of a server 111 and/or network 103 is performed by device 101 in the message flows and steps shown. Other steps such as passwords used with subsequent device application data could provide authentication of the device with the server. A step 229 could also include server 111 verifying a certificate chain for device certificate cert.device 101*c* up through a stored root certificate or trusted intermediate certificate in server 111 or network 103. At step 229, server 111 could also calculate a value for "Client Finished" equivalent to a "Client Finished" segment within plaintext 222*a*, where the plaintext 222*a* data can be read from the output of the symmetric decryption function 228*a* in a step 228 above. Server 111 could compare the calculated "Client Finished" value for the received "Client Finished" value and determine that device 101 has successfully completed the handshake for a secure session. Both device 101 and server 111 could subsequently securely process, encrypt and decrypt, and transmit and receive application data. For some embodiments, plaintext 222*a* could also include data from device 101 in addition to a "Client Finished" message such as application data At step 230, server 111 can generate a "pre-shared" secret key (PSK) for device 101 and server 111 based on prior steps and the set of messages 202, 213, and 225. The generation or derivation of a "pre-shared" secret key (PSK) for device 101 and server 111 is also depicted and described in connection with FIG. 6 below. Although the "pre-shared" secret key (PSK) was not shared between device 101 and server 111 before the first "Client Hello 1" message in FIG. 2*a*, the PSK would be considered "pre-shared" before a second "Client Hello 2" message in (i) a secure session resumption 251*a* depicted in FIG. 2*b* and described below or (ii) a secure session resumption 251*b* depicted in FIG. 2*b* and described below. In other words, a first secure session established using the messages "Client Hello 1" 202 through "Server Finished 1" 233 could be used to establish a PSK shared between device 101 and server 111, where the PSK can be used to secure resumption or continuation of the first secure session. In this manner, a PSK can be mutually generated by both nodes during a first handshake and initial secure session 250. The PSK can both reduce the number of steps required to establish both encrypted and authenticated communications in session resumption 251 after a period of time transpires between the first handshake and initial secure session 250 and the session resumption 251.

The use of securely mutually deriving a PSK by both nodes can address the need in the art discussed in the Description of Related Art, where a PSK can reduce the number of steps and bandwidth/message sizes required to securely resume a previously established session 250. In other words, without session resumption 251, a device 101 and server 111 may need to again conduct the same steps and messages as the first handshake and initial secure session 250, which requires more processing time and resources and more bandwidth compared to session resumption 251. Note that conventional technology, such as with TLS version 1.3 and prior versions, also supports session resumption with a PSK in order to achieve the same overall goal. However, the use of a first handshake and initial secure session 250 supporting PQC KEM and the session resumption 251*a* described below will provide many differences and benefits compared to conventional technology, where the differences and benefits are not contemplated and are not feasible with conventional technology for securely resuming secure sessions. As one example, the use of PSK with TLS version 1.3 and prior versions, as well as similar conventional technology for session resumption based on PKI, will not support secure session resumption in a manner that is secured against quantum computers with an advantage or "supremacy" over classical computers for calculating integer factorization or discrete logarithms.

At step 230 server 111 can use at least the first shared secret key of K1 102*k*-1 from a step 209, the second shared secret key K2 102*k*-2 from a step 227, and additional data (depicted as "data 230*d*" below in FIG. 6) with a HKDF 230*a* (depicted in FIG. 6 below) in order to generate the "pre-shared" secret key (PSK) 230-1 for use with session resumption 251. A step 230 is also depicted and described in connection with FIG. 6 below. The additional data can include plaintext data transmitted in the first message 202, the response second message 213, and the third message 225. The additional data could also include plaintext data from the fourth message 235 described below. A protocol for the First Handshake and Initial Secure Session 250, such as TLS, SSH, etc., could specify some text values outside of the message flow between device 101 and server 111 for use as input of additional data in a step 230 with a HKDF 230*a* to generate a PSK 230-1. In exemplary embodiments, at least the first shared secret key of K1 102*k*-1 and the second shared secret key K2 102*k*-2 are used in a step 230 with a HDKF 230*a* to generate or derive the "pre-shared" secret key (PSK) 230-1 for use with session resumption 251. Note that device 101 will also be able to mutually derive the PSK 230-1 in a step 236 below. Since a server 111 may generate multiple different PSK for different devices 101 over time, an example of the specific PSK for device 101 resulting from the first session 250 is depicted with the designation of "PSK 230-1" in FIG. 2*a*. A second PSK for either device 101 or a different device would have the designation of "PSK 230-2."

At step 231, server 111 can generate an identity or identifier for the PSK 230-1 of PSK-ID 231-1. The PSK-ID 231-1 can be unique for the PSK 230-1 and also with sufficient information entropy and "randomness" to not feasibly be guessed by a potential attacker. Although the PSK-ID 231-1 is referred to herein as an identity for a "pre-shared" secret key (PSK), the PSK-ID 231-1 could alternatively be referred to as a "session ticket" or a "session identity" corresponding to the initial session 250 from FIG. 2*a*. In general, the PSK-ID 231-1 can be a number, value, or string that uniquely identifies or corresponds to the first session 250, in order for data from the first session 250, such as the PSK 230-1, can be selected based on the identifier for the first session of PSK-ID 231-1. As one example, the PSK-ID 231-1 could be a secure hash value over the PSK 230-1, such as the SHA3-256 value of the PSK 230-1. Other possibilities exist as well for the generation of an identity of PSK-ID 231-1 for PSK 230-1 without departing from the scope of the present disclosure.

A network 103 and/or server 111 in a step 231 could also store both the PSK 230-1 generated from a step 230 and the PSK-ID 231-1 in a network database 103*db*, as depicted in FIG. 2*a*. A network database 103*db* could record a plurality of PSK and PSK-ID values, such that both the PSK and PSK-ID would be available for use in subsequent communications with device 101 and other devices, including the session resumption 251*a* depicted in FIG. 2*a*. Network database 103*db* could preferably be securely isolated from devices 101 and other nodes on the public Internet 107, and a separate secure session could be established between network database 103*db* and server 111.

Note that storing the PSK 230-1 in a network database 103*db*, instead of the first and second shared secret keys K1 and K2, provides security for the first session 250, where a hash value over at least the first and second shared secret keys K1 and K2 is stored instead of the original keys K1 and K2. Other nodes within a network 103 may have access to the network database 103*db*, such as a server 111' supporting a resumed session 251 below. By storing the PSK 230-1 in the network database 103*db*, other nodes within network 103 would not feasibly be able to determine the shared secret keys K1 and K2 from the first session 250 and consequently data within the first session 250 can remain secured against later analysis or attempts to decrypt data within the first session 250. As noted below, in exemplary embodiments, a server 111 also "flushes" or clears relevant keys and data from RAM memory 111*m* for the first session 250 upon a session close message 238 below.

At step 232, server 111 can select a plaintext comprising at least the PSK-ID 231-1 from a step 231 for encryption into a fourth symmetric ciphertext symm-C4 102*s*-4. The plaintext selected in a step 232 could also include additional data for device 101, such as the "application data" depicted in FIG. 2*a* within a message 233. The additional data for device 101 could comprise response data from server 111 for the plaintext data 222*a* transmitted in a message 225 above, such as a response to an HTTP request, a response JSON message, response XML data, and other possibilities exist as well for the additional data selected by a server 111 in a step 232 for the plaintext, in addition to the PSK-ID 231-1. The plaintext selected in a step 232 could also include a secure hash value for a "server finished" field within the message 233, similar to the "client finished" hash value 222*b* in a step 228 in FIG. 6. As step 232, server 111 can encrypt the plaintext and generate a MAC value or tag value using symmetric encryption and the second mutually derived symmetric ciphering key S2 221*b* and MAC key MAC 221*c*. The encryption in a step 232 with keys S2 221*b* and MAC key 221*c* can be equivalent to a step 228 by server 111 depicted in FIG. 5 below, except using the keys for symmetric encryption and MAC value generation instead of symmetric decryption and MAC value verification. The output from the encryption and MAC value generation in a step 232 can comprise the fourth symmetric ciphertext symm-C4 102*s*-4.

Server 111 can then send device 101 a fourth message 233 as depicted in FIG. 2*a*, where the fourth message 233 can comprise a "Server Finished 1". The fourth message 233 can be transmitted by server 111 to IP network 107 using the network interface 111*d*. The fourth message 233 could include plaintext metadata and also at least the fourth symmetric ciphertext symm-C4 102*s*-4. Device 101 can receive the fourth message 233 from the IP network 107 using a network interface which could comprise the radio 101*r*. Device 101 can then conduct steps to process the fourth message 233, which can comprise the "Server Finished 1" message.

At step 234, device 101 can verify MAC values for the fourth symmetric ciphertext symm-C4 102*s*-4 using the MAC key MAC 221*c* for device 101. Note the description in the previous sentence supports "encrypt-then-MAC" operations, where MAC values can be verified before conducting a decryption step. Device 101 can then decrypt the fourth symmetric ciphertext symm-C4 102*s*-4 using the second symmetric ciphering key S2 221*b* for device 101. As step 234, device 101 can decrypt the fourth symmetric ciphertext symm-C4 102*s*-4 using the second mutually derived symmetric ciphering key S2 221*b*. The decryption in a step 234 with keys S2 221*b* and MAC key 221*c* can be equivalent to a step 228 by server 111 depicted in FIG. 5 below, except using the keys for symmetric encryption and MAC value generation in a step 234 by device 101 instead of symmetric decryption and MAC value verification in a step 228 by device 101. The output from the symmetric decryption in a step 234 can comprise the plaintext selected by server 111 in a step 232. An example of the plaintext is depicted in FIG. 2*a* as the depicted data within the brackets "{ }" for the fourth symmetric ciphertext symm-C4 102*s*-4 in message 233 within FIG. 2*a*.

At step 235, device 101 can read and process the plaintext data from message 233 output from a step 234. The device 101 can read the identity of the PSK comprising PSK-ID 231-1. Device 101 can store the PSK-ID 231-1 in memory 101*m*, where memory 101*m* for device 101 is depicted and described on connection with FIG. 1 above. Device 101 can store the PSK-ID in volatile memory such as RAM memory or nonvolatile memory 101*bb* such as storage memory. For embodiments where the session resumption 251*a* by device 101 is expected to be longer than a day, then device 101 preferably stores PSK-ID 231-1 in nonvolatile memory 101*bb*. Other possibilities exist as well for the duration between the first session 250 and session resumption 251*a* to determine the location of storage for PSK-ID 231-1 without departing from the scope of the present disclosure. A step 235 can also include device 101 processing additional data from the plaintext (in addition to PSK-ID 231-1), such as application data from the server. The application data could comprise HTTP data, XML, MTTQ, JSON, and other possibilities exist as well.

At step 236, device 101 can use at least the first shared secret key of K1 102*k*-1, the second shared secret key K2 102*k*-2, and additional data (depicted as "data 228*d*" below in FIG. 6) with a HKDF 230*a* (depicted in FIG. 6 below) in order to generate the "pre-shared" secret key (PSK) 230-1 for use with session resumption 251. A step 236 is also depicted and described in connection with FIG. 6 below. The additional data can include plaintext data transmitted in the first message 202, the response second message 213, and the third message 225. The additional data could also include plaintext data from the fourth message 235 described above. A protocol for the First Handshake and Initial Secure Session 250, such as TLS, SSH, etc., could specify some text values outside of the message flow between device 101 and server 111 for use as input of additional data in a step 230 with a HKDF 230a to generate a PSK 230-1. In exemplary embodiments, at least the first shared secret key of K1 102k-1 and the second shared secret key K2 102k-2 are used in a step 236 with a HDKF 230a to generate or derive the "pre-shared" secret key (PSK) 230-1 for use with session resumption 251. Note that server 111 was also able to mutually derive the PSK 230-1 in a step 230 above. For embodiments where device 101 derives PSK 230-1 without using data from message 235 in data 230d, then device 101 could conduct step 236 before receipt of message 235, such as before device 101 sends the third message 225. In a step 236, device 101 can then store the PSK 230-1 along with the identifier of PSK-ID 231-1 in memory 101m. Device 101 can use either or both of RAM memory and nonvolatile storage memory 101bb to store the PSK 230-1 along with the identifier of PSK-ID 23101 in a step 236. In exemplary embodiments, the PSK 230-1 is stored by device 101 in the same physical memory as PSK-ID 231-1 in a step 236.

Device 101 could then transmit and receive additional encrypted application data with server 111 in a step 237a. Server 111 could transmit and receive additional encrypted application data with device 101 in a step 237b. Note that the transfer of The encrypted application data can encrypted with symmetric ciphering keys derived at least from the first shared secret key K1 102k-1 and the second shared secret key K2 102k-1. The encrypted application data can also be verified with MAC values, where the MAC values are generated and verified with MAC keys derived at least from the first shared secret key K1 102k-1 and the second shared secret key K2 102k-1.

Upon conclusion of the transfer of additional encrypted application data between device 101 and a server 111 in steps 237a and 237b, (i) either device 101 or server 111, or (ii) both device 101 and server 111 can transmit a fifth message 238 to close the initial secure session 250. As depicted in FIG. 2a, the fifth message 238 can comprise TCP FIN, ACK message or a final UDP ACK message. Or, the fifth message 238 could comprise a TCP RESET message or equivalent UDP message indicating the TCP or UDP session at the transport layer is being closed by either server 111 or device 101, or possibly closed by an intermediate firewall or router between device 101 and server 111 in the IP network 107.

As noted above for a step 231 by server 111, in exemplary embodiments, a server 111 also "flushes" or clears relevant keys and data from RAM memory 111m for the first session 250 upon a session close message 238. The data deleted or overwritten from RAM memory 111m can include at least the first and second shared secret keys K1 and K2, the server ephemeral secret key, random number M2 219a, as well as any intermediate data or values for conducting a KEM ENCAPS 103j and KEM DECAPS 103k. A device 101 could also delete the equivalent data for the first session 250 after successful transfer of the message 238. As depicted in FIG. 2a, the sequence of steps and message flows beginning with a step 201d and concluding with a message 238 can comprise the First Handshake and Initial Secure Session 250.

After the closing or conclusion of the First Handshake and Initial Secure Session 250, device 101 can perform a wait 240 before staring a session resumption 251. The wait 240 could be brief, such as on the order of seconds or less, or the wait 240 could be longer, such as on the order of minutes, hours, or even longer than a day. As one example, device 101 could use a web browser, where the data transactions via the web browser are paused for the wait 240 period (such as a user of device 101 selecting and using a different application or web session for a period of time during the wait 240 period). Upon user's return to the web browser for communicating with the network 103, the secure session could be resumed by device 101 with session resumption 251.

As another example, device 101 could be for "machine to machine" (M2M) communications, and send in environmental data or location data periodically, such as at each reporting interval which could be every hour. The first session 251a reporting first data could be closed with a message 238. After the wait 240 period of time, which could be for the time of the reporting interval, the device 101 could initiate a session resumption 251a in order to securely communicate new data with network 103. Other possibilities exist as well without departing from the scope of the present disclosure. As another example, a web browser may prefer to quickly switch to the use of PSK for subsequent communication after a first session 250 has been established, and the session resumption 251a could be initiated by the web browser and device 101 within milliseconds after the fifth message 238 to close the first session 251.

A device 101 and server 111 could use the PSK 230-1 and PSK-ID 231-1 in several different manners to securely conduct session resumption 251, where examples of the different options are depicted in FIGS. 2b and 2c below. As described above and also with the Description of Related Art, the session resumption 251 using the PSK 230-1 and PSK-ID 231-1 can allow data to be securely transferred between device 101 and network 103 without requiring a second time the full set of steps and messages shown for a first handshake and initial secure session 250.

FIG. 2b

FIG. 2b is a simplified message flow diagram illustrating an exemplary system with exemplary data transmitted and received by a device and a network for resuming a secure session, in accordance with exemplary embodiments. System 200b can include a device 101, IP network 107, a network 103, and a server 111' operating within network 103. Server 111' can be the same as server 111 from FIG. 1 and FIG. 2a above, or server 111' could be a different physical server but equivalent to server 111 as depicted and described for network 103 in FIGS. 1 and 2a above. Server 111' can communicate with network database 103db within network 103 in order to access information regarding pre-shared keys for devices that were generated during a first session 250.

The nodes or entities within system 200b were also depicted and described in connection with FIG. 1 and FIG. 2a above, where FIG. 2b depicts exemplary steps for the nodes and exemplary message flows between the nodes after a first session 250 depicted and described in connection with FIG. 2a above. Although a single device 101, IP network 107, and network 103 are depicted in a system 200b, a system 200b could include a plurality of each of the depicted nodes connected via different IP networks 107. In addition, data recorded for device 101 and network 103 depicted and described above in FIG. 1 and FIG. 2a can be received and stored in the device 101 and network 103 depicted in FIG. 2b during the steps and message flows depicted in FIG. 2b.

At steps 201d' through 201f device 101 can begin operating and process data in order to securely resume a first session 250 between device 101 and a network 103. Device 101 can generate a message 254 for server 111', where message 254 could comprise a second "Client Hello 2" message. Steps 201d' and subsequent steps in FIG. 2b can use the computing hardware in device 101 as depicted in FIG. 1 above, as well as the operating system and stored parameters within device 101 stored in a step 201*b* above in FIG. 2*a*. At step 201*d'*, device 101 can power on or wake from a sleep state or idle state and then select either a network ID 103*a* or a server ID 111*a* for sending a message 254. The IDs 103*a* or 111*a* could comprise domain names or IP addresses for connecting to the network 103. At step 201*d'*, device 101 could read the identity of a "pre-shared" secret key PSK-ID 231-1 stored in memory 101*m* of device 101 during the first session 250. The device 101 could store both the PSK-ID 231-1 and the PSK 230-1 in a step 236 in FIG. 2*a* above.

Step 201*d'* can include device 101 selecting updated device extensions 101*g'* for use with a resumed secure session between device 101 and server 111'. In other words, device extensions 101*g* selected by device 101 in a step 201*d* in FIG. 2*a* could be for a first session 250 and updated device extensions 101*g'* could be for a resumed session 251*a*. Device extensions 101*g* were also described above in connection with FIG. 1, and can include identifiers or values for supported by both (i) cryptographic algorithms 101*s* and cryptographic parameters 101*x*, and (ii) a protocol for secure communications with network 103 and server 111. Device extensions 101*g* can include supported cipher suites such as names or values identifying supported symmetric ciphering algorithms, secure hash algorithms, digital signature algorithms, etc. Device extensions 101*g'* could be equivalent to device extensions 101*g*, except that device extensions 101*g'* could also specify values, parameters, and settings for the use of PSK 230-1 by device 101 and server 111'. In other words, device 101 in a step 201*d* may not have a PSK available for communication with network 103 and subsequently selects device extensions 101*g*, while device 101 can have a PSK available for communication with network 103 in a step 201*d'* and can select extensions 101*g'* that support the use of the PSK 230-1.

At step 252, device 101 can use the PSK 230-1 for the PSK-ID 231-1 selected in a step 201*d'* to generate a third symmetric ciphering key S3 252*b* and a third MAC key MAC3 252*c*. Note that the PSK 230-1 can be stored by device 101 in a step 236. Exemplary details for a step 252 by device 101 are also depicted and described in connection with FIG. 7*a* below. At step 252, device 101 can generate a second random number 252*a* for use in the resumed session 251*a*. At step 252, device 101 can use at least the PSK 230-1 and additional data (depicted as "data 252*d*" below in FIG. 7*a*) with a HKDF 252*h* (depicted in FIG. 7*a* below) in order to generate the third symmetric ciphering key S3 252*b* and a third MAC key MAC3 252*c*. A nonce or initialization vector could also be generated in a step 252. In addition, the third symmetric ciphering key S3 252*b* could comprise a first portion S3 252*b*-1 for encryption by device 101 and a second portion S3 252*b*-2 for decryption by device 101. Likewise, the third MAC key MAC3 252*c* can comprise two portions, where a first portion is for generation of MAC or tag values by device 101 and a second portion is for verification of MAC values or tag values received from server 111'.

At step 253, device 101 can select data for generation of MAC values in order send data to server in an authenticated manner with message integrity. Exemplary details for a step 253 by device 101 are also depicted and described in connection with FIG. 7*a* below. The selected data in a step 253 can comprise the identity of the PSK, which is PSK-ID 231-1 stored in a step 235 above, the device extensions 101*g'* selected from a step 201*d'* above, and the second random number random 2 252*a* from a step 252. Additional data could be selected in a step 253 for the generation of MAC values. Parameters from device extensions 101*g* or 101*g'* could also be selected in a step 253 for the generation of MAC values and generation of symmetric ciphertext (such as a list of supported cipher suites), or the parameters could be specified in a protocol for resuming the secure session. Device 101 could select a MAC algorithm 253*a* in a step 253 (depicted in FIG. 7*a* below), such as examples of Poly1305, HMAC algorithm, or AES with a mode such as CGM (to generate MAC values but not encrypt). Other possibilities exist as well for a MAC algorithm 253*a* used in a step 253 and for the generation of MAC values herein without departing from the scope of the present disclosure.

At step 253, device 101 can input the selected data into the MAC algorithm 253*a* along with parameters and the third MAC key MAC3 252*c* generated in a step 252 in order to generate the MAC value tag1 253*b*. Note that the generation of the MAC value tag1 253*b* over the plaintext data for a message 254 below can provide security against downgrade attacks from a MITM attacker. In other words, plaintext data for the message 254 can include the PSK-ID 231-1, device extensions 101*g'* for resumed session 251*a*, and a second random number random 2 252*a*. By including the MAC value tag1 253*b* over the plaintext data, the plaintext data cannot be feasibly altered (in a manner where MAC value tag1 253*b* remains valid or verifiable by server 111') without also holding the shared secret MAC key MAC3 252*c*. As one example, the device extensions 101*g'* could include a list of supported cipher suites where some cipher suites may be found insecure in the future (e.g. after device 101 is configured with a protocol for a secure session 250 and resumed session 251). Examples of downgrade attacks for previous versions of TLS such as TLS 1.0 and TLS 1.1 are well known. Without a MAC value tag1 over the device extensions 101*g* with the list of supported cipher suites, a MITM attacker could alter the device extensions 101*g'* since device extensions 101*g'* can be plaintext in a message 254 below.

As a second example, the PSK-ID 231-1 can also be protected against a MITM attacker with the use of the MAC value tag1 253*b* as described in the paragraph above. A MITM attacker could also have previously conducted a different first session 250 with server 111 than the first session 250 between device 101 and server 111. The MITM attacker could have both generated a different PSK and PSK-ID and attempt to substitute the different PSK-ID in the second "Client Hello" message. A MAC value tag1 253*c* for the device 101 using the PSK 230-1 for device 101 could not feasibly be generated over the different PSK-ID substituted in a second "Client Hello" message.

After the conclusion of a step 253 by device 101, device 101 can then conduct a step 201*f* to process a message 254 as depicted in FIG. 2*b*. A step 201*f* in FIG. 2*b* can be equivalent to a step 201*f'''* in FIG. 2*a*, with the difference being step 201*f* can be for session resumption 251*a* and step 201*f* can be for a first session 250. At step 201*f*, device can use firmware or application software within device 101 in order to perform steps as specified in a protocol for resumption of a secure session between device 101 and network 103. The message 254 can comprise a second "Client Hello" or equivalent second message according to the protocol for the secure session selected by device 101 in a step 201*d'* in FIG. 2*a*. Device 101 can send a second message 254 comprising a second "Client Hello" message (or equivalent for a different protocol than TLS) to the server 111' operating in network 103 in a step 201*f'''*. A step 201*f* can comprise processor 101*p* writing the data for the message 254 to a radio 101*r* (or equivalently a network interface if device 101 does not include a radio 101*r*). As depicted in FIG. 2*b*, the message 254 can comprise a second "Client Hello" message, where the first "Client Hello" message was depicted and described above in FIG. 2*a* for the first session 250.

For some embodiments, device 101 and server 111' can support zero round trip time resumption (0-RTT). For these embodiments, device 101 can use the third symmetric ciphering key S3 252*b* generated in a step 252 to encrypt device application data into a fifth symmetric ciphertext symm-C5 102*s*-5. The encryption can be equivalent to the encryption step 223 by device 101 described above in FIG. 2*a* and also FIG. 5 below, except with the use of both (i) the third symmetric ciphering key S3 252*b* and (ii) different plaintext comprising device application data.

Note that the use of 0-RTT is optional, and the fifth symmetric ciphertext symm-C5 102*s*-5 may be omitted from a message 254. For embodiments that support 0-RTT and include the fifth symmetric ciphertext in a message 254, then the encrypted device application data can preferably be idempotent and not change the state of the server, such as with an HTTP GET request. In other words, 0-RTT data may be subject to replay attacks, where the exact same data could be retransmitted, so this risk, if significant, can be averted by device 101 not including 0-RTT data within message 254.

In addition, the fifth symmetric ciphertext symm-C5 102*s*-5 can include a second device ephemeral public key ePK-2.device 101*h*-2 and associated KEM parameters 101*f*-*x*' for the second device ephemeral public key. An updated or new device ephemeral public key ePK-2.device 101*h*-2 in a system 200*b* may be preferred for forward secrecy, such that a third shared secret key K3 102*k*-3 could be generated using the second device ephemeral public key ePK-2.device 101*h*-2. Exemplary steps to use the second device ephemeral public key ePK-2.device 101*h*-2 include steps 208' and 209' by server 111' in FIG. 2*c* below, in order to generate a third shared secret key K3 102*k*-3. By including the second device ephemeral public key ePK-2.device 101*h*-2 within the fifth symmetric ciphertext symm-C5 102*s*-5, then the second device ephemeral public key ePK-2.device 101*h*-2 can be protected from attackers or potential listeners within IP network 107. In other words, by encrypting the second device ephemeral public key ePK-2.device 101*h*-2 in a the fifth symmetric ciphertext symm-C5 102*s*-5, then only a server 111' could feasibly be able to generate an asymmetric ciphertext using the second device ephemeral public key ePK-2.device 101*h*-2.

As depicted in FIG. 2*b*, the message 254 from device 101 to server 111' can comprise the identity of the PSK, which is PSK-ID 231-1 stored in a step 235 above, the device extensions 101*g*' selected from a step 201*d*' above, the second random number random 2 252*a* from a step 252, and the tag value 253*b*. The message 254 can also optionally include the fifth symmetric ciphertext symm-C5 102*s*-5. Message 254 can include headers or values specifying the message is for a "Client Hello" for a resumed session 251*a* according to the secure session protocol selected by the device 101. The inclusion of the tag1 253*b* value increases security compared to conventional technology, since server 111' can verify the tag value 253*b* below in a step 256 before deciding how to respond to the message 254. In one example, if the tag value 253*b* cannot be confirmed by server 111', then server 111 could either remain silent, or send a detailed error message (as opposed to a "general" failure), or the server 111 could request device return to sending a first "Client Hello" message 202 from FIG. 2*a*.

A message 254 to begin a resumed session 251*a* provides several benefits over conventional technology and also addresses needs identified in the Description of Related Art discussed above. First, the PSK can be generated from two separate shared secret keys (e.g. K1 102*k*-1 and K2 102*k*-2), whereas conventional technology such as with TLS 1.3 generates a PSK with a single shared secret key. Additional, mutually shared data may be used with TLS 1.3 along with the single shared secret key, but a first TLS 1.3 session still results in a single, "top-level" shared secret key. As discussed above, the two separate shared secret keys can use different types of cryptographic algorithms, and thus the PSK in the present disclosure can be protected by two different cryptographic algorithms, whereas TLS 1.3 protects the PSK with only a single cryptographic algorithm, and specifically one of the ECDH or DH algorithm, which are both based on the discrete logarithm problem. In addition, the communication of the PSK-ID 231-1 from server 111 to device 101 can be secured by both a first and second shared secret keys (e.g. K1 102*k*-1 and K2 102*k*-2), whereas the communication of the PSK-ID with TLS 1.3 is also protected with one shared secret key resulting from an ECDH (or DH) key exchange.

Server 111' can receive the message 254 as second "Client Hello" in order to conduct a resumed session 251*a*. Server 111' can receive the message 254 via a network interface 111*d* in server hardware 111*h* (depicted for server 111' in FIG. 1 above). Server 111' can use application software such as, but not limited to, OpenSSL with cryptographic algorithms 103*s* and cryptographic parameters 103*x* and server hardware 111*h* to process the received message 254.

At step 255, server 111' can use the received PSK-ID 231-1 from the message 254 to securely query the network database 103*db* for the corresponding PSK 230-1. The storing of multiple values of the PSK and PSK-ID for a network 103 was depicted and described in connection with FIG. 2*a* above. If a corresponding PSK 230-1 for the PSK-ID 231-1 is not found or has expired, then the server 111' may optionally send device 101 an error message. For some embodiments, server 111' may prefer to remain silent and not respond to message 254 if the PSK-ID 230-1 is not found or if subsequent errors occur in the processing of message 254, such as tag value 253*b* not being verified. After a step 255 and upon success of the query to network database 103*db*, server 111' can store the corresponding PSK 230-1 for the PSK-ID 231-1.

Server 111' can then conduct a step 252, where a step 252 by server 111' can be equivalent or the same as a step 252 conducted by device 101. A step 252 is depicted and described above for a device 101 and a server 111' can conduct the same step in order use the PSK 230-1 from a step 255 and mutually derive with device 101 the third symmetric ciphering key S3 252*b* and a third MAC key MAC3 252*c*. Exemplary details for a step 252 by server 111' are also depicted and described in connection with FIG. 7*a* below. At step 252, server 111' can use the second random number 252*a* received from a message 254 with a HKDF 252*h*. At step 252, server 111' can use at least the PSK 230-1 and additional data (depicted as "data 252*d*" below in FIG. 7*a*) with a HKDF 252*h* (depicted in FIG. 7*a* below) in order to mutually derive the third symmetric ciphering key S3 252*b* and a third MAC key MAC3 252*c*. A nonce or initialization vector could also be generated in a step 252. In addition, the third symmetric ciphering key S3 252*b* could comprise a first portion S3 252*b*-1 for decryption by server 111' and a second portion S3 252*b*-2 for encryption by server 111'. Likewise, the third MAC key MAC3 252*c* can comprise two portions, where a first portion is for verification of MAC or tag values received from device 101 and a second portion is for generation of MAC values or tag values by server 111'

Server 111' can conduct a verification of the tag value 253*b* received in the message 254 using the third MAC key MAC3 253*c*. Server 111' can conduct a step 253 in order to generate the same tag value 253*b*. Exemplary details for a step 253 by server 111' are also depicted and described in connection with FIG. 7*a* below. At step 253, server 111' can select data for internal generation of MAC values in order receive data from device 101 in an authenticated manner with message integrity. The selected data in a step 253 can be received in a message 254 and comprise (i) the identity of the PSK, which is PSK-ID 231-1, (ii) the device extensions 101*g'*, and (iii) the second random number random 2 252*a*. For some embodiments, the inclusion of a second random number 2 252*a* could be omitted from a message 254 and also omitted from a step 253 for both device 101 and server 111'.

Additional data could be selected in a step 253 for the generation of MAC values. Parameters from device extensions 101*g* or 101*g'* could also be selected in a step 253 for the generation of MAC values, or the parameters could be specified in a protocol for resuming the secure session. Server 111' could select a MAC algorithm 253*a* in a step 253 (depicted in FIG. 7*a* below), such as examples of Poly1305, HMAC algorithm, or AES with a mode such as CGM (to generate MAC values but not encrypt). Other possibilities exist as well for a MAC algorithm 253*a* used in a step 253 and for the generation of MAC values herein without departing from the scope of the present disclosure. At step 253, server 111' can input the selected data into the MAC algorithm 253*a* along with parameters and the third MAC key MAC3 252*c* generated by server 111' in a step 252 in order to generate the MAC value of tag1 253*b*.

At step 256, server 111' can compare the generated MAC value of tag1 253*b* from a step 253 by server 111' with the received MAC value of tag1 253*b* from message 254. If the generated MAC value of tag1 253*b* from a step 253 by server 111' is equal to or the same as the received MAC value of tag1 253*b* from message 254, then the server 111' can verify and authenticate that the plaintext data in message 254 (such as PSK-ID 231-1 and/or device extensions 101*g'*) was transmitted by the device 101, where the device 101 also stores and operates with the PSK 230-1 mutually derived by server 111' in a step 230 and a device 101 in step 236 during the first session 250. If the verification of tag1 253*b* by server 111' in a step 256 fails, then server 111' can optionally send device 101 an error message.

Note that the verification of plaintext data in message 254 by server 111' can be important for securing a system 200*b*, since plaintext data in message 254 can be used to process subsequent symmetric ciphertext. As one example, device extensions 101*g'* in message 254 can be used by server 111' as parameters to generate a sixth symmetric ciphertext symm-C6 102*s*-6. For example, the device extensions 101*g'* could include metadata specifying a type or parameters for a symmetric ciphering algorithm. Without authentication of device extensions 101*g'*, then the device extensions 101*g'* could be altered in a manner to attempt a "downgrade" attack such as changing device extensions 101*g'* to specify the use of weaker parameters for a symmetric ciphering algorithm. Other possibilities exist as well for the benefits of device 101 receiving plaintext data in message 254 in an authenticated manner through the verification of MAC value tag1 253*b* without departing from the scope of the present disclosure.

At step 257, for embodiments where device 101 and server 111' support zero round trip time resumption (0-RTT), server 111' can decrypt the fifth symmetric ciphertext symm-C5 102*s*-5. For these embodiments, server 111' can use the third symmetric ciphering key S3 252*b* generated in a step 252 by server 111' to decrypt the fifth symmetric ciphertext symm-C5 102*s*-5 from message 254 into a plaintext value for device application data. The decryption can be equivalent to the decryption step 228 by server 111' described above in FIG. 2*a* and also FIG. 5 below, except with the use of both (i) the third symmetric ciphering key S3 252*b* and (ii) different symmetric ciphertext comprising the fifth symmetric ciphertext symm-C5 102*s*-5. Note that the use of 0-RTT is optional, and the fifth symmetric ciphertext symm-C5 102*s*-5 may be omitted from a message 254. For embodiments that support 0-RTT and include the fifth symmetric ciphertext in a message 254, then the decrypted device application data can preferably be idempotent and not change the state of the server, such as with an HTTP GET request. In other words, 0-RTT data may be subject to replay attacks, where the exact same data could be retransmitted, so this risk, if significant, can be averted by server 111' rejecting 0-RTT data within message 254. Although a tag for a MAC value is not depicted with the fifth symmetric ciphertext symm-C5 102*s*-5 in a message 254, the message 254 can also include a tag value using MAC3 252*c* calculated by device 101 during encryption of the fifth symmetric ciphertext symm-C5 102*s*-5.

At step 258, server 111' can select plaintext data 258*a* for inclusion in a second response "Server Hello" message 261. The plaintext data 258*a* could comprise (i) a random number generated by server 111' for use with the resumed session 251*a*, (ii) a session identifier for the resumed session 251*a*, and/or (iii) data specified by the protocol for the resumed session 251*a* and a "Server Hello" message using a PSK. As one example the data specified by the protocol could include a version number specifying TLS version 1.4 or TLS version 2.0, etc, and the length of the "Server Hello" message 261. Other possibilities exist as well for the plaintext 258*a* selected in a step 258 for inclusion in the second "Server Hello" message 261 without departing from the scope of the present disclosure.

Figure 7A:
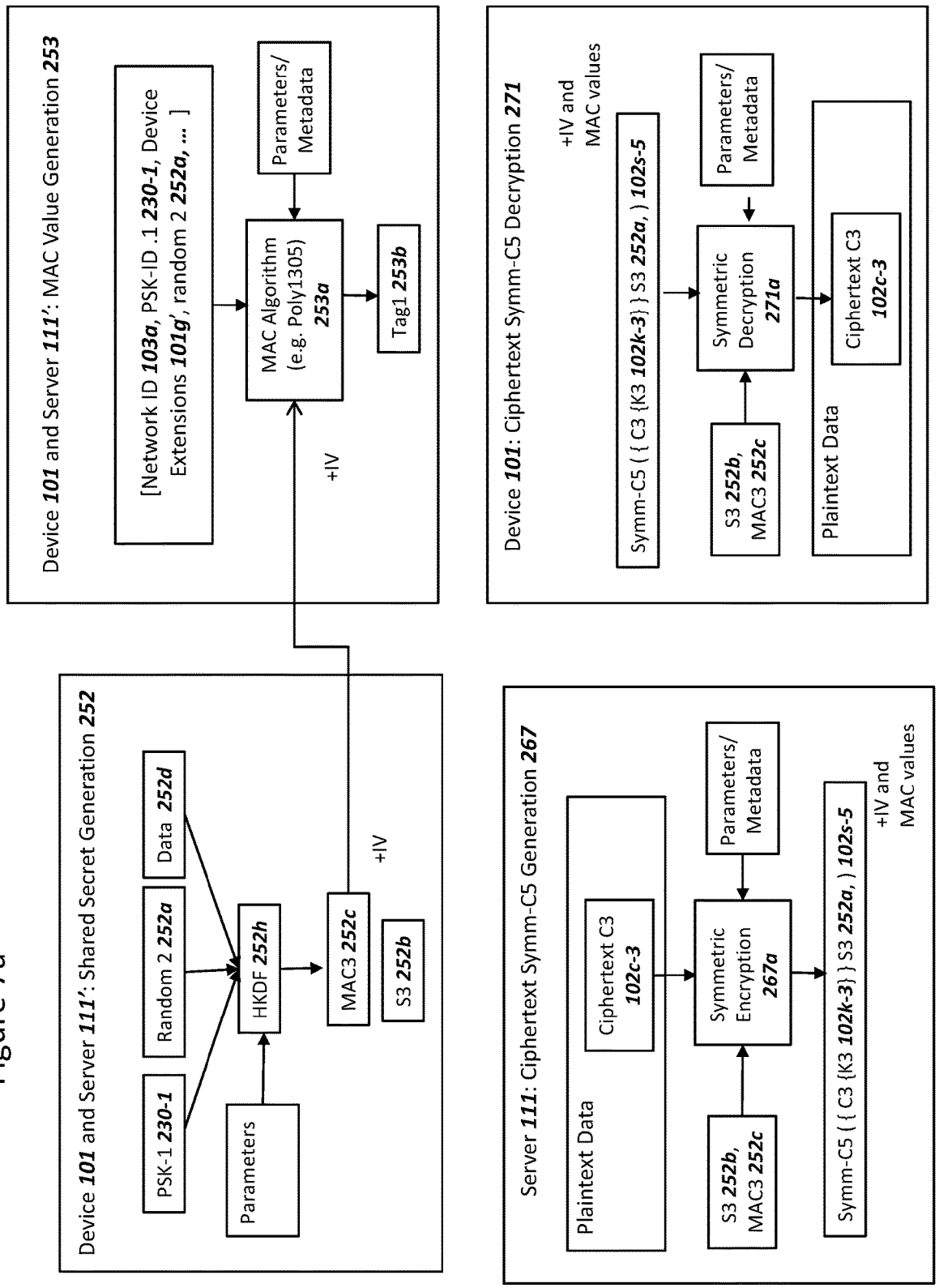
FIG. 7a is a flow chart illustrating exemplary steps for a device and a server (i) mutually generating a third symmetric ciphering key using a "pre-shared" secret key (PSK) and (ii) mutually generating a message authentication code (MAC) value, the server generating a fifth symmetric ciphertext using the third symmetric ciphering key, and the device decrypting the fifth symmetric ciphertext using the third symmetric ciphering key, in accordance with exemplary embodiments.

At step 253' server 111' can use the step 253 depicted and described in FIG. 7*a* for server 111' in order to generate a second MAC value or tag 2 253*c*. The plaintext for use in a step 253' can be the plaintext data 258*a* selected in a step 258. Parameters from device extensions 101*g* or 101*g'* could also be selected in a step 253' for the generation of MAC values, or the parameters could be specified in a protocol for resuming the secure session. Server 111' could select a MAC algorithm 253*a* (depicted in FIG. 7*a*) in a step 253', such as examples of Poly1305, HMAC algorithm, or AES with a mode such as CGM (to generate MAC values but not encrypt). Other possibilities exist as well for a MAC algorithm 253*a* used in a step 253' and for the generation of MAC values herein without departing from the scope of the present disclosure. At step 253', server 111' can input the plaintext data 258*a* into the MAC algorithm 253*a* along with parameters and the third MAC key MAC3 252*c* generated in a step 252 in order to generate the second MAC value tag2 253*c*.

At step 259, server 111' can select server hello data 259*a* for responding to the second "Client Hello" message 254. The server hello data 259*a* could include server extensions 103*g'*, where server extensions 103*g'* can be similar to server extensions 103*g* described in FIG. 1 above, except that server extensions 103*g'* can be used for a resumed session 251a with the use of the PSK 230-1 and PSK-ID 231-1. Server hello data 259a in FIG. 2b could include a "server finished" message equivalent to the "client finished" message depicted in a step 228 for server 111. The server hello data 259a in FIG. 2b could include a "change cipher spec" command to indicate that subsequent data will be encrypted with an updated or different symmetric ciphering key. Other possibilities exist as well for the data included in the server hello data 259a without departing from the scope of the present disclosure. For some exemplary embodiments, encrypted server hello data 259a could include a second server ephemeral public key ePK-2.server 103h-2 generated by a server using a step 204 depicted and described for a server 111 in FIG. 2a above. For these embodiments, then a step 204 to generate the server ephemeral public key ePK-2.server 103h-2 can be conducted after receipt of the message 254' and before the step 270.

At step 260, server 111' can use symmetric encryption 260a with the plaintext server hello data 259a from a step 259 in order to generate a sixth symmetric ciphertext symm-C6 102s-6. A step 260 can correspond to a step 212 by server 111 as depicted and described in connection with FIG. 3 below, except with the use of (i) plaintext server hello data 259a, (ii) the third symmetric ciphering key S3 252b and MAC key MAC3 252c from a step 252 above (instead of keys S1 210b and MAC1 201c in step 212), and the output can be the sixth symmetric ciphertext symm-C6 102s-6 (instead of symm-C1 102s-1 for step 212 in FIG. 3). The symmetric encryption for a step 260 can be included within cryptographic algorithms 103s for server 111'. The symmetric encryption for a step 260 can include input of at least (i) the parameters or metadata mutually shared between device 101 and server 111', and (ii) the third symmetric ciphering key S3 252b and MAC key MAC3 252c from a step 252 above. Server 111' can then use the network interface 111d to transmit or send the second "Server Hello" message 261 to device 101, where the message 261 can include at least plaintext data 258a, the second MAC value of the tag2 253c, and the sixth symmetric ciphertext symm-C6 102s-6 as encrypted server hello data 259a.

Device 101 can receive the second "Server Hello" message 261 using a network interface such as radio 101r. Device 101 can perform a series of steps in order to process the data received. At step 253' device 101 can use the step 253 depicted and described in FIG. 7a for device 101 to generate the second MAC value or tag 2 253c. Note that the step 253' by both device 101 and server 111' can be the same, since both device 101 and server 111' should each internally generate the same MAC value tag2 253c. The plaintext for use in a step 253' can be the plaintext data 258a received in a message 261. Parameters from device extensions 101g or 101g' could also be selected in a step 253' for the generation of MAC values, or the parameters could be specified in a protocol for resuming the secure session. Device 101 could select a MAC algorithm 253a (depicted in FIG. 7a) in a step 253', such as examples of Poly1305, HMAC algorithm, or AES with a mode such as CGM (to generate MAC values but not encrypt). Other possibilities exist as well for a MAC algorithm 253a used in a step 253' and for the generation of MAC values herein without departing from the scope of the present disclosure. At step 253', device 101 can input the plaintext data 258a into the MAC algorithm 253a along with parameters and the third MAC key MAC3 252c generated in a step 252 in order to generate the second MAC value tag2 253c.

Note that the benefit of the use of the second MAC value tag 253c over the plaintext data 258a is that the plaintext data 258a in a second "Server Hello" can be received in an authenticated and verified manner. An attacker or other intermediate node such as a firewall in IP network 107 could not feasibly alter the plaintext data 258a, since generation of the second MAC value tag 253c requires the PSK 230-1 (as shown in step 252 in FIG. 7a), where the PSK 230-1 is only securely available to device 101 and network 103/server 111'. In addition, the generation of the PSK 230-1 can require the derivation and use of both the first shared secret key K1 102k-1 and the second shared secret key K2 102k-2.

At step 262, device 101 can compare the generated MAC value of tag2 253c from a step 253' by device 101 with the received MAC value of tag2 253c from message 261. If the generated MAC value of tag2 253c from a step 253' by device 101 is equal to or the same as the received MAC value of tag2 253c from message 261, then the device 101 can verify and authenticate that the plaintext data 258a in message 261 was transmitted by the server 111', where the server 111' also stores and operates with the PSK 230-1 mutually derived by server 111' in a step 230 and a device 101 in step 236. If the verification of tag2 253c by device 101 in a step 262 fails, then device 101 can optionally send server 111 an error message.

Note that the verification of plaintext data 258a by device 101 can be important for securing a system 200b, since plaintext data 258a can be used to process subsequent symmetric ciphertext, such as the sixth symmetric ciphertext symm-C6 102s-6. For example, the plaintext data 258a could include metadata specifying a type or parameters for a symmetric ciphering algorithm and without authentication of plaintext data 258a, then the plaintext data 258a could be altered in a manner to attempt a "downgrade" attack such as changing plaintext data 258a to specify the use of weaker parameters for a symmetric ciphering algorithm. Other possibilities exist as well for the benefits of device 101 receiving plaintext data 258a in an authenticated manner through the verification of MAC value tag2 253c without departing from the scope of the present disclosure.

At step 263, device 101 can use symmetric decryption 263a with the received sixth symmetric ciphertext symm-C6 102s-6 from a message 261 in order to read the plaintext server hello data 259a. A step 263 can be equivalent to a decryption step 215 for device 101 depicted and described in connection with FIG. 4 below, except with the use of (i) the sixth symmetric ciphertext symm-C6 102s-6 from a message 261 instead of symm-C1 102s-1, and (ii) the use of the third symmetric ciphering key S3 252b and MAC key MAC3 252c from a step 252 above instead of S1 210b and MAC1 210c. The symmetric decryption for a step 263 can be included within cryptographic algorithms 101s for device 101. The symmetric decryption for a step 253 can include input of at least (i) the parameters or metadata mutually shared by device 101 and server 111', and (ii) the third symmetric ciphering key S3 252b and MAC key MAC3 252c from a step 252 above. The output of a step 263 can comprise plaintext server hello data 259a with a MAC value verified by MAC3 252c. Device 101 can then process the plaintext server hello data 259a, such using the data in order to generate a second "Client Finished" message 264.

Device 101 can then send server 111' the second "Client Finished" message 264. Server 111' can receive and process the "Client Finished" message 264. The "Client Finished" message 264 can include symmetric ciphertext, where the symmetric ciphertext was generated using the PSK 230-1. For example, the PSK 230-1 and additional data could be used with a HKDF in order for both device 101 and server 111' to mutually derive a symmetric ciphering key and MAC key. Server 111' could process the "Client Finished" message 264 and then both device 101 and server 111' could transmit and receive in messages 265 encrypted and authenticated application data. The encrypted and authenticated application data can be generated using at least the PSK 230-1. The PSK 230-1 can be input into a HDKF in order to generate symmetric ciphering keys and MAC keys, where the keys are used with symmetric ciphering algorithms to generate the encrypted and authenticated application data. As depicted in FIG. 2b, a step 251a for session resumption can comprise the series of steps and messages starting with step 201d' by device 101 and concluding with messages 265 with encrypted and authenticated application data.

Note that the authentication of handshake messages and application data using the PSK 230-1 in a system 200b does not require the use of digital certificates and digital signatures in the resumed session 251a. Certificates of public keys and digital signatures supporting PQC algorithms in NIST Round 3 typically require more bandwidth for significantly larger sizes of the digital signatures, compared to classical algorithms. Consequently, the resumed session 251a provides an efficient system by avoiding the use of PQC digital certificates and digital signatures for authentication.

System 200b also provides a higher level of security compared to conventional technology for session resumption from the use of both (i) the PSK 230-1 can be derived from two derived shared secrets (e.g. K1 102k-1 and K2 102k-2), which can be derived from two different PQC algorithms for each of device 101 and server 111 (e.g. both an ENCAPS and a DECAPS), and (ii) the identity or identifier for the PSK of PSK-ID 231-1 can be protected by both the two shared secrets for device 101 and network 103. With conventional technology for TLS 1.3, a "pre-shared" secret key is protected with a single mutually derived shared secret that results from an (EC) DHE key exchange. In addition, and as discussed in FIG. 2b above, the plaintext data shared in a message 254 and message 261 can be authenticated using the PSK 230-1. Conventional technology such as with TLS 1.3 does not support the use of MAC values over unencrypted plaintext data transmitted in a "Client Hello" or a "Server Hello" message.

FIG. 2c

FIG. 2c is a simplified message flow diagram illustrating an exemplary system with exemplary data transmitted and received by a device and a network for resuming a secure session, in accordance with exemplary embodiments. System 200c can include a device 101, IP network 107, a network 103, and a server 111' operating within network 103. Server 111' can be the same as server 111 from FIG. 1 and FIG. 2a above, or server 111' could be a different physical server but equivalent to server 111 as depicted and described for network 103 in FIGS. 1 and 2a above. Server 111' can communicate with network database 103db within network 103 in order to access information regarding pre-shared keys for devices that were generated during a first session 250. A difference between FIG. 2c and the above FIG. 2b can be FIG. 2c includes the use of a second device ephemeral public key ePK-2.device 101h-2 and a corresponding second device ephemeral private key of eSK-2.device 101i-2.

The nodes or entities within system 200c were also depicted and described in connection with FIG. 1 and FIG. 2a above, where FIG. 2c depicts exemplary steps for the nodes and exemplary message flows between the nodes after a first session 250 depicted and described in connection with FIG. 2a above. Although a single device 101, IP network 107, and network 103 are depicted in a system 200c, a system 200c could include a plurality of each of the depicted nodes connected via different IP networks 107. In addition, data recorded for device 101 and network 103 depicted and described above in FIG. 1 and FIG. 2a can be received and stored in the device 101 and network 103 depicted in FIG. 2c during the steps and message flows depicted in FIG. 2c.

At steps 201d' through 201f' device 101 can process data in order to securely resume a first session 250 between device 101 and a network 103. Device 101 can generate a message 254' for server 111', where the message 254 could comprise a second "Client Hello 2" message. Steps 201d' and subsequent steps in FIG. 2c can use the computing hardware in device 101 as depicted in FIG. 1 above and FIG. 11 below, as well as the operating system and stored parameters within device 101 stored in a step 201b above in FIG. 2a. At step 201d', device 101 can power on or wake from a sleep state or idle state and then select either a network ID 103a or a server ID 111a for sending a message 254. The IDs 103a or 111a could comprise domain names or IP addresses for connecting to the network 103. At step 201d', device 101 could read the identity of a "pre-shared" secret key PSK-ID 231-1 stored in memory 101m of device 101 during the first session 250.

Step 201d' can include device 101 selecting updated device extensions 101g' for use with a resumed secure session between device 101 and server 111'. In other words, device extensions 101g selected by device 101 in a step 201d in FIG. 2a could be for a first session 250 and updated device extensions 101g' could be for a resumed session 251b. Device extensions 101g were also described above in connection with FIG. 1, and can include identifiers or values for supported by both (i) cryptographic algorithms 101s and cryptographic parameters 101x, and (ii) a protocol for secure communications with network 103 and server 111. Device extensions 101g can include supported cipher suites such as names or values identifying supported symmetric ciphering algorithms, secure hash algorithms, digital signature algorithms, etc. Device extensions 101g' could be equivalent to device extensions 101g, except that device extensions 101g' could also specify values, parameters, and settings for the use of PSK 230-1 and a resumed session 250 by device 101 and server 111'. In other words, device 101 in a step 201d in FIG. 2a may not have a PSK available for communication with network 103 and subsequently selects device extensions 101g, while device 101 can have a PSK available for communication with network 103 in a step 201d' and can select extensions 101g' that support the use of the PSK 230-1.

At step 201d', device 101 can select a subset of the cryptographic parameters 101x for conducting a third KEM 103k/101j. The selected parameters could be KEM parameters 101f-x used with the first KEM 103k/101j. From the successful first session 250 above, device 101 can reasonable expect that server 111' supports the KEM parameters 101f-x, since KEM parameters 101f-x were used with the first session 250. For some embodiments, the KEM parameters selected in a step 201d' can be different than KEM parameters 101f-x, and these different KEM parameters could be within the Device.PQC-KEM.Parameters 101f depicted and described in connection with FIG. 1 above and also with FIG. 8 below. For the purposes of the session resumption 251b depicted in FIG. 2c, the parameters selected by device 101 in a step 201d' are depicted as KEM parameters 101f-x' (indicating they could be updated and different from KEM parameters 101f-x). At a step 201d', the parameters Device.PQC-KEM.Parameters 101*f* can include different supported families of PQC KEM, such as Kyber, BIKE, SIKE, NRTU, HQC, Classic McEliece, etc, where the KEM parameters 101*f-x'* (or the third KEM algorithm) can comprise a specific, identified KEM such as one of (i) Kyber-768 or (ii) SIKEp434 or (iii) BIKE security level 3, etc. Device.PQC-KEM.Parameters 101*f* for device 101 are also depicted and described in connection with FIG. 8 below.

At step 201*e'*, device 101 can use a PQC.KeyGen function 101*q* in FIG. 1 to generate a second device ephemeral PKI key pair comprising a second device ephemeral public key ePK-2.device 101*h*-2 and a second device ephemeral private key eSK-2.device 101*i*-2. The algorithm used to generate the ephemeral PKI key pair can be specified in KEM parameters 101*f-x'* selected by device 101 in a step 201*d'* above. In a step 201*e'*, the device ephemeral PKI key pair can comprise a key pair supporting key encapsulation mechanisms specified in Round 3 of the NIST "Post Quantum Cryptography" (PQC) project. Each KEM provides details for a KeyGen function, which could be used for a PQC.KeyGen function 101*q* in a step 201*e'*. The second device ephemeral public key ePK-2.device 101*h*-2 generated in a step 201*e'* can comprise the value of "Key Share" within a second "Client Hello" message for resumed session 251*b* and message 245' below.

At step 252, device 101 can use the PSK 230-1 to generate a third symmetric ciphering key S3 252*b* and a third MAC key MAC3 252*c*. Exemplary details for a step 252 by device 101 are also depicted and described in connection with FIG. 6 below. At step 252, device 101 can generate a second random number 252*a* for use in the resumed session 251*b*. At step 252, device 101 can use at least the PSK 230-1 and additional data (depicted as "data 252*d*" below in FIG. 7*a*) with a HKDF 252*h* (depicted in FIG. 7*a* below) in order to generate the third symmetric ciphering key S3 252*b* and a third MAC key MAC3 252*c*. A nonce or initialization vector could also be generated in a step 252. In addition, the third symmetric ciphering key S3 252*b* could comprise a first portion S3 252*b*-1 for encryption by device 101 and a second portion S3 252*b*-2 for decryption by device 101. Likewise, the third MAC key MAC3 252*c* can comprise two portions, where a first portion is for generation of MAC or tag values by device 101 and a second portion is for verification of MAC values or tag values received from server 111'.

At step 253, device 101 can select data for generation of MAC values in order send data to server in an authenticated manner with message integrity. Exemplary details for a step 253 by device 101 are also depicted and described in connection with FIG. 6 below. The selected data in a step 253 can comprise (i) the identity of the PSK, which is PSK-ID 231-1 stored in a step 235 above, (ii) the second device ephemeral public key ePK-2.device 101*h*-2 derived in a step 201*e'* above, (iii) the device extensions 101*g'* selected from a step 201*d'* above, (iv) the second random number random 2 252*a* from a step 252, (v) the Device.PQC-KEM.Parameters 101*f*, and (vi) the KEM parameters for the second device ephemeral public key ePK-2.device 101*h*-2 of 101*f-x'*. Additional data could be selected in a step 253 for the generation of MAC values. Parameters from device extensions 101*g* or 101*g'* could also be selected in a step 253 for the generation of MAC values, or the parameters could be specified in a protocol for resuming the secure session. Device 101 could select a MAC algorithm 253*a* in a step 253 (depicted in FIG. 7*a* below), such as examples of Poly1305, HMAC algorithm, or AES with a mode such as CGM (to generate MAC values but not encrypt). Other possibilities exist as well for a MAC algorithm 253*a* used in a step 253 and for the generation of MAC values herein without departing from the scope of the present disclosure. At step 253, device 101 can input the selected data into the MAC algorithm 253*a* along with parameters and the third MAC key MAC3 252*c* generated in a step 252 in order to generate the MAC value tag1 253*b'*. The MAC value tag1 253*b'* can be similar to the MAC value tag1 253*b* in FIG. 2*b*, except that the MAC value tag1 253*b* can also be over the second device ephemeral public key ePK-2.device 101*h*-2 derived in a step 201*e'* above After the conclusion of a step 253 by device 101, device 101 can then conduct a step 201*f* to process a message 254' as depicted in FIG. 2*b*. A message 254' can be similar to a message 254 depicted and described in connection with FIG. 2*b*, with the primary difference between the two messages 254 and 254' being a message 254' can include (i) the second device ephemeral public key ePK-2.device 101*h*-2, (ii) the Device.PQC-KEM.Parameters 101*f*, and (iii) the KEM parameters for the second device ephemeral public key ePK-2.device 101*h*-3 of 101*f-x*. A step 201*f'* in FIG. 2*b* can be equivalent to a step 201*f* in FIG. 2*a*, with the difference being step 201*f* can be for session resumption 251*b* and step 201*f* can be for a first session 250.

Note that the message 254' in FIG. 2*a* for the second "Client Hello" can include all of the equivalent information and data for a first "Client Hello" message 202 in FIG. 2*a* above. The message 254' can also include the PSK-ID 231-1 and the MAC value tag1 253*b'*. By including at least all of the equivalent information and data for a first "Client Hello" message 203 in FIG. 2*a* above, server 111' in a subsequent step 266 below could (i) select not to perform a resumed session 251*b* depicted in FIG. 2*c*, but rather use the message 254' as a message 202 depicted and described in connection with FIG. 2*a* and instead (ii) have server 111' conduct the full set of steps for a first secure session 250 depicted and described in connection with FIG. 2*a*. As one example of the benefits of a message 254' including at least all of the data for a first message 202 in FIG. 2*a*, if server 111' cannot find the PSK-ID 231-1 in a network database 103*db* (or the PSK 230-1 for the PSK-ID 231-1 has expired), then server 111' can use all of the information in the message 254' to conduct the series of steps 203*a* through 212 in FIG. 2*a* in order to respond with a message 213 for a new first session 250. In other words, a message 254' depicted in FIG. 2*c* allows a server proceed in a step 266 described below with either (i) continuing with the resumed session 251*b* or (ii) conducting a new first session 250 without requiring the additional round-trip of messages to (i) reject the message 254' and then (ii) force device 101 to resend an entirely new message 202 to start the new first session 250.

At step 201*f''*, device can use firmware or application software within device 101 in order to perform steps as specified in a protocol for resumption of a secure session between device 101 and network 103. The message 254' can comprise a second "Client Hello" or equivalent second message according to the protocol for the secure session selected by device 101 in a step 201*d* in FIG. 2*a*. Device 101 can send or transmit a second message 254' comprising a second "Client Hello" message (or equivalent for a different protocol than TLS) to the server 111' operating in network 103 in a step 201*f*. A step 201*f* can comprise processor 101*p* writing the data for the message 254' to a radio 101*r* (or equivalently a network interface if device 101 does not include a radio 101*r*). As depicted in FIG. 2*b*, the message 254' can comprise a second "Client Hello" message, where the first "Client Hello" message was depicted and described above in FIG. 2*a* for the first session 250.

At step 255, server 111' can use the received PSK-ID 231-1 from the message 254' to securely query the network database 103*db* for the corresponding PSK 230-1. The storing of multiple values of the PSK and PSK-ID for a network 103 was depicted and described in connection with FIG. 2*a* above. If a corresponding PSK 230-1 for the PSK-ID 231-1 is not found or has expired, then the server 111' may optionally send device 101 an error message. For some embodiments, server 111' may prefer to remain silent and not respond to message 254' if the PSK-ID 230-1 is not found or if subsequent errors occur in the processing of message 254', such as tag value 253*b*' not being verified. After a step 255 and upon success of the query to network database 103*db*, server 111' can store the corresponding PSK 230-1 for the PSK-ID 231-1.

Server 111' can then conduct a step 252, where a step 252 by server 111' can be equivalent or the same as a step 252 conducted by device 101. A step 252 is depicted and described above for a device 101 and a server 111' can conduct the same step in order use the PSK 230-1 from a step 255 and mutually derive with device 101 the third symmetric ciphering key S3 252*b* and a third MAC key MAC3 252*c*. Exemplary details for a step 252 by server 111' are also depicted and described in connection with FIG. 7*a* below and also for a server 111' in FIG. 2*a* above. At step 252, server 111' can use at least the PSK 230-1 and additional data (depicted as "data 252*d*" below in FIG. 7*a*) with a HKDF 252*h* (depicted in FIG. 7*a* below) in order to mutually derive the third symmetric ciphering key S3 252*b* and a third MAC key MAC3 252*c*.

Server 111' can conduct a verification of the tag value 253*b*' received in the message 254 using the third MAC key MAC3 253*c*. Server 111' can conduct a step 253 in order to generate the same tag value 253*b*'. Exemplary details for a step 253 by server 111' are also depicted and described in connection with FIG. 7*a* below. At step 253, server 111' can select data for internal generation of MAC values in order receive data from device 101 in an authenticated manner with message integrity. The selected data in a step 253 can be received in a message 254' and comprise (i) the identity of the PSK, which is PSK-ID 231-1, (ii) the device extensions 101*g*', (iii) the second random number random 2 252*a*, (iv) the second device ephemeral public key ePK-2.device 101*h*-2 derived in a step 201*e*' above, (v) the Device.PQC-KEM.Parameters 101*f*, and (vi) the KEM parameters for the second device ephemeral public key ePK-2.device 101*h*-3 of 101*f*-*x*'. For some embodiments, the inclusion of a second random number 2 252*a* could be omitted from a message 254 and also omitted from a step 253 for both device 101 and server 111'. The description of a step 253 performed by server 111' in FIG. 2*b* above also applies to the step 253 performed by a server 111' in FIG. 2*c*. At step 253, server 111' can input the selected data into the MAC algorithm 253*a* along with parameters and the third MAC key MAC3 252*c* generated by server 111' in a step 252 in order to generate the MAC value of tag1 253*b*'.

At step 256, server 111' can compare the generated MAC value of tag1 253*b*' from a step 253 in FIG. 2*c* by server 111' with the received MAC value of tag1 253*b*' from message 254'. If the generated MAC value of tag1 253*b*' from a step 253 by server 111' in FIG. 2*c* is equal to or the same as the received MAC value of tag1 253*b*' from message 254', then the server 111' can verify and authenticate that the plaintext data in message 254' (such as PSK-ID 231-1 and/or device extensions 101*g*' and/or the second device ephemeral public key ePK-2.device 101*h*-2) was transmitted by the device 101, where the device 101 also stores and operates with the PSK 230-1 mutually derived by server 111' in a step 230 and a device 101 in step 236 during the first session 250. The benefits described for the verification of a MAC value tag1 253*b* described for a system 200*b* also apply for a system 200*c* depicted in FIG. 2*c*.

At step 266 in FIG. 2*c*, if the verification of tag1 253*b*' by server 111' in a step 256 fails, then server 111' can optionally (i) send device 101 an error message, or (ii) chose to re-start a first session 250 and use the message 254' as a message 202 in FIG. 2*a* in order to process the message 254'. In addition, if a step 255 fails, such as server 111' cannot receive or locate a PSK 230-1 for the PSK-ID 231-1 or the PSK 230-1 for the PSK-ID 231-1 has expired, then steps 252 and 253 could be omitted and in a step 266 server 111' could select to re-start a first new session 250 using the message 254' as first "Client Hello" message 202 in FIG. 2*a*. For the embodiments described in the previous two sentences, at a step 266, server 111' could use the message 254' as a message 202 in FIG. 2*a* and then conduct the steps 203*a* through 212 depicted and described in connection with FIG. 2*a* and respond to the message 254' with a message 213 for a new first session 250. For these embodiments, then the PSK-ID 231-1 in the message 254' and the MAC value tag1 253*b*' can be ignored for the purposes of conducting the steps 203*a* through 212 in FIG. 2*a* to generate the "Server Hello" message 213.

In other words, a message 254' depicted in FIG. 2*c* allows a server proceed in a step 266 described below with either (A) continuing with the resumed session 251*b* (when steps 255, 252, 253, and 256 are successful) or (B) conducting a new first session 250. The sequence of steps and message flows depicted in FIG. 2*c* are for the case (A) in the previous sentence. For the case of (B), then the second device ephemeral public key ePK-2.device 101*h*-2 can be used by server 111' as a first device ephemeral public key ePK-1.device 101*h*-1 and the second random number random 2 252*a* can be used as a first random number random 1 202*a*.

At step 203*a*', server 111' can validate that the second device ephemeral public key ePK-2.device 101*h*-2 received is properly structured and consistent with KEM parameters 101*f*-*x*. For example, if KEM parameters 101*f*-*x* state the key 101*h*-2 supports the Kyber-786 algorithm, then in a step 203*a*' server 111' could at least verify the ePK-2.device 101*h*-2 is 1184 bytes long and also can be successfully input into a KEM ENCAPS function 103*k* for sever 111'. At a step 203*a*', server 111' can also verify that KEM parameters 101*f*-*x* is supported by Server.PQC-KEM.Parameters 103*f*. In other words, in a step 203*a*', server 111 can determine the selected KEM parameters 101*f*-*x* for the KEM 103*k*/101*j* and ePK-2.device 101*h*-2 are supported by server 111' by cryptographic algorithms 103*s* and cryptographic parameters 103*x*.

At step 208', server 111' can derive or generate a random number M1 208*a*' for use in a KEM 103*k*/101*j* between server 111' and device 101. At step 209', server 111' can use (i) the received second device ephemeral public key of ePK-2.device 101*h*-2 and (ii) the specified subset of KEM parameters 101*f*-*x* for the device ephemeral public key and the KEM 103*k*/101*j* and (iii) random number M1 208*a*' in order to generate both (x) a third asymmetric ciphertext C3 102*c*-3 and (y) a third shared secret key K3 102*k*-3. A server 111' can use both cryptographic algorithms 103*s* and cryptographic parameters 103*x* in order to conduct the step 209'. The function and use of a step 209' can be equivalent to the use of a step 209 and a KEM ENCAPS function 103*k* as depicted and described in FIG. 3 below, where a step 209' in FIG. 2*c* can use as input (i) the received second device ephemeral public key of ePK-2.device 101h-2, and (ii) the random number M1 208a'. In exemplary embodiments, both the value of M1 208a' comprising a random number and the second device ephemeral public key can be stored within RAM memory 111m of server 111' within network 103.

At step 267, server 111' could conduct an additional encryption step, where server 111' can encrypt the third asymmetric ciphertext C3 102c-3 output from a step 209' above into a "double encrypted" fifth symmetric ciphertext symm-C5 102s-5. In other words, the PQC KEM algorithms proposed in the NIST Round 3 standardization project propose the use of an asymmetrically encrypted ciphertext such as the third asymmetric ciphertext C3 102c-3 in order to conduct a KEM. The original ciphertext output from the KEM and a step 209' (such as KEM ENCAPS 103k in FIG. 3 but using ePK.device 101h-2 and M1 208a') could provide the first level of asymmetric encryption.

Although the ciphertext from the party conducting an ENCAPS function (e.g. server 111' using the device public key ePK-2.device 101h-2) is normally secure with the first level of asymmetric encryption, additional levels of security could be obtained for the system 200c in FIG. 2c by server 111' conducting a step 267 to "double encrypt" the third asymmetric ciphertext C3 102c-3 output from KEM ENCAPS 101k in step 209' by also using symmetric encryption. The "double encryption" of the third asymmetric ciphertext C3 102c-3 in a step 267 can be equivalent to a step 224 by device 101 in FIG. 5, except with the input of third asymmetric ciphertext C3 102c-3 and the use of keys S3 252b and MAC3 252c.

One reason to conduct a step 267 by server 111' for message 261' is that a potential attacker could exist between device 101 and server 111'. From the plaintext second device ephemeral public key ePK-2.device 101h-2, an attacker could attempt to substitute (i) an original third asymmetric ciphertext C3 102c-3 from server 111' with (ii) a different, "fake" ciphertext C3 102c-3'. The different, "fake" ciphertext C3 102c-3' could feasibly be validly created using the second device ephemeral public key ePK-2.device 101h-2 (under certain plausible circumstances). The use of a "double encrypted" third asymmetric ciphertext C3 102c-3 (in the form of the fifth symmetric ciphertext symm-C5 102s-5 in FIG. 2c) by device server 111' increases resistance to an attacker substituting a fake third asymmetric ciphertext C3 102c-3'.

Or, in some embodiments, (i) the fifth symmetric ciphertext symm-C2 102s-5 could omit the use of the symmetric ciphering key S3 252b by server 111' in a step 267 and (ii) the fifth symmetric ciphertext symm-C5 102s-5 could be processed in a step 267a (depicted and described in connection with FIG. 7b below) with only the third MAC key MAC3 252c and a MAC algorithm such as Poly1305. For these embodiments, the MAC values for a plaintext third asymmetric ciphertext C3 102c-3 transmitted in a message 261' in FIG. 2c could be verified by device 101 using the MAC key MAC3 252c. In other words for the embodiments described within this paragraph, a the depicted "fifth symmetric ciphertext symm-C5 102s-5" could comprise a third asymmetric ciphertext C3 102c-3 with MAC values generated using the third MAC key MAC3 252c by server 111', such that device 101 could verify the third asymmetric ciphertext C3 102c-3 was generated by server 111' that (i) conducted the KEM ENCAPS 103j in a step 209' and (ii) operates with PSK 230-1 (since MAC3 252c can be derived from PSK 230-1 in a step 252). For the embodiments described in this paragraph, then the data depicted in FIG. 2c for "symm-C5 102s-5" could be transmitted as plaintext with MAC values using (i) the MAC key MAC3 252c from a HKDF 252h and (ii) the symmetric encryption step 267a in a step 267 but only for generating MAC values and not ciphering or encrypting data.

At step 268, server 111' can use (i) the PSK 230-1 for the PSK-ID 231-1 and (ii) the third shared secret key K3 102k-3 generated in a step 209' above in order to generate a fourth symmetric ciphering key S4 268b and a fourth MAC key MAC4 268c. Note that the PSK 230-1 can be stored by server 111' in a step 230. Exemplary details for a step 268 by server 111' are also depicted and described in connection with FIG. 7b below. At step 268, server 111' can use at least the PSK 230-1, the third shared secret key K3 102k-3 generated in a step 209', and additional data (depicted as "data 268d" below in FIG. 7b) with a HKDF 268a (depicted in FIG. 7b below) in order to generate the fourth symmetric ciphering key S4 268b and a fourth MAC key MAC4 268c. A nonce or initialization vector could also be generated in a step 268 by the HKDF 268a. In addition, the fourth symmetric ciphering key S4 268b could comprise a first portion S4 268b-1 for encryption by server 111' and a second portion S4 268b-2 for decryption by server 111'. Likewise, the fourth MAC key MAC4 268c can comprise two portions, where a first portion is for generation of MAC or tag values by server 111' and a second portion is for verification of MAC values or tag values received by server 111'.

At step 258, server 111' can select plaintext data 258a for inclusion in a second response "Server Hello" message 261'. The plaintext data 258a could comprise (i) a random number generated by server 111' for use with the resumed session 251b, (ii) a session identifier for the resumed session 251b, and/or (iii) data specified by the protocol for the resumed session 251b and a "Server Hello" message using a PSK. As one example the data specified by the protocol could include a version number specifying TLS version 1.4 or TLS version 2.0, etc, and the length of the "Server Hello" message 261'. Other possibilities exist as well for the plaintext 258a selected in a step 258 for inclusion in the second "Server Hello" message 261' without departing from the scope of the present disclosure.

Figure 7B:
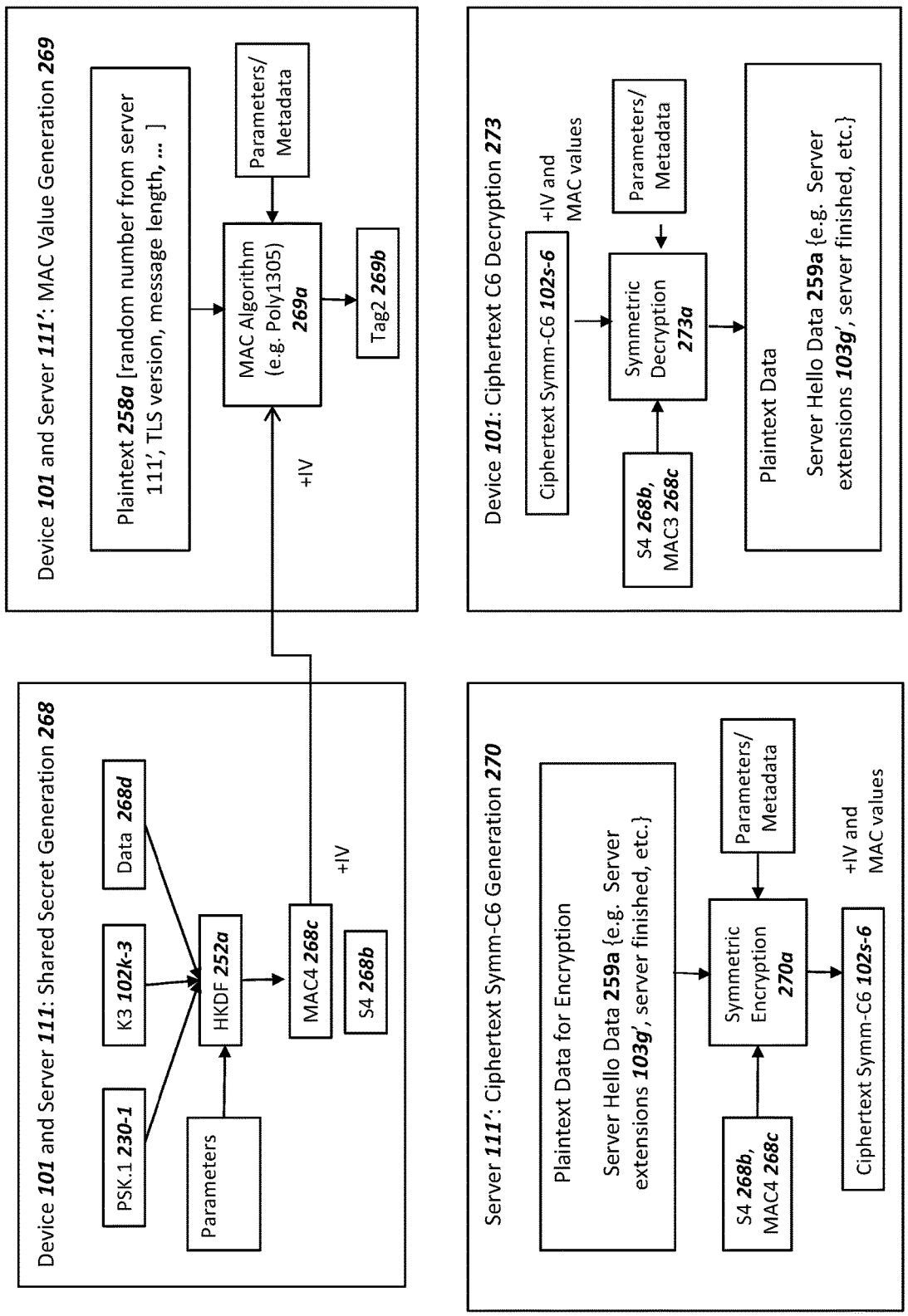
FIG. 7b is a flow chart illustrating exemplary steps for a device and a server (i) mutually generating a fourth symmetric ciphering key using a third shared secret key and (ii) mutually generating a message authentication code (MAC) value, the server generating a sixth symmetric ciphertext using the fourth symmetric ciphering key, and the device decrypting the sixth symmetric ciphertext using the fourth symmetric ciphering key, in accordance with exemplary embodiments.

At step 269 server 111' can use the step 269 depicted and described in FIG. 7b for server 111' in order to generate a second MAC value or tag2 269b. The plaintext for use in a step 269 can be the plaintext data 258a selected in a step 258. Parameters from device extensions 101g or 101g' could also be selected in a step 269 for the generation of MAC values, or the parameters could be specified in a protocol for resuming the secure session. Server 111' could select a MAC algorithm 269a (depicted in FIG. 7b) in a step 269, such as examples of Poly1305, HMAC algorithm, or AES with a mode such as CGM (to generate MAC values but not encrypt). Other possibilities exist as well for a MAC algorithm 269a used in a step 269 and for the generation of MAC values herein without departing from the scope of the present disclosure. At step 269, server 111' can input the plaintext data 258a into the MAC algorithm 269a along with parameters and the fourth MAC key MAC3 268c generated in a step 268 in order to generate the second MAC value tag2 269b.

At step 259, server 111' can select server hello data 259a for responding to the second "Client Hello" message 254 for a resumed session 251b. The server hello data 259a could include server extensions 103g', where server extensions 103g' can be similar to server extensions 103g described in FIG. 1 above, except that server extensions 103g' can be used for a resumed session 251b with the use of the PSK 230-1 and PSK-ID 231-1 and the second device ephemeral public key ePK-2.device 101*h*-2. Server hello data 259*a* in FIG. 2*c* could include a "server finished" message equivalent to the "client finished" message depicted in a step 228 for server 111. The server hello data 259*a* in FIG. 2*c* could include a "change cipher spec" command to indicate that subsequent data will be encrypted with an updated or different symmetric ciphering key. Other possibilities exist as well for the data included in the server hello data 259*a* without departing from the scope of the present disclosure. For some exemplary embodiments, encrypted server hello data 259*a* could include a second server ephemeral public key ePK-2.server 103*h*-2 generated by a server using a step 204 depicted and described for a server 111 in FIG. 2*a* above. For these embodiments, then a step 204 to generate the server ephemeral public key ePK-2.server 103*h*-2 can be conducted after receipt of the message 254' and before the step 270.

At step 270, server 111' can use symmetric encryption 270*a* with the plaintext server hello data 259*a* from a step 259 in order to generate a sixth symmetric ciphertext symm-C6 102*s*-6. A step 270 is also depicted and described in connection with FIG. 7*b* below. The symmetric encryption 270*a* can be included within cryptographic algorithms 103*s* for server 111'. The symmetric encryption 270*a* can include input of at least (i) the parameters or metadata mutually shared between device 101 and server 111', (ii) the fourth symmetric ciphering key S4 268*b* and MAC key MAC4 268*c* from a step 262 above, and (iii) the plaintext server hello data 259*a*.

Server 111' can then use the network interface 111*d* to transmit or send the second "Server Hello" message 261' to device 101, where the message 261' can include at least plaintext data 258*a*, the second MAC value of the tag2 269*b*, the fifth symmetric ciphertext symm-C5 102*s*-5 from a step 267, and the sixth symmetric ciphertext symm-C6 102*s*-6 as encrypted server hello data 259*a*. Although MAC values or tags for the fifth symmetric ciphertext symm-C5 102*s*-5 and the sixth symmetric ciphertext symm-C6 102*s*-6, both the fifth symmetric ciphertext symm-C5 102*s*-5 and the sixth symmetric ciphertext symm-C6 102*s*-6 could include MAC values generated by MAC keys corresponding to the symmetric ciphering keys depicted for the fifth symmetric ciphertext symm-C5 102*s*-5 and the sixth symmetric ciphertext symm-C6 102*s*-6 shown for message 261'.

Device 101 can receive the second "Server Hello" message 261' for a resumed session 251*b* using a network interface such as radio 101*r*. Device 101 can perform a series of steps in order to process the data received. At step 271, device 101 can use symmetric decryption 271*a* with the fifth symmetric ciphertext symm-C5 102*s*-5 from the message 261', in order to read a plaintext value for the third asymmetric ciphertext C3 102*c*-3. A step 271 for device 101 can be equivalent to the step 226 for server 111 depicted and described in connection with FIG. 5, with the difference being the input of the fifth symmetric ciphertext symm-C5 102*s*-5 and the use of the third symmetric ciphering key S3 252*b* and third MAC key MAC3 252*c* from a step 252 for decryption. The symmetric decryption 271 can be included within device cryptographic algorithms 101*s* for device 101. The symmetric decryption 271 can include input of the parameters or metadata shared between device 101 and server 111' (such as specifying a type of algorithm and associated parameters) and the third symmetric ciphering key S3 252*b* and third MAC key MAC3 252*c* from a step 252 above for device 101.

At step 214', device 101 can use (i) the specified KEM parameters 101*f*-*x* transmitted in message 254' along with (ii) cryptographic algorithms 101*s* to conduct a KEM DECAPS 101*j* function with the received third asymmetric ciphertext C3 102*c*-3. The third asymmetric ciphertext C3 102*c*-3 could be output from the step 271 above. In a step 214', the device 101 can use the second device ephemeral private key of eSK-2.device 101*i*-2 derived in step 201*e'* with the KEM DECAPS 101*j* and the received third asymmetric ciphertext 102*c*-3 and KEM parameters 101*f*-*x'* in order to generate the third shared secret key K3 102*k*-3. A step 214 for device 101 is also depicted and described in connection with FIG. 4 below, and also summarized for the step 214 for device 101 in FIG. 1 above. A difference between step 214 depicted in FIG. 4 and the step 214' performed in FIG. 2*c* is that step 214' can use both (i) the third asymmetric ciphertext C3 102*c*-3 instead of the first asymmetric ciphertext C1 102*c*-1, and (ii) the second device ephemeral private key of eSK-2.device 101*i*-2 derived in step 201*e'* instead of the first device ephemeral private key of eSK-1.device 101*i*-1 derived in step 201*e*. Likewise, a difference between step 214 depicted in FIG. 4 and the step 214' performed in FIG. 2*c* is that step 214' can output a third shared secret key K3 102*k*-3 instead of the first shared secret key K1 102*k*-1.

At step 268, device 101 can use (i) the PSK 230-1 for the PSK-ID 231-1 read from a step 201*d'* and (ii) the third shared secret key K3 102*k*-3 generated in a step 214' above in order to generate a fourth symmetric ciphering key S4 268*b* and a fourth MAC key MAC4 268*c*. Note that the PSK 230-1 can be stored by device 101 in a step 236. Exemplary details for a step 268 by device 101 are also depicted and described in connection with FIG. 7*b* below. At step 268, device 101 can use at least the PSK 230-1, the third shared secret key K3 102*k*-3 generated in a step 214', and additional data (depicted as "data 268*d*" below in FIG. 7*b*) with a HKDF 268*a* (depicted in FIG. 7*b* below) in order to generate the fourth symmetric ciphering key S4 268*b* and a fourth MAC key MAC4 268*c*. A nonce or initialization vector could also be generated in a step 268 by the HKDF 268*a*. In addition, the fourth symmetric ciphering key S4 268*b* could comprise a first portion S4 268*b*-1 for decryption by device 101 and a second portion S4 268*b*-2 for encryption by device 101. Likewise, the fourth MAC key MAC4 268*c* can comprise two portions, where a first portion is for generation of MAC or tag values by device 101 and a second portion is for verification of MAC values or tag values received by device 101.

At step 269 device 101 can use the step 269 depicted and described in FIG. 7*b* for device 101 to generate the second MAC value or tag 2 269*b*. Note that the step 269 by both device 101 and server 111' can be the same, since both device 101 and server 111' should each internally generate the same MAC value tag2 269*b*. The plaintext for use in a step 269 can be the plaintext data 258*a* received in a message 261'. Parameters from device extensions 101*g* or 101*g'* could also be selected in a step 269 for the generation of MAC values, or the parameters could be specified in a protocol for resuming the secure session. Device 101 could select a MAC algorithm 269*a* (depicted in FIG. 7*b*) in a step 269, such as examples of Poly1305, HMAC algorithm, or AES with a mode such as CGM (to generate MAC values but not encrypt). Other possibilities exist as well for a MAC algorithm 269*a* used in a step 269 and for the generation of MAC values herein without departing from the scope of the present disclosure. At step 269, device 101 can input the plaintext data 258*a* into the MAC algorithm 269*a* along with parameters and the third MAC key MAC3 268c generated in a step 268 in order to generate the second MAC value tag2 269b.

Note that the benefit of the use of the second MAC value tag 269b over the plaintext data 258a is that the plaintext data 258a in a second "Server Hello" can be received in an authenticated and verified manner without requiring the use of digital certificates and digital signature algorithms using PKI keys. An attacker or other intermediate node such as a firewall in IP network 107 could not feasibly alter the plaintext data 258a, since generation of the second MAC value tag 269b requires the fourth MAC key MAC4 268c. The fourth MAC key M4 268c can require both the PSK 230-1 and the third shared secret key K3 102k-3, as depicted in a step 268 in FIG. 7b. In other words, the PSK 230-1 and the third shared secret key K3 102k-3 are only securely available to device 101 and network 103/server 111'. In addition, the generation of the PSK 230-1 can require the derivation and use of both the first shared secret key K1 102k-1 and the second shared secret key K2 102k-2 during a first session 250.

At step 272, device 101 can compare the generated MAC value of tag2 269b from a step 269 by device 101 with the received MAC value of tag2 269b from message 261'. If the generated MAC value of tag2 269b from a step 269 by device 101 is equal to or the same as the received MAC value of tag2 269b from message 261', then the device 101 can verify and authenticate that the plaintext data 258a in message 261' was transmitted by the server 111', where the server 111' also stores and operates with both (i) the PSK 230-1 mutually derived by server 111' in a step 230 and a device 101 in step 236 and (ii) the third shared secret key K3 102k-2 from a KEM with the second device ephemeral public key ePK-2.device 102h-2. If the verification of tag2 269b by device 101 in a step 272 fails, then device 101 can optionally send server 111' an error message.

Note that the verification of plaintext data 258a by device 101 can be important for securing a system 200c, since plaintext data 258a can be used to process subsequent symmetric ciphertext, such as the sixth symmetric ciphertext symm-C6 102s-6. For example, the plaintext data 258a could include metadata specifying a type or parameters for a symmetric ciphering algorithm, and without authentication of plaintext data 258a, then the plaintext data 258a could be altered in a manner to attempt a "downgrade" attack such as changing plaintext data 258a to specify the use of weaker parameters for a symmetric ciphering algorithm. Other possibilities exist as well for the benefits of device 101 receiving plaintext data 258a in an authenticated manner through the verification of MAC value tag2 269b without departing from the scope of the present disclosure.

At step 273, device 101 can use symmetric decryption 273a with the received sixth symmetric ciphertext symm-C6 102s-6 from a message 261' in order to read the plaintext server hello data 259a. A step 273 is also depicted and described in connection with FIG. 7b below. The symmetric decryption 273a can be included within cryptographic algorithms 101s for device 101. The symmetric decryption 273a can include input of at least (i) the parameters or metadata mutually shared by device 101 and server 111', (ii) the fourth symmetric ciphering key S4 268b and MAC key MAC4 268c from a step 268 above, and (iii) the received sixth symmetric ciphertext symm-C6 102s-6 from a message 261'. Device 101 can then process the plaintext server hello data 259a, such using the data in order to generate a second "Client Finished" message 264'.

Device 101 can then send server 111' the second "Client Finished" message 264'. Server 111' can receive and process the "Client Finished" message 264'. The "Client Finished" message 264' can include symmetric ciphertext, where the symmetric ciphertext was generated using the PSK 230-1 and the third shared secret key K3 102k-3 from the KEM using the second device ephemeral public key ePK-2.device 101h-2. For example, the PSK 230-1 and third shared secret key K3 102k-3 and additional data could be used with a HKDF in order for both device 101 and server 111' to mutually derive a symmetric ciphering key and MAC key. Server 111' could process the "Client Finished" message 264' and then both device 101 and server 111' could transmit and receive in messages 265' encrypted and authenticated application data. The encrypted and authenticated application data can be generated using at least the PSK 230-1 and third shared secret key K3 102k-3. The PSK 230-1 and third shared secret key K3 102k-3 can be input into a HDKF in order to generate symmetric ciphering keys and MAC keys, where the keys are used with symmetric ciphering algorithms to generate the encrypted and authenticated application data. As depicted in FIG. 2c, a step 251b for session resumption can comprise the series of steps and messages starting with step 201d' by device 101 and concluding with messages 265' with encrypted and authenticated application data.

Note that the authentication of handshake messages and application data using the PSK 230-1 in a system 200c does not require the use of digital certificates and digital signatures in the resumed session 251b. Certificates of public keys and digital signatures supporting PQC algorithms in NIST Round 3 typically require more bandwidth for significantly larger sizes of the digital signatures, compared to classical algorithms. Consequently, the resumed session 251b provides an efficient system by avoiding the use of PQC digital certificates and digital signatures for authentication.

System 200c also provides a higher level of security compared to conventional technology for session resumption from all of (i) the PSK 230-1 can be derived from two derived shared secrets (e.g. K1 102k-1 and K2 102k-2), which can be derived from two different PQC algorithms for each of device 101 and server 111 (e.g. both an ENCAPS and a DECAPS), (ii) the identity or identifier for the PSK of PSK-ID 231-1 can be protected by both the two shared secrets for device 101 and network 103, and (iii) a third shared secret key K3 102k-3 can be securely derived in the resumed session 251b and used with the PSK 230-1. With conventional technology for TLS 1.3, a "pre-shared" secret key is protected with a single mutually derived shared secret that results from an (EC) DHE key exchange. In addition, and as discussed in FIG. 2c above, the plaintext data shared in a message 254' can be authenticated using the PSK 230-1. The plaintext data in a message 261' can be authenticated from a fourth MAC key MAC4 268c that can be derived from both the PSK 230-1 and a third shared secret key K3 102k-3. The third shared secret key K3 102k-3 can be protected by both (i) a KEM algorithm and (ii) symmetric encryption of a third asymmetric ciphertext 102c-3 required to generate the third shared secret key K3 102k-3. Other benefits are achieved as well for the system 200c in FIG. 2c without departing from the scope of the present disclosure.

FIG. 3

Figure 3:
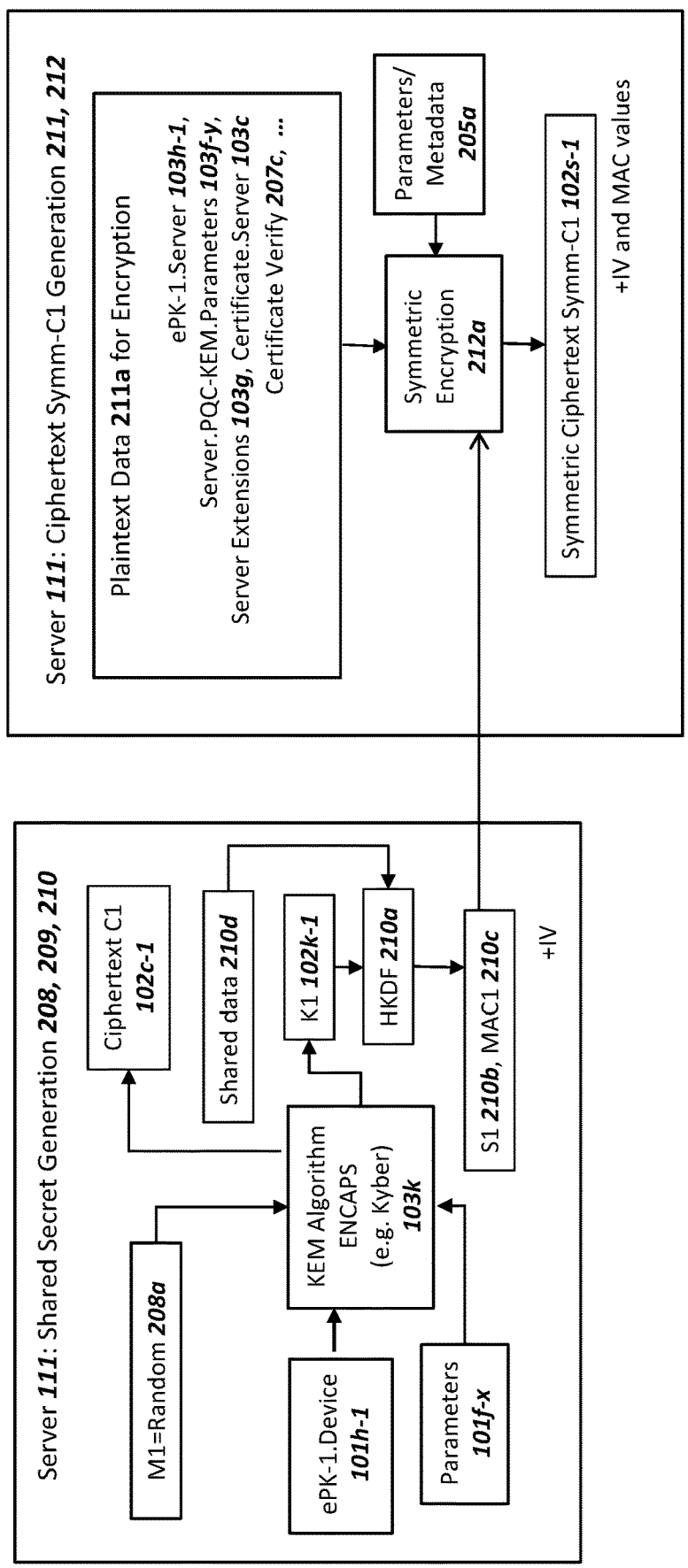
FIG. 3 is a flow chart illustrating exemplary steps for (i) a server conducting a key encapsulation mechanism to mutually derive a first symmetric ciphering key, and (ii) the server conducting symmetric ciphering using the derived first symmetric ciphering key, in accordance with exemplary embodiments.

FIG. 3 is a flow chart illustrating exemplary steps for (i) a server conducting a key encapsulation mechanism to mutually derive a first symmetric ciphering key, and (ii) the server conducting symmetric ciphering using the derived first symmetric ciphering key, in accordance with exemplary embodiments. The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

FIG. 3 depicts exemplary steps for a server 111 to conduct steps 208 through 212 in order (i) to conduct a first key encapsulation mechanism (KEM) with device 101 in order to mutually derive a first shared secret K1 102$k$-1 and (ii) generate a symmetric ciphertext for device 101 using the first shared secret key. The steps 208 through 212 were also depicted and described above in connection with FIG. 2$a$. At step 208, server 111 can generate a random number M1 208$a$ for input into the first KEM encapsulation (ENCAPS) 103$k$ function. Random number M1 208$a$ can comprise a message or a number that's used with KEM ENCAPS 103$k$ in order to generate the first shared secret key K1 102$k$-1. For some embodiments, the value M1 208$a$ could include additional data that is not random and a portion of M1 208$a$ could be a random number. Note the value M1 208$a$ is not transmitted as plaintext to device 101. In exemplary embodiments, a server 111 can use a hardware random number generator 128 depicted and described in connection with FIG. 10 below in order to generate the random number M1 208$a$. A random number M1 208$a$ can also be generated by server 111 with a hardware random number generator 128 using input of data or measurements from at least one transducer within server 111, including a transducer within the processor 111$p$.

The first shared secret key K1 102$k$-1 can comprise a shared secret key for both the device 101 and server 111 to conduct a first HMAC-based key derivation function or hash-based key derivation function (HKDF) 210$a$ in order to derive a first symmetric ciphering key S1 210$b$ and a first MAC key MAC1 210$c$. As contemplated throughout the present disclosure, a HKDF can also use secure hash algorithms such as SHA-256, SHA-3, etc. in order to generate symmetric ciphering keys, MAC keys, initialization vectors, etc. with shared secret keys. Note the first symmetric ciphering key S1 210$b$ could comprise two values or two portions, where a first value or portion is used by server 111 for encryption (and decryption by device 101) and a second value or portion is used by device 101 for encryption (and decryption by server 111). Likewise, a first MAC key MAC1 201$c$ could comprise two values, where a first value is used by server 111 for message authentication and generation of tag values for messages sent by server 111 and a second value is used by device 101 for message authentication and generation of tag values for messages sent by device 101.

Value M1 208$a$ can be input into the first KEM ENCAPS 103$k$ function or step. The following example within FIG. 3 will follow the steps for the Kyber algorithm within the PQ-Crystals project and proposal submitted to NIST, but other and different cryptographic algorithms could be utilized as well. In an exemplary embodiment, the PQC KEM ENCAPS 103$k$ function could follow the KEM steps specified by the Kyber algorithm. In the paper "CRYSTALS-Kyber: a CCA-secure module-lattice-based KEM" (referred to herein as Kyber paper), the message "m" can be the value M1 208a which is 256 bits in length for this example. The step 103k depicted in FIG. 3 can comprise the function/step of "Kyber. Encaps" in the Kyber paper with the first device ephemeral public key ePK-1.device 101h-1. The KEM parameters 101f-x could be both (i) received in message 202 from device 101 and (ii) correspond to a row from Table 1 of the Kyber paper such as Kyber768. The output of KEM ENCAPS 103k and "Kyber. Encaps" can be the value "c" in the Kyber paper or the first asymmetric ciphertext C1 102c-1 in FIG. 3. The length of "c" and the first asymmetric ciphertext C1 102c-1 can be an exemplary 1152 bytes, for parameters 101f-x which specify an example parameter set of Kyber768.

As depicted in FIG. 3, the output of KEM ENCAPS 103k and "Kyber. Encaps" can also be the first shared secret K in the Kyber paper or the first shared secret key K1 102k-1 in FIG. 3. Note that other PQC KEM algorithms such as, but not limited to, BIKE and SIKE can be used to derive a first shared secret key K1 102k-1, which could correspond to a key K. For SIKE, the value M1 208a could be combined with the first device ephemeral public key ePK-1.device 101h-1, or substituted by the first device ephemeral public key ePK-1.device 101h-1. For the use of SIKE, server 111 could also conduct a KeyGen function 103q to derive a server ephemeral PKI key pair for parameters 101f-x. For the use of SIKE, server 111 could use (i) the derived server ephemeral private key with the first device ephemeral public key ePK-1.device 101h-1 and (ii) the KEM ENCAPS 103k function to derive the first shared secret key K1 102k-1. In other words, and also as described in FIG. 1 above, the first KEM 103k/101j could be conducted by server 111 with a first device ephemeral public key ePK-1.device 101h-1 and KEM parameters 101f-x that support any of lattice, code-based, or SIKE based algorithms without departing from the scope of the present disclosure.

At step 210, server 111 can use a HMAC-based key derivation function or a hash-based key derivation function (HKDF) 210a with at least the first shared secret key K1 102k-1 output from KEM ENCAPS function 103k in order to generate both (i) a first symmetric ciphering key of S1 210b and a first message authentication code (MAC) key MAC1 210c. Note that in some exemplary embodiments, additional data 210d mutually shared between device 101 and server 111 besides the first shared secret key K1 102k-1 can also be input into the HKDF 210a in a step 210 in order to generate S1 210b and MAC1 210c. The additional data 210d depicted in FIG. 2a for input into HKDF 210a can comprise data from the message 202, such as, but not limited to, the device ephemeral public key ePK.device 101h from device 101, device extensions 101g, parameters 101f and 101f-x, the ransom number random 1 202a. The additional data 210d could also include metadata 205a and/or the first asymmetric ciphertext C1 102c-1 from a message 213. In general, the additional data 210d can comprise data mutually shared between device 101 and server 111 before a message 225 which is not secret (e.g. data other than the first shared secret key K1 102k-1). The HKDF 210a could be included in cryptographic algorithms 103s for server 111, as depicted and described in connection with FIG. 1 above.

Although not depicted in FIG. 3, the additional data 210d input into HKDF 210a with the first shared secret key K1 102k-1 could include strings or values specified in parameters 103x and 101x for a secure session between device 101 and server 111. In other words, strings, values or numbers mutually shared between device 101 and server 111 before a message 202 from device (such as values specified in standards for a secure session) could also be input into the HKDF 210a along with the first shared secret key K1 102k-1. In a first example, the strings, values, or numbers mutually shared between device 101 and server 111 for data 210d before a message 202 from device 101 could be stored in both cryptographic algorithms 101s and cryptographic algorithms 103s. In a second example, the strings, values, or numbers mutually shared between device 101 and server 111 before a message 202 from device 101 could be stored in both cryptographic parameters 101x and cryptographic parameters 103x. In a third example, the additional data 210d could include metadata 205a or portions of metadata 205a, where metadata 205a can be transmitted as plaintext for a message 213 sent by server 111 and received by device 101.

Other data from a message 202 can be used as data 210d for input into a HKDF 210a, in addition to the first shared secret key K1 102k-1, without departing from the scope of the present disclosure, such as, but not limited to, (i) a network ID 103a or a server ID 111a that can be included in a message 202, as well as (ii) portions plaintext metadata that could be included in a first message 202. For other embodiments, the input of additional data 210d from a message 202 into a HKDF 210a besides K1 102k-1 could be omitted, and S1 210b and MAC1 210c could be derived from K1 102k-a using the HKDF 210a. A HKDF 210a could also derive additional keys besides S1 210b and MAC1 210c, such as, but not limited to an initialization vector for both a server 111 and a device 101. An initialization vector output from the HKDF 210a could be used as a parameter for the generation of the first symmetric ciphertext symm-C1 102s-1 by server 111 in a step 212 and decryption of the first symmetric ciphertext symm-C1 102s-1 by device 101 in a step 215.

In addition, although a single HDKF 210a is depicted in FIG. 3, a step 210 by server 111 and a corresponding step 214 by device 101 could use multiple different HKDF 210a in sequence to derive different keys for symmetric encryption 212a by server 111 and symmetric decryption 215a (depicted in FIG. 4 below), such as a first HKDF 210a to derive the mutually shared symmetric ciphering key S1 210b, a second HKDF 210a to derive the MAC key MAC1 210c, and a third HKDF 210a to derive an initialization vector. Further, although a single HDKF 210a is depicted in FIG. 3, a step 210 by device 101 could use multiple different HKDF 210a in sequence to derive different keys for encryption by device 101, such as a first HKDF 210a to derive the a shared symmetric ciphering key S1 210b for device 101, a second HKDF 210a to derive a MAC key MAC1 210c for device 101, and a third HKDF 210a to derive an initialization vector for device 101. Each of the different HKDF 210a described in this paragraph can use different data mutually shared between device 101 and the server 111, and each of the different HKDF 210a described in this paragraph can also use the first shared secret key K1 102k-1. Server 111 and device 101 can use the operations described in this paragraph to mutually derive each of the first symmetric ciphering key S1 210b and MAC key MAC1 210c and an initialization vector or nonce for use with symmetric encryption 212a and symmetric decryption 215a (depicted in FIG. 4).

A step 210 can also include server 111 calculating two values for the first symmetric ciphering key S1 210b, where a first S1 210b-1 can be for use by server 111 for symmetric encryption of plaintext data into symmetric ciphertext such as symm-C1 102s-1 sent to device 101. A second S1 210b-2 can be for use by server 111 for symmetric decryption of symmetric ciphertext data such as symm-C2 102s-2 from device 101 into plaintext data in a step 226 below. The first S1 210b-1 can be used by server 111 to encrypt data using the key "S1" for device 101 in a message 213 (e.g. symm-C1 102s-1), and the second S1 210b-2 can be used by server 111 to decrypt data using the key "S1" received from device 101 in a message 225 (e.g. symm-C2 102s-2). The first S1 210b-1 can be referred to as a first portion of S1 210b and the second S1 210b-2 can be referred to as a second portion of S1 210b.

In a step 214 below for device 101, the device 101 could also likewise derive two different values for the key S1 comprising the first S1 210b-1 for decrypting data in a message 213 (e.g. symm-C1 102s-1) using "S1" and the second S1 210b-2 for encrypting data sent to server 111 in a message 225 (e.g. symm-C2 102s-2). Likewise, server 111 in a step 214 can generate two values for MAC key MAC1 210c, where the first MAC1 210c-1 is used by server 111 to generate MAC codes sent to device 101 (e.g. with symm-C1 102s-1) and the second MAC1 210c-2 is used by server 111 to verify MAC codes received from device 101 (e.g. with symm-C2 102s-2 in a step 226). A device 101 can likewise use the HKDF 210a to generate all of the same first S1 210b-1, the second S2 210b-2, the first MAC1 210c-1 and the second MAC 210c-2.

Note that the embodiments described in paragraph above also apply to the generation of (i) two different values for the second symmetric ciphering key S2 221b (a first S2 for encryption by server 111 and a second S2 for decryption by server 111), and (ii) two different values for the second MAC key MAC2 221c (a first MAC2 for generating MAC codes and a second MAC2 for verifying MAC codes). Likewise, the embodiments described in paragraph above also apply to the generation of (i) two different values for the third symmetric ciphering key S3 228b (a first S2 for encryption by server 111 and a second S2 for decryption by server 111), and (ii) two different values for the second MAC key MAC2 228c (a first MAC2 for generating MAC codes and a second MAC2 for verifying MAC codes).

At step 211, server 111 can select and process a plaintext 211a for encryption into a first symmetric ciphertext symm-C1 102s-1. A step 211 is also depicted and described in connection with FIG. 2a above. Note that the first asymmetric ciphertext C1 102c-1 could be previously output from the KEM ENCAPS function 103k (where device 101 uses the first asymmetric ciphertext C1 102c-1 for the first KEM 103k/101j). In exemplary embodiments the data or values for the plaintext 211a selected in a step 211 can include at least (i) the server certificate cert.server 103c selected by a network 103 in a step 205 above, (ii) server extensions 103g from a step 205, (iii) the server digital signature for a "Certificate Verify" value 207c from a step 207, (iv) the first server ephemeral public key ePK.server 103h, and (v) parameters 103f-y for the first server ephemeral public key ePK.server 103h. Note the server certificate cert.server 103c can include at least (i) the server public key PK.server 103d, (ii) parameters for digital signatures, and (iii) a digital signature from a certificate issuer.

At step 212, server 111 can use symmetric encryption 212a with the plaintext 211a from a step 211 in order to generate the first symmetric ciphertext symm-C1 102s-1. A step 212 is also depicted and described in connection with FIG. 2a above. The symmetric encryption 212a can be included within cryptographic algorithms 103s for server 111. The symmetric encryption 212a can include input of the parameters specified in metadata 205a from a step 205 in FIG. 2a above and the symmetric ciphering key S1 210b and MAC key MAC1 210c for server 111 from a step 210 above. In a step 212, server 111 can also use an initialization vector for the symmetric encryption 212a, where the initialization vector (IV) can be included with metadata 205a. Note that a HKDF 210a could also derive the initialization vector for use by server 111 with symmetric encryption 212a, and the resulting initialization vector could either be (i) included with plaintext metadata 205a, or (ii) omitted from plaintext metadata 205a and device 101 could mutually derive the same initialization vector using the HDKF 210a in a step 214 below.

As depicted in FIG. 3, the "MAC values" can be generated in a step 212 from the use of the MAC key MAC1 210c. The MAC values could be generated from the use of a MAC algorithm equivalent to MAC algorithm 253a in a step 253 from FIG. 7a below. Or, the MAC values could be generated by the symmetric encryption 212a, where symmetric encryption 212a could include a mode that generates MAC values from the MAC key MAC1 210c. The MAC values as contemplated herein can be over the symmetric ciphertext symm-C1 102s-1 as opposed to the plaintext 211a, which represents operation of a step 212 (and equivalent encryption steps below) as "encrypt-then-MAC". In addition, the symmetric encryption below for steps 223, 224, 267, and 270 can use the corresponding MAC keys and MAC values depicted for the steps in the equivalent manner as described within this paragraph for generating MAC values for symmetric ciphertext. The resulting first symmetric ciphertext symm-C1 102s-1 and MAC values could be included in the response second message 213 sent or transmitted from server 111 to device 101 as depicted in FIG. 2a above.

Within FIG. 3, each of the depicted steps 208 through 212 as described above can comprise computer executable instructions stored within RAM memory 111m. Associated data and values for input into and output from the computer executable instructions could be stored in RAM memory 111m as well, such as M1 208a, the first asymmetric ciphertext C1 102c-1, the shared data 210d, the first shared secret key K1 102k-1, and the keys S3 210b and MAC3 210c. Plaintext 211a, metadata 205a, the depicted IV, and the first symmetric ciphertext symm-C1 102s-1 can be stored in RAM memory 111m as well. RAM memory 111m is depicted and described in connection with FIG. 1 above and FIG. 11 below. The computer executable instructions could be stored in RAM memory 111m during operation of server 111 including when the server 111 performs the steps depicted in FIG. 2a above.

Some of the depicted data processed by the computer executable instructions may also be stored in nonvolatile or storage memory 111b, such as, but not limited to, the server static private key SK.server 103d, Server Extensions 103g, and the server certificate cert.server 103c. The processor 111p or a processor system including processor 111p could execute the computer executable instructions in order use the input data and output data depicted and described for a server 111 in FIG. 3. The RAM memory 111m and the storage memory 111b can be connected to the processor 111p via a system bus 111c, which can include a memory bus.

FIG. 4

Figure 4:
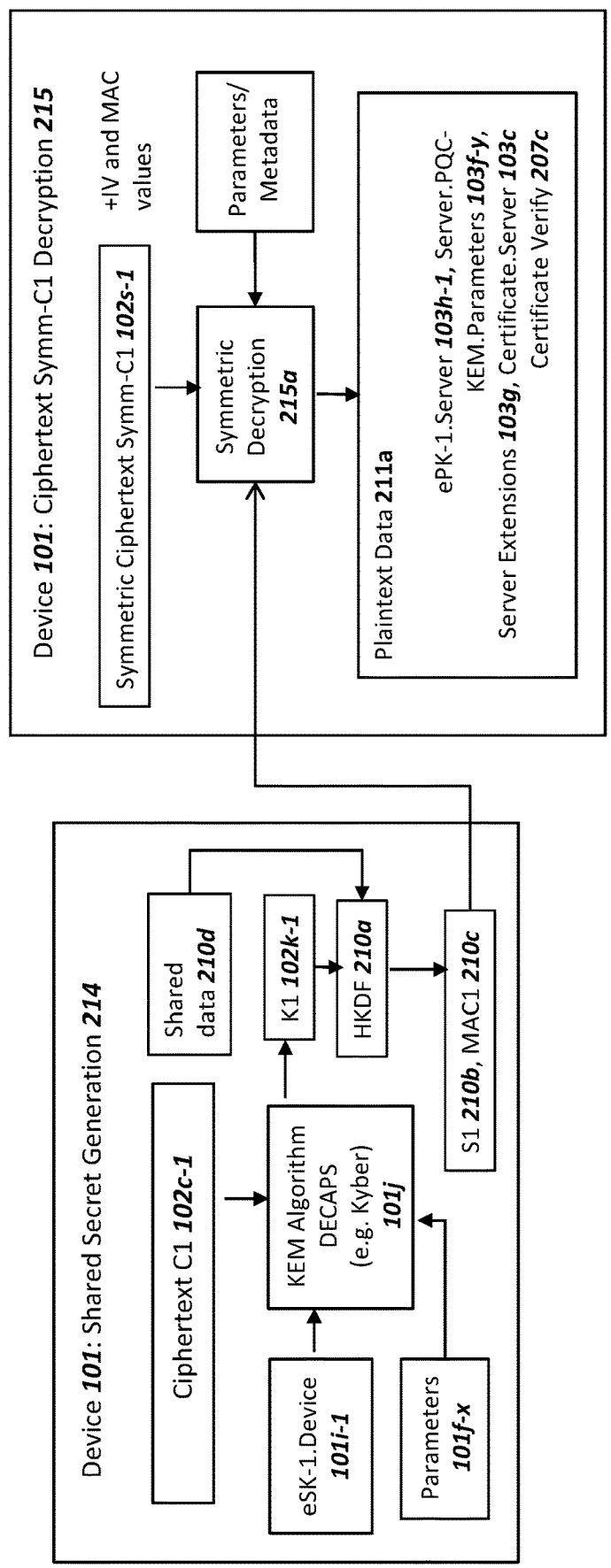
FIG. 4 is a flow chart illustrating exemplary steps for a device conducting (i) a key encapsulation mechanism to mutually derive the first symmetric ciphering key, (ii) symmetric ciphering using the derived first symmetric ciphering key, in accordance with exemplary embodiments.

FIG. 4 is a flow chart illustrating exemplary steps for a device conducting (i) a key encapsulation mechanism to mutually derive the first symmetric ciphering key, (ii) symmetric ciphering using the derived first symmetric ciphering key, in accordance with exemplary embodiments. FIG. 4 depicts exemplary steps for a device 101 to (i) conduct the first key encapsulation mechanism (KEM) with first server 111 in order to mutually derive the first shared secret K1 102k-1 in a step 214 and (ii) process the first symmetric ciphertext symm-C1 102s-1 using the first shared secret key in order to read the plaintext 211a in a step 215. The steps 214 and 215 were also depicted and described above in connection with FIG. 2a.

A step 214 can comprise a KEM decapsulation (DE-CAPS) step by device 101 in order to mutually derive the first shared secret K1 102k-1. The following example within FIG. 4 will follow the steps for the Kyber algorithm within the PQ-Crystals project and proposal submitted to NIST, but other and different cryptographic algorithms could be utilized as well. In an exemplary embodiment, the PQC KEM DECAPS 101j function could follow the KEM steps specified by the Kyber algorithm. In the paper "CRYSTALS-Kyber: a CCA-secure module-lattice-based KEM" (referred to herein as Kyber paper), the ciphertext can be the received first asymmetric ciphertext C1 102c-1 from a message 213.

The KEM DECAPS 101j function depicted in FIG. 4 can comprise the function/step of "Kyber. Decaps" in the Kyber paper with the private key eSK.device 101i and the first asymmetric ciphertext C1 102c-1. The first device ephemeral private key eSK-1.device 101i-1 could be derived by device 101 along with ePK-1.device 101h-1 in a step 201e as described in FIG. 2a above. The KEM parameters 101f-x could be both (i) sent by device 101 in message 202 to first server 111 and (ii) correspond to a row from Table 1 of the Kyber paper, such as Kyber768. The length of "c" and the first asymmetric ciphertext C1 102c-1 can be an exemplary 1152 bytes, for KEM parameters 101f-x which specify an example parameter set of Kyber768. The output of KEM DECAPS 101j and "Kyber. Decaps" can be the first shared secret key K1 102k-1, which is also described as a key K in the Kyber paper. Note that other PQC KEM algorithms such as, but not limited to, BIKE and SIKE can be used to derive the first shared secret key K1 102k-1, which could correspond to a key K. In other words, and also as described in FIG. 1 above, the first KEM 103k/101j could be conducted by device 101 with a device ephemeral private key eSK-1.device 101i-1 and KEM parameters 101f-x that support any of lattice, multivariate, or SIKE based algorithms without departing from the scope of the present disclosure.

At step 214, device 101 can use a HMAC-based Extract-and-Expand Key Derivation Function (HKDF) 210a with at least the first shared secret key K1 102k-1 output from KEM DECAPS function 101j in order to mutually derive both (i) the first symmetric ciphering key of S1 210b and the first message authentication code (MAC) key MAC1 210c for the device 101. The first server 111 can mutually derive the same first symmetric ciphering key S1 210b and MAC key MAC1 210c in a step 210 as depicted and described in connection with FIG. 3 above and also in FIG. 2a. In other words, the value of S1 210b calculated by both device 101 and first server 111 can be equal, and also the value of MAC1 210c calculated by both device 101 and first server 111 can be equal as well.

Note that in some exemplary embodiments, additional shared data 210d mutually shared between device 101 and first server 111 besides the first shared secret key K1 102k-1 can also be input into the HKDF 210a in a step 214 in order to generate S1 210b and MAC1 210c. As depicted in FIG. 4, the additional shared data 210d input into HKDF 210a can comprise data from the message 202, such as, but not limited to, the first device ephemeral public key ePK-1.device 101h-1 from device 101, device extensions 101g, parameters 101f and 101f-x, and the first asymmetric ciphertext C1 102c-1. The HKDF 210a could be included in cryptographic algorithms 101s for device 101, as depicted and described in connection with FIG. 1 above. Data from message 213 from server 111 could also be included as additional shared data 210d input into HKDF 210a, including metadata 205a and/or the first asymmetric ciphertext C1 102c-1. In general, the additional shared data 210d can comprise data mutually shared between device 101 and server 111 before a message 225 which is not secret (e.g. data other than the first shared secret key K1 102k-1).

As depicted in FIG. 4, the additional shared data 210d input into HKDF 210a with the first shared secret key K1 102k-1 could include strings or values specified in parameters 103x and 101x for a secure session between device 101 and first server 111. In other words, strings, values or numbers mutually shared between device 101 and first server 111 before a message 202 from device (such as values specified in standards for a secure session) could be input into the HKDF 210a in a step 214 by device 101 with the first shared secret key K1 102k-1.

Other data from a message 202 and/or message 213 can be used as shared data 210d for input into a HKDF 210a, in addition to the first shared secret key K1 102k-1, without departing from the scope of the present disclosure, such as, but not limited to, (i) a network ID 103a or a server ID 111a that can be included in a message 202, as well as (ii) portions of metadata 205a. For other embodiments, the input of additional data 210d from a message 202 into a HKDF 210a in a step 214 besides K1 102k-1 could be omitted, and S1 210b and MAC1 210c could be derived from K1 102k-1 using the HKDF 210a. In summary, both device 101 and first server 111 can select identical information or bytes, as well as identical sequence of bytes for the additional information from message 202 and/or message 213 as data 210d for input into HKDF 210a in order for both device 101 and first server 111 to mutually derive the same values for S1 210b and MAC1 210c. A HKDF 210a in a step 214 for device 101 and step 210 for first server 111 could also derive additional keys besides S1 210b and MAC1 210c, such as, but not limited to an initialization vector (IV) for both a first server 111 and a device 101. As discussed above with a step 210, the key S1 210b could comprise a first key S1 210b-1 for encryption by a device 101 (and decryption by a first server 111), and a second key S1 210b-2 for encryption by a first server 111 (and decryption by a device 101).

At step 215, device 101 can use symmetric decryption 215a with the first symmetric ciphertext symm-C1 102s-1 received in message 213 in FIG. 2a above in order to read the plaintext 211a. A step 215 is also depicted and described in connection with FIG. 2a above. The symmetric decryption 215a can be included within cryptographic algorithms 101s for device 101. The symmetric decryption 215a can include input of the parameters specified in metadata 205a from a message 213 and the symmetric ciphering key S1 210b and MAC key MAC1 210c from a step 214 above.

The depiction of "MAC values" in FIG. 4 represents the MAC values for the first symmetric ciphertext symm-C1 102s-1 can be both (i) received with the first symmetric ciphertext symm-C1 102s-1 and (ii) generated in a step 215 from the use of the MAC key MAC1 210c. The MAC values could be generated from the use of a MAC algorithm equivalent to MAC algorithm 253a in a step 253 from FIG. 7a below. Or, the MAC values could be generated by the symmetric decryption 215a, where symmetric decryption 215a could include a mode that generates MAC values from the MAC key MAC1 210c. In a step 215, device 101 could compare the received MAC values from the first symmetric ciphertext symm-C1 with the MAC values generated by device 101 in a step 215. If the generated and received MAC values are equal, then the first symmetric ciphertext symm-C1 102s-1 has been received with message integrity. The MAC values as contemplated herein can be over the symmetric ciphertext symm-C1 102s-1 as opposed to the plaintext 211a, which represents the corresponding operation of a step 212 by server 111 above as "encrypt-then-MAC". In addition, the symmetric decryption below for steps 226, 228, 271, and 273 can use the corresponding MAC keys and MAC values depicted for the steps in the equivalent manner as described within this paragraph for generating and verifying MAC values for symmetric ciphertext.

In a step 215, device 101 can also use an initialization vector for the symmetric decryption 215a, where the initialization vector can be included with metadata 205a. Note that a HKDF 210a could also derive the initialization vector for use by device 101 with symmetric decryption 215a, and the resulting initialization vector could either be (i) included with plaintext metadata 205a, or (ii) omitted from plaintext metadata 205a and device 101 could mutually derive the same initialization vector using the HDKF 210a from a step 214 above. The resulting plaintext 211a from a step 215 can be stored by device 101 in memory 101m and also be used with a digital signature verification step 217 by device 101 as described above in FIG. 2a. The plaintext data 211a from a step 215 can be the same as plaintext 211a processed by a first server 111 as described for a step 211 above in FIG. 3 and also FIG. 2a.

Within FIG. 4, both of the depicted steps 214 and 215 as described above can comprise computer executable instructions stored within RAM memory within device memory 101m as depicted and described in connection with FIG. 1 above and also FIG. 11 below. The computer executable instructions could be stored in RAM memory during operation of device 101 including when the device performs the steps depicted in FIG. 2a above. Associated data and values for input into and output from the computer executable instructions could be stored device memory as well, such as the first asymmetric ciphertext C1 102c-1, the shared data 210d, the first shared secret key K1 102k-1, and the keys S3 210b and MAC3 210c. Plaintext 211a, metadata 205a, the depicted IV, and the first symmetric ciphertext symm-C1 102s-1 can be stored in RAM memory 101m as well.

Some of the depicted data processed by the computer executable instructions may also be stored in nonvolatile or storage memory within device memory 101bb (depicted and described in connection with FIG. 11 below), such as, but not limited to, the KEM DECAPS function 101j, the symmetric decryption algorithm 215a, and the HKDF algorithm for HKDF 210a. The processor 101p could execute the computer executable instructions in order use the input data and output data depicted and described for a device 101 in FIG. 4. The RAM memory and the storage memory for device memory 101m can be connected to the processor 101p via a system bus 101t.

FIG. 5

Figure 5:
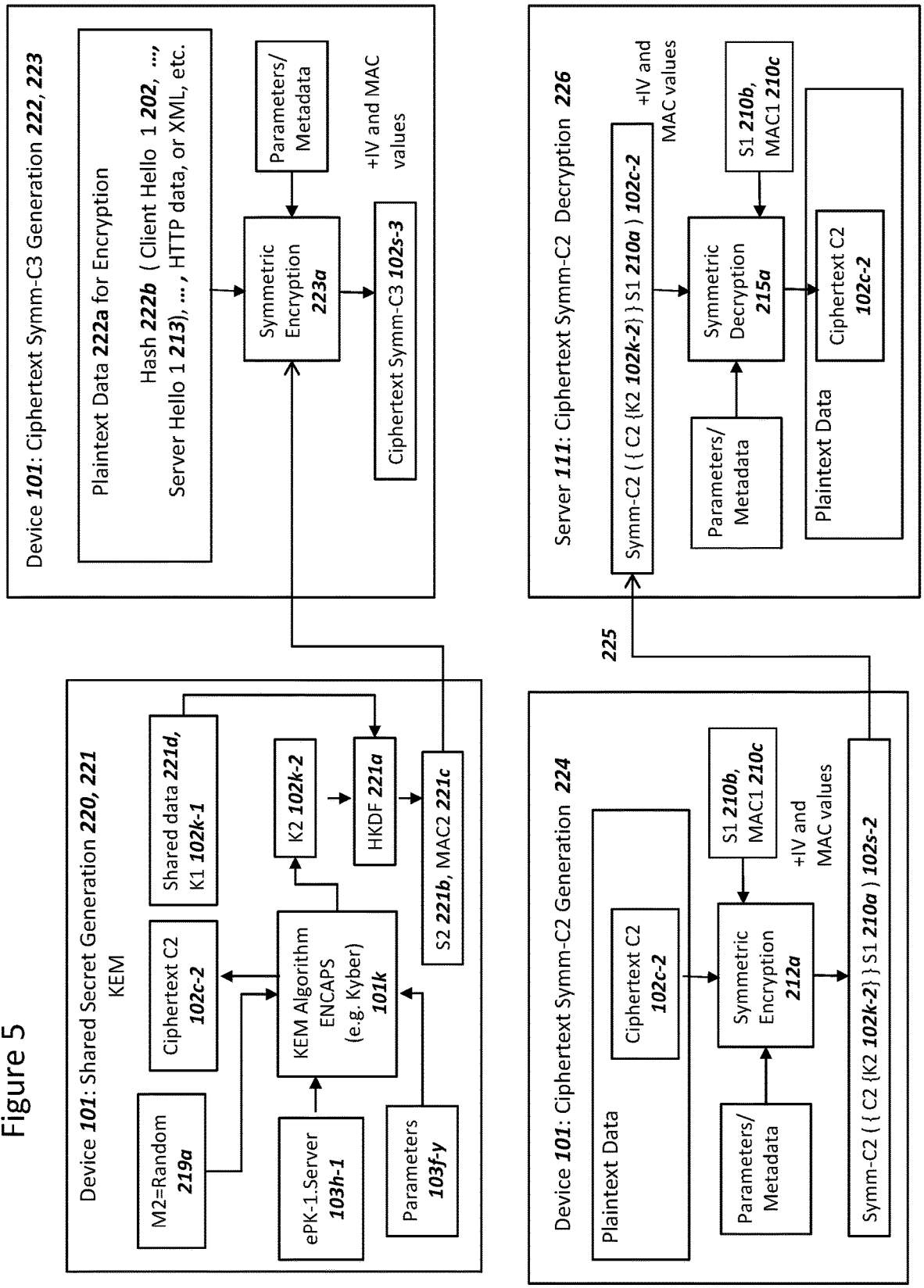
FIG. 5 is a flow chart illustrating exemplary steps for (i) a device conducting a key encapsulation mechanism to mutually derive a second symmetric ciphering key, (ii) the device conducting symmetric ciphering using the derived second symmetric ciphering key, and (iii) the device and a server conducting symmetric ciphering of asymmetric ciphertext with the first symmetric ciphering key, in accordance with exemplary embodiments.

FIG. 5 is a flow chart illustrating exemplary steps for (i) a device conducting a key encapsulation mechanism to mutually derive a second symmetric ciphering key, (ii) the device conducting symmetric ciphering using the derived second symmetric ciphering key, and (iii) the device and a server conducting symmetric ciphering of asymmetric ciphertext with the first symmetric ciphering key, in accordance with exemplary embodiments. As depicted in FIG. 5, a device 101 can conduct a second KEM 101k/103j in a step 220 using both (i) the server ephemeral public key ePK.server 103h received in the first symmetric ciphertext symm-C1 102s-1 (or as plaintext in a message 213), and (ii) the KEM parameters 103f-y from server 111 in the response second message 213. The output of the second KEM 101k/103j can include a second shared secret key of K2 102k-2 and a second asymmetric ciphertext C2 102c-2. Device 101 can then in steps 222 and 223 generate a third symmetric ciphertext using at least the second shared secret key of K2 102k-2. As depicted in FIG. 5, a server 111 can conduct the second KEM 101k/103j in a step 225 using (i) the server ephemeral private key eSK.server 103i from a step 204, (ii) the second asymmetric ciphertext C2 102c-2 received from a message 225, and (ii) the KEM parameters 103f-y transmitted by server 111 in the response second message 213. The output of the second KEM 101k/103j can include a second shared secret key of K2 102k-2. Server 111 can then in step 226 decrypt the third symmetric ciphertext symm-C3 102s-3 using at least the second shared secret key of K2 102k-2.

At step 220 in FIG. 5, device 101 can use the derived or generated a random number M2 219a from a step 219 depicted and described in connection with FIG. 2a above. The random number M2 219a can be for use in a second KEM 101k/103j between server 111 and device 101. Random number M2 219a could include some data or bits that are not random, such as deterministically calculated, but in exemplary embodiments at least some data or bits within both M1 208a and M2 219a are at least pseudo-random numbers or values. A random number M2 219a can be generated by device 101 with a hardware random number generator using input of data or measurements from at least one transducer within device 101, including a transducer within the processor 101p. At step 220, device 101 can use both (i) the received server ephemeral public key of ePK.server 103h from message 213 and (ii) the specified subset of parameters 103f-y for the server ephemeral public key and the second KEM 101k/103j in order to generate both (x) a second asymmetric ciphertext C2 102c-2 and (y) a second shared secret key K2 102k-2. At step 220, device 101 can use a KEM ENCAPS function 101k with both (i) and (ii) from the previous sentence in order to generate both (x) an asymmetric ciphertext C2 102c-2 and (y) the second shared secret key K2 102k-2. A summary of the step 220 by device 101 with a KEM ENCAPS function 101k was also depicted and described in connection with FIG. 1 and FIG. 2a above. A device 101 can use both cryptographic algorithms 101s and cryptographic parameters 101x in order to conduct the step 220.

At step 221, device 101 can use a hash-based key derivation function or an HMAC-based Extract-and-Expand Key Derivation Function (HKDF) 221a with at least the second shared secret key K2 102k-2 output from KEM ENCAPS function 101k in order to generate both (i) a second symmetric ciphering key of S2 221b and a second message authentication code (MAC) key MAC2 221c. Note that in some exemplary embodiments, additional data mutually shared between device 101 and server 111 besides the second shared secret key K2 102k-2 can also be input into the HKDF 221a in a step 221 in order to generate S2 221b and MAC2 221c. In preferred embodiments as depicted in FIG. 5, the first shared secret key K1 102k-1 generated in a step 214 in FIG. 4 and FIG. 2a can also be input into the HKDF 221a.

For a step 221, other data input into HKDF 221a besides shared secret keys K2 and/or K1 can include data from the message 213, such as, but not limited to, the server ephemeral public key ePK.server 103h from server 111, server extensions 103g, and/or parameters 103f-y. Although not depicted in FIG. 5, the data for message 202 and also metadata 205a input into the HKDF 221a in FIG. 4 above could also be input into HKDF 221a in FIG. 5. For other embodiments, the input of (i) the first shared secret key K1 102k-1 and/or (ii) data from message 202 and 213 could be omitted from inclusion in the calculation of HKDF 221a, and the keys S2 221b and MAC2 221c could be derived from the second shared secret key K2 102k-2 from a step 220.

Figure 6:
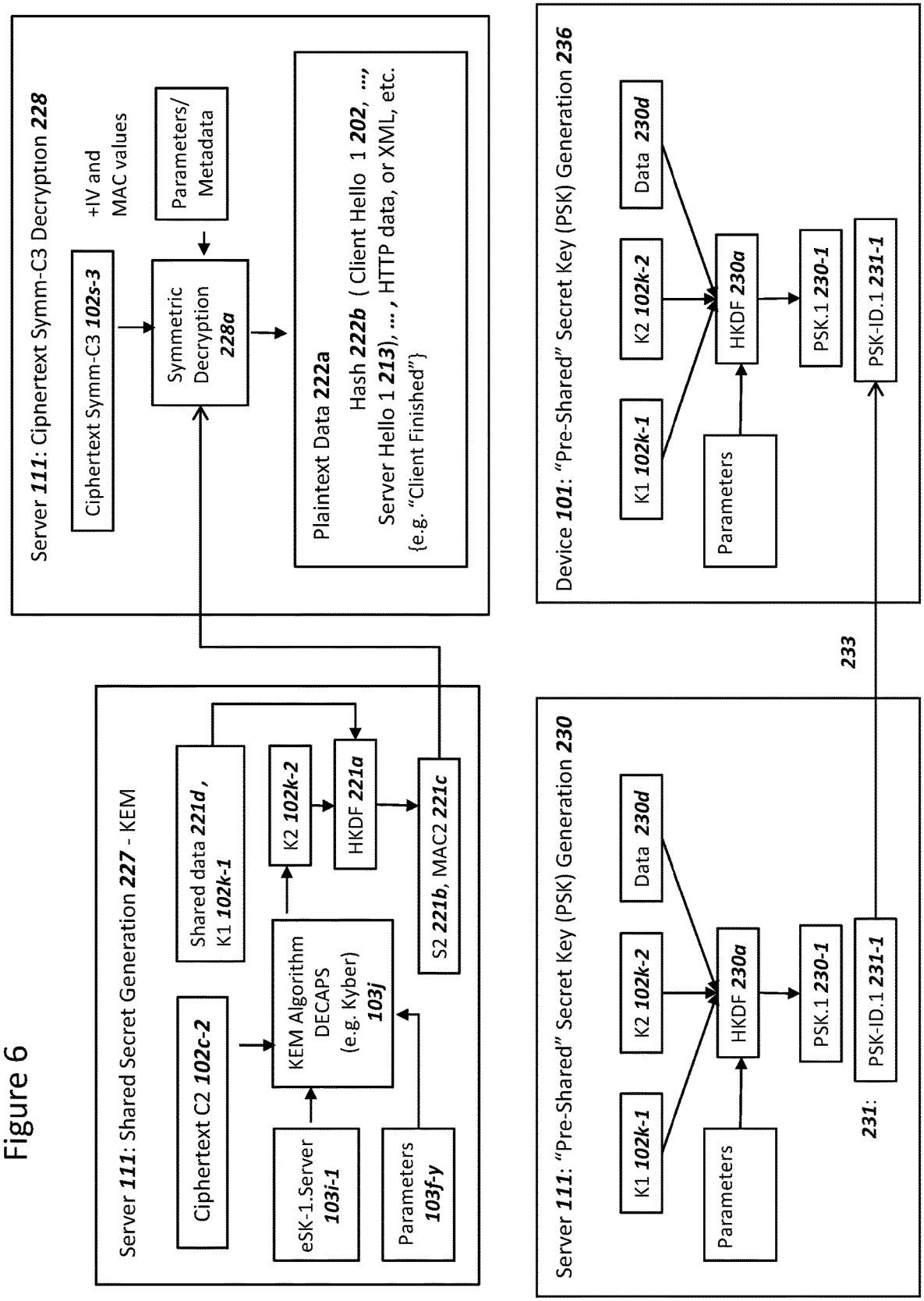
FIG. 6 is a flow chart illustrating exemplary steps for (i) a server conducting a key encapsulation mechanism to mutually derive the second symmetric ciphering key, (ii) the server conducting symmetric ciphering using the derived second symmetric ciphering key, and (iii) a device and the server mutually deriving a pre-shared secret key for session resumption, in accordance with exemplary embodiments.

At step 222, device 101 can select and process a plaintext 222a for encryption into a third symmetric ciphertext symm-C3 102s-3. A step 222 is also depicted and described in connection with FIG. 2a above. In exemplary embodiments the data or values for the plaintext 222a selected in a step 222 can include at least a secure hash value 222b over the data previously communicated between device 101 and server 111 in messages 202 and 205. Additional data mutually shared between device 101 and server 111 outside of messages 202 and 205 could be included in the generation of the secure hash value 222b. For some exemplary embodiments, such as with the last sentence of the paragraph above (where the first shared secret key K1 102k-1 was omitted from input into HKDF 221a), then the secure hash value 222b can also be over the first shared secret key K1 102k-1. As depicted in FIG. 6 below, the plaintext 222a can correspond to a "Client Finished" message in a handshake for an initial secure session 250. Note that plaintext 222a for a step 222 could include data generated by a device 101 for a server 111 in addition to a "Client Finished" message. The additional data for plaintext 222a could include an HTTP request, XML data, a JSON message, or other application data from the device 101 to server 111.

At step 223, device 101 can use symmetric encryption 223a with the plaintext 222a from a step 222 in order to generate the third symmetric ciphertext symm-C3 102s-3. A step 223 is also depicted and described in connection with FIG. 2a above. The symmetric encryption 223a can be included within cryptographic algorithms 101s for device 101. The symmetric encryption 223a can include input of (i) the parameters 103g-1 in message 213 (or in metadata 205a from a message 213) above and (ii) the symmetric ciphering key S2 221b and MAC key MAC2 221c from a step 221 above. In a step 223, device 101 can also use an initialization vector for the symmetric encryption 222a, where the initialization vector can be either (i) included with metadata for a message 225 below, or (ii) mutually derived with server 111 using the second KEM 101k/103j and HKDF 221a. After steps 220 through 223 in FIG. 5, device 101 can include the second asymmetric ciphertext C2 102c-2 and the third symmetric ciphertext symm-C3 102s-3 in the message 225 depicted in FIG. 2a and transmitted to server 111. For some embodiments, such as "Option (Y)" depicted and described in connection with FIG. 2a, the message 225 can include the second symmetric ciphertext symm-C2 102c-2 (which symmetrically encrypts the first asymmetric ciphertext C1 102c-1) and the third symmetric ciphertext symm-C3 102s-3.

At step 224, device 101 can use symmetric encryption 212a with input of the plaintext value of the second asymmetric ciphertext C2 102c-2 output from a KEM ENCAPS 101j in step 220. The plaintext value of the second asymmetric ciphertext C2 102c-2 can be the string of bits resulting from asymmetric encryption of data according to the KEM specified by KEM parameters 103f-y in step 220. The output of symmetric encryption 212a can comprise a "double encrypted" second symmetric ciphertext symm-C2 102s-2. The symmetric encryption 212a can be included within cryptographic algorithms 101s for device 101 and be equivalent for the symmetric encryption 212a used by server 111 in a step 212 above in FIG. 3. The symmetric encryption 212a can include input of (i) parameters or plaintext metadata such as from metadata 205a in a message 213 above in FIG. 2a and (ii) the first symmetric ciphering key S1 210b and MAC key MAC1 210c from a step 214 above in FIG. 4 for device 101. In a step 224, device 101 can also use an initialization vector for the symmetric encryption 212a, where the initialization vector can be either (i) included with metadata 205a in message 213, or (ii) mutually derived with server 111 using the HKDF 210a in a step 214. The second symmetric ciphertext symm-C2 102s-2 output from a step 224 could be included in the message 225, as depicted and described in connection with FIG. 2a.

Note that for some exemplary embodiments, the use of "double encryption" and symmetric ciphering key S1 210b could be omitted from a step 224, but the MAC key MAC1 210c could be included in the depicted step 224, such that MAC codes could be generated for the second asymmetric ciphertext C2 102c-2. In other words, as an alternative embodiment to the depiction of a second symmetric ciphertext symm-C2 102s-1 within FIG. 2a, for the transfer of the second asymmetric ciphertext C2 102c-2, the data for a message 225 could comprise "({C2{K2 102k-2}}MAC1 210c,) 102s-2', where 102s-2' indicates that symmetric encryption is omitted. MAC values generated by device 101 with at least the MAC key MAC1 210c in a step 224 can be included with the message 225. The MAC values for the second asymmetric ciphertext C2 102c-2 could be generated by a MAC algorithm such as, but not limited to, Poly1305. Or the tag values generated by a symmetric encryption step 212a with the MAC key MAC1 210b could be used and the symmetric encryption omitted. At step 226, server 111 can use symmetric decryption 215a with input of the "double encrypted" second symmetric ciphertext symm-C2 102s-2 received in a message 225.

Symmetric decryption 215a for a server 111 in a step 226 can used the same algorithm and be equivalent to the symmetric decryption 215a for a device 101 in a step 215 depicted and described in connection with FIG. 4 above. The output of symmetric decryption 215a can comprise the plaintext value of the second asymmetric ciphertext C2 102c-2 for input into KEM DECAPS 103j in step 227 by server 111 below in FIG. 6 and also in FIG. 2a above. The plaintext value of the second asymmetric ciphertext C2 102c-2 can be the string of bits resulting from asymmetric encryption output by device 101 in a step 220 (e.g. raw asymmetrically ciphered data without any symmetric ciphering). The symmetric decryption 215a can be included within cryptographic algorithms 103s for server 111. The symmetric decryption 215a can include input of (i) parameters or plaintext metadata such as from metadata 205a in a message 213 above in FIG. 2a (and also the same as used by device 101 in a step 224) and (ii) the symmetric ciphering key S1 210b and MAC key MAC1 210c from a step 209 above in FIG. 3 for server 111. In a step 226, server 111 can also use an initialization vector for the symmetric decryption 215a, where the initialization vector can be either (i) included with metadata in message 225, or (ii) mutually derived with device 101 using the HKDF 210a in a step 209.

Note that for some exemplary embodiments, the use of "double encryption" and symmetric ciphering key S1 210b could be omitted from a step 226, but the MAC key MAC1 210c could be included, such that MAC values could be verified for the second symmetric ciphertext symm-C2 102s-2. In other words, as an alternative embodiment to the depiction of a second symmetric ciphertext symm-C2 102s-1 within FIG. 2a, for the transfer of the second asymmetric ciphertext C2 102c-2, the data for a message 225 could comprise "({C2{K2 102k-2}} MAC1 210c,) 102s-2', where 102s-2' indicates that symmetric encryption is omitted. MAC values generated by device 101 with at least the MAC key MAC1 210c in a step 224 can be included with the message 225. Server 111 could conduct the step 226 with the MAC key MAC1 210c generated in a step 210 in order to verify the MAC values over the second asymmetric ciphertext C2 102c-2.

Within FIG. 5, each of the depicted steps 220 through 224 as described above can comprise computer executable instructions stored within RAM memory within device memory 101m as depicted and described in connection with FIG. 1 above and FIG. 11 below. The computer executable instructions could be stored in RAM memory during operation of device 101 including when the device performs the steps depicted in FIG. 2a above. Some of the depicted data processed by the computer executable instructions may also be stored in nonvolatile or storage memory within device memory 101bb (depicted and described in connection with FIG. 11 below), such as, but not limited to, the KEM ENCAPS function 101k, the symmetric encryption algorithm 223a, HKDF 221a, and the associated parameters. The processor 101p could execute the computer executable instructions in order use the input data and output data depicted and described for a device 101 in FIG. 5. The RAM memory and the storage memory for device memory 101m can be connected to the processor 101p via a system bus 101t.

FIG. 6

FIG. 6 is a flow chart illustrating exemplary steps for (i) a server conducting a key encapsulation mechanism to mutually derive the second symmetric ciphering key, (ii) the server conducting symmetric ciphering using the derived second symmetric ciphering key, and (iii) a device and the server mutually deriving a pre-shared secret key for session resumption, in accordance with exemplary embodiments. Server 111 can receive the message 225 from device 101 as depicted and described in connection with FIG. 2a and conduct a series of steps in order to process the message and securely send application data from the server to the device.

For embodiments depicted and described in connection with FIG. 2a, the server 111 could first conduct a step 226 depicted and described in connection with FIG. 2a and FIG. 5 to convert the second symmetric ciphertext symm-C2 102s-2 in order to read the second asymmetric ciphertext C2 102c-2. At step 227, server 111 can use (i) the specified KEM parameters 103f-y transmitted in message 213 along with (ii) cryptographic algorithms 103s to conduct the KEM DECAPS 103j function with the received second asymmetric ciphertext C2 102c-2. The server 111 can use the first server ephemeral private key of eSK.server 103i with the KEM DECAPS 103j and the received second asymmetric ciphertext C2 102c-2 in order to generate the second shared secret key K2 102k-2. The corresponding steps 220 and 221 for device 101 is also depicted and described in connection with FIG. 2a and FIG. 5 above. Note that for some PQC algorithms, the KEM DECAPS 103j function could fail for a small frequency of messages 225, such as less than one failure per million or billion KEM messages, and if a step 227 fails, then server 111 could send device 101 an error message.

At step 227 as depicted in FIG. 5, server 111 can include both (i) the HKDF 221a used by device 101 in a step 221, and (ii) the exact same input into the HKDF 221a for data input into HKDF 221a in order to generate the second symmetric ciphering key S2 221b and second MAC key MAC2 221c. In preferred exemplary embodiments where the mutual shared derivation of S2 and MAC2 by device 101 and server 111 are the same values for both sides, then server 111 should use the exact same input into HKDF 221a as used by device 101, which could be specified by both cryptographic algorithms 103s for server 111 and cryptographic algorithms 101s for device 101.

In a step 227, server 111 can use a hash-based key derivation function or an HMAC-based Extract-and-Expand Key Derivation Function (HKDF) 221a with at least the second shared secret key K2 102k-2 output from KEM DECAPS function 103j in order to generate both (i) a second symmetric ciphering key of S2 221b and a second message authentication code (MAC) key MAC2 221c. As depicted in FIG. 6, in preferred embodiments, the first shared secret key K1 102k-1 generated in a step 210 in FIG. 3 and FIG. 2a can also be input into the HKDF 221a.

In this manner and by including the first shared secret key K1 102k-1 as input into HKDF 221a, the symmetric ciphering key S2 and MAC key MAC2 can be mutually derived with device 101 more securely by including input from two separate shared secrets (e.g. K1 and K2, which can also be derived by separate KEM algorithms), compared to deriving the key S2 and MAC2 using only a single KEM algorithm (e.g. using either (i) K2 only or (ii) a single KEM for K1 and K2). In other words, the combination of K1 using a first KEM 103k/101j and K2 using a second KEM 101k/103j for HKDF 221a provides security equal to at least the stronger of the first KEM (for KEM ENCAPS 103k) and the second KEM (for KEM ENCAPS 101k). In exemplary embodiments, the parameters for the first KEM 103k/101j comprise a completely different type of KEM (e.g. lattice, code-based, or SIKE) than the type for the second KEM 101k/103j (e.g. lattice, code-based, or SIKE). Examples of types of algorithms are included in the Wikipedia summary for the NIST PQC project.

For a step 227, other shared data 221d input into HKDF 221a, besides shared secret keys K2 and/or K1, can include data from the message 213, such as, but not limited to, the server ephemeral public key ePK.server 103h from server 111, server extensions 103g, and/or parameters 103f-y. The shared data 221d for server 111 in a step 227 can comprise the same data for shared data 221d used by device 101 in a step 221 described above in FIG. 5. The shared data 221d could include data from message 202 and also metadata 205a input into the HKDF 210a above could also be input into HKDF 221a in FIG. 6. For other embodiments, the input of (i) the first shared secret key K1 102k-1 and/or (ii) data from message 202 and 213 could be omitted from inclusion in the calculation of HKDF 221a, and the keys S2 221b and MAC2 221c could be derived from the second shared secret key K2 102k-2 from a step 220.

At step 228, server 111 can use symmetric decryption 228a with the third symmetric ciphertext symm-C3 102s-3 received in message 225 in FIG. 2a above in order to read the plaintext 222a. A step 228 is also depicted and described in connection with FIG. 2a above. The symmetric decryption 228a can be included within cryptographic algorithms 103s for server 111. The symmetric decryption 228a can include input of the parameters specified in metadata 205a from a message 213 and the second symmetric ciphering key S2 221b and MAC key MAC2 221c from a step 227 above for server 111. Or, the symmetric decryption 228a can include input of the parameters specified in metadata from a message 225 generated by device 101.

In a step 228, server 111 can also use an initialization vector or nonce for the symmetric decryption 228a, where the initialization vector can be included with metadata. Note that a HKDF 221a in a step 227 could also derive the initialization vector for use by device 101 and server 111 with symmetric decryption 228a, and the resulting initialization vector could either be (i) included with plaintext metadata in a message 225, or (ii) omitted from plaintext metadata in a message 225 and server 111 could mutually derive the same initialization vector using the HDKF 221a from a step 227 above.

The resulting plaintext 222a from a step 228 can include a secure hash value 222b, which can be the same secure hash value 222b processed by device 101 in a step 222 above. For some exemplary embodiments, where the first shared secret key K1 102k-1 was omitted from input into HKDF 221a, then the secure hash value 222b can also be over at least the first shared secret key K1 102k-1. In exemplary embodiments, the plaintext 222a includes data for a "Client Finished" message. In a step 228, server 111 can calculate the secure hash value 222b over the same data from message 202 and 213 used by device 101 for generation of the secure hash value 222b in the message 225. If the calculated value 222b matches the received value 222b, then server 111 can consider the handshake for the secure session successfully completed.

At step 230, server 111 can generate or derive a "pre-shared" secret key (PSK) for device 101 and server 111 based on prior steps and the set of messages 202, 213, and 225, where the steps and messages before a step 230 are depicted and described in connection with FIG. 2a above. Although the "pre-shared" secret key (PSK) was not shared between device 101 and server 111 before the first "Client Hello 1" message in FIG. 2a, the PSK would be considered "pre-shared" before a second "Client Hello 2" message in (i) a secure session resumption 251a depicted in FIG. 2b and described above or (ii) a secure session resumption 251b depicted in FIG. 2c and described above. In other words, a first secure session established using the messages "Client Hello 1" 202 through "Server Finished 1" 233 in FIG. 2a above could be used to establish a PSK mutually shared between device 101 and server 111, where the PSK can be used to secure resumption or continuation of the first secure session. In this manner, a PSK can be (i) mutually generated or derived by both nodes during a first handshake and initial secure session 250, and (ii) subsequently used by both a device 101 and server 111 in a resumed session 251a in FIG. 2b or resumed session 251b in FIG. 2c. The PSK can both reduce the number of steps required to establish both encrypted and authenticated communications in session resumption 251 after a period of time transpires between the first handshake and initial secure session 250 and the session resumption 251 in FIG. 2a.

At step 230 server 111 can use at least the first shared secret key of K1 102k-1 from a step 209, the second shared secret key K2 102k-2 from a step 227, and additional data 230d with a HKDF 230a in order to generate the "pre-shared" secret key (PSK) 230-1 for use with session resumption 251 depicted and described in connection with FIG. 2a above. The additional data 230d can include plaintext data transmitted in the first message 202, the response second message 213, the third message 225, and/or the fourth message 235 depicted and described in connection with FIG. 2a. A protocol for the First Handshake and Initial Secure Session 250 in FIG. 2a, such as TLS, SSH, Wireguard etc., could specify some text values outside of the message flow between device 101 and server 111 for use as input of additional data 230d in a step 230 with a HKDF 230a to generate a PSK 230-1.

In exemplary embodiments, at least the first shared secret key of K1 102k-1 and the second shared secret key K2 102k-2 are used in a step 230 with a HDKF 230a to generate or derive the "pre-shared" secret key (PSK) 230-1 for use with session resumption 251. Since a server 111 may generate multiple different PSK for different devices 101 over time, an example of the specific PSK for device 101 resulting from the first session 250 is depicted with the designation of "PSK 230-1" in FIG. 6. A second PSK for either device 101 or a different device would have the designation of "PSK 230-2."

At step 231, server 111 can generate an identity or identifier for the PSK 230-1 of PSK-ID 231-1. The PSK-ID 231-1 can be unique for the PSK 230-1 and also with sufficient information entropy and "randomness" to not feasibly be guessed by a potential attacker. As one example, the PSK-ID 231-1 could be a secure hash value over the PSK 203-1, such as the SHA3-256 value of the PSK 230-1. Other possibilities exist as well for the generation of an identity of PSK-ID 231-1 for PSK 230-1 by server 111 or network 103 without departing from the scope of the present disclosure. A network 103 and/or server 111 in a step 231 could also store both the PSK 230-1 generated from a step 230 and the PSK-ID 231-1 in a network database 103db, as depicted in FIG. 2a above. A network database 103db could record a plurality of PSK and PSK-ID values, such that both the PSK and PSK-ID would be available for use in subsequent communications with device 101 and other devices, including the session resumption 251a depicted in FIG. 2a.

At step 236, device 101 can mutually generate or derive the "pre-shared" secret key (PSK) for device 101 and server 111 based on prior steps and the set of messages 202, 213, and 225, the steps and messages before a step 236 are depicted and described in connection with FIG. 2a above. At step 236 device 101 can use at least the first shared secret key of K1 102k-1 from a step 214, the second shared secret key K2 102k-2 from a step 220, and additional data 230d with a HKDF 230a in order to mutually derive the "pre-shared" secret key (PSK) 230-1 for use with session resumption 251 depicted and described in connection with FIG. 2a above. The additional data 230d can include plaintext data transmitted in the first message 202, the response second message 213, the third message 225, and/or the fourth message 235 depicted and described in connection with FIG. 2a. A protocol for the First Handshake and Initial Secure Session 250 in FIG. 2a, such as TLS, SSH, Wireguard etc., could specify some text values outside of the message flow between device 101 and server 111 for use as input of additional data 230d in a step 236 with a HKDF 230a to generate a PSK 230-1. In any case, the additional data 230d input into a HKDF 230a by a device 101 in a step 236 can be the same as the additional data 230d input into a HKDF 230a by a server 111 in a step 230.

In exemplary embodiments, the device 101 and the server 111 use the exact same data 230d as input into the HKDF 230a, along with the first shared secret key of K1 102k-1 from a step 214 and the second shared secret key K2 102k-2 from a step 220 in order to mutually derive the same value for the PSK 230-1. In addition, the sequence of bits for the data input into the HKDF 230*a* for device 101 and server 111 are the same, in order to ensure both device 101 and server 111 mutually derive the same value for PSK 230-1. In general, and for all HKDF described herein, the server 111 and device 101 input the same sequence of values for input into a HKDF in order to mutually derive the same keys.

In exemplary embodiments, at least the first shared secret key of K1 102*k*-1 and the second shared secret key K2 102*k*-2 are used in a step 236 with a HDKF 230*a* to generate or derive the "pre-shared" secret key (PSK) 230-1 for use with session resumption 251. As depicted for a step 236 in FIG. 6, additional mutually shared data 230*d* can be input as well. FIG. 6 also depicts that device 101 can receive an identity or identification information for the PSK 230-1 of PSK-ID 231-1 in a message 233, where the message 233 is depicted and described in connection with FIG. 2*a* above. In exemplary embodiments, the PSK-ID 231-1 in a message 233 is received within a fourth symmetric ciphertext symm-C4 102*s*-4. In a step 236, device 101 can then store the PSK 230-1 along with the identifier of PSK-ID 231-1 in memory 101*m*. Device 101 can use either or both of RAM memory and nonvolatile storage memory 101*bb* to store the PSK 230-1 along with the identifier of PSK-ID 231-1 in a step 236. In exemplary embodiments, the PSK 230-1 is stored by device 101 in the same physical memory as PSK-ID 231-1 in a step 236.

Within FIG. 6, each of the depicted steps 227 and 228 and 230 as described above can comprise computer executable instructions stored within RAM memory 111*m* as depicted and described in connection with FIG. 1 above and FIG. 11 below. The computer executable instructions could be stored in RAM memory 111*m* during operation of server 111 including when the server 111 performs the steps depicted in FIG. 2*a* above. Some of the depicted data processed by the computer executable instructions may also be stored in nonvolatile or storage memory 111*b*, such as, but not limited to, the KEM DECAPS function 103*j*, HKDF 221*a*, the symmetric decryption algorithm 228*a*, the HKDF 230*a*, and the associated parameters. The processor 111*p* or a processor system including processor 111*p* could execute the computer executable instructions in order use the input data and output data depicted and described for a server 111 in FIG. 6. The RAM memory 111*m* and the storage memory 111*b* can be connected to the processor 111*p* via a system bus 111*c*.

Within FIG. 6, the depicted step 236 as described above can comprise computer executable instructions stored within RAM memory within device memory 101*m* as depicted and described in connection with FIG. 1 above and FIG. 11 below. The computer executable instructions could be stored in RAM memory during operation of device 101 including when the device performs the steps depicted in FIG. 2*a* above. Some of the depicted data processed by the computer executable instructions may also be stored in nonvolatile or storage memory within device memory 101*bb* (depicted and described in connection with FIG. 11 below), such as, but not limited to, the HKDF 230*a*, and the associated parameters. The processor 101*p* could execute the computer executable instructions in order use the input data and output data depicted and described for a device 101 in FIG. 6. The RAM memory and the storage memory 101*bb* for device memory can be connected to the processor 101*p* via a system bus 101*t*.

FIG. 7*a*

FIG. 7*a* is a flow chart illustrating exemplary steps for a device and a server (i) mutually generating a third symmetric ciphering key using a "pre-shared" secret key (PSK) and (ii) mutually generating a message authentication code (MAC) value, the server generating a fifth symmetric ciphertext using the third symmetric ciphering key, and the device decrypting the fifth symmetric ciphertext using the third symmetric ciphering key, in accordance with exemplary embodiments.

A step 252 for device 101 to mutually generate a third symmetric ciphering key using a "pre-shared" secret key (PSK) was also depicted and described above in FIG. 2*b* and FIG. 2*c*. Before conducting the step 252, device 101 can store PSK 230-1 and PSK-ID 231-1 in memory. The PSK 230-1 could be derived in a step 230 by device 101 and the PSK-ID 231-1 could be received by device 101 in a fourth symmetric ciphertext symm-C4 102*s*-4. At step 252, device 101 can use the PSK 230-1 for the PSK-ID 231-1 selected in a step 201*d'* (depicted and described in connection with in FIG. 2*b* and FIG. 2*c* above) to generate a third symmetric ciphering key S3 252*b* and a third MAC key MAC3 252*c*. Note that the PSK 230-1 can be stored by device 101 in a step 236. At step 252, device 101 can generate a second random number 252*a* for use in the resumed session 251. At step 252, device 101 can use at least the PSK 230-1 and additional data 252*d* with a HKDF 252*h* in order to generate the third symmetric ciphering key S3 252*b* and a third MAC key MAC3 252*c*.

In addition, at step 252, device 101 can use the PSK 230-1, the second random number 252*a*, and additional data 252*d* with a HKDF 252*h* in order to generate the third symmetric ciphering key S3 252*b* and a third MAC key MAC3 252*c*. The additional data 252*d* in a step 252 could be mutually shared data between device 101 and server 111, such as any of the plaintext in a message 254 (for resumed session 251*a* in FIG. 2*b*) or message 254' (for resumed session 251*b* in FIG. 2*c*). The additional data 252*d* could also include data specified by the protocol for secure sessions and session resumption used by device 101 and server 111', such as text or numeric values stored with cryptographic algorithms 101*s* for device 101. The benefits of including the second random number 252*a* as input into the HKDF 252*h* include an increase of information entropy for the calculation of the third symmetric ciphering key S3 252*b* and a third MAC key MAC3 252*c*. Further, the inclusion of the second random number 252*a* as input into the HKDF 252*h* ensures (for device 101) that the server 111' receiving the second random number 252*a* also has access to PSK 230-1 for network 103.

A step 252 by server 111' can be equivalent or the same as a step 252 conducted by device 101, in order use the PSK 230-1 and mutually derive with device 101 the third symmetric ciphering key S3 252*b* and a third MAC key MAC3 252*c*. A step 252 by server 111 was also depicted and described in connection with FIG. 2*b* and FIG. 2*c* above. At step 252, server 111' can use the second random number 252*a* received from a message 254 or 254' (in FIG. 2*a* and FIG. 2*b*) with a HKDF 252*h*. At step 252, server 111' can use at least the PSK 230-1 and additional data 252*d* with a HKDF 252*h* in order to mutually derive the third symmetric ciphering key S3 252*b* and a third MAC key MAC3 252*c*. For some embodiments, the second random number 252*a* can be omitted by server 111' and device 101 for input into HKDF 252*h*. A nonce or initialization vector could also be generated in a step 252. In addition, the third symmetric ciphering key S3 252*b* could comprise a first portion S3 252*b*-1 for decryption by server 111' and a second portion S3 252*b*-2 for encryption by server 111'. Likewise, the third MAC key MAC3 252*c* can comprise two portions, where a first portion is for verification of MAC or tag values received from device 101 and a second portion is for generation of MAC values or tag values by server 111'

At step 253, device 101 can select data for generation of MAC values in order send data to server in an authenticated manner with message integrity. A step 253 for device 101 was also depicted and described in connection with FIG. 2b and FIG. 2c above. The selected data in a step 253 can comprise the identity for network 103a (such as, but not limited to a domain name), an identity of the PSK, which is PSK-ID 231-1 stored by device 101 in a step 235 above in FIG. 2a, the device extensions 101g' selected from a step 201d' above in FIG. 2b and FIG. 2c, and the second random number random 2 252a from a step 252 in FIG. 2b and FIG. 2c. Additional data could be selected in a step 253 for the generation of MAC values. Parameters from device extensions 101g or 101g' could also be selected in a step 253 for the generation of MAC values, or the parameters could be specified in a protocol for resuming the secure session. Device 101 could select a MAC algorithm 253a in a step 253, such as examples of Poly1305, HMAC algorithm, or AES with a mode such as CGM (to generate MAC values but not encrypt). Other possibilities exist as well for a MAC algorithm 253a used in a step 253 and for the generation of MAC values herein without departing from the scope of the present disclosure. At step 253, device 101 can input the selected data into the MAC algorithm 253a along with parameters and the third MAC key MAC3 252c generated in a step 252 in order to generate the MAC value tag1 253b. As depicted for step 253 in FIG. 7a, the device 101 can also input an initialization vector or nonce value generated by a step 252 for device 101 into the MAC algorithm 253a.

Server 111' can also conduct a step 253 in order to generate the same tag value tag1 253b. A step 253 for server 111' was also depicted and described in connection with FIG. 2b and FIG. 2c above. A step 253 by server 111 can be performed by selecting data for internal generation of MAC values in order to verify data from device 101 in an authenticated manner with message integrity. The selected data in a step 253 can be received in a message 254 or 254' (in FIG. 2b and FIG. 2c) and comprise (i) a network identity of 103a, (ii) the identity of the PSK, which is PSK-ID 231-1, (iii) the device extensions 101g', and (iv) the second random number random 2 252a. For some embodiments, the inclusion of a second random number 2 252a could be omitted from a message 254 and also omitted from a step 253 for both device 101 and server 111'. Both device 101 and server 111' can select the same data in a step 253 for input into a MAC algorithm 253a.

Additional data could be selected in a step 253 for the generation of MAC values. Parameters from device extensions 101g or 101g' could also be selected in a step 253 for the generation of MAC values, or the parameters could be specified in a protocol for resuming the secure session. Server 111' could select the same MAC algorithm 253a as device 101 in a step 253, such as examples of Poly1305, HMAC algorithm, or AES with a mode such as CGM (to generate MAC values but not encrypt). Other possibilities exist as well for a MAC algorithm 253a used in a step 253 and for the generation of MAC values herein without departing from the scope of the present disclosure. At step 253, server 111' can input the selected data into the MAC algorithm 253a along with parameters and the third MAC key MAC3 252c generated by server 111' in a step 252 in order to generate the MAC value of tag1 253b. As depicted for step 253 in FIG. 7a, the server 111' can also input an initialization vector or nonce value generated by a step 252 for server 111' into the MAC algorithm 253a.

FIG. 7a also depicts the server 111' generating a fifth symmetric ciphertext symm-C5 102s-5 using the third symmetric ciphering key S3 252b in a step 267. The use and operation of a step 267 is also depicted and described in connection with FIG. 2c above. At step 267, server 111' can use symmetric encryption 267a with the third asymmetric ciphertext C3 102c-3 from a step 209' above in FIG. 2c in order to generate a fifth symmetric ciphertext symm-C5 102s-5. The symmetric encryption 267a can be included within server cryptographic algorithms 103s for server 111'. The symmetric encryption 267a can correspond to the symmetric decryption 271a used by a device 101 in a step 271 also depicted in FIG. 7a. The symmetric encryption 267a can include input of at least (i) parameters or metadata from a message 254', and (ii) the symmetric ciphering key S3 252b and MAC key MAC3 252c from a step 252 above for server 111'.

A step 267 can also include server 111' processing metadata from message 254', where metadata can include plaintext data to conduct symmetric encryption 267a such as handshake headers, an initialization vector, an identity of the symmetric ciphering key to use, etc. Note that the output of the step 267 can comprise a "double encrypted" third ciphertext C3 102c-3, where (i) the first layer of encryption can be via asymmetric encryption via the third KEM 101k'/103j' using the second device ephemeral public key ePK-2.device 101h-2, and (ii) the second layer of encryption can be via symmetric encryption 267a of the third asymmetric ciphertext C3 102c-3 using keys S3 224b and MAC3 224c.

For some exemplary embodiments, a step 267 can be omitted and the third asymmetric ciphertext C3 102c-3 could be transmitted without the additional layer of symmetric encryption from a step 267. In other words, the data depicted as transmitted in a message 261' in FIG. 2c regarding the third asymmetric ciphertext C3 102c-3 could be "C3 102c-3" instead of the depicted value of "symm-C5 102s-5 ({C3 102c-3} S3 252b)."

Although the ciphertext from the party conducting an ENCAPS function is normally secure with the first level of asymmetric encryption, additional levels of security could be obtained for the system 200c in FIG. 2c by server 111' conducting a step 267 to "double encrypt" the third asymmetric ciphertext C3 102c-3 output from KEM ENCAPS 103k' with the second device ephemeral public key ePK-2.device 101h-2 also using symmetric encryption. In other words, by using "double encryption" via the fifth symmetric ciphertext symm-C5 102s-5, an attacker would need to break at least both symmetric encryption 267a and asymmetric encryption from KEM ENCAPS 103k' in order to determine K3 102k-3. Without "double encryption", an attacker would need to break only asymmetric encryption from KEM ENCAPS 103k' in order to determine K3 102k-3. In addition, the use of a "double encrypted" third asymmetric ciphertext C3 102c-3 by server 111' increases resistance to an attacker substituting a fake or fraudulent third asymmetric ciphertext C3 102c-3, if the attacker was able to obtain the second device ephemeral public key ePK-2.device 101h-2.

Or, in some embodiments where the third asymmetric ciphertext C3 102c-3 is not "double encrypted, (i) the fifth symmetric ciphertext symm-C5 102c-5 could omit the use of the symmetric ciphering key S3 252b by server 111' in a step 267 and (ii) the third asymmetric ciphertext C3 102c-3 could be processed in a step 267a during a step 267 with only the third MAC key MAC3 252c. In other words, the third MAC key MAC3 252c could be used with a MAC algorithm equivalent to MAC algorithm 253a in step 253 above in order to generate MAC values. For these embodiments, the MAC values transmitted by server 111' along with the third asymmetric ciphertext C3 102c-3 could be verified by device 101 using the MAC key MAC3 252c derived by device 101 in a step 252. In other words, a third asymmetric ciphertext C3 102c-3 in a message 261' depicted and described in connection with FIG. 2c above could comprise a third asymmetric ciphertext C3 102c-3 with MAC values generated using the third MAC key MAC3 252c, such that device 101 could verify the third asymmetric ciphertext C3 102c-3 was generated by server 111 that (i) conducted the KEM ENCAPS 103k' with the second device ephemeral public key ePK-2.device 101h-2 and (ii) operates with at least the PSK 230-1 (where the third MAC key MAC3 252c is derived from PSK 230-1).

At step 271, device 101 can use symmetric decryption 271a with the fifth symmetric ciphertext symm-C5 102s-5 received in message 261' in FIG. 2c above in order to read the third asymmetric ciphertext C3 102c-3. A step 271 is also depicted and described in connection with FIG. 2c above. The symmetric decryption 271a can be included within cryptographic algorithms 101s for device 101. The symmetric decryption 271a can include input of the parameters specified in metadata from a message 254' and the symmetric ciphering key S3 252b and MAC key MAC3 252c from a step 252 above. The output of a step 271 by device 101 can be a plaintext value of the third asymmetric ciphertext C3 102c-3 for use with a KEM DECAPS 101j'. For the embodiment described in the paragraph above, the use of a symmetric ciphering key S3 252b could be omitted and the step 271 could use the MAC key MAC3 252c in order to verify a MAC value in message 261' for the third asymmetric ciphertext C3 102c-3.

In a step 271, device 101 can also use an initialization vector for the symmetric decryption 271a, where the initialization vector can be included with message 261' in FIG. 2c. Note that a HKDF 252a could also derive the initialization vector for use by device 101 with symmetric decryption 271a, and the resulting initialization vector could either be (i) included with plaintext metadata in a message 261', or (ii) omitted from message 261' and device 101 could mutually derive the same initialization vector using the HDKF 252a from a step 252 above. The resulting plaintext comprising the third asymmetric ciphertext C3 102s-3 can be stored by device 101 in RAM memory 101m and also used with a step 214' as depicted and described in connection with FIG. 2c above.

FIG. 7b

FIG. 7b is a flow chart illustrating exemplary steps for a device and a server (i) mutually generating a fourth symmetric ciphering key using a third shared secret key and (ii) mutually generating a message authentication code (MAC) value, the server generating a sixth symmetric ciphertext using the fourth symmetric ciphering key, and the device decrypting the sixth symmetric ciphertext using the fourth symmetric ciphering key, in accordance with exemplary embodiments.

At step 268, server 111' can use (i) the PSK 230-1 for the PSK-ID 231-1 and (ii) the third shared secret key K3 102k-3 generated in a step 209' above in order to generate a fourth symmetric ciphering key S4 268b and a fourth MAC key MAC4 268c. Note that the PSK 230-1 can be stored by server 111' in a step 230. Exemplary details for a step 268 by server 111' are also depicted and described in connection with FIG. 2c above. At step 268, server 111' can use at least the PSK 230-1, the third shared secret key K3 102k-3 generated in a step 209', and additional data 268d with a HKDF 268a in order to generate the fourth symmetric ciphering key S4 268b and a fourth MAC key MAC4 268c. A nonce or initialization vector could also be generated in a step 268 by the HKDF 268a.

Additional data 268d can comprise data that is mutually shared between device 101 and server 111'. The additional data can include random2 252a from device 101 and a random number from server 111', where random number from server 111' can be included in plaintext 258a in a message 261' in FIG. 2c. The additional data 268d does not need to be secret data, such as the third shared secret key K3 102k-3, and the additional data 268d can comprise data that is publicly shared, such as either (i) transmitted across IP network 107 or (ii) specified in a protocol for secure sessions used by device 101 and server 111'. In general, as contemplated herein, the shared data 210d for HDKF 210a and the shared data 221d for HKDF 221a can also comprise data that is publicly shared according to the sentence above. The shared data 210d and 221d does not need to be secret data, where the secret data can comprise shared secret keys resulting from KEM.

For a step 268, the fourth symmetric ciphering key S4 268b could comprise a first portion S4 268b-1 for encryption by server 111' and a second portion S4 268b-2 for decryption by server 111'. Likewise, the fourth MAC key MAC4 268c can comprise two portions, where a first portion is for generation of MAC or tag values by server 111' and a second portion is for verification of MAC values or tag values received by server 111'. For some embodiments, the inclusion of the PSK 230-1 in a step 268 by device 101 and server 111' could be omitted from input into HKDF 268a, and the minimum input necessary for a HKDF 268a can comprise the third shared secret key K3 102k-3.

At step 268, device 101 can use (i) the PSK 230-1 for the PSK-ID 231-1 read from a step 201d' in FIG. 2c and (ii) the third shared secret key K3 102k-3 generated in a step 214' above in order to mutually derive the fourth symmetric ciphering key S4 268b and a fourth MAC key MAC4 268c. Note that the PSK 230-1 can be stored by device 101 in a step 236. Exemplary details for a step 268 by device 101 are also depicted and described in connection with FIG. 2c above. At step 268, device 101 can use at least the PSK 230-1, the third shared secret key K3 102k-3 generated in a step 214' additional data 268d with a HKDF 268a in order to generate the fourth symmetric ciphering key S4 268b and a fourth MAC key MAC4 268c. The additional data can include random2 252a from device 101 and a random number from server 111', where random number from server 111' can be included in plaintext 258a. A nonce or initialization vector could also be generated in a step 268 by the HKDF 268a.

In addition for a step 268, the fourth symmetric ciphering key S4 268b could comprise a first portion S4 268b-1 for decryption by device 101 and a second portion S4 268b-2 for encryption by device 101. Likewise, the fourth MAC key MAC4 268c can comprise two portions, where a first portion is for generation of MAC or tag values by device 101 and a second portion is for verification of MAC values or tag values received by device 101. In preferred embodiments, both device 101 and server 111' input the exact same values and sequence of bits into HKDF 268a in order to mutually derive the same keys S4 268b and MAC4 268c.

FIG. 7b also depicts device 101 and server 111' mutually generating a message authentication code (MAC) value in a step 269. A step 269 was also depicted and described in connection with FIG. 2c above. At step 269 server 111' and device 101 can generate a second MAC value or tag 2 269b. The plaintext for use in a step 269 can be the plaintext data 258a selected in a step 258 by server 111' in FIG. 2c above. Parameters from device extensions 101g or 101g' could also be selected in a step 269 for the generation of MAC values, or the parameters could be specified in a protocol for resuming the secure session. Server 111' could select a MAC algorithm 269a in a step 269, such as examples of Poly1305, HMAC algorithm, or AES with a mode such as CGM (to generate MAC values but not encrypt). Other possibilities exist as well for a MAC algorithm 269a used in a step 269 and for the generation of MAC values herein without departing from the scope of the present disclosure. At step 269, server 111' can input the plaintext data 258a into the MAC algorithm 269a along with parameters and the fourth MAC key MAC3 268c generated in a step 268 in order to generate the second MAC value tag2 269b. A step 269 by device 101 and server 111' can include a nonce or initialization vector generated in a step 268. Or, the nonce could be transmitted by server 111' to device 101 in a message 261' in FIG. 2c.

At step 269 device 101 can use the step 269 depicted and described in FIG. 7b for device 101 to generate the second MAC value or tag 2 269b. Note that the step 269 by both device 101 and server 111' can be the same, since both device 101 and server 111' should each internally generate the same MAC value tag2 269b. The plaintext for use in a step 269 can be the plaintext data 258a received in a message 261' by device 101. Parameters from device extensions 101g or 101g' could also be selected in a step 269 for the generation of MAC values, or the parameters could be specified in a protocol for resuming the secure session. Device 101 could select a MAC algorithm 269a in a step 269, such as examples of Poly1305, HMAC algorithm, or AES with a mode such as CGM (to generate MAC values but not encrypt). Other possibilities exist as well for a MAC algorithm 269a used in a step 269 and for the generation of MAC values herein without departing from the scope of the present disclosure. At step 269, device 101 can input the plaintext data 258a into the MAC algorithm 269a along with parameters and the third MAC key MAC3 268c generated in a step 268 in order to generate the second MAC value tag2 269b.

FIG. 7b depicts the server 111' generating a sixth symmetric ciphertext symm-C6 102s-6 using the fourth symmetric ciphering key S4 268b and fourth MAC key MAC4 268c in a step 270. At step 270, server 111' can use symmetric encryption 270a with the plaintext server hello data 259a from a step 259 for a resumed session 251b in FIG. 2c above, in order to generate the sixth symmetric ciphertext symm-C6 102s-6. A step 270 is also depicted and described in connection with FIG. 2c above. The symmetric encryption 270a can be included within cryptographic algorithms 103s for server 111'. The symmetric encryption 270a can include input of at least (i) the parameters or metadata mutually shared between device 101 and server 111', and (ii) the fourth symmetric ciphering key S4 268b and MAC key MAC4 268c from a step 268 above. Step 270 can include the input of an initialization vector or nonce, and also include an output of a MAC value or tag for the sixth symmetric ciphertext symm-C6 102s-6, where the MAC value or tag for sixth symmetric ciphertext symm-C6 102s-6 is generated using the MAC key MAC4 268c from a step 268 above.

FIG. 7b depicts the device 101 decrypting the sixth symmetric ciphertext symm-C6 102s-6 using the fourth symmetric ciphering key S4 268b and fourth MAC key MAC4 268c in a step 273. At step 273, device 101 can use symmetric decryption 273a with the received sixth symmetric ciphertext symm-C6 102s-6 from a message 261' in order to read the plaintext server hello data 259a. A step 273 is also depicted and described in connection with FIG. 2c above. The symmetric decryption 273a can be included within cryptographic algorithms 101s for device 101. The symmetric decryption 273a can include input of at least (i) the parameters or metadata mutually shared by device 101 and server 111', and (ii) the fourth symmetric ciphering key S4 268b and MAC key MAC4 268c from a step 268 above. Step 273 can include the input of an initialization vector or nonce, and also include an output of a MAC value or tag for the sixth symmetric ciphertext symm-C6 102s-6, where the MAC value or tag for the sixth symmetric ciphertext symm-C6 102s-6 is generated using the MAC key MAC4 268c from a step 268 above. Device 101 can compare the received tag value with the calculated tag value using MAC4 268c in order to verify the message integrity for the sixth symmetric ciphertext symm-C6 102s-6. Device 101 can then process the plaintext server hello data 259a, such using the data in order to generate a second "Client Finished" message 264' as depicted and described in connection with FIG. 2c above.

FIG. 8

FIG. 8 is an illustration of (i) an exemplary set of cryptographic parameters for a key encapsulation mechanism (KEM) stored and used by a device and a server, and (ii) conducting two KEM for the cryptographic parameters in accordance with exemplary embodiments. As depicted and described above in connection with FIG. 1, a device 101 can store a set of cryptographic parameters 101x for conducting supported key encapsulation mechanisms (KEM), and a server 111 can also store a set of cryptographic parameters 103x for conducting supported KEM. The cryptographic parameters can specify sets of values for cryptographic algorithms that are supported by device 101 and network 103 or server 111 in order to support the systems and methods depicted herein. Cryptographic parameters 101x and 103x or subsets thereof can be recorded in non-volatile memory in each of device 101, and server 111 or network 103. Cryptographic parameters 101x and 103x can include values for an identification for a collection or subset of a KEM set identifier 801, a key length 802, a type or name 803, and a secure hash algorithm 804. The depicted parameters in FIG. 8 focus on parameters relevant to conducting a KEM, and different parameters could be used for symmetric ciphering algorithms and also digital signature algorithms.

As contemplated herein, when a selected set of cryptographic parameters such as using the words or description "parameters 101f" or "cryptographic parameters 101f" can specify a set of rows in the parameters for FIG. 8. An individual row of parameters or values can specify sufficient information such that both (i) a device 101 and a server 111 can conduct a KEM.KeyGen function to generate a PKI key pair, and (ii) using the PKI keys to conduct either KEM ENCAPS or KEM DECAPS functions (such as those depicted and described in connection with FIG. 1). KEM parameters ID 801 can be an identity for a row or set of values for cryptographic parameters 101x and 103x. PK key length 802 could represent the length of a public key in bits or bytes. Cryptographic parameters 101*x* and 103*x* could include the length of a private key in bits or bytes as well.

The type or name 803 for a set of cryptographic parameters can specify the cryptographic algorithms to use with PKI keys, such as the exemplary names for post-quantum cryptography cryptographic algorithms. The field of post-quantum cryptography continues to develop with proposed algorithms currently undergoing revisions for standardization as of November 2021. In general, the leading candidates for post-quantum cryptography key encapsulation mechanisms propose using (i) lattice-based cryptography, (ii) code-based cryptography, or (iii) Supersingular elliptic curve isogeny cryptography (SIKE), as described by the Wikipedia PQC article.

Hash algorithm 804 in cryptographic parameters 101*x* and 103*x* can be the name of a secure hash algorithm, such as the exemplary SHA-256 algorithm depicted, which may also be referred to as "SHA-2". Hash algorithm 804 can also be used in a hash-based key derivation function within the KEM ENCAPS and KEM DECAPS function to generate keys K1 102*k*-1 and K2 102*k*-2.

Although not depicted in FIG. 8, settings or parameters for a symmetric ciphering algorithms can specify (i) the identity or name of a symmetric ciphering algorithm such as "AES", "AES-SIV", 3DES, Blowfish, etc, and (ii) settings for the symmetric ciphering algorithm. Other possibilities exist as well for data within cryptographic parameters, such as the specification of point compression, encoding rules such as distinguished encoding rules (DER), ASN or CSN syntax notation, padding rules, byte or bit orders such as big endian, little endian, etc.

The specific steps, calculations, and logic for a key encapsulation mechanism (KEM) can be specified according to the name 803. In general a key encapsulation mechanism or key exchange specified by a name 803 can comprise using a public key from a remote entity and a local private key in order to derive a shared secret. The key encapsulation mechanism could also comprise (i) encrypting a message "m" or random number for deriving a symmetric ciphering key (or value for the key) with a public key and (ii) decrypting the message "m" or random number for deriving the symmetric ciphering key (or value for the key) with a corresponding private key. Note the name 803 can support different types. In exemplary embodiments depicted in FIG. 8, a first KEM 103*k*/101*j* specified by device 101 for the first device ephemeral public key ePK-1.device 101*h*-1 with the KEM parameters 101*f*-*x* and ID 801 of "3" can support a type of "Kyber" (where a different type would be "SIKE" for the ID of "4" in parameters 101*f*).

FIG. 8 also depicts and exemplary mutual negotiation of parameters for a first KEM 103*k* (ENCAPS) and 101*j* (DECAPS), and herein referred to as "KEM 103*k*/101*j*", and a second KEM 101*k* (ENCAPS) and 103*j* (DECAPS). Note that both the first KEM 103*k*/101*j* and second KEM 101*k*/103*j* can use a different type of KEM (e.g. completely different algorithm such as a first type based on lattices and a second type based on SIKE, etc.) For some exemplary embodiments (not depicted in FIG. 8), the first KEM 103*k*/101*j* and second KEM 101*k*/103*j* could use the same type or name 803 for the algorithm of the KEM. For example, the first KEM 103*k*/101*j* could use KEM parameters 101*f*-*x* that specifies an exemplary name 803 of "Kyber-1024" and the second KEM 101*k*/103*j* could also use the same KEM parameters 101*f*-*x* that specifies the same exemplary name 803 of "Kyber-1024". For the embodiment described in the previous sentence, the KEM parameters 103*f*-*y* from FIG. 2*a* would be the same as KEM parameters 101*f*-*x* But, in preferred exemplary embodiments, the first KEM 103*k*/101*j* can use a first type (e.g. lattice based) that is completely different than a second type for the second KEM 101*k*/103*j* (e.g. code-based or SIKE). In this manner, the security of a system 200*a* for application data can be at least as strong as the stronger of the type for the first KEM 103*k*/101*j* and the second KEM 101*k*/103*j*.

As depicted in FIG. 8, device 101 in a step 201*d* from FIG. 2*a* can select a set of supported cryptographic KEM parameters 101*f*, which can comprise a list of all parameters supported by device 101 for conducting both a first KEM 103*k*/101*j* and a second KEM 101*k*/103*j*. The set of supported cryptographic KEM parameters 101*f* could be recorded or stored in device 101 in nonvolatile memory during a device configuration step 201*b*. In exemplary embodiments, this set of supported cryptographic KEM parameters 101*f* comprises at least two rows with distinct KEM parameter identities 801. Each KEM parameter ID 801 could be designated a unique byte code for a field in specifications or standards for a secure session between device 101 and server 111. For the depicted parameters 101*f* in FIG. 8, device 101 could support an exemplary list of KEM parameters IDs 801 of "1" through "4". Other possibilities exist as well for parameters 101*f* supported by device 101 without departing from the scope of the present disclosure.

In addition, device 101 in a step 201*d* from FIG. 2*a* can select a specific set of cryptographic KEM parameters 101*f*-*x* from parameters 101*f*, where the specific set of parameters 101*f*-*x* can be used to derive the first device ephemeral public key ePK-1.device 101*h*-1. As depicted and described in connection with FIG. 2*a*, both the selected set of cryptographic KEM parameters 101*f* and the specific KEM parameters 101*f*-*x* for ePK-1.device 101*h*-1 can be included in a message 202 in FIG. 2*a* above. For the exemplary embodiment depicted in FIG. 8, the KEM parameters 101*f*-*x* can be a subset of parameters 101*f* and could have and ID 801 of "3".

As depicted in FIG. 8, server 111 can store a set of supported cryptographic KEM parameters 103*f* in storage memory 111*b* during a server configuration step 201*c*. The KEM parameters 103*f* can comprise a list of all parameters supported by server 111 for conducting both a first KEM 103*k*/101*j* and a second KEM 101*k*/103*j*. In exemplary embodiments, this set of supported cryptographic KEM parameters 103*f* comprises at least two rows with distinct KEM parameter identities 801. For the depicted parameters 103*f* in FIG. 8, server 111 could support an exemplary list of KEM parameters IDs 801 of "3" through "6". In preferred exemplary embodiments, the received and specified KEM parameters 101*f*-*x* can match a row or KEM parameters ID 801 for KEM parameters 103*f*.

As described in a step 203*b* in FIG. 2*a*, a server 111 can select a row or set of KEM parameters 103*f*-*y* that matches all of the following conditions: (i) is supported by the received KEM parameters 101*f*, (ii) is supported by the stored KEM parameters 103*f*, (iii) is different than the specified and received KEM parameters 101*f*-*x* for ePK-1.device 101*h*-1, and (iv) KEM parameters 103*f*-*y* use a different type than KEM parameters 101*f*-*x* (e.g. different algorithm such as code-based if 101*f*-*x* specifies lattice-based, etc). For the exemplary data depicted in FIG. 8, a server 111 can select the row with ID 801 of "4" for KEM parameters 103*f*-*y*, which meets all of the criteria (i) through (iv) from the above sentence. All of KEM parameters 101*f*, 103*f*, 101*f*-*x* and 103*f*-*y* could represent different data or values than that depicted in FIG. 8 without departing from the scope of the present disclosure, such as including or specifying different KEM mechanisms and parameters. But in preferred exemplary embodiments, the parameters 103*f-y* for the second KEM 101*k*/103*j* support all of the criteria for (i) through (iv) as described in this paragraph.

For other exemplary embodiments, such as for devices 101 with more restricted memories that can support a single KEM algorithms such as a single row in the table depicted in FIG. 8, then both the first KEM 103*k*/101*j* and the second KEM 101*k*/103*j* could be conducted with the same KEM parameters. In other words, for the embodiment described in this paragraph, the parameters 101*f*, 101*f-x*, and 103*f-y* could be the same and use the same values and settings for both the first KEM 103*k*/101*j* and the second KEM 101*k*/103*j*. In other words, as one example for the embodiment within this paragraph, both parameters 101*f-x* and 103*f-y* could support the same KEM algorithm such as Kyber768.

FIG. 8 also depicts the use of (i) first KEM parameters 101*f-x* for a first KEM 103*k*/101*j* and (ii) second KEM parameters 103*f-y* for a second KEM 101*k*/103*j*. The depiction in FIG. 8 provides additional details showing the formatting and use of KEM parameters with PKI keys and ENCAPS and DECAPS functions. A device 101 can select first KEM parameters 101*f-x* as a subset of KEM parameters 101*f* stored within device 101. The first KEM parameters 101*f-x* can be used with the KEM KeyGen function to generate a first device ephemeral public key ePK-1.device 101*h*-1-*x* and first device ephemeral private key eSK-1.device 101*i*-1. The first KEM 103*k*/101*j* can comprise server 111 KEM ENCAPS 103*k* and device 101 KEM DECAPS 101*j* using the first KEM parameters 101*f-x*.

A server 111 can select second KEM parameters 103*f-y* as a subset of KEM parameters 103*f* stored within server 111, and also preferably matching all of the conditions (i) through (iv) for a step 203*b* described three paragraphs above. The selected second KEM parameters 103*f-y* from a step 203*b* can be used with the KEM KeyGen function to generate a server ephemeral public key ePK.server 103*h* and server ephemeral private key eSK.server 103*i*. The second KEM 101*k*/103*j* can comprise server 111 KEM DECAPS 103*j* and device 101 KEM ENCAPS 101*j* using the second KEM parameters 103*f-y*.

FIG. 9*a*

Figure 9A:
FIG. 9a is a flow chart illustrating exemplary steps for a device to use multiple key encapsulation mechanisms (KEM) and resume a secure session with a "pre-shared" secret key, in accordance with exemplary embodiments.

FIG. 9*a* is a flow chart illustrating exemplary steps for a device to use multiple key encapsulation mechanisms (KEM) and resume a secure session with a "pre-shared" secret key, in accordance with exemplary embodiments. The steps and components depicted in FIG. 9*a* for a device 101 are also depicted and described in connection with FIG. 2*a*, FIG. 2*b*, and additional Figures above. The steps and data for device 101 to securely conduct multiple different KEM and resume a secure session can comprise (i) a first portion depicted in FIG. 9*a* and also (ii) a continuing, second portion depicted in FIG. 9*b* below. Note that some steps can be conducted in a different order or sequence than depicted in FIG. 9*a* and also FIG. 9*b* below. As one example, a step 223 below could be conducted before a step 224, and other possibilities exist as well for the sequence of some steps without departing from the scope of the present disclosure.

Figure 11:
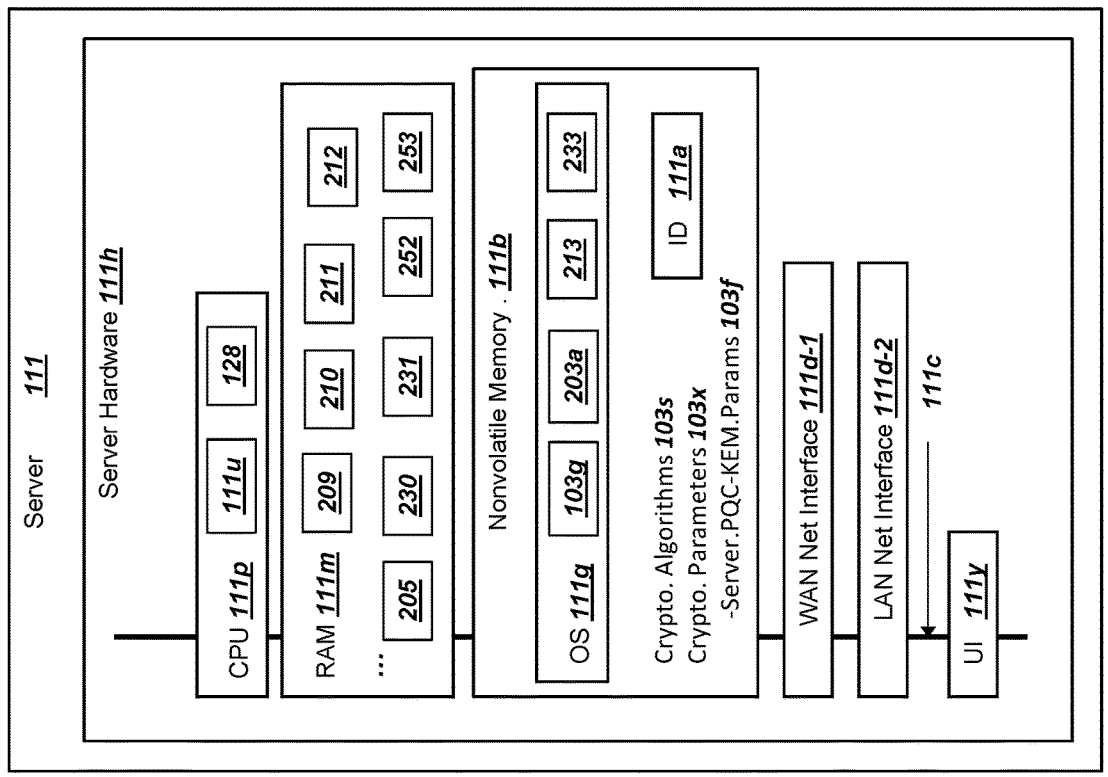
FIG. 11 is a graphical illustration of hardware, firmware, and software components for a server and a device, in accordance with exemplary embodiments.

Device 101 can use the device hardware or electrical component depicted for device 101 in FIG. 1 and FIG. 11 in order to conduct the steps in FIG. 9*a*. Note that a device 101 can conduct the additional steps as depicted in FIG. 2*a*, FIG. 2*b*, and additional Figures above. FIG. 9*a* provides a summary of the primary steps for a preferred embodiment where a device 101 can (i) use multiple KEM (e.g. ENCAPS and DECAPS) and parameters for multiple different KEM with a server 111 and (ii) securely resume a session from a mutually derived "pre-shared" secret key.

At step 201*b*, device 101 can store in nonvolatile memory for device memory 101*m* both (i) device KEM parameters 101*f* and (ii) cryptographic algorithms 101*s*. Note that the server KEM parameters 103*f* can be stored within server 111, and the device and server KEM parameters 101*f* and 103*f* can have a common subset comprising a first KEM algorithm 803 with ID 801 and a second KEM algorithm 803 with a different ID 801 as depicted and described in connection with FIG. 8. The device KEM parameters 101*f* can be a subset of cryptographic parameters 101*x*. The data stored in device 101 can be stored during a configuration step for device 101. An example of the device KEM parameters 101*f* are depicted and described in connection with FIG. 8 above (with the data depicted as "in 202", which is a message generated by device 101 in FIG. 2*a*).

At step 201*d*, device 101 can select (i) server ID 111*a* and/or a network ID 103*a*, and (ii) a first subset 101*f-x* of KEM parameters 101*f*, which can comprise a first KEM algorithm 803 with ID 801. As contemplated herein, the first subset 101*f-x* of the device KEM parameters 101*f* can be referred to as KEM parameters 101*f-x*. The KEM parameters 101*f-x* can specify a first type of KEM algorithm (e.g. lattice-based, code-based, or SIKE), such as, but not limited to, the KEM parameter 101*f-x* depicted FIG. 8. The KEM parameters 101*f-x* can be selected in a step 201*d* based on device 101 anticipating or previously storing that server 111 supports the KEM parameters 101*f-x* in order to conduct a first KEM 805 as depicted and described in connection with FIG. 8.

At step 201*e*, device 101 can generate an ephemeral private key 101*h*-1 and ephemeral public key 101*i*-1 using the first subset 101*f-x* of KEM parameters 101*f* (or a first KEM algorithm), which are also referred to herein as KEM parameters 101*f-x*. At step 201*e*, device 101 can use a PQC.KeyGen function 101*q* to generate a device ephemeral PKI key pair comprising a device ephemeral public key ePK-1.device 101*h*-1 and a device ephemeral private key eSK-1.device 101*i*-1. The algorithm used to generate the ephemeral PKI key pair can be specified in KEM parameters 101*f-x* selected by device 101 in a step 201*d* above.

At step 202, device 101 can send a first message 202 to a server 111, wherein message 202 includes at least (i) the first set of KEM parameters 101*f*, (ii) the device ephemeral public key ePK-1.device 101*h*-1-*x*, and (iii) the selected subset 101*f-x* of KEM parameters 101*f-x* for the ephemeral public key 101*h-x*. The selected subset of KEM parameters 101*f-x* sent in a first message 202 can comprise an identity or identifier for a first KEM algorithm of KEM parameters 101*f-x*, such as a name or code 801 for the first KEM algorithm. A message 202 from device 101 to server 111 is depicted and described in connection with FIG. 2*a* above. Additional data could be included in a message 202, such as device extensions 101*g*, which could specify additional cryptographic parameters and settings supported by device 101. The message 202 could comprise a "Client Hello" message and also include an identity of network 103 or server 111 (or an IP address), such that the message 202 could be routed to server 111.

At step 213, device 101 can receive a second message 213, wherein message 213 includes at least (i) a first asymmetric ciphertext C1 102*c*-1 for the first subset 101*f-x* (or first KEM algorithm) of KEM parameters 101*f*, and a first symmetric ciphertext symm-C1 102*s*-1. A message 213 from the server 111 is depicted and described in connection with FIG. 2a above. Additional data could be included in a second message 213 as well, such as metadata 205a that can specify symmetric ciphering algorithms and a HKDF 210a for device 101 to use in order to process the data in message 213. The server 111 could conduct the steps 203a through 212 in FIG. 2a and additional Figures above in order to generate the message 213. Note that a server ephemeral public key of ePK.server 103h can be included within the first symmetric ciphertext symm-C1 102s-1.

At step 214, device 101 can generate a first shared secret key K1 102k-1 with (i) KEM DECAPS 101j and the first asymmetric ciphertext C1 102c-1 and (ii) device ephemeral private key eSK-1.device 101i-1 and the first subset 101f-x (or first KEM algorithm) of KEM parameters 101f. A step 214 is depicted and described in connection with FIG. 2a above and also FIG. 4. The device 101 can use the device ephemeral private key of eSK-1.device 101i-1 with the KEM DECAPS 101j and the received first asymmetric ciphertext 102c-1 in order to generate the first shared secret key K1 102k-1. A step 214 can also include device 101 using a HKDF 210a with at least the first shared secret key K1 102k-1 to generate a symmetric ciphering key S1 210b and MAC key MAC1 210c.

At step 215, device 101 can decrypt the first symmetric ciphertext symm-C1 102s-1 using the first shared secret key K1 102k-1. A step 215 is depicted and described in connection with FIG. 2a above and also FIG. 4. At step 215, device 101 can use (i) a symmetric ciphering algorithm 215a from cryptographic algorithms 101s supporting the device extensions 101g and specified in metadata 205c, (ii) the symmetric ciphering key S1 210b from the HKDF 210a in a step 214, in order to convert the first symmetric ciphertext symm-C1 102s-1 into a plaintext 211a. The symmetric decryption 215a can include input of the parameters specified in metadata 205a from a message 213 and the symmetric ciphering key S1 210b and MAC key MAC1 210c from a step 214 above. In a step 215, device 101 can also use an initialization vector for the symmetric decryption 215a, where the initialization vector can be included with metadata 205a (or derived from HKDF 210a in step 214). Plaintext 211a can include at least a server ephemeral public key ePK.server 103h and KEM parameters 103f-x for the ePK-.server 103h. KEM parameters 101f-x selected by device 101 in a step 201d can be referred to as a first subset 101f-x of device KEM parameters 101f. KEM parameters 103f-y in plaintext 211a can be referred to as a second subset of device KEM parameters 101f.

In exemplary embodiments, the first subset 101f-x (or first KEM algorithm) of KEM parameters 101f in message 202 can specify a first type of KEM algorithm (e.g. lattice-based, code-based, or SIKE), such as, but not limited to, the KEM parameter 101f-x depicted FIG. 8. In exemplary embodiments, the second subset 103f-y (or second KEM algorithm) of KEM parameters 101f received in message 213 can specify a second type of KEM algorithm (e.g. lattice-based, code-based, or SIKE, but also different than the first type for KEM parameters 101f-x in message 202 above). An exemplary KEM parameters 103f-y according to this exemplary embodiment is depicted and described in connection with FIG. 8 above. Other embodiments, such as for devices with more restricted memory or processing resources or lower security requirements, then the first subset 101f-x and second subset 103f-x can specify the same KEM algorithm, such as a single row for KEM parameters 101f in FIG. 8.

At step 220, device 101 can generate (i) a second shared secret key K2 102k-2 and a second asymmetric ciphertext C2 102c-2 using (ii) KEM ENCAPS 101k and the server ephemeral public key ePK.server 103h and the second subset 103f-y of KEM parameters 101f. A step 220 is depicted and described in connection with FIG. 2a and also FIG. 5. At step 220, device 101 can use both (i) the received server ephemeral public key of ePK.server 103h from message 213 and (ii) the specified subset of parameters 103f-y (or second KEM algorithm) for the server ephemeral public key and the second KEM101k/103j in order to generate both (x) a second asymmetric ciphertext C2 102c-2 and (y) a second shared secret key K2 102k-2. At step 220, device 101 can use a KEM ENCAPS function 101k with both (i) and (ii) from the previous sentence in order to generate both (x) the asymmetric ciphertext C2 102c-2 and (y) the second shared secret key K2 102k-2.

After step 220, and as depicted and described in connection with FIG. 2a and FIG. 5, a device 101 can use a step 221 with a HKDF 221a with at least the second shared secret key K2 102k-2 to generate a second symmetric ciphering key S2 221b and MAC key MAC2 221c. Note that in exemplary embodiments, the HKDF 221a can receive input of both the first shared secret key K1 102k-1 from a step 214 and the second shared secret key K2 102k-2 from a step 220.

In a step 224, the second asymmetric ciphertext C2 102c-2 could also be encrypted into a "double encrypted" second symmetric ciphertext symm-C2 102s-2, where device 101 encrypts the second asymmetric ciphertext C2 102c-2 using the mutually shared symmetric ciphering key S1 210b and MAC key MAC1 210c from a step 214. As depicted in FIG. 4 above, device 101 can (i) derive the mutually shared symmetric ciphering key S1 210b and MAC key MAC1 210c using a step 214 and then (ii) encrypt the second asymmetric ciphertext C2 102c-2 into a "double encrypted" second symmetric ciphertext symm-C2 102s-2 using a step 224 from FIG. 5.

Although not depicted in FIG. 9a, for some embodiments the use of a "double encrypted" second asymmetric ciphertext C2 102c-2 (in the form of the second symmetric ciphertext symm-C2 102s-2) could be omitted and a step 224 could be skipped. For these embodiments, then a second asymmetric ciphertext C2 102c-2 could be transmitted without adding symmetric encryption and the second asymmetric ciphertext C2 102c-2 could be included in a message 225 below. In addition, for these embodiments and as described above, the second asymmetric ciphertext C2 102c-2 could include a MAC value generated by device 101 with the MAC key MAC1 210b and a MAC algorithm, equivalent to a MAC algorithm 253 depicted in FIG. 7a above.

At step 223, device 101 can use (i) a symmetric ciphering algorithm 223a from cryptographic algorithms 101s supporting the metadata 205a, (ii) the symmetric ciphering key S2 221b from the HKDF 221a in a step 221 (after step 220 above), and (iii) plaintext data such as for a "Client Finished" and/or application data to generate the third symmetric ciphertext symm-C3 102s-3. The use an operation of a step 223 is depicted and described in connection with FIG. 2a and also FIG. 5. The symmetric encryption 223a can include input of the symmetric ciphering key S2 221b and MAC key MAC2 221c from a step 221 above. As depicted in FIG. 9a, the steps and messages for device 101 to conduct a resumed secure session 251 with server 111 continues in FIG. 10b below.

FIG. 9b

FIG. 9b is a flow chart illustrating exemplary steps for a device to conduct multiple key encapsulation mechanisms (KEM) and resume a secure session with a "pre-shared" secret key, in accordance with exemplary embodiments. The steps and components depicted in FIG. 9b for a device 101 are also depicted and described in connection with FIG. 2a, FIG. 2b, and additional Figures above. The steps and data for device 101 to securely conduct multiple KEM and resume a secure session can comprise (i) a first portion depicted in FIG. 9a above and also (ii) a continuing, second portion depicted in FIG. 9b herein.

After steps 223 and 224 above, device 101 can send or transmit a third message 225 to server 111, wherein the third message 225 includes at least the second symmetric ciphertext symm-C2 102s-2 and third symmetric ciphertext symm-C3 102s-3. Device 101 can use a network interface 101r such as a radio to transmit the message 225. An exemplary message 225 is also depicted and described in connection with FIG. 2a above. Although not depicted in FIG. 9b, server 111 can conduct the series of steps depicted and described in connection with FIG. 2a in order to process the message 225.

Device 111 can then receive from server 111 a fourth symmetric ciphertext C4 102s-4 in a fourth message 233. A message 233 is also depicted and described in connection with FIG. 2a above. Device 101 can conduct a step 234 in order to decrypt the fourth symmetric ciphertext symm-C4 102s-4 using at least S2 221b in order to read a PSK-ID 231-1. The plaintext from a fourth symmetric ciphertext symm-C4 102s-4 can include additional data, including server application data or a "server finished" message. The plaintext read from decrypting the fourth symmetric ciphertext symm-C4 102s-4 can include the plaintext value of the PSK-ID 231-1, which can be used as an identity for a "pre-shared" secret key for a resumed session 251.

At step 236, device 101 can use at least the first shared secret key of K1 102k-1 and the second shared secret key K2 102k-2 with a HKDF 230a in order to generate the "pre-shared" secret key (PSK) 230-1 for use with session resumption 251. A step 236 is also depicted and described in connection with FIG. 2a and FIG. 6 above. The PSK 230-1 can be mutually derived with a server 111 using a step 236, where the server 111 conducts the corresponding step 230. Device 101 can store both the PSK 230-1 from a step 236 and the PSK-ID 231-1 from a step 234 in device memory, for subsequent use with a resumed session 251. Although not depicted in FIG. 9b, device 101 could then transmit and received encrypted application data with server 111. Device 101 and server 111 could then close the first session. The series of steps 201d through 236 in FIGS. 9a and 9b can comprise a first session 250 for device 101.

After a time interval 240, device 101 may select to conduct a resumed session 251a with network 103. Device 101 could conduct a step 252, where a step 252 is depicted and described in connection with FIG. 2b and FIG. 7a above. In step 252, device 101 could generate a random number 252a for use with the resumed session 251a. In step 252, device 101 can generate a third symmetric ciphering key S3 252b and third MAC key MAC3 252c using HKDF 252h with PSK 230-1 and the random number 252a.

At step 253, device 101 can select data for generation of MAC values in order send data to server in an authenticated manner with message integrity. Exemplary details for a step 253 by device 101 are also depicted and described in connection with FIG. 7a above. The selected data in a step 253 can comprise the identity of the PSK, which is PSK-ID 231-1 stored in a step 235 above, the device extensions 101g' selected from a step 201d' above, and the second random number random 2 252a from a step 252. At step 253, device 101 can input the selected data into the MAC algorithm 253a along with parameters and the third MAC key MAC3 252c generated in a step 252 in order to generate the MAC value tag1 253b.

Device 101 can send a message 254 to network 103 for resumption 251a, wherein message 254 includes at least PSK-ID 231-1, device extensions 101g', the random number 252a, and the MAC value tag1 253b. Device extensions 101g' can be selected and processed in a step 201d' by device 101, as depicted and described in connection with FIG. 2b above. The device extensions 101g' can be extensions for a resumed session 251a. The message 254 can comprise the equivalent of a "Client Hello" message for secure protocol, with information for conducting a resumed session 251a.

Device 101 can receive a message 261 from network 103, wherein message 261 includes plaintext 258a, a tag2 253c over plaintext 258a, and a sixth symmetric ciphertext symm-C6 102s-6. A message 261 is depicted and described in connection with FIG. 2b above. Device 101 can then conduct steps 253' and 262 in order to verify tag2 253c over plaintext 258a with the third MAC key MAC3 252c generated by device 101 in a step 252 above. At step 253' device 101 can use the step 253 depicted and described in FIG. 7a for device 101 to generate the MAC value or tag 2 253c. The plaintext for use in a step 253' can be the plaintext data 258a received in a message 261. At step 262, device 101 can compare the generated MAC value of tag2 253c from a step 253' by device 101 with the received MAC value of tag2 253c from message 261. If the generated MAC value of tag2 253c from a step 253' by device 101 is equal to or the same as the received MAC value of tag2 253c from message 261, then the device 101 can verify and authenticate that the plaintext data 258a in message 261 was transmitted by the network 103, where the network 103 also stores and operates with the PSK 230-1 derived or generated by device 101 in step 236.

Device 101 can then conduct a step 263 to decrypt the sixth symmetric ciphertext symm-C6 102s-6 using the third symmetric ciphering key S3 252b from a step 252. Device 101 can read a plaintext server hello 259a from a step 263. Although not depicted in FIG. 9b, device 101 could conduct and additional series of steps to transmit and receive encrypted and authenticated data with network 103 after the step 263.

FIG. 10a

Figure 10A:
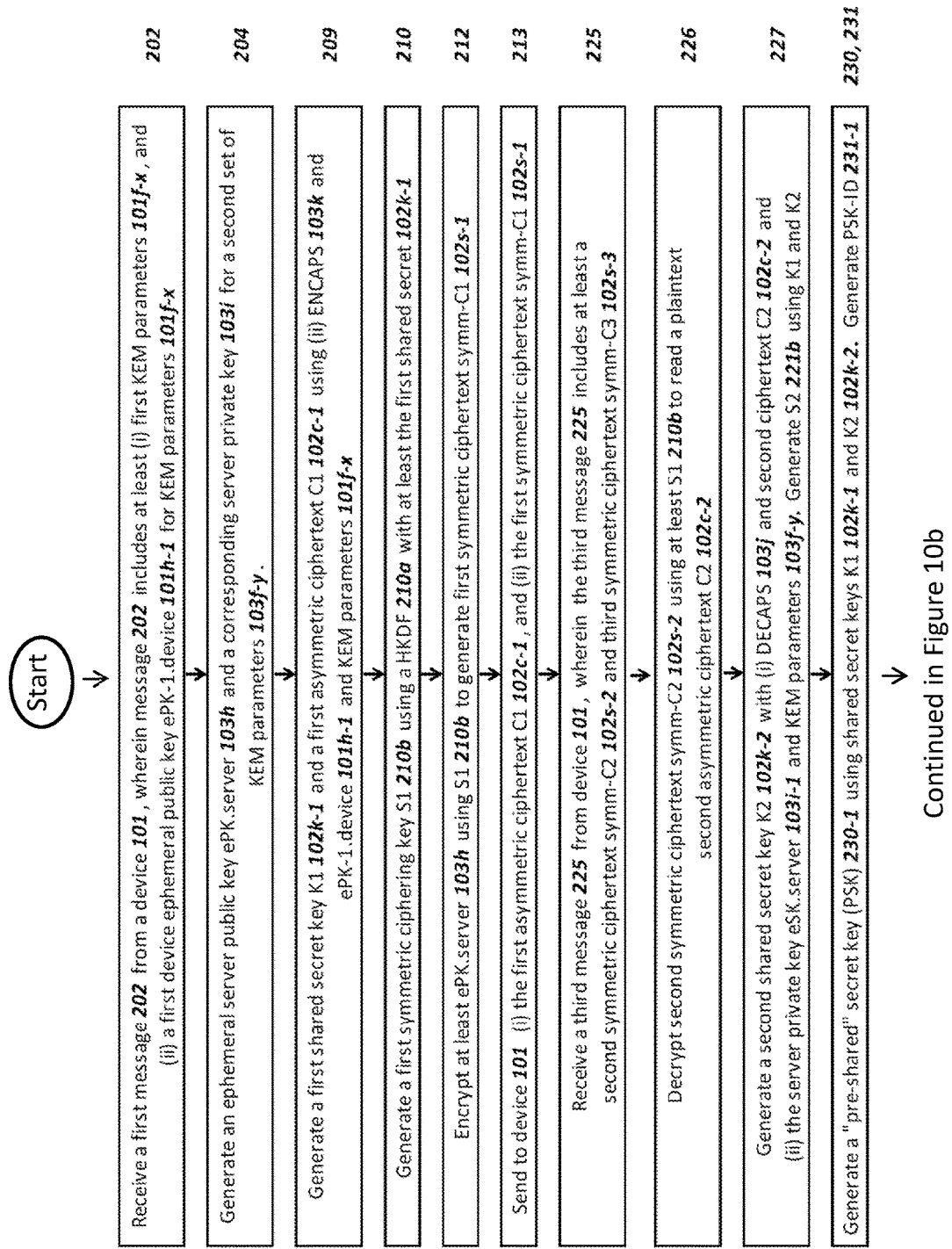
FIG. 10a is a flow chart illustrating exemplary steps for a server to conduct multiple key encapsulation mechanisms (KEM) and resume a secure session with a "pre-shared" secret key, in accordance with exemplary embodiments.

FIG. 10a is a flow chart illustrating exemplary steps for a server to conduct multiple key encapsulation mechanisms (KEM) and resume a secure session with a "pre-shared" secret key, in accordance with exemplary embodiments. The steps and components depicted in FIG. 10a for a server 111 are also depicted and described in connection with FIG. 2a, FIG. 2b, and additional Figures above. The steps and data for server 111 to securely conduct multiple KEM and resume a secure session can comprise (i) a first portion depicted in FIG. 10a and also (ii) a continuing, second portion depicted in FIG. 10b below.

Server 111 can use the server hardware depicted for server 111 in FIG. 1 and FIG. 11 in order to conduct the steps in FIG. 10a. Note that a server 111 can conduct the additional steps as depicted in FIG. 2a, FIG. 2b, and additional Figures above. FIG. 10a provides a summary of the primary steps for a preferred embodiment where a server 111 can (i) use multiple types of KEM algorithms or parameters for multiple different KEM with a device 101 and (ii) securely resume a session from a mutually derived "pre-shared"

secret key. Note that some steps can be conducted in a different order or sequence than depicted in FIG. 10a and also FIG. 10b below. As one example, a step 209 below could be conducted before a step 204, and other possibilities exist as well for the sequence of some steps without departing from the scope of the present disclosure.

Server 111 can receive a first message 202 from a device 101, wherein message 202 includes at least (i) first KEM parameters 101f-x, and (ii) a first device ephemeral public key ePK-1.device 101h-1 for KEM parameters 101f-x. As depicted and described for a message 202 in FIG. 2a, the message 202 can also include device KEM parameters 101f, where an example of KEM parameters 101f are also depicted and described in connection with FIG. 8.

Although not depicted in FIG. 10a, server 111 could conduct a step 203b using the device KEM parameters 101f, the server KEM parameters 103f, and the received device KEM parameters 101f-x for ePK-1.device 101h-1 in order to select server KEM parameters 103f-y as a subset of server KEM parameters 103f. At step 204, server 111 can use a KeyGen function to generate an ephemeral server public key ePK.server 103h and a corresponding server private key eSK.server 103i for a second set of KEM parameters 103f-y.

At step 209, server 111 can use both (i) the received device ephemeral public key of ePK-1.device 101h-1 and (ii) the specified subset of KEM parameters 101f-x for the device ephemeral public key and the first KEM 103k/101j in order to generate both (x) a first asymmetric ciphertext C1 102c-1 and (y) a first shared secret key K1 102k-1. A step 209 by server 111 is depicted and described in connection with FIG. 2a and FIG. 4 above.

At step 210, server 111 can use a hash-based key derivation function or an HMAC-based Extract-and-Expand Key Derivation Function (HKDF) 210a (depicted and described in FIG. 3 above) with at least the first shared secret key K1 102k-1 output from KEM ENCAPS function 103k in step 209 in order to generate both (i) a first symmetric ciphering key of S1 210b and (ii) a first message authentication code (MAC) key MAC1 210c. Additional mutually shared data 210d for both device 101 and server 111 could be input into HKDF 210a in a step 210 in order to derive both (i) (i) a first symmetric ciphering key of S1 210b and (ii) a first message authentication code (MAC) key MAC1 210.

At step 212 server 111 can encrypt at least ePK.server 103h using S1 210b to generate the first symmetric ciphertext symm-C1 102s-1. A step 212 is depicted and described in connection with FIG. 2a above. The encryption step 212 can also include encrypting additional data for a Server Hello 1 message 213, such as server extensions 103g, a server digital certificate 103c, KEM parameters 103f-y for the server ephemeral public key ePK.server 103h, and a server digital signature for a "CertificateVerify" value 207c. Server 111 can then send to device 101 (i) the first asymmetric ciphertext C1 102c-1, and (ii) the first symmetric ciphertext symm-C1 102s-1 in a message 213. The message 213 is also depicted and described in connection with FIG. 2a above, and the message 213 can comprise a second message in a first session 250.

Server 111 can then receive a third message 225 from device 101, wherein the third message 225 includes a second symmetric ciphertext symm-C2 102s-2 and third symmetric ciphertext symm-C3 102s-3. For some embodiments, the second symmetric ciphertext symm-C2 102s-2 can omit "double encryption" of a second asymmetric ciphertext C2 102c-2, and message 225 can include the second asymmetric ciphertext C2 102c-2 with a MAC value using MAC1 210c. For embodiments with the a second symmetric ciphertext symm-C2 102s-2 in a message 225, in a step 226 server 111 can decrypt the second symmetric ciphertext symm-C2 102s-2 using at least S1 210b to read a plaintext second asymmetric ciphertext C2 102c-2. The step 226 is also depicted and described in connection with FIG. 2a and FIG. 5 above.

At step 227, server 111 can generate a second shared secret key K2 102k-2 with (i) KEM DECAPS 103j and the second ciphertext C2 102c-2 from step 226 and (ii) the server private key eSK.server 103i-1 and KEM parameters 103f-y. In step 227, server 111 can generate a second symmetric ciphering key S2 221b and a second MAC key MAC2 221c using at least (i) the first shared secret key K1 102k-1 from a step 210 and (ii) the second shared secret key K2 102k-2 from the KEM DECAPS 103j and (iii) the HKDF 221a. A step 227 is also depicted and described in connection with FIG. 2a and FIG. 6 above. Although not depicted in FIG. 9a, additional shared data 221d that is mutually shared between device 101 and server 111 can also optionally be input into the HKDF 221a.

At step 230, server 111 can generate a "pre-shared" secret key PSK 230-1 for a resumed session 251 with device 101 as depicted and described in connection with FIG. 2a and FIG. 6 above. An HKDF 230a can be used with at least the (i) the first shared secret key K1 102k-1 from a step 210 and (ii) the second shared secret key K2 102k-2 from the KEM DECAPS 103j. The HKDF 230a can include additional data 230d that is mutually shared between device 101 and server 111. At step 231 server 111 can generate a unique identity or identifier for PSK 230-1 of PSK-ID 231-1. Server 111 can then store the PSK 230-1 and PSK-ID 231-1 in a network database 103d for subsequent use by either server 111 or a different server 111' in order to conduct a resumed session 251 with device 101. As depicted in FIG. 10a, the steps and messages for server 111 to conduct a resumed secure session 251 with device 101 continues in FIG. 10b below.

FIG. 10b

Figure 10B:
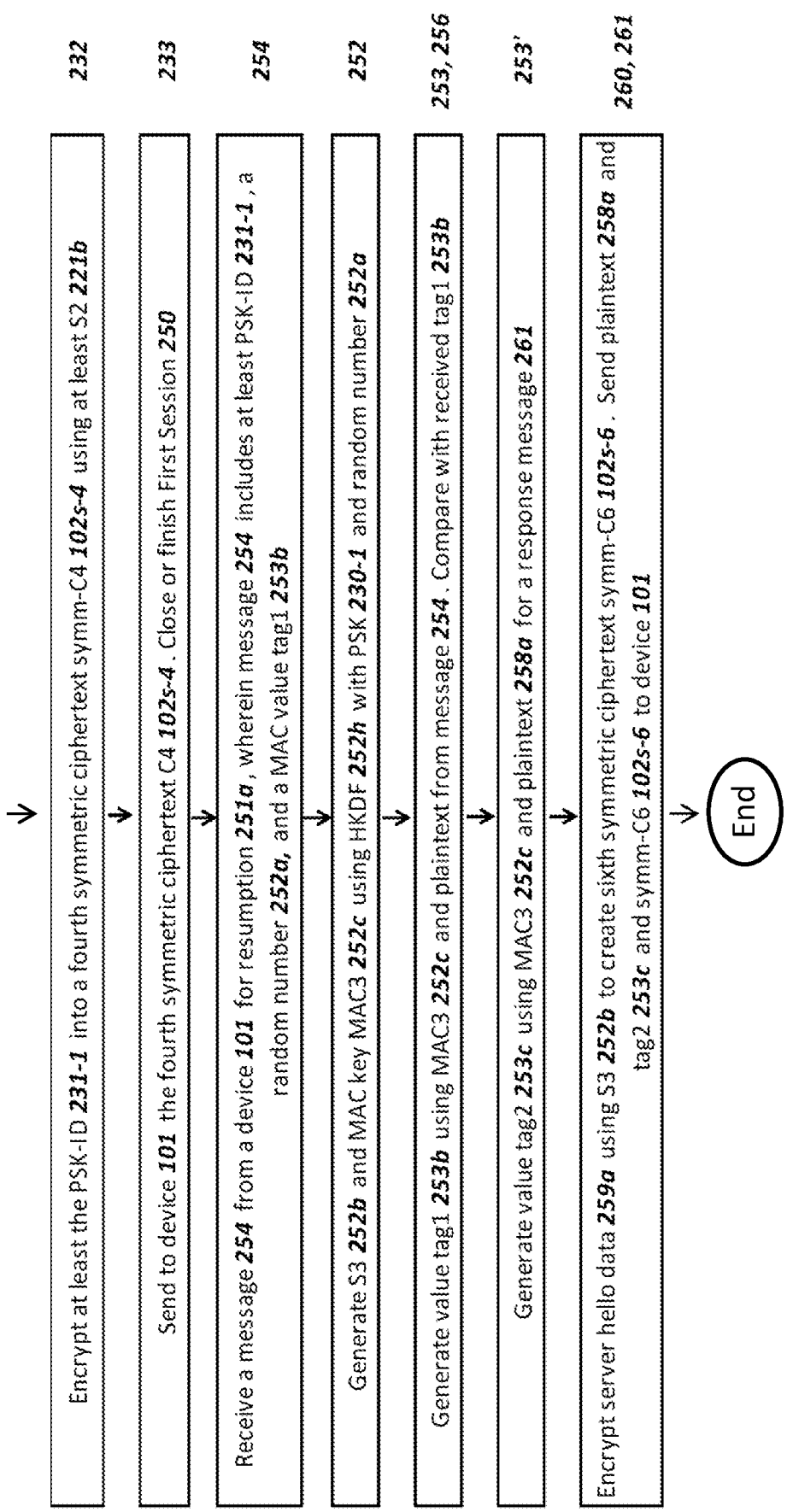
FIG. 10b is a flow chart illustrating exemplary steps for a server to conduct multiple key encapsulation mechanisms (KEM) and resume a secure session with a "pre-shared" secret key, in accordance with exemplary embodiments.

FIG. 10b is a flow chart illustrating exemplary steps for a server to conduct multiple key encapsulation mechanisms (KEM) and resume a secure session with a "pre-shared" secret key, in accordance with exemplary embodiments. The steps and components depicted in FIG. 10b for a server 111 are also depicted and described in connection with FIG. 2a, FIG. 2b, and additional Figures above. The steps and data for server 111 to securely conduct multiple KEM and resume a secure session can comprise (i) a first portion depicted in FIG. 10a above and also (ii) a continuing, second portion depicted in FIG. 10b herein.

Server 111 can use the server hardware depicted for server 111 in FIG. 1 and FIG. 11 in order to conduct the steps in FIG. 10b. Note that a server 111 can conduct the additional steps as depicted in FIG. 2a, FIG. 2b, and additional Figures above. FIG. 10a provides a summary of the primary steps for a preferred embodiment where a server 111 can (i) use multiple KEM algorithms or parameters for different KEM (including ENCAPS and DECAPS) with a device 101 and (ii) securely resume a session from a mutually derived "pre-shared" secret key 230-1. Note that some steps can be conducted in a different order or sequence than depicted in FIG. 10a above and also FIG. 10b herein. As one example, a step 253' below could be conducted before a step 256, and other possibilities exist as well for the sequence of some steps without departing from the scope of the present disclosure.

At step 232, server 111 can encrypt at least the PSK-ID 231-1 into a fourth symmetric ciphertext symm-C4 102s-4 using at least the second symmetric ciphering key S2 221b derived from a step 227. A step 232 is also depicted and described in connection with FIG. 2a above. At step 232, server 111 can select a plaintext comprising at least the PSK-ID 231-1 from a step 231 for encryption into the fourth symmetric ciphertext symm-C4 102s-4. The plaintext selected in a step 232 could also include additional data for device 101, such as the "application data" depicted in FIG. 2a within a message 233. The plaintext selected in a step 232 could also include a secure hash value for a "server finished" field within the message 233, similar to the "client finished" hash value 222b in a step 228 in FIG. 6. The encryption in a step 232 with keys S2 221b and MAC key 221c can be equivalent to a step 228 by server 111 depicted in FIG. 5 above, except using the keys for symmetric encryption and MAC value generation instead of symmetric decryption and MAC value verification. The output from the encryption and MAC value generation in a step 232 can comprise the fourth symmetric ciphertext symm-C4 102s-4.

Server 111 can then send device 101 a message 233 comprising (i) the fourth symmetric ciphertext C4 102s-4 from the step 232 above. A message 233 is also depicted and described in connection with FIG. 2a above. Although not depicted in FIG. 10b, server 111 could then continue the first session 250 by sending and receiving encrypted and authenticated application data in a step 237b, where a step 237b is depicted and described in connection with FIG. 2a. At the conclusion of a step 237b, server 111 can then close or finish the first session 250 with a message 238 as depicted and described in connection with FIG. 2a above.

After a period of time 240a as depicted and described in connection with FIG. 2a, server 111 can then receive a message 254 from a device 101 for resumption 251a, wherein message 254 includes at least PSK-ID 231-1, a random number 252a, and a MAC value tag1 253b. The message 254 is depicted and described in connection with FIG. 2c above. Additional data could be included in a message 254, such as device extensions 101g' for a resumed session 251a. Although not depicted in FIG. 10b, the message received by server 111 could be a message 254' as depicted and described in connection with FIG. 2c, where the message 254 could also include a second device ephemeral public key ePK-2.device 101h-2.

Although not depicted in FIG. 10b, server 111 can conduct a step 255 from FIG. 2c to use the received PSK-ID 231-1 from the message 254 to securely query the network database 103db for the corresponding PSK 230-1. At step 252, server 111 can generate a third symmetric ciphering key S3 252b and third MAC key MAC3 252c using HKDF 252h with at least PSK 230-1 and random number 252a. A step 252 for server 111 is also depicted and described in connection with FIG. 2b and FIG. 7a above. The HKDF 252h can include additional data 252d that is mutually shared between device 101 and server 111.

At step 253, server 111 can generate a value tag1 253b using MAC3 252c and plaintext from message 254, such as the PSK-ID 231-2. A step 253 for server 111 is also depicted and described in connection with FIG. 2b and FIG. 7a above. At step 256, the generated value tag1 253b can be compared with received tag1 253b in order to authenticate and verify the message 254 was transmitted by device 101.

Although not depicted in FIG. 10b, server 111 could conduct a step 258 in order to select a plaintext 258a for a response message 261 from server 111 to device 101. The step 258 was depicted and described in connection with FIG. 2b above. Server 111 can then conduct a step 253' to generate value tag2 253c using MAC3 252c and plaintext 258a for a response message 261. A step 253' for server 111 is also depicted and described in connection with FIG. 2b above. The step 253' can correspond to the step 253 for server 111 depicted and described in connection with FIG. 7a, except using plaintext 258a for input into the MAC algorithm 253a. At step 253', server 111' can input the plaintext data 258a into the MAC algorithm 253a along with parameters and the third MAC key MAC3 252c generated in a step 252 in order to generate the second MAC value tag2 253c. In this manner, a step 253' can be used for verification of the plaintext 258a from server 111 in a subsequent message 261.

Although not depicted in FIG. 10b, server 111 could conduct a step 259 in order to select server hello data 259a for a response message 261 from server 111 to device 101. The step 259 and server hello data 259a was depicted and described in connection with FIG. 2b above. At step 260, server 111 can encrypt server hello data 259a using the third symmetric ciphering key S3 252b from a step 252 to create a sixth symmetric ciphertext symm-C6 102s-6. The step 260 by server 111 is also depicted and described in connection with FIG. 2b above. Server 111' can then use the network interface 111d to transmit or send the second "Server Hello" message 261 to device 101, where the message 261 can include at least plaintext data 258a, the second MAC value of the tag2 253c, and the sixth symmetric ciphertext symm-C6 102s-6 as encrypted server hello data 259a.

For some embodiments, a different server 111' than server 111 in network 103 can conduct the series of steps 254 through 261 in FIG. 10b, such as if network 103 uses a load balancer and the message 254 is received by the server 111' and the message 202 is received by a server 111. Or, if server 111 receives both the message 202 and message 254, then a server 111 could conduct all of the steps and send/receive all of the messages described in FIG. 10a and FIG. 10b.

FIG. 11

FIG. 11 is a graphical illustration of hardware, firmware, and software components for a server and a device, in accordance with exemplary embodiments. FIG. 11 is illustrated to include several components that can be common within a server 111 and a device 101. Server 111 can include or operate with server hardware 111h and the device 101 can include or operate with device hardware 101u. Server 111 may consist of multiple electrical components in order to communicate with a plurality of devices 101 over time. In exemplary embodiments and as depicted in FIG. 11, server 111 can include a server identity 111a, a processor 111p (depicted as "CPU 111p"), random access memory (RAM) 111m, storage memory 111b (depicted as "nonvolatile memory 111b"), a Wide Area Network (WAN) interface 111d-1, a LAN interface 111d-2, a system bus 111c, and a user interface (UI) 111y.

Server identity 111a could comprise a preferably unique alpha-numeric or hexadecimal identifier for server 111, such as an Ethernet MAC address, a domain name service (DNS) name, a Uniform Resource Locator (URL), an owner interface identifier in an IPv6 network, a serial number, an IP address, or other sequence of digits to uniquely identify each of the many different possible nodes for a server 111 connected to an IP network 107. Server identity 111a can preferably be recorded in a non-volatile memory and recorded by a network 103 upon configuration of a server 111, such as during a configuration step 201c depicted and described in connection with FIG. 2a above. Server identity 111a may also be a number or string to identify an instance of server 111 running in a cloud or virtual networking environment. For some embodiments, server identity 111a can be the same as network identity 103a.

In exemplary embodiments, server 111 can operate with multiple different server identities 111a, such as a server identity 111a comprising a DNS name and a second server identity 111a comprising an IP address and a port number. A third server identity 111a could comprise an MAC address for WAN interface 111d-1. A fourth server identity 111a can comprise an identifier for an instance of a virtual machine operating in a cloud networking environment. A different server 111 could be associated with a different IP address and port number or a different MAC address for WAN interface 111d-1. In exemplary embodiments, (i) a server 111 with a server identity 111a can operate with a first Internet Protocol address and port (IP: port) number with a first set of server extensions 103g and (ii) a second or different server 111 with a second server identity 111a can operate with a second IP: port number and a second set of server extensions 103g. Other possibilities exist as well for the use of a plurality of different server identities 111a without departing from the scope of the present disclosure.

The CPU 111p can comprise a general purpose processor appropriate for higher processing power requirements for a server 111, and may operate with multiple different processor cores. CPU 111p can comprise a processor for server 111 such as an ARM® based processor or an Intel® based processor such as belonging to the XEON® family of processors, and other possibilities exist as well. For some exemplary embodiments, the CPU 111p can be based on a processor using the RISC-V architecture. CPU 111p can utilize bus 111c to fetch instructions from RAM 111m and operate on the instruction. CPU 111p can include components such as registers, accumulators, and logic elements to add, subtract, multiply, and divide numerical values and record the results in RAM 111m or storage memory 111b, and also write the values to an external interface such as WAN interface 111d-1 and/or LAN interface 111d-2. In exemplary embodiments, CPU 111p can perform the mathematical calculations for KEM DECAPS 103j, KEM ENCAPS 103k, symmetric ciphering, etc. depicted and described in connection with in FIG. 1, FIG. 2a, etc., above. A CPU 111p could also comprise a "system on a chip" (SOC) with a plurality of cores, including examples of the Amazon Graviton family of processors such as the Graviton 2 or the Apple "M" family of processors such as the M1 MAX, M2, etc.

For servers 111 operating as a virtual machine or a container such as, but not limited to, within Docker or Kubernetes, the server 111 could be allocated a portion of a physical processor CPU 111p from a host operating system in order for the server 111 to conduct processing and computational steps as contemplated herein. The portion of a physical processor CPU 111p for the server 111 could comprise different embodiments without departing from the scope of the present disclosure. A CPU 111p for a server 111 could comprise a "time slice" of a physical SOC within a physical host server (such as repeated brief periods of time on the order of milliseconds or less for CPU 111p) that is shared with other processes or virtual machines running on the host. The CPU 111p for a server 111 could comprise a dedicated (for a period of time) processing core of a physical SOC within a physical host server. Or, the CPU 111p for a server could comprise a combination of the allocation of resources from a physical SOC within a physical host server as described in the previous two sentences.

CPU 111p can also include a secure processing environment (SPE) 111u in order to conduct post-quantum cryptography (PQC) key encapsulation mechanism (KEM) operations and algorithms, such as, but not limited to, (i) conducting KEM ENCAPS function 103k depicted and described in connection with FIG. 1 above and (ii) conducting HKDF function 210a in order to derive first shared secret key K1 102k-1. SPE 111u can comprise a dedicated area of silicon or transistors within CPU 111p in order to isolate the PQC KEM operations from other programs or software operated by CPU 111p, including many processes or programs running operating system 111g. SPE 111u could contain RAM memory equivalent to RAM 111m and nonvolatile memory equivalent to storage memory 111b, as well as a separately functioning processor on a smaller scale than CPU 111p, such as possibly a dedicated processor core within CPU 111p. SPE 111u can comprise a "secure enclave" or a "secure environment", based on the manufacturer of CPU 111p. In some exemplary embodiments, an SPE 111u can be omitted and the CPU 111p can conduct PQC KEM and general cryptographic calculations without an SPE 111u.

A processor 111p for server 111 could include a hardware random number generator 128. The hardware random number generator 128 can use a sensor such as a sensor in server 111 to collect environmental noise measurements such as silicon thermal noise, noise values within RAM or nonvolatile memory cells, and other possibilities exist as well for a hardware random number generator 128 to collect noise or environmental data for the processor to calculate a random number. The random number or a secure hash value over the random number can also be used to generate the value M1 208a as a random number for the KEM ENCAPS function 103k in a step 208 above. Other random numbers used by a server 111 herein can be generated with hardware random number generator 128.

RAM 111m may comprise a random access memory for server 111. RAM 111m can be a volatile memory providing rapid read/write memory access to CPU 111p. RAM 111m could be located on a separate integrated circuit in server 111 or located within CPU 111p. The RAM 111m can include data recorded in server 111 for the operation when communicating with a plurality of devices 101 or a device 101. RAM 111m may be connected to CPU 111p using a system bus 111c which could comprise a memory bus, such as supporting DDR5 RAM memory and other possibilities exist as well. As depicted and described in connection with FIG. 1 above, RAM 111m could also include an operating system 111g, or components of an operating system 111g such as a kernel, and other components of operating system 111g, such as some supporting libraries could be stored within storage memory 111b. In other words, although operating system (OS) 111g is depicted in FIG. 11 as being stored within nonvolatile memory 111b, some portions of OS 111g could be stored within RAM when server 111 operates (such as the kernel), and other portions could be stored in nonvolatile memory 111b, such as device drivers.

The system bus 111c may be any of several types of bus structures including a memory bus or memory controller, a peripheral bus, and a local bus using any of a variety of bus architectures including a data bus. System bus 111c connects components within server 111 as illustrated in FIG. 11, such as transferring electrical signals between the components illustrated. Server 111 can include multiple different versions of bus 111c to connect different components, including a first system bus 111c between CPU 111p and RAM 111m (which could be a memory bus), and a second system bus 111c between CPU 111p and WAN interface 111d-1 or LAN interface 111d-2, which could be an I2C bus, an SPI bus, a PCI bus, or similar data busses.

In exemplary embodiments, RAM 111m operating with server 111 can record values and algorithmic steps or computer instructions for securely conducting a post-quantum cryptography (PQC) key encapsulation mechanisms (KEM). RAM 111m may also store the value M1 208a from a step 208 above in FIG. 1. RAM 111m may store the computer executable instructions for conducting the steps and associated variables and values or constants for steps 203a, 203b, 204, 205, 208, 209, 206, 207, 210, 211, 212, 226, 227, 228, 229, 230, 231, 232, 255, 252, 253, 256, 257, 258, 253', 259, 260, 266, 203a', 208', 209', 267, 268, 269, and 270 which are depicted and described in connection with FIGS. 2a through 2c above and also previous Figures herein. A select portion of the above steps are depicted in FIG. 11 above for RAM 111m memory in server 111, although data for all of the above steps could be stored in RAM 111m during a first session 250 and a resumed session 251. The exemplary steps depicted in RAM 111m listed in the above sentence can comprise computer executable instructions for the processor CPU 111p as well as memory cells for storing constants and variables associated with conducting the computer executable instructions. The computer executable instructions for the different steps can be stored in storage memory 111b when the server 111 is powered off or in an extended sleep state (such as greater than 10 seconds). The computer executable instructions can be moved by an OS 111g from the storage memory 111b to the RAM 111m during a boot process or a process for the server 111 to begin supporting communications with at least one device 101.

Note that the associated data or values for the steps can also be stored within RAM 111m for a period of time to both conduct the step and use the resulting data in subsequent steps. As one example, in a step 210 to conduct a hash based key derivation function (HKDF) 210a (depicted and described in connection with FIG. 3 above), the output from a step 209 comprising a first shared secret key K1 102k-1 can be stored in RAM 111m and be input into the HKDF 210a. In other words and as one example, the depiction of a step 210 in RAM 111m can include both (i) the computer executable instructions to conduct the step and (ii) the data or values associated with the step such as the first shared secret key K1 102k-1 generated or processed by the step. Consequently, a step depicted in RAM 111m can include all of the associated data and instructions or logic to conduct the step, where details for the steps are depicted in the Figures above. The output of the HKDF 210a can comprise the first shared symmetric ciphering key S1 210b and MAC key MAC1 210c, which could also be stored within RAM 111m and within physical memory associated with a step 210 allocated to RAM 111m.

As another example for RAM 111m within server 111 or allocated to server 111, RAM 111m could store both computer executable instructions and associated values for a step 227 as depicted in FIG. 5 above. The step 227 within RAM could include the data from message 213, the first shared secret key K1 102k-1, the second shared secret key K2 102k-2 (received from a message 225 from device 101), and the HDKF 221a, as well as the second symmetric ciphering key S2 221b and MAC key MAC2 221c. For some data within RAM 111m for step 227, the depicted data for a step 227 or recited data from the previous sentence could comprise a pointer within RAM 111m for a step 227, such that the data could be recorded or stored within RAM 111m in a different location within RAM 111m than the memory allocated to data for step 227 within RAM 111m. For embodiments where CPU 111p includes an SPE 111u, then the data for step 227 (as well as similar steps for processing KEM functions or processing with symmetric ciphering keys and MAC keys) could be stored within RAM memory within the SPE 111u instead of general RAM 111m for the server 111 or 111'.

Nonvolatile memory 111b or "storage memory" 111b (which can also be referred to herein as "memory 111b") within server 111 can comprise a non-volatile memory for long-term storage of data, including times when server 111 may be powered off or within an extended sleep state such as a sleep state longer than a few seconds. Memory 111b may be a NAND flash memory or a NOR flash memory and record firmware for server 111, such as a bootloader program and OS 111g. Memory 111b can record long-term and non-volatile storage of data or files for server 111. In an exemplary embodiment, OS 111g is recorded in memory 111b when server 111 is powered off, and portions of memory 111b are moved by CPU 111p into RAM 111m using a boot loader when server 111 powers on.

Memory 111b (i) can be integrated with CPU 111p into a single integrated circuit (potentially as a "system on a chip"), or (ii) operate as a separate integrated circuit or a removable card or "disk", such as a solid state drive (SSD). Storage memory 111b can also comprise a plurality of spinning hard disk drives in a redundant array of independent disks (RAID) configuration. Memory 111b may also be referred to as "server storage" and can include exemplary file systems of FAT16, FAT 32, NTFS, ext3, ext4, UDF, or similar file systems. As contemplated herein, the terms "memory 111b", "storage memory 111b", and "nonvolatile memory 111b" can be considered equivalent. As depicted in FIG. 11, non-volatile memory 111b can record cryptographic algorithms 103s, cryptographic parameters 103x, server PQC KEM parameters 103f, and at least one server identity of 111a.

When server 111 is powered off, nonvolatile memory 111b can store an operating system (OS) 101g from a step 201c. When server 111 is powered on, RAM memory 111m could store portions of the OS 111g. The operating system (OS) 111g can include Internet protocol stacks such as a User Datagram Protocol (UDP) stack, Transmission Control Protocol (TCP) stack, a domain name system (DNS) stack, a TLS stack, a DPP stack, a boot process loaded by a boot loader from storage memory 111b, etc. The operating system 111g may include timers and schedulers for managing the access of software to hardware resources within server 111, where the hardware resources managed by OS 111g can include CPU 111p, RAM 111m, nonvolatile memory 111b, and system bus 111c, and well as connections to the IP network 107 via a WAN interface 111d-1 and also the network database 103db via LAN interface 111d-2. The operating system shown of 111g can be appropriate for a higher power computing device with more memory and CPU resources (compared to a device 101). Example operating systems 111g for a server 111 includes Linux or Windows® Server, and other possibilities exist as well.

As depicted in FIG. 11, OS 111g in FIG. 11 can contain algorithms, programs, or computer executable instructions (by processor 111p or SPE 111u) for conducting both (i) a first secure session 250 with the device 101 and (ii) a resumed session 251. Example steps depicted include the steps to process the transmission of a message 213 and send a message 233. An OS 111g can include algorithms for the server 111 to conduct a step 203a for processing a message 202 from device 101, where the message 202 and steps 203a is depicted and described in connection with FIG. 2a above. An OS 111g could also store server extensions 103g. An OS 111g can also include the executable instructions for processor 111p to send messages, such as but not limited to, a message 213 as depicted and described above in connection with FIG. 2a. In other words, OS 111g can include libraries and drivers such that the message 213 could be assembled based on the output and data from the series of steps 203a through 212 depicted and described in connection with FIG. 2a, and then the OS 111g could write the data for message 213 via the system bus 111c to the WAN interface 111d-1, where the WAN interface 111d-1 can subsequently transmit the message 213 to the IP network 107. Equivalent steps by OS 111g could be taken to receive message 225.

An OS 111g can also include the executable instructions for processor 111p to receive messages such as, but not limited to, a message 254 and 254' as depicted and described above in connection with FIG. 2b and FIG. 2c. In other words, OS 111g can include libraries and drivers such that the message 254 could be received from the IP network 107 using the WAN interface 111d-1 and system bus 111c. The OS 111g could parse the data received in a message 254 and store contents from the message 254 in RAM 111m such that the server 111 could conduct the subsequent steps using the data from the message 254. The OS 111g could write data from the message 254 to RAM 111m, and then the computer executable steps in RAM 111m such as associated with steps 255 through 260 could process the data from a message 254. The receipt of a message 254 and then steps 255 through 260 using the data from a message 254 is also depicted and described in connection with FIG. 2b above.

Server 111 can include a WAN interface 111d-1 to communicate with IP network 107 and a plurality of devices 101, as depicted in FIG. 1 above (where FIG. 1 depicts a single device 101). WAN interface 111d-1 can comprise either a wired connection such as Ethernet or a wireless connection. For wireless configurations of server 111, then WAN interface 111d-1 can comprise a radio, which could connect with an antenna in order to transmit and receive radio frequency signals. For a wireless configuration of server 111, WAN interface 111d-1 within server 111 can provide connectivity to an IP network 107 through 3GPP standards such as 3G, 4G, 4G LTE, and 5G networks, or subsequent and similar standards.

Server 111 may also operate a LAN interface 111d-2, where LAN interface 111d-2 can be used to connect and communicate with other servers in a network 103, such as a network database 103db through private network. LAN interface 111d-2 can comprise a physical interface connected to system bus 111c for server 111. In exemplary embodiments, LAN interface 111d-2 can comprise an Ethernet or fiber optic physical connection. In other words, (i) LAN interface 111d-2 can connect server 111 to private network (which could comprise an IP network with private IP addresses that are not globally routable), and (ii) WAN interface 111d-1 can comprise an interface for communicating with a plurality of devices 101 through potentially insecure networks such as the globally routable public Internet. The use of a separate WAN interface 111d-1 and LAN interface 111d-2 can increase the security of operation for server 111. However, the use of separate physical interfaces for LAN interface 111d-2 and WAN interface 111d-1 can be omitted, and a single physical interface such as Ethernet or fiber-optic could be used by server 111 to communicate with both devices 101 and at least a device 101.

Server 111 may also optionally include user interface 111y which may include one or more sub-servers for receiving inputs and/or one or more sub-servers for conveying outputs. User interfaces are known in the art and may be simple for many servers 111 such as a few LED lights or and LCD display, and thus user interfaces are not described in detail here. User interface 111y could comprise a touch screen or screen display with keyboard and mouse, if server 111 has sophisticated interaction with a user, such as a network administrator. Server 111 can optionally omit a user interface 111y, if no user input or display is required for establishing communications within a network 103 and/or IP network 107.

Although not depicted in FIG. 11, server 111 can include other components to support operation, such as a clock, power source or power connection, antennas, etc. Other possibilities exist as well for hardware and electrical components operating in a server 111 without departing from the scope of the present disclosure. Using the electrical components depicted in FIG. 11, a server 111 could send and receive the data 106 in FIG. 1 in an encrypted and secure manner after conducting the authenticated PQC KEM steps as contemplated herein, in order to conduct secure communications with a plurality of devices 101. Using the electrical components depicted in FIG. 11, a server 111 could conduct both a first session 250 depicted and described in connection with FIG. 2a and a resumed session 251 depicted and described in connection with FIG. 2b and FIG. 2c.

Device 101 may consist of multiple electrical components in order to communicate with a plurality of servers 111 or servers 111' over time. In exemplary embodiments and as depicted in FIG. 11, device 101 with device hardware 101u can include a device identity 101aa, a processor 101p (depicted as "CPU 101p"), random access memory (RAM) 101m, storage memory 101bb (depicted as "nonvolatile memory 101bb, a network interface 101r (which could comprise a radio), a system bus 101t, and a user interface (UI) 101w. For some embodiments, a device 101 could also comprise a server for "server to server" communications, where the server as a device 101 operates in a "client mode" and the server as device 101 initiates the first session 250 with a message 202 in FIG. 2a.

Device identity 101aa could comprise a preferably unique alpha-numeric or hexadecimal identifier for device 101, such as an Ethernet MAC address, a domain name service (DNS) name, a subscriber permanent identifier (SUPI), an international mobile subscriber identity (IMSI), a network access identifier (NAI), an owner interface identifier in an IPv6 network, a serial number, an IP address, or other sequence of digits to uniquely identify each of the many different possible devices for a device 101 connected to an IP network 107. Device identity 101aa can preferably be recorded in a non-volatile memory and recorded by a device 101 upon configuration of a device 101, such as during a configuration step 201b depicted and described in connection with FIG. 2a above. For embodiments where device 101 operates as a server, then the device identity 101aa could also comprise a server identity 111a depicted and described for a server 111 above.

In exemplary embodiments, device 101 can operate with multiple different device identities 111a, such as a first device identity 101aa comprising device name within a device certificate 101c and a second device identity 101aa comprising a SUPI for use with a radio for network interface 101r. A third device identity 101aa could comprise an MAC address for network interface 101r. Different devices 101 could be associated with different device identities 101aa. Other possibilities exist as well for the use of a plurality of different device identities 101aa without departing from the scope of the present disclosure.

The CPU 101p can comprise a general purpose processor appropriate for lower processing power requirements for a device 101 compared to a server 111 with CPU 101p, and may operate with multiple different processor cores. CPU 101p can comprise a processor for device 101 such as an ARM® based processor or an Intel® based processor such as belonging to the ATOM® family of processors, and other possibilities exist as well. For some exemplary embodiments, the CPU 101p can be based on a processor using the RISC-V architecture. CPU 101p can utilize bus 111c to fetch instructions from RAM 101m and operate on the instruction. CPU 101p can include components such as registers, accumulators, and logic elements to add, subtract, multiply, and divide numerical values and record the results in RAM 101m or storage memory 101bb, and also write the values to an external interface such as network interface 101r. In exemplary embodiments, CPU 101p can perform the mathematical calculations for KEM DECAPS 101j, KEM ENCAPS 101k, symmetric ciphering, etc. depicted and described in connection with in FIG. 1, FIG. 2a, etc., above. A CPU 101p could also comprise a "system on a chip" (SOC) with a plurality of cores, including examples of the Apple "M" family of processors such as the M1 MAX, M2, etc. For embodiments where device 101 operates as a server, then the CPU 101p could also function as a CPU 111p for a server 111 depicted and described for a server 111 above.

For device 101 operating as a server, then the device 101 could also operate as a virtual machine or a container such as, but not limited to, within Docker or Kubernetes. The device 101 could be allocated a portion of a physical processor CPU 101p from a host operating system in order for the device 101 to conduct processing and computational steps as contemplated herein. The portion of a physical processor CPU 101p for the device 101 could comprise different embodiments without departing from the scope of the present disclosure. A CPU 101p for a device 101 could comprise a "time slice" of a physical SOC within a physical host computing device (such as repeated brief periods of time on the order of milliseconds or less for CPU 101p) that is shared with other processes or virtual machines running on the host. The CPU 101p for a device 101 could comprise a dedicated (for a period of time) processing core of a physical SOC within a physical host server. Or, the CPU 101p for a device 101 could comprise a combination of the allocation of resources from a physical SOC within a physical host computing device as described in the previous two sentences.

CPU 101p can also include a secure processing environment (SPE) or tamper resistant secure hardware (TRSH) 113 described for device 101 in FIG. 1 above. The SPE or TRSH conduct post-quantum cryptography (PQC) key encapsulation mechanism (KEM) operations and algorithms, such as, but not limited to, (i) conducting KEM ENCAPS function 101k depicted and described in connection with FIG. 1 above and (ii) conducting HKDF function 210a in order to derive first shared secret key K1 102k-1. SPE or TRSH 113 can comprise a dedicated area of silicon or transistors within CPU 101p in order to isolate the PQC KEM operations from other programs or software operated by CPU 101p, including many processes or programs running operating system 101g. SPE 111u could contain RAM 101m' memory equivalent to RAM 101m and nonvolatile memory equivalent to storage memory 101bb, as well as a separately functioning processor on a smaller scale than CPU 101p, such as possibly a dedicated processor core within CPU 101p. SPE or TRSH 113 can comprise a "secure enclave" or a "secure environment", based on the manufacturer of CPU 101p. In some exemplary embodiments, an SPE or TRSH 113 can be omitted and the CPU 101p can conduct PQC KEM and general cryptographic calculations without an SPE or TRSH 113.

A processor 101p for device 101 could include a hardware random number generator 128. The hardware random number generator 128 can use a sensor such as a sensor 101y in device 101 to collect environmental noise measurements such as silicon thermal noise, noise values within RAM or nonvolatile memory cells, and other possibilities exist as well for a hardware random number generator 128 to collect noise or environmental data for the processor to calculate a random number. The random number or a secure hash value over the random number can also be used to generate the value M2 219a as a random number for the KEM ENCAPS function 101k in a step 219 above. The hardware random number generator in CPU 101p can also be used to derive device ephemeral public keys ePK.device 101h. Other random numbers used by a device 101 for conducting or processing a first session 250 and a resumed session 251 can be generated with hardware random number generator 128.

RAM 101m may comprise a random access memory for device 101. RAM 101m can be a volatile memory providing rapid read/write memory access to CPU 101p. RAM 101m could be located on a separate integrated circuit in device 101 or located within CPU 101p. The RAM 101m can include data recorded in device 101 for the operation when communicating with a server 111 or 111'. RAM 101m may be connected to CPU 101p using a system bus 101t which could comprise a memory bus, such as supporting DDR5 RAM memory and other possibilities exist as well. Although not depicted in FIG. 11, RAM 101m could also include an operating system 101gg, or components of an operating system 101gg such as a kernel, and other components of operating system 101gg, and some supporting libraries could be stored within nonvolatile memory. In other words, although operating system (OS) 101gg is depicted in FIG. 11 as being stored within nonvolatile memory 101bb, some portions of OS 101gg could be stored within RAM when device 101 operates (such as the kernel), and other portions could be stored in nonvolatile memory 101bb, such as device drivers.

The system bus 101t may be any of several types of bus structures including a memory bus or memory controller, a peripheral bus, and a local bus using any of a variety of bus architectures including a data bus. System bus 101t connects electrical components within device 101 as illustrated in FIG. 11, such as transferring electrical signals between the components illustrated. Device 101 can include multiple different versions of bus 101t to connect different components, including a first system bus 101t between CPU 101t and RAM 101m (which could be a memory bus), and a second system bus 101t between CPU 101p and network interface 101r, which could be an I2C bus, an SPI bus, a PCI bus, or similar data busses.

In exemplary embodiments, RAM 101m operating with device 101 can record values and algorithmic steps or computer instructions for securely conducting a post-quantum cryptography (PQC) key encapsulation mechanisms (KEM). RAM 101m may also store the value M2 219a from a step 208 above in FIG. 1. RAM 101m may store the computer executable instructions for conducting the steps and associated variables and values or constants for steps 201d, 201e, 201f, 214, 215, 216, 217, 218, 219, 220, 221, 222, 223, 224, 234, 235, 236, 237a, 201d', 201e', 252, 253, 201f, 271, 214', 268, 269, 272, and 273 which are depicted and described in connection with FIGS. 2a through 2c above and also previous Figures herein. A select portion of the above steps are depicted in FIG. 11 above for RAM 101m memory in device 101, although data for all of the above steps could be stored in RAM 101m during a first session 250 and a resumed session 251. The exemplary steps depicted in RAM 101m listed in the above sentence can comprise computer executable instructions for the processor CPU 101p as well as memory cells for storing constants and variables associated with conducting the computer executable instructions. The computer executable instructions for the different steps can be stored in storage memory 101bb when the device 101 is powered off or in an extended sleep state (such as greater than an hour). The computer executable instructions can be moved by an OS 101gg from the storage memory 101bb to the RAM 101m during a boot process or a process for the device 101 to begin supporting communications with at least one device 101.

Note that the associated data or values for the steps can also be stored within RAM 101m for a period of time to both conduct the step and use the resulting data in subsequent steps. As one example, in a step 252 to conduct a hash based key derivation function (HKDF) 252h (depicted and described in connection with FIG. 7a above), the output from a step 230 comprising PSK 230-1 can be stored in RAM 101m and be input into the HKDF 252h. In other words and as one example, the depiction of a step 252 in RAM 101m can include both (i) the computer executable instructions to conduct the step and (ii) the data or values associated with the step such as the PSK 230-1 processed by the step. Consequently, a step depicted in RAM 101m can include all of the associated data and instructions or logic to conduct the step, where details for the steps are depicted in the Figures above. The output of the HKDF 252h can comprise the third shared symmetric ciphering key S3 252b and MAC key MAC3 252c, which could also be stored within RAM 101m and within physical memory associated with a step 252 allocated to RAM 101m.

As another example for RAM 101m within device 101 or allocated to device 101, RAM 101m could store both computer executable instructions and associated values for steps 220 and 221 as depicted in FIG. 5 above. The steps 220 and 221 within RAM 101m could include the data for message 213, the first shared secret key K1 102k-1, the second shared secret key K2 102k-2, and the HDKF 221a, as well as the second symmetric ciphering key S2 221b and MAC key MAC2 221c. For some data within RAM 101m for steps 220 and 221, the depicted data for steps 220 and 221 or recited data from the previous sentence could comprise a pointer within RAM 101m for steps 220 and 221, such that the data could be recorded or stored within RAM 101m in a different location within RAM 101m than the memory allocated to data for steps 220 and 221 within RAM 101m. For embodiments where CPU 101p includes a SPE or TRSH 113, then the data for steps 220 and 221 (as well as similar steps for processing KEM functions or processing with symmetric ciphering keys and MAC keys) could be stored within RAM 101m' within the SPE or TRSH 113 instead of general RAM 101m for the device 101.

Nonvolatile memory 101bb or "storage memory" 101bb (which can also be referred to herein as "memory 101bb") within device 101 can comprise a non-volatile memory for long-term storage of data, including times when device 101 may be powered off or within an extended sleep state such as a sleep state longer than several minutes. Memory 101bb may be a NAND flash memory or a NOR flash memory and record firmware for device 101, such as a bootloader program and OS 101gg. Memory 101bb can record long-term and non-volatile storage of data or files for device 101. In an exemplary embodiment, OS 101gg is recorded in memory 101bb when device 101 is powered off, and portions of memory 101bb are moved by CPU 101p into RAM 101m using a boot loader when device 101 powers on.

Memory 101bb (i) can be integrated with CPU 101p into a single integrated circuit (potentially as a "system on a chip"), or (ii) operate as a separate integrated circuit or a removable card or "disk", such as a solid state drive (SSD). Storage memory 101bb can also comprise a plurality of spinning hard disk drives in a redundant array of independent disks (RAID) configuration. Memory 101bb may also be referred to as "device storage" and can include exemplary file systems of FAT16, FAT 32, NTFS, ext3, ext4, UDF, or similar file systems. As contemplated herein, the terms "memory 101bb", "storage memory 101bb", and "nonvolatile memory 101bb" can be considered equivalent. As depicted in FIG. 11, non-volatile memory 101bb can record cryptographic algorithms 101s, cryptographic parameters 101x, device PQC KEM parameters 101f, and at least one device identity of 101aa.

When device 101 is powered off, nonvolatile memory 101b can store an operating system (OS) 101g from a step 201b. When device 101 is powered on, RAM memory 101m could store portions of the OS 101gg. The operating system (OS) 101gg can include Internet protocol stacks such as a User Datagram Protocol (UDP) stack, Transmission Control Protocol (TCP) stack, a domain name system (DNS) stack, a TLS stack, a DPP stack, a boot process loaded by a boot loader from storage memory 101bb, etc. The operating system 101gg may include timers and schedulers for managing the access of software to hardware resources within device 101, where the hardware resources managed by OS 101gg can include CPU 101p, RAM 101m, nonvolatile memory 101bb, and system bus 101t, and well as connections to the IP network 107 via a network interface 101r. The operating system shown of 101gg can be appropriate for lower power computing device with less memory and CPU resources (compared to a server 111). Example operating systems 101gg for a device 101 includes Linux or Android, and other possibilities exist as well.

As depicted in FIG. 11, OS 101gg in FIG. 11 can contain algorithms, programs, or computer executable instructions (by processor 101p or SPE 113) for conducting both (i) a first secure session 250 with the server 111 and (ii) a resumed session 251. Example steps depicted within OS 101gg include the steps to process the transmission of a message 202 and process and select device extensions 101g. An OS 101gg can include algorithms for the device 101 to conduct a step 201d for processing a message 202 from device 101, where the message 202 and steps 201d is depicted and described in connection with FIG. 2a above. An OS 101gg could also store and process device extensions 101g. An OS 101gg can also include the executable instructions for processor 101p to send messages, such as but not limited to, a message 225 as depicted and described above in connection with FIG. 2a and a message 254 as depicted and described above in connection with FIG. 2b. In other words, OS 101gg can include libraries and drivers such that the message 254 could be assembled based on the output and data from the series of steps 201d' through 201f depicted and described in connection with FIG. 2b, and then the OS 101gg could write the data for message 254 via the system bus 101t to the network interface 101r, where the network interface 101r can subsequently transmit the message 254 to the IP network 107 and server 111'.

An OS 101gg can also include the executable instructions for device 101 to receive messages such as, but not limited to, a message 261 and 261' as depicted and described above in connection with FIG. 2b and FIG. 2c. In other words, OS 101gg can include libraries and drivers such that the message 261 could be received from the IP network 107 using the network interface 101r and system bus 101t. The OS 101gg could parse the data received in a message 261 and store contents from the message 261 in RAM 101m such that the device 101 could conduct the subsequent steps using the data from the message 261. The OS 101gg could write data from the message 261 to RAM 101m, and then the computer executable steps in RAM 101m such as associated with steps 253', 262, and 263 could process the data from a message 261. The receipt of a message 261 and then steps 253', 262, and 263 using the data from a message 261 is also depicted and described in connection with FIG. 2b above.

Device 101 can include a network interface 101r to communicate with IP network 107 and a plurality of networks 103, as depicted in FIG. 1 above (where FIG. 1 depicts a single network 103). Network interface 101r can comprise either a wired connection such as Ethernet or a wireless connection. For wireless configurations of device 101, then network interface 101r can comprise a radio, which could connect with an antenna in order to transmit and receive radio frequency signals from base stations or Wi-Fi access points. For wired configurations of device 101, such as if device 101 is a server, router, or a fixed location computing device, then device 101 could include a wired configuration for network interface 101r, such as Ethernet, fiber optic, or a coaxial cable connection. Device 101 may also optionally include user interface 101w which was also depicted and described in connection with FIG. 1 above. Device 101 can optionally omit a user interface 101w, if no user input or display is required for establishing communications within a network 103 and/or IP network 107.

Although not depicted in FIG. 11, device 101 can include other components to support operation, such as a clock, power source or power connection, antennas, etc. Other possibilities exist as well for hardware and electrical components operating in a device 101 without departing from the scope of the present disclosure. Using the electrical components depicted in FIG. 11, a device 101 could send and receive the data 106 in FIG. 1 in an encrypted and secure manner after conducting the authenticated PQC KEM steps as contemplated herein, in order to conduct secure communications with a plurality of networks 103. Using the electrical components depicted in FIG. 11, a device 101 could conduct both a first session 250 depicted and described in connection with FIG. 2a and a resumed session 251 depicted and described in connection with FIG. 2b and FIG. 2c.

Conclusion

Various exemplary embodiments have been described above. Those skilled in the art will understand, however, that changes and modifications may be made to those examples without departing from the scope of the claims.

The invention claimed is:

1. A method for a device to conduct secure communications with a network, the method performed by the device, the method comprising:

a) storing, in nonvolatile memory, a plurality of key encapsulation mechanism (KEM) algorithms comprising a first KEM algorithm;

b) generating, by a processing unit, a device ephemeral private key and a corresponding device ephemeral public key for the first KEM algorithm;

c) transmitting, to the network via a network interface, a first message comprising (i) the device ephemeral public key, and (ii) identifiers for each of the plurality of KEM algorithms and the first KEM algorithm;

d) receiving, from the network via the network interface, a second message comprising a first asymmetric ciphertext and a first symmetric ciphertext of at least a server public key for a second KEM algorithm;

e) conducting a KEM decapsulation (DECAPS) function to generate a first shared secret K1 using the first asymmetric ciphertext and the first KEM algorithm;

f) conducting a KEM encapsulation (ENCAPS) function to generate a second shared secret K2 and a second asymmetric ciphertext using at least (i) the server public key and (ii) the second KEM algorithm;

g) deriving a symmetric ciphering key S2 using at least the K1 and the K2;

h) deriving a "pre-shared" secret key (PSK) using at least the K1 and the K2;

i) receiving, from the network, a third message comprising a second symmetric ciphertext of an identity of the PSK (PSK-ID), wherein the device decrypts the second symmetric ciphertext with the key S2;

j) transmitting, to the network, a fourth message requesting resumption of a secure session, the fourth message comprising the PSK-ID and a random number generated by the device;

k) generating a symmetric ciphering key S3 using the PSK and the random number;

l) Receiving, from the network, a third symmetric ciphertext; and m) decrypting the third symmetric ciphertext using the key S3.

2. The method of claim 1, further comprising in step g), deriving a symmetric ciphering key S2 using at least the K1 and the K2 with one of (i) a HMAC-based Extract-and-Expand Key Derivation Function (HKDF) and (ii) a hash-based key derivation function.

3. The method of claim 2, further comprising in step g) using the HKDF to derive a message authentication code (MAC) key and an initialization vector for the second symmetric ciphertext.

4. The method of claim 1, further comprising in step h), deriving the PSK using at least plaintext data from the first message and the second message with one of a HKDF and a hash-based key derivation function.

5. The method of claim 1, further comprising in step h), generating a symmetric ciphering key S3 using the PSK and the random number with one of a HKDF and a hash-based key derivation function.

6. The method of claim 5, further comprising in step k) using the HKDF to derive a message authentication code (MAC) key and an initialization vector for the third symmetric ciphertext.

7. The method of claim 1, wherein the first KEM algorithm comprises a first algorithm type for lattice-based cryptography and the second KEM algorithm comprises a second algorithm type for code-based cryptography.

8. The method of claim 1, wherein the first KEM algorithm comprises a first algorithm type for code-based cryptography and the second KEM algorithm comprises a second algorithm type for lattice-based cryptography.

9. The method of claim 1, wherein the server public key comprises a server static public key, wherein a plaintext for the first symmetric ciphertext includes a server certificate with the server static public key and an identity for the second KEM algorithm.

10. The method of claim 1, wherein the server public key comprises a server ephemeral public key, and wherein a plaintext for the first symmetric ciphertext includes a server digital signature over at least the server ephemeral public key and the device ephemeral public key.

11. The method of claim 1, wherein the symmetric ciphering key S2 comprises a first portion and a second portion, wherein in step i) the device decrypts with the first portion of the key S2, and wherein the second portion of the key S2 comprises an encryption key.

12. The method of claim 1, wherein the secure session comprises step c) through step i).

13. The method of claim 1, wherein the device comprises one of a personal computer, a laptop computer, a mobile handset, a router, and a server.

* * * * *